(12) United States Patent
Nakayama et al.

(10) Patent No.: US 9,249,295 B2
(45) Date of Patent: *Feb. 2, 2016

(54) CARBON FIBER-REINFORCED THERMOPLASTIC RESIN COMPOSITION, MOLDING MATERIAL, PREPREG, AND METHODS FOR PRODUCING SAME

(71) Applicant: TORAY INDUSTRIES, INC., Tokyo (JP)

(72) Inventors: Yoshifumi Nakayama, Iyo-gun (JP); Toshiya Kamae, Iyo-gun (JP); Daigo Kobayashi, Iyo-gun (JP); Makoto Endo, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/345,889

(22) PCT Filed: Sep. 21, 2012

(86) PCT No.: PCT/JP2012/074215
§ 371 (c)(1),
(2) Date: Mar. 19, 2014

(87) PCT Pub. No.: WO2013/051404
PCT Pub. Date: Apr. 11, 2013

(65) Prior Publication Data
US 2014/0228519 A1  Aug. 14, 2014

(30) Foreign Application Priority Data

| Oct. 4, 2011 | (JP) | 2011-219847 |
| Dec. 5, 2011 | (JP) | 2011-266149 |
| Dec. 5, 2011 | (JP) | 2011-266225 |
| Dec. 5, 2011 | (JP) | 2011-266226 |
| Dec. 5, 2011 | (JP) | 2011-266228 |

(51) Int. Cl.
*C08L 63/04* (2006.01)
*C08J 5/06* (2006.01)
(Continued)

(52) U.S. Cl.
CPC . *C08L 63/04* (2013.01); *B29D 7/01* (2013.01); *C08J 5/06* (2013.01); *C08J 5/24* (2013.01); *C08L 63/00* (2013.01); *C08J 2300/22* (2013.01)

(58) Field of Classification Search
CPC .................................. C08L 63/00; C08L 63/04
USPC .......................................................... 525/109
See application file for complete search history.

(56) References Cited

U.S. PATENT DOCUMENTS 3,674,581 A * 7/1972 Kalnin et al. .................... 156/84
4,804,427 A * 2/1989 Paul et al. ...................... 156/181
(Continued)

FOREIGN PATENT DOCUMENTS

| JP | 52-45672 A | 4/1977 |
| JP | 60-139875 A | 7/1985 |

(Continued)

OTHER PUBLICATIONS

International Search Report issued in PCT/JP2012/074215, dated Jan. 8, 2013.

*Primary Examiner* — Megan McCulley
(74) *Attorney, Agent, or Firm* — Birch, Stewart, Kolasch & Birch, LLP

(57) ABSTRACT

Provided are a carbon fiber-reinforced thermoplastic resin composition excellent in interfacial adhesion between carbon fiber and a thermoplastic resin and excellent in dynamic characteristics, and a molding material, a prepreg, and a method for producing the same. The carbon fiber-reinforced thermoplastic resin composition includes the following components (A) and (B), carbon fiber and a thermoplastic resin; component (A): (A1) a bifunctional or higher functional epoxy compound and/or (A2) an epoxy compound which has a monofunctional or higher epoxy group and has one or more taypes of functional groups selected from a hydroxyl group, an amide group, an imide group, a urethane group, a urea group, a sulfonyl group and a sulfo group; and component (B): 0.1 to 25 parts by mass, based on 100 parts by mass of the component (A), of at least one reaction accelerator selected from the group consisting of [a] a specific tertiary amine compound (salt) (B1), [b] a specific quaternary ammonium salt (B2) and [c] a quaternary phosphonium salt and/or phosphine compound (B3).

26 Claims, 2 Drawing Sheets

(51) Int. Cl.
  *C08J 5/24* (2006.01)
  *B29D 7/01* (2006.01)
  *C08L 63/00* (2006.01)

(56) References Cited

U.S. PATENT DOCUMENTS

| | | | |
|---|---|---|---|
| 5,140,071 A | | 8/1992 | Kroker et al. |
| 5,177,056 A | * | 1/1993 | Hilti et al. .................. 505/122 |
| 5,242,748 A | * | 9/1993 | Folda et al. .................. 442/175 |
| 5,242,958 A | | 9/1993 | Klett |
| 5,462,799 A | * | 10/1995 | Kobayashi et al. ............ 428/364 |
| 6,179,944 B1 | * | 1/2001 | Monolo et al. ................ 156/169 |
| 6,503,967 B1 | * | 1/2003 | Kitajima et al. ............... 523/421 |
| 2002/0150755 A1 | * | 10/2002 | Kobayashi et al. ............ 428/364 |
| 2009/0048385 A1 | * | 2/2009 | Horio ........................... 524/495 |
| 2009/0069512 A1 | * | 3/2009 | Yeager et al. ................. 525/474 |
| 2010/0062211 A1 | * | 3/2010 | Kawazoe et al. .............. 428/116 |
| 2010/0178495 A1 | * | 7/2010 | Taketa et al. ................. 428/339 |
| 2010/0252438 A1 | * | 10/2010 | Yoshikawa et al. ............. 205/50 |
| 2010/0280151 A1 | * | 11/2010 | Nguyen et al. ................ 523/215 |
| 2011/0058948 A1 | * | 3/2011 | Jacob et al. .................... 416/230 |
| 2011/0097568 A1 | * | 4/2011 | Kamae et al. ................. 428/222 |
| 2012/0028047 A1 | * | 2/2012 | Imai et al. .................... 428/403 |
| 2013/0089736 A1 | | 4/2013 | Nakayama et al. |
| 2014/0342144 A1 | * | 11/2014 | Nakayama et al. ........... 428/220 |

FOREIGN PATENT DOCUMENTS

| | | |
|---|---|---|
| JP | 4-119171 A | 4/1992 |
| JP | 7-505658 A | 6/1995 |
| JP | 9-217281 A | 8/1997 |
| JP | 2005-146429 A | 6/2005 |
| WO | WO 2012/002266 A1 | 1/2012 |

* cited by examiner

CARBON FIBER-REINFORCED THERMOPLASTIC RESIN COMPOSITION, MOLDING MATERIAL, PREPREG, AND METHODS FOR PRODUCING SAME

TECHNICAL FIELD

The present invention relates to a carbon fiber-reinforced thermoplastic resin composition which is suitably used for aircraft components, spacecraft components, automobile components, watercraft components and the like, and a molded article formed by molding the carbon fiber-reinforced thermoplastic resin composition.

BACKGROUND ART

Since carbon fiber has an excellent strength and elastic modulus while it is lightweight, composite materials obtained by combining carbon fiber with various matrix resins are used in many fields such as those of aircraft components, spacecraft components, automobile components, watercraft components, civil engineering and construction materials and sports goods. For taking advantage of excellent characteristics of carbon fiber in composite materials using carbon fiber, it is important to have excellent interfacial adhesion between carbon fiber and a matrix resin.

For improving interfacial adhesion between carbon fiber and a matrix resin, a method is usually practiced in which carbon fiber is subjected to an oxidation treatment such as gas phase oxidation or liquid phase oxidation to introduce an oxygen-containing functional group to the surface of carbon fiber. For example, a method has been proposed in which carbon fiber is subjected to an electrolytic treatment to improve interlayer shear strength as an index of interfacial adhesion (see Patent Document 1). In recent years, however, interfacial adhesion which can be achieved by such an oxidation treatment alone has been becoming insufficient as the level of required characteristics of composite materials has been raised.

On the other hand, carbon fiber is fragile and poor in collectability and friction resistance, so that fuzz and thread breakage easily occur in the high-order processing step. Therefore, a method is usually practiced in which a sizing agent is applied to carbon fiber.

For example, a method has been proposed in which as a sizing agent, diglycidyl ether of bisphenol A is applied to carbon fiber (see Patent Documents 2 and 3). A method has been proposed in which as a sizing agent, a polyalkylene oxide adduct of bisphenol A is applied to carbon fiber (see Patent Documents 4 and 5). A method has been proposed in which as a sizing agent, a polyalkylene oxide adduct of bisphenol A with an epoxy group added thereto is applied to carbon fiber (see Patent Documents 6 and 7). Further, a method has been proposed in which as a sizing agent, an epoxy adduct of polyalkylene glycol is applied to carbon fiber (see Patent Documents 8, 9 and 10).

In addition, a method has been proposed in which as a sizing agent, a urethane compound having an epoxy group and a quaternary ammonium salt is applied to carbon fiber (see Patent Document 11). Even with the proposed methods, interfacial adhesion between carbon fiber and a matrix resin cannot be improved although collectability and friction resistance are improved.

It is known that with these methods, collectability and friction resistance of carbon fiber are improved. However, in these previous proposals, there is no technical idea of positively improving interfacial adhesion between carbon fiber and a matrix resin by a sizing agent, and interfacial adhesion between carbon fiber and a matrix resin cannot be significantly improved in practice.

On the other hand, a method is practiced in which a specific sizing agent is applied to carbon fiber for the purpose of improving the impregnation property of a matrix resin into carbon fiber.

For example, a method has been proposed in which as a sizing agent, a cationic surfactant having a surface tension of 40 mN/m or less and a viscosity of 200 Pa·s or less at 80° C. is applied to carbon fiber (see Patent Document 12). In addition, a method has been proposed in which as a sizing agent, an epoxy resin, a water-soluble polyurethane resin and a polyether resin are applied to carbon fiber (see Patent Document 13). With these methods, collectability of carbon fiber and the impregnation property of a matrix resin into carbon fiber are improved. However, in these previous proposals, there is no technical idea of positively improving interfacial adhesion between carbon fiber and a matrix resin by a sizing agent, and interfacial adhesion between carbon fiber and a matrix resin cannot be significantly improved in practice.

Thus, so far the sizing agent has been used as so called a paste for the purpose of improving high-order processability and improving the impregnation property of a matrix resin into carbon fiber, and little attempt has been made to improve interfacial adhesion between carbon fiber and a matrix resin by a sizing agent. Even in cases of making the above-mentioned attempt, the effect of improvement of interfacial adhesion is insufficient, or limited with an effect exhibited only by combination with special carbon fiber.

For example, a method has been proposed in which as a sizing agent, N,N,N',N'-tetraglycidyl metaxylylenediamine is applied to carbon fiber (see Patent Document 14). In this proposed method, however, interfacial adhesion is still insufficient although it is shown that interlayer shear strength as an index of interfacial adhesion is improved as compared to a case where glycidyl ether of bisphenol A is used. Further, there is the problem that since N,N,N',N'-tetraglycidyl metaxylylenediamine used in this proposal includes aliphatic tertiary amine in the backbone and thus has nucleophilicity, it undergoes a self-polymerization reaction, and resultantly a carbon fiber bundle is hardened with time, so that high-order processability is deteriorated.

A method has been proposed in which as a sizing agent, a mixture of a vinyl compound monomer having a glycidyl group and an amine curing agent for epoxy resin is applied to carbon fiber (see Patent Document 15). In this proposed method, however, interfacial adhesion is still insufficient although it is shown that interlayer shear strength as an index of interfacial adhesion is improved as compared to a case where an amine curing agent is not used. Further, there is the problem that since the glycidyl group and the amine curing agent react with each other to increase a molecular weight in a step of drying the sizing agent, resultantly a carbon fiber bundle is hardened to deteriorate high-order processability, and further gaps between pieces of carbon fiber are narrowed to deteriorate the impregnation property of a resin.

A method of using a sizing agent having an epoxy-based compound in combination with an amine curing agent is proposed in other documents (see Patent Document 16). However, according to this proposal, the handling characteristics and impregnation property of a fiber bundle is improved, but on the other hand, adhesion between carbon fiber and an epoxy matrix resin may be hindered as a film of the sizing agent having an increased molecular weight is formed on the surface of carbon fiber.

Further, a method has been proposed in which an amine compound is applied to carbon fiber (see Patent Document 17). In this proposed method, however, interfacial adhesion is still insufficient although it is shown that interlayer shear strength as an index of interfacial adhesion is improved as compared to a case where application to carbon fiber is not performed. In this proposal, there is no detailed description of the adhesion improvement mechanism, but the roughly estimated mechanism is as follows. That is, in this proposal, ethylenetriamine and xylenediamine containing a primary amino group and piperidine and imidazole containing a secondary amino group are used, and all of these compounds include active hydrogen in the molecule. The active hydrogen may act on an epoxy matrix resin to accelerate a curing reaction. For example, a hydroxyl group generated by a reaction of an epoxy matrix with the amine compound and a carboxyl group and a hydroxyl group etc. of the surface of carbon fiber may form a hydrogen bonding interaction to improve adhesion. In this proposal, however, the effect of improvement of interfacial adhesion is still insufficient as described above, and requests required for composite materials in recent years cannot be satisfied.

Further, as another example of using an amine compound as a sizing agent, a method has been proposed in which a cured product of a thermosetting resin and an amine compound is used (see Patent Document 18). In this proposal, the amine compound is defined as a compound having an active group which can react with an epoxy group, and m-xylenediamine containing a primary amino group and piperazine containing a secondary amino group are used. The object of this proposal is to improve collectability and handling characteristics of a carbon fiber bundle by positively reacting active hydrogen contained in an amine compound with a thermosetting resin, typically an epoxy resin to produce a cured product. The carbon fiber bundle is limited to chopped applications, and dynamic characteristics related to interfacial adhesion in a molded product after the carbon fiber bundle is melt-kneaded with the thermoplastic resin are still insufficient.

Further, a method has been proposed in which as carbon fiber, one with the surface oxygen concentration O/C, surface hydroxyl group concentration and carboxyl group concentration falling within a specific range is used, and as a sizing agent, an aliphatic compound having a plurality of epoxy groups is applied to carbon fiber (see Patent Document 19). In this proposed method, however, although it is shown that EDS as an index of interfacial adhesion is improved, the effect of improvement of interfacial adhesion between carbon fiber and a matrix resin is insufficient, and the effect of improvement of interfacial adhesion is limited with an effect exhibited only by combination with special carbon fiber.

As described above, in conventional techniques, interfacial adhesion between carbon fiber and a matrix resin is insufficient, and particularly when a thermoplastic resin is used, interfacial adhesion between the resin and carbon fiber is poor. Therefore a further interfacial adhesion improvement technique is required.

PRIOR ART DOCUMENTS

Patent Documents

Patent Document 1: Japanese Patent Laid-open Publication No. 04-361619
Patent Document 2: U.S. Pat. No. 3,957,716
Patent Document 3: Japanese Patent Laid-open Publication No. 57-171767
Patent Document 4: Japanese Patent Laid-open Publication No. 07-009444
Patent Document 5: Japanese Patent Laid-open Publication No. 2000-336577
Patent Document 6: Japanese Patent Laid-open Publication No. 61-028074
Patent Document 7: Japanese Patent Laid-open Publication No. 01-272867
Patent Document 8: Japanese Patent Laid-open Publication No. 57-128266
Patent Document 9: U.S. Pat. No. 4,555,446
Patent Document 10: Japanese Patent Laid-open Publication No. 62-033872
Patent Document 11: U.S. Pat. No. 4,496,671
Patent Document 12: Japanese Patent Laid-open Publication No. 2010-31424
Patent Document 13: Japanese Patent Laid-open Publication No. 2005-320641
Patent Document 14: Japanese Patent Laid-open Publication No. 52-059794
Patent Document 15: Japanese Patent Laid-open Publication No. 52-045673
Patent Document 16: Japanese Patent Laid-open Publication No. 2005-146429
Patent Document 17: Japanese Patent Laid-open Publication No. 52-045672
Patent Document 18: Japanese Patent Laid-open Publication No. 09-217281
Patent Document 19: U.S. Pat. No. 5,691,055

SUMMARY OF THE INVENTION

Problems to be Solved by the Invention

Thus, in view of the problems of conventional techniques described above, an object of the present invention is to provide a carbon fiber-reinforced thermoplastic resin composition excellent in interfacial adhesion between carbon fiber and a thermoplastic resin and excellent in dynamic characteristics, and a molding material, a prepreg, and a method for producing the same.

Solutions to the Problems

The present inventors have found that by blending (A) a specific epoxy compound and (B) a specific tertiary amine compound and/or tertiary amine salt, quaternary ammonium salt, quaternary phosphonium salt and/or phosphine compound in a specific ratio in a composition including carbon fiber and a thermoplastic resin, interfacial adhesion between carbon fiber and the thermoplastic resin is enhanced, so that a carbon fiber-reinforced thermoplastic resin composition excellent in dynamic characteristics is obtained, leading to the present invention.

That is, the present invention provides a carbon fiber-reinforced thermoplastic resin composition including the following components (A) and (B), carbon fiber and a thermoplastic resin:

component (A): (A1) a bifunctional or higher functional epoxy compound and/or (A2) an epoxy compound which has a monofunctional or higher epoxy group and has one or more types of functional groupes selected from a hydroxyl group, an amide group, an imide group, a urethane group, a urea group, a sulfonyl group and a sulfo group; and component (B): 0.1 to 25 parts by mass, based on 100 parts by mass of the component (A), of at least one reaction accelerator selected from the group consisting of the following compounds [a], [b] and [c]:

[a] a tertiary amine compound and/or tertiary amine salt having a molecular weight of 100 g/mol or more (B1);

[b] a quaternary ammonium salt (B2) having a cation site represented by the following general formula (I) or (II):

[Chemical Formula 1]

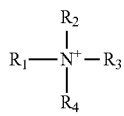

Formula (I)

[Chemical Formula 2]

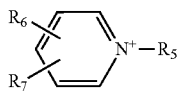

Formula (II)

wherein $R_1$ to $R_5$ each represent a hydrocarbon group with a carbon number of 1 to 22, a group containing a hydrocarbon with a carbon number of 1 to 22 and an ether structure or a group containing a hydrocarbon with a carbon number of 1 to 22 and an ester structure or a group containing a hydrocarbon with a carbon number of 1 to 22 and a hydroxyl group; and $R_6$ and $R_7$ each represent hydrogen, a hydrocarbon group with a carbon number of 1 to 8, a group containing a hydrocarbon with a carbon number of 1 to 8 and an ether structure or a group containing a hydrocarbon with a carbon number of 1 to 8 and an ester structure; and

[c] a quaternary phosphonium salt and/or phosphine compound (B3).

According to a preferred aspect of the carbon fiber-reinforced thermoplastic resin composition of the present invention, the component (B) is contained in an amount of 0.001 to 0.3 parts by mass based on 100 parts by mass of carbon fiber.

According to a preferred aspect of the carbon fiber-reinforced thermoplastic resin composition of the present invention, the [a] tertiary amine compound and/or tertiary amine salt having a molecular weight of 100 g/mol or more (B1) is a compound represented by the following general formula (III):

[Chemical Formula 3]

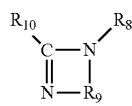

Formula (III)

wherein $R_8$ represents a hydrocarbon group with a carbon number of 1 to 22, a group containing a hydrocarbon with a carbon number of 1 to 22 and an ether structure or a group containing a hydrocarbon with a carbon number of 1 to 22 and an ester structure or a group containing a hydrocarbon with a carbon number of 1 to 22 and a hydroxyl group; $R_9$ is an alkylene group with a carbon number of 3 to 22, and may contain an unsaturated group; and $R_{10}$ represents hydrogen, a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group; or $R_8$ and $R_{10}$ are bonded to each other to form an alkylene group with a carbon number of 2 to 11; a compound represented by the following general formula (IV):

[Chemical Formula 4]

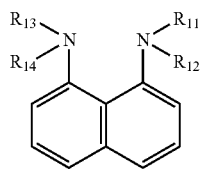

Formula (IV)

wherein $R_{11}$ to $R_{14}$ each represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group; a compound represented by the following general formula (V):

[Chemical Formula 5]

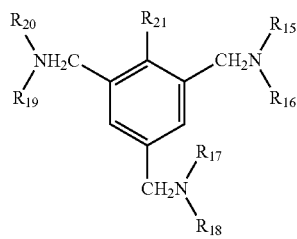

Formula (V)

wherein $R_{15}$ to $R_{20}$ each represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group; and $R_{21}$ represents a hydrocarbon group with a carbon number of 1 to 22, a group containing a hydrocarbon with a carbon number of 1 to 22 and an ether structure, a group containing a hydrocarbon with a carbon number of 1 to 22 and an ester structure, a group containing a hydrocarbon with a carbon number of 1 to 22 and a hydroxyl group, or a hydroxyl group; or a compound represented by the following general formula (VI), the compound having at least one branched structure and containing at least one hydroxyl group:

[Chemical Formula 6]

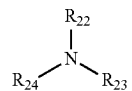

Formula (VI)

wherein $R_{22}$ to $R_{24}$ represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group, and any of $R_{22}$ to $R_{24}$ contains a branched structure represented by the general formula (VII) or (VIII):

[Chemical Formula 7]

Formula (VII)

wherein $R_{25}$ and $R_{26}$ represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure, a group containing a hydrocarbon with a carbon number of 1 to 22 and a hydroxyl group, or a hydroxyl group:

[Chemical Formula 8]

Formula (VIII)

wherein $R_{27}$ to $R_{29}$ represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure, a group containing a hydrocarbon with a carbon number of 1 to 22 and a hydroxyl group, or a hydroxyl group.

According to a preferred aspect of the carbon fiber-reinforced thermoplastic resin composition of the present invention, the compound represented by the general formula (III) is 1,5-diazabicyclo[4,3,0]-5-nonene or a salt thereof, or 1,8-diazabicyclo[5,4,0]-7-undecene or a salt thereof.

According to a preferred aspect of the carbon fiber-reinforced thermoplastic resin composition of the present invention, the compound represented by the general formula (VI) has at least two branched structures.

According to a preferred aspect of the carbon fiber-reinforced thermoplastic resin composition of the present invention, the compound represented by the general formula (VI) is triisopropanolamine or a salt thereof.

According to a preferred aspect of the carbon fiber-reinforced thermoplastic resin composition of the present invention, in the general formula (I) of the compound [b], $R_1$ and $R_2$ represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group, and $R_3$ and $R_4$ represent a hydrocarbon group with a carbon number of 2 to 22, a group containing a hydrocarbon with a carbon number of 2 to 22 and an ether structure, a group containing a hydrocarbon with a carbon number of 2 to 22 and an ester structure or a group containing a hydrocarbon with a carbon number of 2 to 22 and a hydroxyl group; and in the general formula (II), $R_5$ represents a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group, and $R_6$ and $R_7$ each represent hydrogen, a hydrocarbon group with a carbon number of 1 to 8, a group containing a hydrocarbon with a carbon number of 1 to 8 and an ether structure or a group containing a hydrocarbon with a carbon number of 1 to 8 and an ester structure.

According to a preferred aspect of the carbon fiber-reinforced thermoplastic resin composition of the present invention, an anion site of the [b] quaternary ammonium salt having a cation site (B2) is a halogen ion.

According to a preferred aspect of the carbon fiber-reinforced thermoplastic resin composition of the present invention, the [c] quaternary phosphonium salt and/or phosphine compound (B3) is any of quaternary phosphonium salts or phosphine compounds represented by the following general formula (IX) and (X).

[Chemical Formula 9]

Formula (IX)

[Chemical Formula 10]

Formula (X)

wherein $R_{30}$ to $R_{36}$ each represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group; and the anion site $X^-$ represents any of halogen ions such as a fluoride anion, a chloride anion, a bromide anion and an iodide anion, a hydroxide anion, an acetate anion, an oxalate anion, a sulfate anion, a benzenesulfonate anion, a tetraphenylborate ion, a tetrafluoroborate ion, a hexafluorophosphate ion, a bis(trifluoromethylsulfonyl)imide ion and a toluenesulfonate anion.

According to a preferred aspect of the carbon fiber-reinforced thermoplastic resin composition of the present invention, the component (A) satisfies at least one of the following requirements (α) to (γ):
  (α) the epoxy equivalent is less than 360 g/mol;
  (β) it is a trifunctional or higher epoxy compound; and
  (γ) an aromatic ring is included in the molecule.

According to a preferred aspect of the carbon fiber-reinforced thermoplastic resin composition of the present invention, the (A1) component is a phenol novolak type epoxy resin, a cresol novolak type epoxy resin or tetraglycidyldiaminodiphenylmethane.

According to a preferred aspect of the carbon fiber-reinforced thermoplastic resin composition of the present invention, the thermoplastic resin is at least one thermoplastic resin selected from the group consisting of a polyarylene sulfide resin, a polyether ether ketone resin, a polyphenylene ether resin, a polyoxymethylene resin, a polyamide resin, a polyester-based resin, a polycarbonate resin, a styrene-based resin and a polyolefin-based resin.

According to a preferred aspect of the carbon fiber-reinforced thermoplastic resin composition of the present invention, the surface oxygen concentration O/C of carbon fiber is 0.05 to 0.5 as measured by X-ray photoelectron spectroscopy.

According to a preferred aspect of the carbon fiber-reinforced thermoplastic resin composition of the present invention, the carbon fiber-reinforced thermoplastic resin composition includes 1 to 80% by mass of sizing agent-applied carbon fiber formed by depositing 0.1 to 10 parts by mass, based on 100 parts by mass of carbon fiber, of a sizing agent containing the component (A) and the component (B), and 20 to 99% by mass of a thermoplastic resin.

According to a preferred aspect of the carbon fiber-reinforced thermoplastic resin composition of the present invention, the carbon fiber-reinforced thermoplastic resin composition is obtained by melt-kneading 1 to 80% by mass of sizing agent-applied carbon fiber obtained by depositing 0.1 to 10 parts by mass, based on 100 parts by mass of carbon fiber, of a sizing agent containing the component (A) and the component (B), and 20 to 99% by mass of a thermoplastic resin.

According to a preferred aspect of the carbon fiber-reinforced thermoplastic resin composition of the present invention, carbon fiber is subjected to liquid phase electrolytic oxidation in an alkaline electrolytic solution, or subjected to liquid phase electrolytic oxidation in an acidic electrolytic solution, and subsequently washed with an alkaline aqueous solution.

The present invention also provides a carbon fiber-reinforced thermoplastic resin molded article formed by molding the carbon fiber-reinforced thermoplastic resin composition.

The present invention also provides a molding material including the components (A) and (B), carbon fiber and thermoplastic resin, the molding material being any of the following molding materials (P), (Q) and (R):

molding material (P): a pillar-shaped molding material (P) in which carbon fiber is arranged almost in parallel in the axial center direction and the length of carbon fiber is substantially equal to the length of the molding material;

molding material (Q): molding material (Q) in which carbon fiber is in the form of a single fiber and substantially two-dimensionally oriented; and molding material (R): molding material (R) in which carbon fiber is in the form of a bundle and substantially two-dimensionally oriented.

According to a preferred aspect of the molding material (P) of the present invention, the configuration of the molding material (P) satisfies at least one of the requirements (δ) to (ζ):

(δ) it has a core-sheath structure including as a core structure a structure B having carbon fiber as a principal component and including a sheath structure a structure A having a thermoplastic resin as a principal component, with the structure A covering the periphery of the structure B;

(ε) the pillar-shaped molding material has a length of 1 to 50 mm; and (ζ) it is a long fiber pellet.

According to a preferred aspect of the molding material (P) of the present invention, the thermoplastic resin of the molding material (P) and a component (D) additionally contained in the molding material (P) satisfy any one of the requirements (η) to (κ):

(η) the thermoplastic resin is a polyarylene sulfide resin and as the component (D), a polyarylene sulfide having a mass average molecular weight of 10000 or more and a dispersion degree of 2.5 or less in terms of a mass average molecular weight/number average molecular weight [d] is contained in an amount of 0.1 to 100 parts by mass based on 100 parts by mass of carbon fiber;

(θ) the thermoplastic resin is a polyamide resin and further, as the component (D), a phenol-based polymer [e] is contained in an amount of 0.1 to 100 parts by mass based on 100 parts by mass of carbon fiber;

(ι) the thermoplastic resin is a polyolefin-based resin and further, as the component (D), a terpene-based resin [f] is contained in an amount of 0.1 to 100 parts by mass based on 100 parts by mass of carbon fiber; and (κ) the thermoplastic resin is a polyolefin-based resin and further, as the component (D), a mixture of a first propylene-based resin [g] and a second propylene-based resin [h] having an acyl group on side chain is contained in an amount of 0.1 to 100 parts by mass based on 100 parts by mass of carbon fiber.

According to a preferred aspect of the molding material (P) of the present invention, carbon fiber is impregnated with a part or the whole of the component (D) of the molding material (P).

According to a preferred aspect of the molding material (Q) of the present invention, the shape of the thermoplastic resin of the molding material (Q) is any one selected from the group consisting of a particle shape, a fiber shape and a film shape.

According to a preferred aspect of the molding material (Q) of the present invention, the shape of the molding material (Q) is any one selected from the group consisting of a web shape, a nonwoven fabric shape and a felt shape.

The present invention also provides a method for producing the molding material (Q), including the following first step, second step and third step:

first step: processing carbon fiber into a sheet-shaped fabric in any one shape selected from the group consisting of a web shape, a nonwoven fabric shape, a felt shape and a mat shape;

second step: adding 0.1 to 10 parts by mass of a binder containing the component (A) and the component (B) based on 100 parts by mass of the fabric obtained in the first step; and third step: adding 1 to 80% by mass of the fabric, to which the binder is added in the second step, and 20 to 99% by mass of a thermoplastic resin, and performing heating and melting to form a composite.

According to a preferred aspect of the molding material (R) of the present invention, the shape of the molding material (R) is a sheet shape.

The present invention also provides a method for producing the molding material (R), including the following first step, second step and third step:

first step: obtaining sizing agent-applied carbon fiber by depositing 0.1 to 10 parts by mass, based on 100 parts by mass of carbon fiber, of a sizing agent containing the component (A) and the component (B);

second step: cutting to 1 to 50 mm the sizing agent-applied carbon fiber obtained in the first step; and third step: mixing 1 to 80% by mass of the sizing agent-applied carbon fiber cut in the second step and 20 to 99% by mass of a matrix resin, thereby forming a composite.

The present invention also provides a carbon fiber-reinforced composite material formed by molding the molding material.

The present invention also provides a prepreg including sizing agent-applied carbon fiber formed by applying to carbon fiber a sizing agent containing the components (A) and (B), and a thermoplastic resin.

According to a preferred aspect of the prepreg of the present invention, the prepreg has a width of 1 to 50 mm.

The present invention also provides a carbon fiber-reinforced composite material formed by molding the prepreg.

Effects of the Invention

According to the present invention, by blending (A) a specific epoxy compound and (B) a specific tertiary amine compound and/or tertiary amine salt, quaternary ammonium salt, quaternary phosphonium salt and/or phosphine compound in a composition including carbon fiber and a thermoplastic resin, hydrogen ions of an oxygen-containing functional group originally contained in the surface of carbon fiber or oxygen-containing functional groups introduced by an oxidation treatment, such as a carboxyl group and a hydroxyl group, are drawn out by the (B) specific tertiary amine compound and/or tertiary amine salt, quaternary ammonium salt, quaternary phosphonium salt and/or phosphine compound, so that the functional group is anionized, and formation of a covalent bond between the anionized functional group and the epoxy group contained in the component (A) is accelerated. As a result, interfacial adhesion between carbon fiber and the thermoplastic resin is enhanced, so that a carbon fiber-reinforced thermoplastic resin composition excellent in dynamic characteristics is obtained.

Further, a molded article formed by molding the carbon fiber-reinforced thermoplastic resin composition is excellent in strength and elastic modulus while having a light weight, and therefore can be suitably used in many fields such as those of aircraft components, spacecraft components, automobile components, watercraft components, civil engineering and construction materials and sports goods.

EMBODIMENTS OF THE INVENTION

Figure 1:
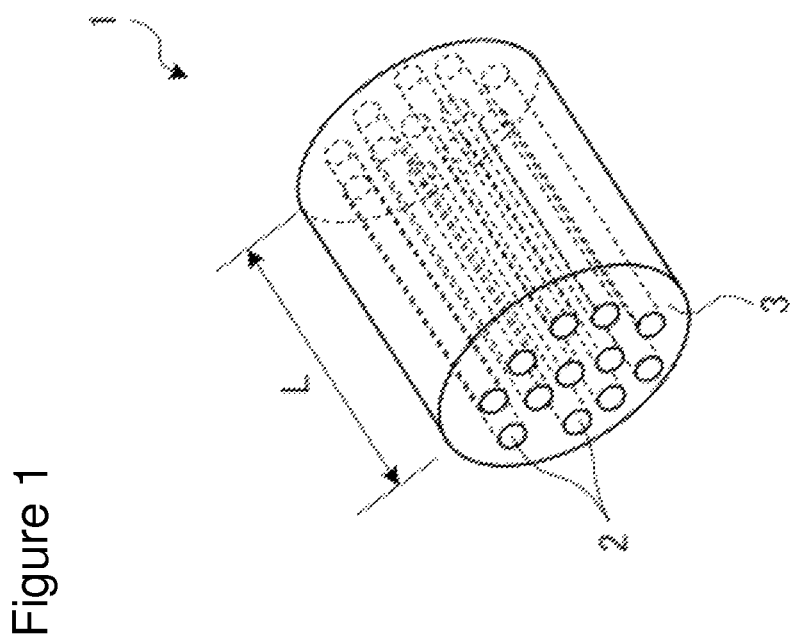
FIG. 1 is a perspective view showing one example of a molding material (P) according to an embodiment of the present invention.

Embodiments of the carbon fiber-reinforced thermoplastic resin composition of the present invention will be described further in detail below. The present invention provides a carbon fiber-reinforced thermoplastic resin composition including the following components (A) and (B), carbon fiber and a thermoplastic resin.

component (A): (A1) a bifunctional or higher functional epoxy compound and/or (A2) an epoxy compound which has a monofunctional or higher epoxy group and has one or more types of functional groupes selected from a hydroxyl group, an amide group, an imide group, a urethane group, a urea group, a sulfonyl group and a sulfo group; and component (B): 0.1 to 25 parts by mass, based on 100 parts by mass of the component (A), of at least one reaction accelerator selected from the group consisting of the following compounds [a], [b] and [c]:

[a] a tertiary amine compound and/or tertiary amine salt having a molecular weight of 100 g/mol or more (B1);

[b] a quaternary ammonium salt (B2) having a cation site represented by the following general formula (I) or (II):

[Chemical Formula 11]

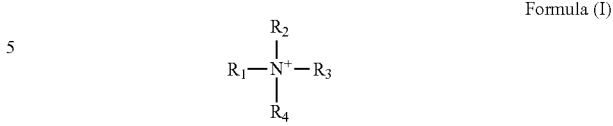

Formula (I)

[Chemical Formula 12]

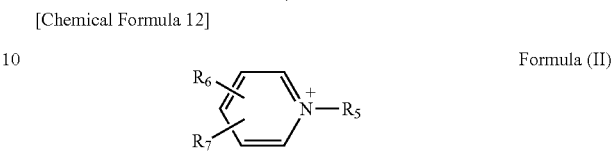

Formula (II)

wherein $R_1$ to $R_5$ each represent a hydrocarbon group with a carbon number of 1 to 22, a group containing a hydrocarbon with a carbon number of 1 to 22 and an ether structure or a group containing a hydrocarbon with a carbon number of 1 to 22 and an ester structure or a group containing a hydrocarbon with a carbon number of 1 to 22 and a hydroxyl group; and $R_6$ and $R_7$ each represent hydrogen, a hydrocarbon group with a carbon number of 1 to 8, a group containing a hydrocarbon with a carbon number of 1 to 8 and an ether structure or a group containing a hydrocarbon with a carbon number of 1 to 8 and an ester structure; and

[c] a quaternary phosphonium salt and/or phosphine compound (B3).

The component (A) for use in the present invention refers to (A1) a compound having two or more epoxy groups in the molecule and/or (A2) an epoxy compound which has a monofunctional or higher epoxy group and has one or more types of functional groupes selected from a hydroxyl group, an amide group, an imide group, a urethane group, a urea group, a sulfonyl group and a sulfo group.

The component (B) for use in the present invention refers to at least one compound selected from (B1) a tertiary amine compound and/or tertiary amine salt having a molecular weight of 100 g/mol or more, (B2) a quaternary ammonium salt having a cation site represented by the general formula (I) or (II), and (B3) a quaternary phosphonium salt and/or phosphine compound.

A mechanism with which by blending the component (A) and the component (B) in a composition including carbon fiber and a thermoplastic resin, interfacial adhesion between carbon fiber and the thermoplastic resin is enhanced, so that dynamic characteristics of the carbon fiber-reinforced thermoplastic resin composition are improved is not known, but it is thought that first the component (B) acts on oxygen-containing functional groups such as a carboxyl group and a hydroxyl group to draw out hydrogen ions contained in these functional groups, so that the functional group is anionized, and thereafter the anionized functional group and an epoxy group nucleophilically react with each other. Consequently, a strong bond between carbon fiber and the epoxy is formed. On the other hand, the relationship with the thermoplastic resin is as explained below for each of the (A1) and (A2) compounds.

In the case of the component (A1), it is thought that a remaining epoxy group that is not involved in covalent bonding with carbon fiber for use in the present invention reacts with a functional group contained in the thermoplastic resin to form a covalent bond or form a hydrogen bond. It is preferred that one or more unsaturated group is contained in the structure of the component (A1), and when an unsaturated group is contained in the thermoplastic resin, the unsaturated group of the component (A1) and the unsaturated group of the thermoplastic resin can radically react with each other to form a strong interface.

In the case of the (A2) compound, it is thought that the epoxy group of the (A2) compound forms a covalent bond with oxygen-containing functional groups of carbon fiber, such as a carboxyl group and a hydroxyl group, but a remaining hydroxyl group, an amide group, an imide group, a urethane group, a urea group, a sulfonyl group or a sulfo group forms an interaction such as a covalent bond or a hydrogen bond depending on a type of the thermoplastic resin. Particularly, when the thermoplastic resin for use in the present invention is one of a polyarylene sulfide resin, a polyether ether ketone resin, a polyphenylene ether resin, a polyoxymethylene resin, a polyamide resin, a polyester-based resin, a polycarbonate resin, a styrene-based resin and a polyolefin-based resin (particularly acid-modified ones), a strong interface may be formed due to the interaction between a hydroxyl group, an amide group, an imide group, a urethane group, a urea group, a sulfonyl group or a sulfo group in the (A2) compound and a thiol group, an amide group, an ester group, an ether group, a sulfide group, an acid anhydride, a carboxyl group, a hydroxyl group, an amino group or the like contained in the main chain, side chain and terminal of the thermoplastic resin.

That is, the remaining epoxy group that is not involved in covalent bonding with carbon fiber in the case of the component (A1) may have a function corresponding to that of the hydroxyl group, amide group, imide group, urethane group, urea group, sulfonyl group or sulfo group in the case of the (A2) compound.

In the present invention, the component (B) is contained in an amount of preferably 0.001 to 0.3 parts by mass, more preferably 0.005 to 0.2 parts by mass, further preferably 0.01 to 0.1 parts by mass, based on 100 parts by mass of carbon fiber. When the component (B) is contained in an amount of 0.001 to 0.3 parts by mass based on 100 parts by mass of carbon fiber, a reaction of oxygen-containing functional groups of carbon fiber, such as a carboxyl group and a hydroxyl group, with the epoxy compound (A) is accelerated to increase the adhesion improvement effect.

In the present invention, the epoxy equivalent of the epoxy compound (A) is preferably less than 360 g/mol, more preferably less than 270 g/mol, further preferably less than 180 g/mol. When the epoxy equivalent is less than 360 g/mol, a covalent bond is formed with high density, so that interfacial adhesion between carbon fiber and the thermoplastic resin is further enhanced. The lower limit of the epoxy equivalent is not particularly specified, but interfacial adhesion may be saturated when the epoxy equivalent is less than 90 g/mol.

In the present invention, the epoxy compound (A) is preferably a trifunctional or higher epoxy resin, more preferably a tetrafunctional or higher epoxy resin. When the epoxy compound (A) is a trifunctional or higher epoxy resin which has three or more epoxy groups in the molecule, interfacial adhesion is further improved because even when one epoxy group forms a covalent bond with an oxygen-containing functional group of the surface of carbon fiber, remaining two or more epoxy groups can form a covalent bond or a hydrogen bond with a functional group contained in the thermoplastic resin. The upper limit of the number of epoxy groups is not particularly specified, but interfacial adhesion may be saturated when the number of epoxy groups is 10 or more.

In the present invention, the epoxy compound (A) preferably has one or more aromatic ring, more preferably has two or more aromatic rings. In the composite material including carbon fiber and a thermoplastic resin, so called an interfacial layer in the vicinity of carbon fiber may have properties different from those of the thermoplastic resin due to influences of the carbon fiber or sizing agent. When the epoxy compound (A) has one or more aromatic ring, a rigid interfacial layer is formed, so that the stress transfer capacity between carbon fiber and the thermoplastic resin is improved, leading to improvement of dynamic characteristics, such as a 0° tensile strength, of the composite material. An epoxy compound having an aromatic ring has high heat resistance and therefore can maintain essential functions of reaction with an oxygen-containing functional group of the surface of carbon fiber and interaction with a thermoplastic resin, without being lost due to thermal decomposition even in the case of a thermoplastic resin requiring a high molding temperature, typically a polyarylene sulfide resin. The upper limit of the number of aromatic groups is not particularly specified, but dynamic characteristics may be saturated when the number of aromatic groups is 10 or more.

In the present invention, the (A1) epoxy compound is preferably a phenol novolak type epoxy resin, a cresol novolak type epoxy resin or tetraglycidyldiaminodiphenylmethane. These epoxy resins have a large number of epoxy groups, a small epoxy equivalent and two or more aromatic groups, and improve not only interfacial adhesion between carbon fiber and the thermoplastic resin but also dynamic characteristics, such as a 0° tensile strength, of the composite material. In the present invention, the bifunctional or higher epoxy resin is more preferably a phenol novolak type epoxy resin or a cresol novolak type epoxy resin.

In the present invention, specific examples of the (A1) bifunctional or higher epoxy compound include glycidyl ether type epoxy resins derived from polyols, glycidyl amine type epoxy resins derived from amines having a plurality of active hydrogens, glycidyl ester type epoxy resins derived from polycarboxylic acids, and epoxy resins obtained by oxidizing a compound having a plurality of double bonds in the molecule.

Examples of the glycidyl ether type epoxy resin include glycidyl ether type epoxy resins obtained by reaction of bisphenol A, bisphenol F, bisphenol AD, bisphenol S, tetrabromobisphenol A, phenol novolak, cresol novolak, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane and tetrakis(p-hydroxyphenyl)ethane with epichlorohydrin. Examples of the glycidyl ether type epoxy resin also include glycidyl ether type epoxy resins obtained by reaction of ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, hydrogenated bisphenol A, hydrogenated bisphenol F, glycerol, diglycerol, polyglycerol, trimethylolpropane, pentaerythritol, sorbitol and arabitol with epichlorohydrin. Examples of the glycidyl ether type epoxy resin also include glycidyl ether type epoxy resins having a dicyclopentadiene backbone and glycidyl ether type epoxy resins having biphenyl aralkyl backbone.

Examples of the glycidylamine type epoxy resin include N,N-diglycidylaniline, N,N-diglycidyl-o-toluidine, 1,3-bis(aminomethyl)cyclohexane, m-xylylenediamine, m-phenylenediamine, 4,4'-diaminodiphenylmethane and 9,9-bis(4-aminophenyl)fluorene.

Further, examples of the glycidylamine type epoxy resin include epoxy resins obtained by reacting both a hydroxyl group and an amino group of aminophenols such as m-aminophenol, p-aminophenol and 4-amino-3-methylphenol with epichlorohydrin.

Examples of the glycidyl ester type epoxy resin include glycidyl ester type epoxy resins obtained by reacting phthalic acid, terephthalic acid, hexahydrophthalic acid and dimer acid with epichlorohydrin.

Examples of the epoxy resin obtained by oxidizing a compound having a plurality of double bonds in the molecule include epoxy resins having an epoxycyclohexane ring in the molecule. Further, examples of the epoxy resin include epoxidized soybean oil.

Examples of the (A1) epoxy compound for use in the present invention, other than the above-mentioned epoxy resins, include epoxy resins such as triglycidyl isocyanurate. Moreover, mention is made of epoxy resins synthesized using the above-mentioned epoxy resins as a raw material, for example epoxy resins synthesized from bisphenol A diglycidyl ether and tolylene diisocyanate by oxazolidone ring generation reaction.

In the present invention, specific examples of the (A2) epoxy compound which has a monofunctional or higher epoxy group and has one or more types of functional groupes selected from a hydroxyl group, an amide group, an imide group, a urethane group, a urea group, a sulfonyl group and a sulfo group include compounds having an epoxy group and a hydroxyl group, compounds having an epoxy group and an amide group, compounds having an epoxy group and an imide group, compounds having an epoxy group and a urethane group, compounds having an epoxy group and a urea group, compounds having an epoxy group and a sulfonyl group and compounds having an epoxy group and a sulfo group.

Examples of the compound having an epoxy group and a hydroxyl group include sorbitol type polyglycidyl ethers and glycerol type polyglycidyl ethers, and specific examples include "DENACOL (trademark registration)" EX-611, EX-612, EX-614, EX-614B, EX-622, EX-512, EX-521, EX-421, EX-313, EX-314 and EX-321 (manufactured by Nagase ChemteX Corporation).

Examples of the compound having an epoxy group and an amide group include glycidylbenzamide and amide-modified epoxy resins. The amide-modified epoxy can be obtained by reacting a carboxyl group of dicarboxylic acid amide with an epoxy group of a bifunctional or higher epoxy resin.

Examples of the compound having an epoxy group and an imide group include glycidylphthalimide. Specific examples include "DENACOL (trademark registration)" EX-731 (manufactured by Nagase ChemteX Corporation).

Examples of the compound having an epoxy group and a urethane group include urethane-modified epoxy resins, and specific examples include "ADEKA RESIN (trademark registration)" EPU-78-135, EPU-6, EPU-11, EPU-15, EPU-16A, EPU-16N, EPU-17T-6, EPU-1348 and EPU-1395 (manufactured by ADEKA CORPORATION). Alternatively, the compound can be obtained by reacting a terminal hydroxyl group of a polyethylene oxide monoalkyl ether with a polyvalent isocyanate in an amount of reaction equivalent to the amount of the hydroxyl group, and then reacting an isocyanate residue of the resulting reaction product with a hydroxyl group in a polyvalent epoxy resin. Examples of the polyvalent isocyanate used here include 2,4-tolylene diisocyanate, metaphenylene diisocyanate, paraphenylene diisocyanate, diphenylmethane diisocyanate, hexamethylene diisocyanate, isophorone diisocyanate, norbornane diisocyanate, triphenylmethane triisocyanate and biphenyl-2,4,4'-triisocyanate.

Examples of the compound having an epoxy group and a urea group include urea-modified epoxy resins. The urea-modified epoxy can be obtained by reacting a carboxyl group of dicarboxylic acid urea with an epoxy group of a bifunctional or higher epoxy resin.

Examples of the compound having an epoxy group and a sulfonyl group include bisphenol S type epoxy.

Examples of the compound having an epoxy group and a sulfo group include glycidyl p-toluenesulfonate and glycidyl 3-nitrobenzenesulfonate.

The compounds (B1) to (B3) of the component (B) will be described in order below.

The (B1) tertiary amine compound and/or tertiary amine salt having a molecular weight of 100 g/mol or more, which is used in the present invention, is blended in an amount of necessarily 0.1 to 25 parts by mass, preferably 0.5 to 20 parts by mass, more preferably 2 to 15 parts by mass, further preferably 2 to 8 parts by mass, based on 100 parts by mass of the epoxy compound (A). When the blending amount is less than 0.1 parts by mass, interfacial adhesion between carbon fiber and the thermoplastic resin is insufficient because formation of a covalent bond between the epoxy compound (A) and an oxygen-containing functional group of the surface of carbon fiber is not accelerated. On the other hand, when the blending amount is more than 25 parts by mass, the component (B1) covers the surface of carbon fiber, so that formation of a covalent bond is hindered, leading to insufficient interfacial adhesion between carbon fiber and the thermoplastic resin.

The (B1) tertiary amine compound and/or tertiary amine salt having a molecular weight of 100 g/mol or more, which is used in the present invention, has a molecular weight of necessarily 100 g/mol or more, preferably in a range of 100 to 400 g/mol, more preferably in a range of 100 to 300 g/mol, further preferably in a range of 100 to 200 g/mol. When the molecular weight is 100 g/mol or more, volatilization is suppressed, so that a high effect of improvement of interfacial adhesion is obtained even with a small amount of the compound. On the other hand, when the molecular weight is 400 g/mol or less, the ratio of active sites in the molecule is high, so that a high effect of improvement of interfacial adhesion is obtained even with a small amount of the compound.

The tertiary amine compound for use in the present invention refers to a compound having a tertiary amino group in the molecule. The tertiary amine salt for use in the present invention refers to a salt obtained by neutralizing a compound having a tertiary amino group with a proton donor. Here the proton donor refers to a compound having active hydrogen which can be given as a proton to a compound having a tertiary amino group. The active hydrogen refers to a hydrogen atom which is given as a proton to a basic compound.

Examples of the proton donor include inorganic acids, organic acids such as carboxylic acids, sulfonic acids and phenols, alcohols, mercaptans and 1,3-dicarbonyl compounds.

Specific examples of the inorganic acid include sulfuric acid, sulfurous acid, persulfuric acid, hydrochloric acid, perchloric acid, nitric acid, phosphoric acid, phosphorous acid, hypophosphoric acid, phosphonic acid, phosphinic acid, pyrophosphoric acid, tripolyphosphoric acid and amidesulphuric acid. Among them, sulfuric acid, hydrochloric acid, nitric acid and phosphoric acid are preferably used.

The carboxylic acids are classified into aliphatic polycarboxylic acids, aromatic polycarboxylic acids, S-containing polycarboxylic acids, aliphatic oxycarboxylic acids, aromatic oxycarboxylic acids, aliphatic monocarboxylic acids and aromatic monocarboxylic acids, and examples thereof include the following compounds.

Specific examples of the aliphatic polycarboxylic acid include oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, methylmalonic acid, ethylmalonic acid, propylmalonic acid, butylmalonic acid, pentylmalonic acid, hexylmalonic acid, dimethylmalonic acid, diethylmalonic acid, methylpropylmalonic acid, methylbutylmalonic acid, ethylpropylmalonic acid, dipropylmalonic acid, methylsuccinic acid, ethylsuccinic acid, 2,2-dimethylsuccinic acid, 2,3-dimethylsuccinic acid, 2-methylglutaric acid, 3-methylglutaric acid, 3-methyl-3-ethylglutaric acid, 3,3-diethylglutaric acid, 3,3-dimethylglutaric acid, 3-methyladipic acid, maleic acid, fumaric acid, itaconic acid and citraconic acid.

Specific examples of the aromatic polycarboxylic acid include phthalic acid, isophthalic acid, terephthalic acid, trimellitic acid and pyromellitic acid.

Specific examples of the S-containing polycarboxylic acid include thiodipropionic acid.

Specific examples of the aliphatic oxycarboxylic acid include glycolic acid, lactic acid, tartaric acid and castor oil fatty acid.

Specific examples of the aromatic oxycarboxylic acid include salicylic acid, mandelic acid, 4-hydroxybenzoic acid, 1-hydroxybenzoic-2-naphthoic acid, 3-hydroxy-2-naphthoic acid and 6-hydroxy-2-naphthoic acid.

Specific examples of the aliphatic monocarboxylic acid include formic acid, acetic acid, propionic acid, butyric acid, isobutyric acid, valeric acid, caproic acid, enanthic acid, caprylic acid, octylic acid, pelargonic acid, lauric acid, myristic acid, stearic acid, behenic acid, undecanoic acid, acrylic acid, methacrylic acid, crotonic acid and oleic acid.

Specific examples of the aromatic monocarboxylic acid include benzoic acid, cinnamic acid, naphthoic acid, toluic acid, ethylbenzoic acid, propylbenzoic acid, isopropylbenzoic acid, butylbenzoic acid, isobutylbenzoic acid, sec-butylbenzoic acid, tert-butylbenzoic acid, methoxybenzoic acid, ethoxybenzoic acid, propoxybenzoic acid, isopropoxybenzoic acid, butoxybenzoic acid, isobutoxybenzoic acid, sec-butoxybenzoic acid, tert-butoxybenzoic acid, aminobenzoic acid, N-methylaminobenzoic acid, N-ethylaminobenzoic acid, N-propylaminobenzoic acid, N-isopropylaminobenzoic acid, N-butylaminobenzoic acid, N-isobutylaminobenzoic acid, N-sec-butylaminobenzoic acid, N-tert-butylaminobenzoic acid, N,N-dimethylaminobenzoic acid, N,N-diethylaminobenzoic acid, nitrobenzoic acid and fluorobenzoic acid.

Among the above-mentioned carboxylic acids, aromatic polycarboxylic acids, aliphatic monocarboxylic acids and aromatic carboxylic acids are preferably used, and specifically phthalic acid, formic acid and octylic acid are preferably used.

Sulfonic acids may be classified into aliphatic sulfonic acids and aromatic sulfonic acids, and examples thereof include the following compounds.

Specific examples of the monovalent saturated aliphatic sulfonic acid, among aliphatic sulfonic acids, include methanesulfonic acid, ethanesulfonic acid, propanesulfonic acid, isopropylsulfonic acid, butanesulfonic acid, isobutylsulfonic acid, tert-butylsulfonic acid, pentanesulfonic acid, isopentylsulfonic acid, hexanesulfonic acid, nonanesulfonic acid, decanesulfonic acid, undecanesulfonic acid, dodecanesulfonic acid, tridecanesulfonic acid, tetradecanesulfonic acid, n-octylsulfonic acid, dodecylsulfonic acid and cetylsulfonic acid.

The aliphatic sulfonic acid may be an unsaturated sulfonic acid, and specific examples of the monovalent unsaturated sulfonic acid include ethylenesulfonic acid and 1-propene-1-sulfonic acid.

Specific examples of the bifunctional or higher aliphatic sulfonic acid, among aliphatic sulfonic acids, include methionic acid, 1,1-ethanedisulfonic acid, 1,2-ethanedisulfonic acid, 1,1-propanedisulfonic acid, 1,3-propanedisulfonic acid and polyvinylsulfonic acid.

The aliphatic sulfonic acid may be an oxy aliphatic sulfonic acid having a hydroxyl group, and specific examples of the oxy aliphatic sulfonic acid include isethionic acid and 3-oxy-propanesulfonic acid.

The aliphatic sulfonic acid may be a sulfo-aliphatic carboxylic acid, and specific examples of the sulfo-aliphatic carboxylic acid include sulfoacetic acid and sulfosuccinic acid.

The aliphatic sulfonic acid may be a sulfo-aliphatic carboxylic acid ester, and specific examples of the sulfo-aliphatic carboxylic acid ester include di(2-ethylhexyl)sulfosuccinic acid.

The aliphatic sulfonic acid may be a fluorosulfonic acid, and specific examples of the fluorosulfonic acid include trifluoromethanesulfonic acid, perfluoroethanesulfonic acid, perfluoropropanesulfonic acid, perfluoroisopropylsulfonic acid, perfluorobutanesulfonic acid, perfluoroisobutylsulfonic acid, perfluorotertbutylsulfonic acid, perfluoropentanesulfonic acid, perfluoroisopentylsulfonic acid, perfluorohexanesulfonic acid, perfluorononanesulfonic acid, perfluorodecanesulfonic acid, perfluoroundecanesulfonic acid, perfluorododecanesulfonic acid, perfluorotridecanesulfonic acid, perfluorotetradecanesulfonic acid, perfluoron-octylsulfonic acid, perfluorododecylsulfonic acid and perfluorocetylsulfonic acid.

Specific examples of the monovalent aromatic sulfonic acid, among aromatic sulfonic acids, include benzenesulfonic acid, p-toluenesulfonic acid, o-toluenesulfonic acid, m-toluenesulfonic acid, o-xylene-4-sulfonic acid, m-xylene-4-sulfonic acid, 4-ethylbenzenesulfonic acid, 4-propylbenzenesulfonic acid, 4-butylbenzenesulfonic acid, 4-dodecylbenzenesulfonic acid, 4-octylbenzenesulfonic acid, 2-methyl-5-isopropylbenzenesulfonic acid, 2-naphthalenesulfonic acid, butylnaphthalenesulfonic acid, t-butylnaphthalenesulfonic acid, 2,4,5-trichlorobenzenesulfonic acid, benzylsulfonic acid and phenylethanesulfonic acid.

Specific examples of the bifunctional or higher aromatic sulfonic acid, among aromatic sulfonic acids, include m-benzenedisulfonic acid, 1,4-naphthalenedisulfonic acid, 1,5-naphthalenedisulfonic acid, 1,6-naphthalenedisulfonic acid, 2,6-naphthalenedisulfonic acid, 2,7-naphthalenedisulfonic acid, 1,3,6-naphthalenetrisulfonic acid and sulfonated polystyrene.

The aromatic sulfonic acid may be an oxy aromatic sulfonic acid, specific examples of the oxy aromatic sulfonic acid include phenol-2-sulfonic acid, phenol-3-sulfonic acid, phenol-4-sulfonic acid, anisole-o-sulfonic acid, anisole-m-sulfonic acid, phenetole-o-sulfonic acid, phenetole-m-sulfonic acid, phenol-2,4-disulfonic acid, phenol-2,4,6-trisulfonic acid, anisole-2,4-disulfonic acid, phenetole-2,5-disulfonic acid, 2-oxytoluene-4-sulfonic acid, pyrocatechine-4-sulfonic acid, veratrole-4-sulfonic acid, resorcin-4-sulfonic acid, 2-oxy-1-methoxybenzene-4-sulfonic acid, 1,2-dioxybenzene-3,5-disulfonic acid, resorcin-4,6-disulfonic acid, hydroquinonesulfonic acid, hydroquinone-2,5-disulfonic acid and 1,2,3-trioxybenzene-4-sulfonic acid.

The aromatic sulfonic acid may be a sulfo aromatic carboxylic acid, and specific examples of the sulfo aromatic carboxylic acid include o-sulfobenzoic acid, m-sulfobenzoic acid, p-sulfobenzoic acid, 2,4-disulfobenzoic acid, 3-sulfophthalic acid, 3,5-disulfofophthalic acid, 4-sulfoisophthalic acid, 2-sulfoterephthalic acid, 2-methyl-4-sulfobenzoic acid, 2-methyl-3,5-disulfobenzoic acid, 4-propyl-3-sulfobenzoic acid, 2,4,6-trimethyl-3-sulfobenzoic acid, 2-methyl-5-sulfoterephthalic acid, 5-sulfosalicylic acid and 3-oxy-4-sulfobenzoic acid.

The aromatic sulfonic acid may be a thio aromatic sulfonic acid, and specific examples of the thio aromatic sulfonic acid include thiophenolsulfonic acid, thioanisole-4-sulfonic acid and thiophenetole-4-sulfonic acid.

Among aromatic sulfonic acids, specific examples of those having other functional groups include benzaldehyde-o-sulfonic acid, benzaldehyde-2,4-disulfonic acid, acetophenone-o-sulfonic acid, acetophenone-2,4-disulfonic acid, benzophenone-o-sulfonic acid, benzophenone-3,3'-disulfonic acid, 4-aminophenol-3-sulfonic acid, anthraquinone-1-sulfonic acid, anthraquinone-2-sulfonic acid, anthraquinone-1,5-disulfonic acid, anthraquinone-1,8-disulfonic acid, anthraquinone-2,6-disulfonic acid and 2-methyl anthraquinone-1-sulfonic acid.

Among the above-mentioned sulfonic acids, monovalent aromatic sulfonic acids are preferably used, and specifically benzenesulfonic acid, p-toluenesulfonic acid, o-toluenesulfonic acid and m-toluenesulfonic acid are preferably used.

As phenols, specific examples of those containing one active hydrogen in one molecule include phenol, cresol, ethylphenol, n-propylphenol, isopropylphenol, n-butylphenol, sec-butylphenol, tert-butylphenol, cyclohexylphenol, dimethylphenol, methyl-tert-butylphenol, di-tert-butylphenol, chlorophenol, bromophenol, nitrophenol, methoxyphenol and methyl salicylate.

Specific examples of the phenol containing two active hydrogens in one molecule include biphenols such as hydroquinone, resorcinol, catechol, methylhydroquinone, tert-butylhydroquinone, benzylhydroquinone, phenylhydroquinone, dimethylhydroquinone, methyltert-butylhydroquinone, ditert-butylhydroquinone, trimethylhydroquinone, methoxyhydroquinone, methylresorcinol, tert-butylresorcinol, benzylresorcinol, phenylresorcinol, dimethylresorcinol, methyltert-butylresorcinol, ditert-butylresorcinol, trimethylresorcinol, methoxyresorcinol, methylcatechol, tert-butylcatechol, benzylcatechol, phenylcatechol, dimethylcatechol, methyltert-butylcatechol, ditert-butylcatechol, trimethylcatechol, methoxycatechol, biphenol, 4,4'-dihydroxy3,3',5,5'-tetramethylbiphenyl and 4,4'-dihydroxy3,3',5,5'-tetratert-butylbiphenyl, bisphenol A, 4,4'-dihydroxy3,3',5,5'-tetramethyl bisphenol A, 4,4'-dihydroxy3,3',5,5'-tetratert-butyl bisphenol A, bisphenol F, 4,4'-dihydroxy3,3',5,5'-tetramethyl bisphenol F, 4,4'-dihydroxy3,3',5,5'-tetratert-butyl bisphenol F, bisphenol AD, 4,4'-dihydroxy3,3',5,5'-tetramethyl bisphenol AD, 4,4'-dihydroxy3,3',5,5'-tetratert-butyl bisphenol AD, bisphenols represented by structural formulae (XI) to (XVII), etc., terpene phenol, and compounds represented by structural formulae (XVIII) and (XIX). Specific examples of those containing three active hydrogens in one molecule include trihydroxybenzene and tris(p-hydroxyphenyl)methane. Specific examples of those containing four active hydrogens in one molecule include tetrakis (p-hydroxyphenyl)ethane. Specific examples of others include phenols and novolaks of phenols such as alkyl phenols and halogenated phenols.

Among the above-mentioned phenols, phenols and phenol novolaks are preferably used.

Examples of alcohols include 1,2-ethanediol, 1,2-propanediol, 1,3-propanediol, 1,3-butanediol, 1,4-butanediol, 1,5-pentanediol, 1,1-dimethyl-1,3-propanediol, 2,2-dimethyl-1,3-propanediol, 2-methyl-2,4-pentanediol, 1,4-cyclohexanediol, 1,4-cyclohexane dimethanol, diethylene glycol, triethylene glycol, dodecahydrobisphenol A, an ethylene oxide adduct of bisphenol A represented by structural formula (XX), a propylene oxide adduct of bisphenol A represented by structural formula (XXI), an ethylene oxide adduct of dodecahydrobisphenol A represented by structural formula (XXII), a propylene oxide adduct of dodecahydrobisphenol A represented by structural formula (XXIII), glycerin, trimethylolethane and trimethylolpropane. Specific examples of those containing four hydroxyl groups in one molecule include pentaerythritol.

[Chemical Formula 13]

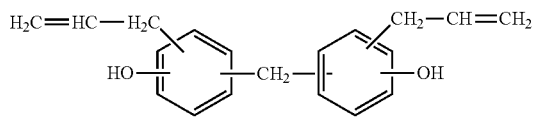

Formula (XI)

[Chemical Formula 14]

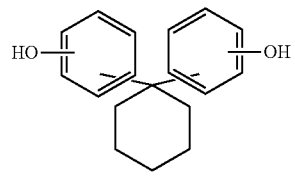

Formula (XII)

[Chemical Formula 15]

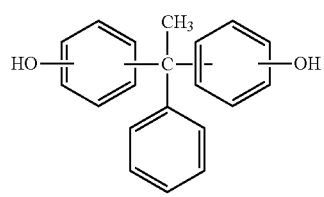

Formula (XIII)

[Chemical Formula 16]

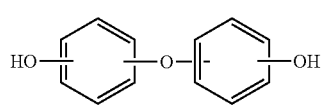

Formula (XIV)

[Chemical Formula 17]

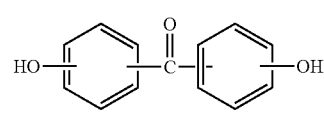

Formula (XV)

[Chemical Formula 18]

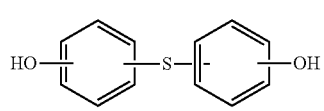

Formula (XVI)

-continued

Formula (XVII)

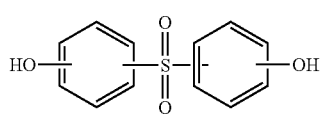

Formula (XVIII)

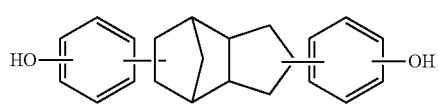

Formula (XIX)

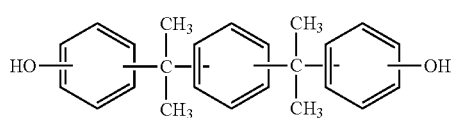

Formula (XX)

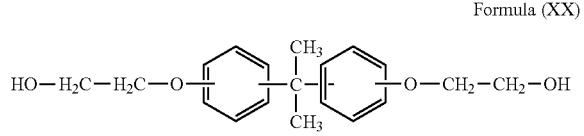

Formula (XXI)

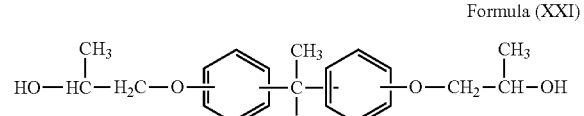

Formula (XXII)

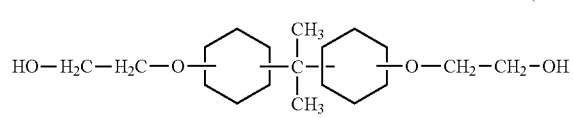

Formula (XXIII)

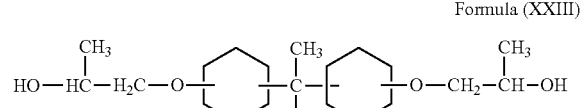

As mercaptans, specific examples of those containing one active hydrogen in one molecule include methanethiol, ethanethiol, 1-propanethiol, 2-propanethiol, 1-butanethiol, 2-methyl-1-propanethiol, 2-butanethiol, 2-methyl-2-propanethiol, 1-pentanethiol, 1-hexanethiol, 1-heptanethiol, 1-octanethiol, cyclopentanethiol, cyclohexanethiol, benzyl mercaptan, benzenethiol, toluenethiol, chlorobenzenethiol, bromobenzenethiol, nitrobenzenethiol and methoxybenzenethiol. Specific examples of those containing two active hydrogens in one molecule include 1,2-ethanedithiol, 1,3-propanedithiol, 1,4-butanedithiol, 1,5-pentanedithiol, 2,2'-oxydiethanethiol, 1,6-hexanedithiol, 1,2-cyclohexanedithiol, 1,3-cyclohexanedithiol, 1,4-cyclohexanedithiol, 1,2-benzenedithiol, 1,3-benzenedithiol and 1,4-benzenethiol.

Examples of the 1,3-dicarbonyl compound include 2,4-pentanedione, 3-methyl-2,4-pentanedione, 3-ethyl-2,4-pentanedione, 3,5-heptanedione, 4,6-nonanedione, 2,6-dimethyl-3,5-heptanedione, 2,2,6,6-tetramethyl-3,5-heptanedione, 1-phenyl-1,3-butanedione, 1,3-diphenyl-1,3-propanedione, 1,3-cyclopentanedione, 2-methyl-1,3-cyclopentanedione, 2-ethyl-1,3-cyclopentanedione, 1,3-cyclohexanedione, 2-methyl-1,3-cyclohexanedione, 2-ethylcyclohexanedione, 1,3-indanedione, ethyl acetoacetate and diethyl malonate.

The (B1) tertiary amine compound and/or tertiary amine salt having a molecular weight of 100 g/mol or more, which is used in the present invention, is a compound represented by the following general formula (III):

[Chemical Formula 26]

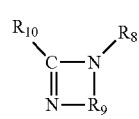

Formula (III)

wherein $R_8$ represents a hydrocarbon group with a carbon number of 1 to 22, a group containing a hydrocarbon with a carbon number of 1 to 22 and an ether structure or a group containing a hydrocarbon with a carbon number of 1 to 22 and an ester structure or a group containing a hydrocarbon with a carbon number of 1 to 22 and a hydroxyl group; $R_9$ is an alkylene group with a carbon number of 3 to 22, and may contain an unsaturated group; and $R_{10}$ represents hydrogen, a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing hydrocarbon with a carbon number of 1 to 22 and a hydroxyl group; or $R_8$ and $R_{10}$ are bonded to each other to form an alkylene group with a carbon number of 2 to 11; a compound represented by the following general formula (IV):

[Chemical Formula 27]

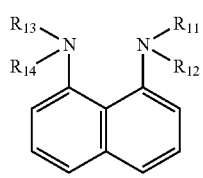

Formula (IV)

wherein $R_{11}$ to $R_{14}$ each represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group; a compound represented by the following general formula (V):

[Chemical Formula 28]

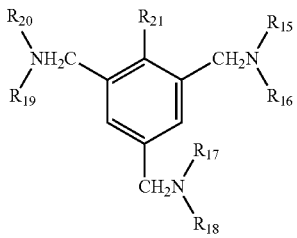

Formula (V)

wherein $R_{15}$ to $R_{20}$ each represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group; and $R_{21}$ represents a hydrocarbon group with a carbon number of 1 to 22, a group containing a hydrocarbon with a carbon number of 1 to 22 and an ether structure, a group containing a hydrocarbon with a carbon number of 1 to 22 and an ester structure, a group containing a hydrocarbon with a carbon number of 1 to 22 and a hydroxyl group, or a hydroxyl group; or a compound represented by the following general formula (VI), the compound having at least one branched structure and containing at least one hydroxyl group:

[Chemical Formula 29]

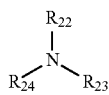

Formula (VI)

wherein $R_{22}$ to $R_{24}$ represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group, and any of $R_{22}$ to $R_{24}$ contains a branched structure represented by the general formula (VII) or (VIII).

[Chemical Formula 30]

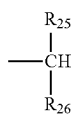

Formula (VII)

wherein $R_{25}$ and $R_{26}$ represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure, a group containing a hydrocarbon with a carbon number of 1 to 22 and a hydroxyl group, or a hydroxyl group.

[Chemical Formula 31]

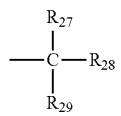

Formula (VIII)

wherein $R_{27}$ to $R_{29}$ represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure, a group containing a hydrocarbon with a carbon number of 1 to 22 and a hydroxyl group, or a hydroxyl group.

In the present invention, the compound represented by the general formula (VI) should have at least one branched structure, and contain at least one hydroxyl group. The compound has preferably at least two branched structures, further preferably three or more branched structures. When the compound has a branched structure, the steric hindrance ability is enhanced to suppress reaction of epoxy groups, so that the effect of accelerating reaction of a functional group of the surface of carbon fiber with the epoxy can be increased. When the compound has at least one hydroxyl group, interaction with an oxygen-containing functional group of the surface of carbon fiber is enhanced to efficiently draw out a hydrogen ion of an oxygen-containing functional group of the surface of carbon fiber, so that reactivity with the epoxy can be enhanced.

In the present invention, $R_8$ and $R_{11}$ to $R_{20}$ in the general formulae (III) to (V) are each a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group. When the carbon number is between 1 and 22, steric hindrance of the molecular structure is moderately small, so that the reaction acceleration effect is increased, leading to improvement of interfacial adhesion. The carbon number is more preferably in a range of 1 to 14, further preferably in a range of 1 to 8. On the other hand, when the carbon number is more than 22, steric hindrance of the molecular structure is slightly large, so that the reaction acceleration effect may be reduced.

In the present invention, $R_{21}$ in the general formula (V) is a hydrocarbon group with a carbon number of 1 to 22, a group containing a hydrocarbon with a carbon number of 1 to 22 and an ether structure, a group containing a hydrocarbon with a carbon number of 1 to 22 and an ester structure, a group containing a hydrocarbon with a carbon number of 1 to 22 and a hydroxyl group, or a hydroxyl group. When the carbon number is between 1 and 22, steric hindrance of the molecular structure is moderately small, so that the reaction acceleration effect is increased, leading to improvement of interfacial adhesion. The carbon number is more preferably in a range of 1 to 14, further preferably in a range of 1 to 8. On the other hand, when the carbon number is more than 22, steric hindrance of the molecular structure is slightly large, so that the reaction acceleration effect may be reduced.

In the present invention, $R_9$ in the general formula (III) is an alkylene group with a carbon number of 3 to 22, and may contain an unsaturated group. When the carbon number is between 3 and 22, steric hindrance of the molecular structure is moderately small, so that the reaction acceleration effect is increased, leading to improvement of interfacial adhesion.

The carbon number is more preferably in a range of 3 to 14, further preferably in a range of 3 to 8. On the other hand, when the carbon number is more than 22, steric hindrance of the molecular structure is slightly large, so that the reaction acceleration effect may be reduced.

In the present invention, $R_{10}$ in the general formula (III) is a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group. When the carbon number is between 1 and 22, steric hindrance of the molecular structure is moderately small, so that the reaction acceleration effect is increased, leading to improvement of interfacial adhesion. The carbon number is more preferably in a range of 1 to 14, further preferably in a range of 1 to 8. On the other hand, when the carbon number is more than 22, steric hindrance of the molecular structure is slightly large, so that the reaction acceleration effect may be reduced.

In the present invention, $R_{22}$ to $R_{24}$ in the general formula (VI) are each a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group, and any of $R_{22}$ to $R_{24}$ contains a branched structure represented by the general formula (VII) or (VIII). When the carbon number is between 1 and 22, steric hindrance of the molecular structure is moderately small, so that the reaction acceleration effect is increased, leading to improvement of interfacial adhesion. The carbon number is more preferably in a range of 1 to 14, further preferably in a range of 1 to 8. On the other hand, when the carbon number is more than 22, steric hindrance of the molecular structure is slightly large, so that the reaction acceleration effect may be reduced.

Here, the hydrocarbon group with a carbon number of 1 to 22 is a group including only carbon and hydrogen atoms, may be either a saturated hydrocarbon group or an unsaturated hydrocarbon group, and may contain or does not have to contain a ring structure. Examples of the hydrocarbon group include a methyl group, an ethyl group, a propyl group, a butyl group, a pentyl group, a hexyl group, a cyclohexyl group, an octyl group, a decyl group, a dodecyl group, a tetradecyl group, a hexadecyl group, an octadecyl group, an oleyl group, a docosyl group, a benzyl group and a phenyl group.

As the group containing a hydrocarbon with a carbon number of 1 to 22 and an ether structure, examples of those having a linear structure include a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, a methoxyethoxymethyl group, a methoxyethoxyethyl group, and polyether groups such as a polyethylene glycol group and a polypropylene glycol group. Examples of those having a cyclic structure include ethylene oxide, tetrahydrofuran, oxepane and 1,3-dioxolane.

Examples of the group containing a hydrocarbon with a carbon number of 1 to 22 and an ester structure include an acetoxymethyl group, an acetoxyethyl group, an acetoxypropyl group, an acetoxybutyl group, a methacryloyloxyethyl group and a benzoyloxyethyl group.

Examples of the group containing a hydrocarbon with a carbon number of 1 to 22 and a hydroxyl group include a hydroxymethyl group, a hydroxyethyl group, a hydroxypropyl group, a hydroxybutyl group, a hydroxypentyl group, a hydroxyhexyl group, a hydroxycyclohexyl group, a hydroxyoctyl group, a hydroxydecyl group, a hydroxydodecyl group, a hydroxytetradecyl group, a hydroxyhexadecyl group, a hydroxyoctadecyl group, a hydroxyoleyl group and a hydroxydocosyl group.

In the present invention, specific examples of the compound represented by the general formula (III) may include 1,8-diazabicyclo[5,4,0]-7-undecene (DBU), 1,5-diazabicyclo[4,3,0]-5-nonene (DBN), 1,4-diazabicyclo[2.2.2]octane and 5,6-dibutylamino-1,8-diaza-bicyclo[5,4,0]undecene-7 (DBA) or salts thereof. Specific examples of the DBU salt include a phenol salt of DBU (U-CAT SA1 manufactured by SAN-APRO LTD.), an octylic acid of DBU (U-CAT SA102 manufactured by SAN-APRO LTD.), a p-toluenesulfonic acid salt of DBU (U-CAT SA506 manufactured by SAN-APRO LTD.), a formic acid salt of DBU (U-CAT SA603 manufactured by SAN-APRO LTD.), an ortho-phthalic acid salt of DBU (U-CAT SA810) and phenol novolak resin salts of DBU (U-CAT SA810, SA831, SA841, SA851, 881 manufactured by SAN-APRO LTD.).

In the present invention, the compound represented by the general formula (III) is preferably 1,5-diazabicyclo[4,3,0]-5-nonene or a salt thereof, or 1,8-diazabicyclo[5,4,0]-7-undecene or a salt thereof in that a hydrogen ion of an oxygen-containing functional group such as a carboxyl group and a hydroxyl group of carbon fiber is drawn out to accelerate a nucleophilic reaction with the termoplastic resin. It is considered that because the compound represented by the general formula (III) has a cyclic structure, affinity with carbon fiber having an equivalently cyclic carbon net surface is increased, thus making it possible to efficiently and effectively draw out a hydrogen ion of an oxygen-containing functional group of the surface of carbon fiber.

In the present invention, specific examples of the compound represented by the formula (IV) include 1,8-bis(dimethylamino)naphthalene, 1,8-bis(diethylamino)naphthalene, 1,8-bis(dipropylamino)naphthalene, 1,8-bis(dibutylamino)naphthalene, 1,8-bis(dipentylamino)naphthalene, 1,8-bis(dihexylamino)naphthalene, 1-dimethylamino-8-methylaminoquinolizine, 1-dimethylamino-7-methyl-8-methylaminoquinolizine, 1-dimethylamino-7-methyl-8-methylaminoisoquinoline, 7-methyl-1,8-methylamino-2,7-naphthyridine and 2,7-dimethyl-1,8-methylamino-2,7-naphthyridine. Among them, 1,8-bis(dimethylamino)naphthalene is preferred.

In the present invention, specific examples of the compound represented by the formula (V) include 2,4,6-tris(dimethylaminomethyl)phenol, 2,4,6-tris(diethylaminomethyl)phenol, 2,4,6-tris(dipropylaminomethyl)phenol, 2,4,6-tris(dibutylaminomethyl)phenol, 2,4,6-tris(dipentylaminomethyl)phenol and 2,4,6-tris(dihexylaminomethyl)phenol.

In the present invention, specific examples of the compound represented by the general formula (VI) include diisobutylmethanolamine, di-tertiary-butylmethanolamine, di(2-ethylhexyl)methanolamine, diisopropylethanolamine, diisobutylethanolamine, di-tertiary-butylethanolamine, di(2-ethylhexyl)ethanolamine, diisopropylpropanolamine, diisobutylpropanolamine, di-tertiary-butylpropanolamine, di(2-ethylhexyl)propanolamine, isopropyldimethanolamine, isobutyldimethanolamine, tertiary-butyldimethanolamine, (2-ethylhexyl)dimethanolamine, isopropyldiethanolamine, isobutyldiethanolamine, tertiary-butyldiethanolamine, (2-ethylhexyl)diethanolamine, dimethylisopropanolamine, diethylisopropanolamine, methyldiisopropanolamine, ethyldiisopropanolamine, propyldiisopropanolamine, butyldiisopropanolamine and triisopropanolamine.

In the present invention, the compound represented by the general formula (VI) is preferably triisopropanolamine or a salt thereof. Since triisopropanolamine has three hydroxyl groups, interaction with an oxygen-containing functional group of the surface of carbon fiber is enhanced to efficiently draw out a proton of an oxygen-containing functional group of the surface of carbon fiber, so that reactivity with the epoxy can be enhanced. Further, since triisopropanolamine has three branched structures, the steric hindrance ability is enhanced to suppress reaction of epoxy groups, so that reactivity of an oxygen-containing functional group of the surface of carbon fiber with the epoxy can be increased.

In the present invention, the acid dissociation constant pKa of the conjugated acid of the tertiary amine compound (B1) is preferably 9 or more, more preferably 11 or more. When the acid dissociation constant pKa is 9 or more, reaction of a functional group of the surface of carbon fiber with the epoxy is accelerated to increase the adhesion improvement effect. Specific examples of the tertiary amine compound include DBU(pKa12.5), DBN(pKa12.7) and 1,8-bis(dimethylamino) naphthalene (pKa 12.3).

In the present invention, the boiling point of the tertiary amine compound and/or tertiary amine salt (B1) is preferably 160° C. or higher, more preferably in a range of 160 to 350° C., further preferably 160 to 260° C. When the boiling point is lower than 160° C., the reaction acceleration effect may be reduced as volatilization is intensified in the process of producing a carbon fiber-reinforced thermoplastic resin composition.

Examples of the tertiary amine compound and/or tertiary amine salt (B1) for use in the present invention include aliphatic tertiary amines, aromatic group-containing aliphatic tertiary amines, aromatic tertiary amines, heterocyclic tertiary amines, and salts thereof. Specific examples are listed below.

Specific examples of the aliphatic tertiary amine include triethylamine, tripropylamine, triisopropylamine, tributylamine, tripentylamine, trihexylamine, tricyclohexylamine, trioctylamine, dimethylpropylamine, dimethylbutylamine, dimethylpentylamine, dimethylhexylamine, dimethylcyclohexylamine, dimethyloctylamine, dimethyldecylamine, dimethyldodecylamine, dimethyltetradecylamine, dimethylhexadecylamine, dimethyloctadecylamine, dimethyloleylamine, dimethyldocosylamine, diethylpropylamine, diethylbutylamine, diethylpentylamine, diethylhexylamine, diethylcyclohexylamine, diethyloctylamine, diethyldecylamine, diethyldodecylamine, diethyltetradecylamine, diethylhexadecylamine, diethyloctadecylamine, diethyloleylamine, diethyldocosylamine, dipropylmethylamine, diisopropylethylamine, dipropylethylamine, dipropylbutylamine, dibutylmethylamine, dibutylethylamine, dibutylpropylamine, dihexylmethylamine, dihexylethylamine, dihexylpropylamine, dihexylbutylamine, dicyclohexylmethylamine, dicyclohexylethylamine, dicyclohexylpropylamine, dicyclohexylbutylamine, dioctylmethylamine, dioctylethylamine, dioctylpropylamine, didecylmethylamine, didecylethylamine, didecylpropylamine, didecylbutylamine, didodecylmethylamine, didodecylethylamine, didodecylpropylamine, didodecylbutylamine, ditetradecylmethylamine, ditetradecylethylamine, ditetradecylpropylamine, ditetradecylbutylamine, dihexadecylmethylamine, dihexadecylethylamine, dihexadecylpropylamine, dihexadecylbutylamine, trimethanolamine, triethanolamine, triisopropanolamine, tributanolamine, trihexanolamine, diethylmethanolamine, dipropylmethanolamine, diisopropylmethanolamine, dibutylmethanolamine, diisobutylmethanolamine, di-tertiary-butylmethanolamine, di(2-ethylhexyl)methanolamine, dimethylethanolamine, diethylethanolamine, dipropylethanolamine, diisopropylethanolamine, dibutylethanolamine, diisobutylethanolamine, di-tertiary-butylethanolamine, di(2-ethylhexyl)ethanolamine, dimethylpropanolamine, diethylpropanolamine, dipropylpropanolamine, diisopropylpropanolamine, dibutylpropanolamine, diisobutylpropanolamine, di-tertiary-butylpropanolamine, di(2-ethylhexyl)propanolamine, methyldimethanolamine, ethyldimethanolamine, propyldimethanolamine, isopropyldimethanolamine, butyldimethanolamine, isobutyldimethanolamine, tertiary-butyldimethanolamine, (2-ethylhexyl)dimethanolamine, methyldiethanolamine, ethyldiethanolamine, propyldiethanolamine, isopropyldiethanolamine, butyldiethanolamine, isobutyldiethanolamine, tertiary-butyldiethanolamine, (2-ethylhexyl)diethanolamine and dimethylaminoethoxyethanol.

The aliphatic tertiary amine may be a compound having two or more tertiary amines in the molecule, and examples of the compound having two or more tertiary amines in the molecule include N,N,N',N'-tetramethyl-1,3-propanediamine, N,N,N',N'-tetraethyl-1,3-propanediamine, N,N-diethyl-N',N'-dimethyl-1,3-propanediamine, tetramethyl-1,6-hexadiamine, pentamethyldiethylenetriamine, bis(2-dimethylaminoethyl)ether and trimethylaminoethylethanolamine.

Specific examples of the aromatic group-containing aliphatic tertiary amine include N,N'-dimethylbenzylamine, N,N'-diethylbenzylamine, N,N'-dipropylbenzylamine, N,N'-dibutylbenzylamine, N,N'-dihexylbenzylamine, N,N'-dicyclohexylbenzylamine, N,N'-dioctylbenzylamine, N,N'-didodecylbenzylamine, N,N'-dioleylbenzylamine, N,N'-dibenzylmethylamine, N,N'-dibenzylethylamine, N,N'-dibenzylpropylamine, N,N'-dibenzylbutylamine, N,N'-dibenzylhexylamine, N,N'-dibenzylcyclohexylamine, N,N'-dibenzyloctylamine, N,N'-dibenzyldodecylamine, N,N'-dibenzyloleylamine, tribenzylamine, N,N'-methylethylbenzylamine, N,N'-methylpropylbenzylamine, N,N'-methylbutylbenzylamine, N,N'-methylhexylbenzylamine, N,N'-methylcyclohexylbenzylamine, N,N'-methyloctylbenzylamine, N,N'-methyldodecylbenzylamine, N,N'-methyloleylbenzylamine, N,N'-methylhexadecylbenzylamine, N,N'-methyloctadecylbenzylamine, 2-(dimethylaminomethyl)phenol, 2,4,6-tris(dimethylaminomethyl)phenol, 2,4,6-tris(diethylaminomethyl)phenol, 2,4,6-tris(dipropylaminomethyl)phenol, 2,4,6-tris(dibutylaminomethyl)phenol, 2,4,6-tris(dipentylaminomethyl)phenol and 2,4,6-tris(dihexylaminomethyl)phenol.

Specific examples of the aromatic tertiary amine include triphenylamine, tri(methylphenyl)amine, tri(ethylphenyl)amine, tri(propylphenyl)amine, tri(butylphenyl)amine, tri(phenoxyphenyl)amine, tri(benzylphenyl)amine, diphenylmethylamine, diphenylethylamine, diphenylpropylamine, diphenylbutylamine, diphenylhexylamine, diphenylcyclohexylamine, N,N-dimethylaniline, N,N-diethylaniline, N,N-dipropylaniline, N,N-dibutylaniline, N,N-dihexylaniline, N,N-dicyclohexylaniline, (methylphenyl)dimethylamine, (ethylphenyl)dimethylamine, (propylphenyl)dimethylamine, (butylphenyl)dimethylamine, bis(methylphenyl)methylamine, bis(ethylphenyl)methylamine, bis(propylphenyl)methylamine, bis(butylphenyl)methylamine, N,N-di(hydroxyethyl)aniline, N,N-di(hydroxypropyl)aniline, N,N-di(hydroxybutyl)aniline and diisopropanol-p-toluidine.

Specific examples of heterocyclic tertiary amine include pyridine-based compounds such as picoline, isoquinoline and quinoline, imidazole-based compounds, pyrazole-based compounds, morpholine-based compounds, piperazine-based compounds, piperidine-based compounds, pyrrolidine-based compounds, cycloamidine-based compounds, proton sponge derivatives and hindered amine-based compounds.

Examples of the pyridine-based compound include N,N-dimethyl-4-aminopyridine, bipyridine and 2,6-lutidine. Examples of the imidazole-based compound include 1-benzyl-2-methylimidazole, 1-cyanoethyl-2-methylimidazole, 1-cyanoethyl-2-phenylimidazole, 1-cyanoethyl-2-ethyl-4-imidazole, 1-cyanoethyl-2-undecylimidazole, 1-cyanoethyl-2-methylimidazolium trimellitate, 1-cyanoethyl-2-undecylimidazolium trimellitate, 1-benzyl-2-phenylimidazole, 1-(2-hydroxyethyl)imidazole, 1-benzyl-2-formylimidazole, 1-benzyl-imidazole and 1-allylimidazole. Examples of the pyrazole-based compound include pyrazole and 1,4-dimethylpyrazole. Examples of the morpholine-based compound include 4-(2-hydroxyethyl)morpholine, N-ethylmorpholine, N-methylmorpholine and 2,2'-dimorpholinediethylether. Examples of the piperazine-based compound include 1-(2-hydroxyethyl)piperazine and N,N-dimethylpiperazine. Examples of the piperidine-based compound include N-(2-hydroxyethyl)piperidine, N-ethylpiperidine, N-propylpiperidine, N-butylpiperidine, N-hexylpiperidine, N-cyclohexylpiperidine and N-octylpiperidine. Examples of the pyrrolidine-based compound include N-butylpyrrolidine and N-octylpyrrolidine. Examples of the cycloamidine-based compound may include 1,8-diazabicyclo[5,4,0]-7-undecene (DBU), 1,5-diazabicyclo[4,3,0]-5-nonene (DBN), 1,4-diazabicyclo[2.2.2]octane and 5,6-dibutylamino-1,8-diaza-bicyclo[5,4,0]undecene-7(DBA). Examples of other heterocyclic amines may include hexamethylenetetramine, hexaethylenetetramine and hexapropyltetramine Specific examples of the DBU salt include a phenol salt of DBU (U-CAT SA1 manufactured by SAN-APRO LTD.), an octylic acid of DBU (U-CAT SA102 manufactured by SAN-APRO LTD.), a p-toluenesulfonic acid salt of DBU (U-CAT SA506 manufactured by SAN-APRO LTD.), a formic acid salt of DBU (U-CAT SA603 manufactured by SAN-APRO LTD.), an ortho-phthalic acid salt of DBU (U-CAT SA810) and phenol novolak resin salts of DBU (U-CAT SA810, SA831, SA841, SA851, 881 manufactured by SAN-APRO LTD.).

Specific examples of the proton sponge derivative include 1,8-bis(dimethylamino)naphthalene, 1,8-bis(diethylamino)naphthalene, 1,8-bis(dipropylamino)naphthalene, 1,8-bis(dibutylamino)naphthalene, 1,8-bis(dipentylamino)naphthalene, 1,8-bis(dihexylamino)naphthalene, 1-dimethylamino-8-methylamino-quinolizine, 1-dimethylamino-7-methyl-8-methylamino-quinolizine, 1-dimethylamino-7-methyl-8-methylamino-isoquinoline, 7-methyl-1,8-methylamino-2,7-naphthyridine and 2,7-dimethyl-1,8-methylamino-2,7-naphthyridine.

Among these tertiary amine compounds and tertiary amine salts, triisopropylamine, dibutylethanolamine, diethylethanolamine, triisopropanolamine, diisopropylethylamine, 2,4,6-tris(dimethylaminomethyl)phenol, 2,6-lutidine, DBU, DBU salts, DBN, DBN salts and 1,8-bis(dimethylamino) naphthalene are preferably used because the effect of acceleration of reaction of an oxygen-containing functional group of the surface of carbon fiber with an epoxy resin is high and reaction of epoxy rings can be suppressed.

Examples of the hindered amine-based compound include tetrakis(1,2,2,6,6-pentamethyl-4-piperidinyl)butane-1,2,3,4-tetracarboxylate (e.g. LA-52 (manufactured by ADEKA Corporation)), bis(1,2,2,6,6-pentamethyl-4-piperidyl) sebacate (e.g. LA-72 (manufactured by ADEKA Corporation), TINUVIN 765 (manufactured by BASF Ltd.)), carbonic acid=bis (2,2,6,6-tetramethyl-1-undecyloxypiperidine-4-yl) (e.g. LA-81 (manufactured by ADEKA Corporation)), 1,2,2,6,6-pentamethyl-4-piperidyl methacrylate (e.g. LA-82 (manufactured by ADEKA Corporation)), malonic acid-2-((4-methoxyphenyl)methylene), 1,3-bis(1,2,2,6,6-pentamethyl-4-piperidinyl) ester, Chimassorb 119, 2-dodecyl-N-(1,2,2,6,6-pentamethyl-4-piperidinyl)succinimide, 1-hexadecyl 2,3,4-tris(1,2,2,6,6-pentamethyl-4-piperidinyl) 1,2,3,4-butanetetracarboxylate, 1,2,3-tris(1,2,2,6,6-pentamethyl-4-piperidinyl)-4-tridecyl 1,2,3,4-butanetetracarboxylate, 1-methyl 10-(1,2,2,6,6-pentamethyl-4-piperidinyl) decanedioate, 4-(ethenyloxy)-1,2,2,6,6-pentamethylpiperidine, bis(1,2,2,6,6-pentamethyl-4-piperidinyl) 2-((3,5-bis(1,1-dimethylethyl)-4-hydroxyphenyl)methyl)-2-butylpropanedioate, 4-hydroxy-1,2,2,6,6-pentamethylpiperidine, 1,2,2,6,6-pentamethylpiperidine, LA-63P (manufactured by ADEKA Corporation), LA-68 (manufactured by ADEKA Corporation) TINUVIN 622LD (manufactured by BASF Ltd.) and TINUVIN 144 (manufactured by BASF Ltd.).

These tertiary amine compounds and tertiary amine salts may be used alone, or in combination of two or more thereof.

Next, the compounds (B2) will be described.

The (B2) quaternary ammonium salt having a cation site represented by the general formula (I) or (II), which is used in the present invention, is blended in an amount of necessarily 0.1 to 25 parts by mass, preferably 0.1 to 10 parts by mass, more preferably 0.1 to 8 parts by mass, based on 100 parts by mass of the epoxy compound (A). When the blending amount is less than 0.1 parts by mass, interfacial adhesion between carbon fiber and the thermoplastic resin is insufficient because formation of a covalent bond between the epoxy compound (A) and an oxygen-containing functional group of the surface of carbon fiber is not accelerated. On the other hand, when the blending amount is more than 25 parts by mass, the (B2) compound covers the surface of carbon fiber, so that formation of a covalent bond is hindered, leading to insufficient interfacial adhesion between carbon fiber and the thermoplastic resin.

A mechanism with which formation of a covalent bond is accelerated by blending the (B2) quaternary ammonium salt having a cation site represented by the general formula (I) or (II), which is used in the present invention, is not clear, but such an effect is obtained only with a quaternary ammonium salt having a specific structure. Therefore, $R_1$ to $R_5$ in the general formula (I) or (II) are each required to be a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group. When the carbon number is 23 or more, interfacial adhesion becomes insufficient although the reason is not clear.

Here, the hydrocarbon group with a carbon number of 1 to 22 is a group including only carbon and hydrogen atoms, may be either a saturated hydrocarbon group or an unsaturated hydrocarbon group, and may contain or does not have to contain a ring structure. Examples of the hydrocarbon group include a methyl group, an ethyl group, a propyl group, a butyl group, a pentyl group, a hexyl group, a cyclohexyl group, an octyl group, a decyl group, a dodecyl group, a tetradecyl group, a hexadecyl group, an octadecyl group, an oleyl group, a docosyl group, a benzyl group and a phenyl group.

Examples of the group containing a hydrocarbon with a carbon number of 1 to 22 and an ether structure include a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, a methoxyethoxymethyl group, a methoxyethoxyethyl group, and polyether groups such as a polyethylene glycol group and a polypropylene glycol group.

Examples of the group containing a hydrocarbon with a carbon number of 1 to 22 and an ester structure include an acetoxymethyl group, an acetoxyethyl group, an acetoxypropyl group, an acetoxybutyl group, a methacryloyloxyethyl group and a benzoyloxyethyl group.

Examples of the group containing a hydrocarbon with a carbon number of 1 to 22 and a hydroxyl group include a hydroxymethyl group, a hydroxyethyl group, a hydroxypropyl group, a hydroxybutyl group, a hydroxypentyl group, a hydroxyhexyl group, a hydroxycyclohexyl group, a hydroxyoctyl group, a hydroxydecyl group, a hydroxydodecyl group, a hydroxytetradecyl group, a hydroxyhexadecyl group, a hydroxyoctadecyl group, a hydroxyoleyl group and a hydroxydocosyl group.

Particularly, the carbon number of $R_1$ to $R_5$ of the (B2) quaternary ammonium salt having a cation site is preferably in a range of 1 to 14, more preferably in a range of 1 to 8. When the carbon number is less than 14, steric hindrance, at the time when the quaternary ammonium salt acts as a reaction accelerator, is moderately small, so that the reaction acceleration effect is increased, leading to further improvement of interfacial adhesion.

In the present invention, the carbon number of $R_3$ and $R_4$ of the (B2) quaternary ammonium salt having a cation site represented by the general formula (I) is preferably 2 or more, more preferably 3 or more, further preferably 4 or more. When the carbon number is 2 or more, homopolymerization of the epoxy resin due to the action of the quaternary ammonium salt as an initiator is suppressed, so that interfacial adhesion is further improved.

In the present invention, preferably $R_6$ and $R_7$ of the quaternary ammonium salt having a cation site represented by the general formula (II) are each hydrogen, a hydrocarbon group with a carbon number of 1 to 8, a group containing a hydrocarbon with a carbon number of 1 to 8 and an ether structure or a group containing a hydrocarbon with a carbon number of 1 to 8 and an ester structure. When these groups are hydrogen or groups with a carbon number of less than 8, the ratio of active sites in the molecule is high, so that a high effect of improvement of interfacial adhesion is obtained even with a small amount of the compound.

In the present invention, the molecular weight of the cation site of the (B2) quaternary ammonium salt having a cation site is preferably in a range of 100 to 400 g/mol, more preferably in a range of 100 to 300 g/mol, further preferably in a range of 100 to 200 g/mol. When the molecular weight of the cation site is 100 g/mol or more, volatilization is suppressed even during heat treatment, so that a high effect of improvement of interfacial adhesion is obtained even with a small amount of the compound. On the other hand, when the molecular weight of the cation site is 400 g/mol or less, the ratio of active sites in the molecule is high, so that a high effect of improvement of interfacial adhesion is obtained even with a small amount of the compound.

In the present invention, examples of the cation site of the quaternary ammonium salt represented by the general formula (I) include tetramethylammonium, ethyltrimethylammonium, trimethylpropylammonium, butyltrimethylammonium, trimethylpentylammonium, hexyltrimethylammonium, cyclohexyltrimethylammonium, trimethyloctylammonium, decyltrimethylammonium, dodecyltrimethylammonium, tetradecyltrimethylammonium, hexadecyltrimethylammonium, trimethyloctadecylammonium, trimethyloleylammonium, docosyltrimethylammonium, benzyltrimethylammonium, trimethylphenylammonium, diethyldimethylammonium, dimethyldipropylammonium, dibutyldimethylammonium, dimethyldipentylammonium, dihexyldimethylammonium, dicyclohexyldimethylammonium, dimethyldioctylammonium, didecyldimethylammonium, ethyldecyldimethylammonium, didodecyldimethylammonium, ethyldodecyldimethylammonium, ditetradecyldimethylammonium, ethyltetradecyldimethylammonium, dihexadecyldimethylammonium, ethylhexadecyldimethylammonium, dimethyldioctadecylammonium, ethyloctadecyldimethylammonium, dimethyldioleylammonium, ethyldimethyloleylammonium, didocosyldimethylammonium, docosylethyldimethylammonium, dibenzyldimethylammonium, benzylethyldimethylammonium, benzyldimethylpropylammonium, benzylbutyldimethylammonium, benzyldecyldimethylammonium, benzyldodecyldimethylammonium, benzyltetradecyldimethylammonium, benzylhexadecyldimethylammonium, benzyloctadecyldimethylammonium, benzyldimethyloleylammonium, dimethyldiphenylammonium, ethyldimethylphenylammonium, dimethylpropylphenylammonium, butyldimethylphenylammonium, decyldimethylphenylammonium, dodecyldimethylphenylammonium, tetradecyldimethylphenylammonium, hexadecyldimethylphenylammonium, dimethyloctadecylphenylammonium, dimethyloleylphenylammonium, tetraethylammonium, triethylmethylammonium, triethylpropylammonium, butyltriethylammonium, triethylpentylammonium, triethylhexylammonium, triethylcyclohexylammonium, triethyloctylammonium, decyltriethylammonium, dodecyltriethylammonium, tetradecyltriethylammonium, hexadecyltriethylammonium, triethyloctadecylammonium, triethyloleylammonium, benzyltriethylammonium, triethylphenylammonium, diethyldipropylammonium, dibutyldiethylammonium, diethyldipentylammonium, diethyldihexylammonium, diethyldicyclohexylammonium, diethyldioctylammonium, didecyldiethylammonium, didodecyldiethylammonium, ditetradecyldiethylammonium, diethyldihexadecylammonium, diethyldioctadecylammonium, diethyldioleylammonium, dibenzyldiethylammonium, diethyldiphenylammonium, tetrapropylammonium, methyltripropylammonium, ethyltripropylammonium, butyltripropylammonium, benzyltripropylammonium, phenyltripropylammonium, tetrabutylammonium, tributylmethylammonium, tributylethylammonium, tributylpropylammonium, benzyltributylammonium, tributylphenylammonium, tetrapentylammonium, tetrahexylammonium, tetraheptylammonium, tetraoctylammonium, methyltrioctylammonium, ethyltrioctylammonium, trioctylpropylammonium, butyltrioctylammonium, dimethyldioctylammonium, diethyldioctylammonium, dioctyldipropylammonium, dibutyldioctylammonium, tetradecylammonium, tetradodecylammonium, 2-hydroxyethyltrimethylammonium, 2-hydroxyethyltriethylammonium, 2-hydroxyethyltripropylammonium, 2-hydroxyethyltributylammonium, polyoxyethylenetrimethylammonium, polyoxyethylenetriethylammonium, polyoxyethylenetripropylammonium, polyoxyethylenetributylammonium, bis(2-hydroxyethyl)dimethylammonium, bis(2-hydroxyethyl)diethylammonium, bis(2-hydroxyethyl)dipropylammonium, bis(2-hydroxyethyl)dibutylammonium, bis(polyoxyethylene)dimethylammonium, bis(polyoxyethylene)diethylammonium, bis(polyoxyethylene)dipropylammonium, bis(polyoxyethylene)dibutylammonium, tris(2-hydroxyethyl)methylammonium, tris(2-hydroxyethyl)ethylammonium, tris(2-hydroxyethyl)propylammonium, tris(2-hydroxyethyl)butylammonium, tris(polyoxyethylene)methylammonium, tris(polyoxyethylene)ethylammonium, tris(polyoxyethylene)propylammonium and tris(polyoxyethylene)butylammonium.

Examples of the cation site of the quaternary ammonium salt represented by the general formula (II) include 1-methylpyridinium, 1-ethylpyridinium, 1-ethyl-2-methylpyridinium, 1-ethyl-4-methylpyridinium, 1-ethyl-2,4-dimethylpyridinium, 1-ethyl-2,4,6-trimethylpyridinium, 1-propylpyridinium, 1-butylpyridinium, 1-butyl-2-methylpyridinium, 1-butyl-4-methylpyridinium, 1-butyl-2,4-dimethylpyridinium, 1-butyl-2,4,6-trimethylpyridinium, 1-pentylpyridinium, 1-hexylpyridinium, 1-cyclohexylpyridinium, 1-octylpyridinium, 1-decylpyridinium, 1-dodecylpyridinium, 1-tetradecylpyridinium, 1-hexadecylpyridinium, 1-octadecylpyridinium, 1-oleylpyridinium and 1-docosylpyridinium, and 1-benzylpyridinium.

In the present invention, examples of the anion site of the (B2) quaternary ammonium salt having a cation site include halogen ions such as a fluoride anion, a chloride anion, a bromide anion and an iodide anion. Further, examples of the anion site include a hydroxide anion, an acetate anion, an oxalate anion, a sulfate anion a benzoate anion, an iodate anion, a methylsulfonate anion, a benzenesulfonate anion and a toluenesulfonate anion.

Particularly, the counter ion is preferably a halogen ion because they are small in size and do not hinder the reaction acceleration effect of the quaternary ammonium salt.

In the present invention, these quaternary ammonium salts may be used alone, or in combination of two or more thereof.

In the present invention, examples of the (B2) quaternary ammonium salt having a cation site include trimethyloctadecylammonim chloride, trimethyloctadecylammonium bromide, trimethyloctadecylammonium hydroxide, trimethyloctadecylammonium acetate, trimethyloctadecylammonium benzoate, trimethyloctadecylammonium-p-toluenesulfonate, trimethyloctadecylammonium hydrochloride, trimethyloctadecylammonium tetrachloroiodate, trimethyloctadecylammonium hydrogensulfate, trimethyloctadecylammonium methylsulfate, benzyltrimethylammonium chloride, benzyltrimethylammonium bromide, benzyltrimethylammonium hydroxide, benzyltrimethylammonium acetate, benzyltrimethylammonium benzoate, benzyltrimethylammonium-p-toluenesulfonate, tetrabutylammonium chloride, tetrabutylammonium bromide, tetrabutylammonium hydroxide, tetrabutylammonium acetate, tetrabutylammonium benzoate, tetrabutylammonium-p-toluenesulfonate, (2-methoxyethoxymethyl)triethylammonium chloride, (2-methoxyethoxymethyl)triethylammonium bromide, (2-methoxyethoxymethyl)triethylammonium hydroxide, (2-methoxyethoxymethyl)triethylammonium-p-toluenesulfonate, (2-acetoxyethyl)trimethylammonium chloride, (2-acetoxyethyl)trimethylammonium bromide, (2-acetoxyethyl)trimethylammonium hydroxide, (2-acetoxyethyl)trimethylammonium-p-toluenesulfonate, (2-hydroxyethyl)trimethylammonium chloride, (2-hydroxyethyl)trimethylammonium bromide, (2-hydroxyethyl)trimethylammonium hydroxide, (2-hydroxyethyl)trimethylammonium-p-toluenesulfonate, bis(polyoxyethylene)dimethylammonium chloride, bis(polyoxyethylene)dimethylammonium bromide, bis(polyoxyethylene)dimethylammonium hydroxide, bis(polyoxyethylene)dimethylammonium-p-toluenesulfonate, 1-hexadecylpyridinium chloride, 1-hexadecylpyridinium bromide, 1-hexadecylpyridinium hydroxide and 1-hexadecylpyridinium-p-toluenesulfonate.

Next, the compounds (B3) will be described.

The (B3) quaternary phosphonium salt and/or phosphine compound for use in the present invention is blended in an amount of necessarily 0.1 to 25 parts by mass, preferably 0.1 to 10 parts by mass, more preferably 0.1 to 8 parts by mass, based on 100 parts by mass of the epoxy compound (A). When the blending amount is less than 0.1 parts by mass, interfacial adhesion between carbon fiber and the thermoplastic resin is insufficient because formation of a covalent bond between the epoxy compound (A) and an oxygen-containing functional group of the surface of carbon fiber is not accelerated. On the other hand, when the blending amount is more than 25 parts by mass, the (B3) compound covers the surface of carbon fiber, so that formation of a covalent bond is hindered, leading to insufficient interfacial adhesion between carbon fiber and the thermoplastic resin.

The quaternary phosphonium salt or phosphine compound (B3) for use in the present invention is preferably any of quaternary phosphonium salts or phosphine compounds represented by the following general formula (IX) and (X).

[Chemical Formula 32]

Formula (IX)

[Chemical Formula 33]

Formula (X)

wherein $R_{30}$ to $R_{36}$ each represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group; and the anion site $X^-$ represents any of halogen ions such as a fluoride anion, a chloride anion, a bromide anion and an iodide anion, a hydroxide anion, an acetate anion, an oxalate anion, a sulfate anion, a benzenesulfonate anion, a tetraphenylborate ion, a tetrafluoroborate ion, a hexafluorophosphate ion, a bis(trifluoromethylsulfonyl)imide ion and a toluenesulfonate anion.

Therefore, $R_{30}$ to $R_{36}$ in the general formula (IX) or (X) are each required to be a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group. When the carbon number is 23 or more, interfacial adhesion may become insufficient although the reason is not clear.

Here, the hydrocarbon group with a carbon number of 1 to 22 is a group including only carbon and hydrogen atoms, may be either a saturated hydrocarbon group or an unsaturated hydrocarbon group, and may contain or does not have to contain a ring structure. Examples of the hydrocarbon group include a methyl group, an ethyl group, a propyl group, a butyl group, a pentyl group, a hexyl group, a cyclohexyl group, an octyl group, a decyl group, a dodecyl group, a tetradecyl group, a hexadecyl group, an octadecyl group, an oleyl group, a docosyl group, a vinyl group, a 2-propynyl group, a benzyl group, a phenyl group, a cinnamyl group and a naphthylmethyl group.

As the group containing a hydrocarbon with a carbon number of 1 to 22 and an ether structure, examples of those having a linear structure include a methoxymethyl group, an ethoxymethyl group, a propoxymethyl group, a butoxymethyl group, a phenoxymethyl group, a methoxyethyl group, an ethoxyethyl group, a propoxyethyl group, a butoxyethyl group, a phenoxyethyl group, a methoxyethoxymethyl group, a methoxyethoxyethyl group, and polyether groups such as a polyethylene glycol group and a polypropylene glycol group. Examples of those having a cyclic structure include ethylene oxide, tetrahydrofuran, oxepane and 1,3-dioxolane.

Examples of the group containing a hydrocarbon with a carbon number of 1 to 22 and an ester structure include an acetoxymethyl group, an acetoxyethyl group, an acetoxypropyl group, an acetoxybutyl group, a methacryloyloxyethyl group and a benzoyloxyethyl group.

Examples of the group containing a hydrocarbon with a carbon number of 1 to 22 and a hydroxyl group include a hydroxymethyl group, a hydroxyethyl group, a hydroxypropyl group, a hydroxybutyl group, a hydroxypentyl group, a hydroxyhexyl group, a hydroxycyclohexyl group, a hydroxyoctyl group, a hydroxydecyl group, a hydroxydodecyl group, a hydroxytetradecyl group, a hydroxyhexadecyl group, a hydroxyoctadecyl group, a hydroxyoleyl group and a hydroxydocosyl group.

Particularly, the carbon number of $R_{30}$ to $R_{36}$ of the (B3) quaternary phosphonium salt or phosphine compound is preferably in a range of 1 to 14. When the carbon number is less than 14, steric hindrance, at the time when the quaternary ammonium salt acts as a reaction accelerator, is moderately small, so that the reaction acceleration effect is increased, leading to further improvement of interfacial adhesion.

In the present invention, the carbon number of $R_{30}$ and $R_{33}$ of the (B3) quaternary phosphonium salt represented by the general formula (IX) is preferably 2 or more, more preferably 3 or more, further preferably 4 or more. When the carbon number is 2 or more, homopolymerization of the epoxy resin due to the action of the quaternary phosphonium salt as an initiator is suppressed, so that interfacial adhesion is further improved.

In the present invention, the anion site X-1 of the (B3) quaternary phosphonium salt represented by the general formula (IX) is preferably a halogen ion because it is small in size and do not hinder the reaction acceleration effect of the quaternary ammonium salt.

In the present invention, preferably $R_{34}$ and $R_{35}$ of the (B3) phosphine compound represented by the general formula (X) are each a hydrocarbon group with a carbon number of 1 to 8, a group containing a hydrocarbon with a carbon number of 1 to 8 and an ether structure or a group containing a hydrocarbon with a carbon number of 1 to 8 and an ester structure. When the carbon number is less than 8, the ratio of active sites in the molecule is high, so that a high effect of improvement of interfacial adhesion is obtained even with a small amount of the compound.

In the present invention, the molecular weight of the cation site of the (B3) quaternary phosphonium salt having a cation site is preferably in a range of 100 to 400 g/mol, more preferably in a range of 100 to 300 g/mol, further preferably in a range of 100 to 200 g/mol. When the molecular weight of the cation site is 100 g/mol or more, volatilization is suppressed even during heat treatment, so that a high effect of improvement of interfacial adhesion is obtained even with a small amount of the compound. On the other hand, when the molecular weight of the cation site is 400 g/mol or less, the ratio of active sites in the molecule is high, so that a high effect of improvement of interfacial adhesion is obtained even with a small amount of the compound.

In the present invention, examples of the cation site of the aliphatic quaternary phosphonium salt represented by the general formula (IX) include tetramethylphosphonium, tetraethylphosphonium, tetrapropylphosphonium, tetrabutylphosphonium, methyltriethylphosphonium, methyltripropylphosphonium, methyltributylphosphonium, dimethyldiethylphosphonium, dimethyldipropylphosphonium, dimethyldibutylphosphonium, trimethylethylphosphonium, trimethylpropylphosphonium, trimethylbutylphosphonium, (2-methoxyethoxymethyl)triethylphosphonium, (2-acetoxyethyl)trimethylphosphonium chloride, (2-acetoxyethyl)trimethylphosphonium, (2-hydroxyethyl)trimethylphosphonium, tributyl-n-octylphosphonium, tributyldodecylphosphonium, tributylhexadecylphosphonium, tributyl(1,3-dioxolane-2-ylmethyl)phosphonium, di-t-butyldimethylphosphonium and trihexyltetradecylphosphonium, and bis(polyoxyethylene)dimethylphosphonium.

Examples of the cation site of the aromatic quaternary phosphonium salt represented by the general formula (IX) include tetraphenylphosphonium, triphenylmethylphosphonium, diphenyldimethylphosphonium, ethyltriphenylphosphonium, tetraphenylphosphonium, n-butyltriphenylphosphonium, benzyltriphenylphosphonium, isopropyltriphenylphosphonium, vinyltriphenylphosphonium, allyltriphenylphosphonium, triphenylpropargylphosphonium, t-butyltriphenylphosphonium, heptyltriphenylphosphonium, triphenyltetradecylphosphonium, hexyltriphenylphosphonium, (methoxymethyl)triphenylphosphonium, 2-hydroxybenzyltriphenylphosphonium, (4-carboxybutyl)triphenylphosphonium, (3-carboxypropyl)triphenylphosphonium, cinnamyltriphenylphosphonium, cyclopropyltriphenylphosphonium, 2-(1,3-dioxane-2-yl)ethyltriphenylphosphonium, 2-(1,3-dioxolane-2-yl)ethyltriphenylphosphonium, 2-(1,3-dioxolane-2-yl)methyltriphenylphosphonium, 4-ethoxybenzyltriphenylphosphonium and ethoxycarbonylmethyl(triphenyl)phosphonium.

In the present invention, these quaternary phosphonium salts may be used alone, or in combination of two or more thereof.

In the present invention, examples of the (B3) quaternary phosphonium salt include trimethyloctadecylphosphonium chloride, trimethyloctadecylphosphonium bromide, trimethyloctadecylphosphonium hydroxide, trimethyloctadecylphosphonium acetate, trimethyloctadecylphosphonium benzoate, trimethyloctadecylphosphonium-p-toluenesulfonate, trimethyloctadecylphosphonium hydrochloride, trimethyloctadecylphosphonium tetrachloroiodate, trimethyloctadecylphosphonium hydrogensulfate, trimethyloctadecylphosphonium methylsulfate, benzyltrimethylphosphonium chloride, benzyltrimethylphosphonium bromide, benzyltrimethylphosphonium hydroxide, benzyltrimethylphosphonium acetate, benzyltrimethylphosphonium benzoate, benzyltrimethylphosphonium-p-toluenesulfonate, tetrabutylphosphonium chloride, tetrabutylphosphonium bromide, tetrabutylphosphonium hydroxide, tetrabutylphosphonium acetate, tetrabutylphosphonium benzoate, tetrabutylphosphonium-p-toluenesulfonate, (2-methoxyethoxymethyl)triethylphosphonium chloride, (2-methoxyethoxymethyl)triethylphosphonium bromide, (2-methoxyethoxymethyl)triethylphosphonium hydroxide, (2-methoxyethoxymethyl)triethylphosphonium-p-toluenesulfonate, (2-acetoxyethyl)trimethylphosphonium chloride, (2-acetoxyethyl)trimethylphosphonium bromide, (2-acetoxyethyl)trimethylphosphonium hydroxide, (2-acetoxyethyl)trimethylphosphonium-p-toluenesulfonate, (2-hydroxyethyl)trimethylphosphonium chloride, (2-hydroxyethyl)trimethylphosphonium bromide, (2-hydroxyethyl)trimethylphosphonium hydroxide, (2-hydroxyethyl)trimethylphosphonium-p-toluenesulfonate, bis(polyoxyethylene)dimethylphosphonium chloride, bis(polyoxyethylene)dimethylphosphonium bromide, bis(polyoxyethylene)dimethylphosphonium hydroxide, bis(polyoxyethylene)dimethylphosphonium-p-toluenesulfonate, tetraphenylphosphonium bromide and tetraphenylphosphonium tetraphenylborate.

Examples of the (B3) quaternary phosphonium salt other than those of the general formula (IX) include acetonyltriphenylphosphonium chloride, 1H-benzotriazole-1-yloxytripyrrolidinophosphonium hexafluorophosphate, 1H-benzotriazole-1-yloxytris(dimethylamino)phosphonium hexafluorophosphate, trans-2-butene-1,4-bis(triphenylphosphonium chloride), (4-carboxybutyl)triphenylphosphonium bromide, (4-carboxypropyl)triphenylphosphonium bromide, (2,4-dichlorobenzyl)triphenylphosphonium chloride, 2-dimethylaminoethyltriphenylphosphonium bromide, ethoxycarbonylmethyl(triphenyl)phosphonium bromide, (formylmethyl)triphenylphosphonium chloride, N-methylanilinotriphenylphosphonium iodide and phenacyltriphenylphosphonium bromide.

Examples of the phosphine compound represented by the general formula (X) include triethylphosphine, tripropylphosphine, tributylphosphine, tri-t-butylphosphine, tripentylphosphine, trihexylphosphine, tricyclopentylphosphine, tricyclohexylphosphine, trioctylphosphine, triphenylphosphine, tri(2-furyl)phosphine, dimethylpropylphosphine, dimethylbutylphosphine, dimethylpentylphosphine, dimethylhexylphosphine, dimethylcyclohexylphosphine, dimethyloctylphosphine, dimethyldecylphosphine, dimethyldodecylphosphine, dimethyltetradecylphosphine, dimethylhexadecylphosphine, dimethyloctadecylphosphine, dimethyloleylphosphine, dimethyldocosylphosphine, diethylpropylphosphine, diethylbutylphosphine, diethylpentylphosphine, diethylhexylphosphine, diethylcyclohexylphosphine, diethyloctylphosphine, diethyldecylphosphine, diethyldodecylphosphine, diethyltetradecylphosphine, diethylhexadecylphosphine, diethyloctadecylphosphine, diethyloleylphosphine, diethyldocosylphosphine, diethylphenylphosphine, ethyldiphenylphosphine, dipropylmethylphosphine, dipropylethylphosphine, dipropylbutylphosphine, dibutylmethylphosphine, dibutylethylphosphine, dibutylpropylphosphine, dihexylmethylphosphine, dihexylethylphosphine, dihexylpropylphosphine, dihexylbutylphosphine, dicyclohexylmethylphosphine, dicyclohexylethylphosphine, dicyclohexylpropylphosphine, dicyclohexylbutylphosphine, dicyclohexylphenylphosphine, dioctylmethylphosphine, dioctylethylphosphine, dioctylpropylphosphine, didecylmethylphosphine, didecylethylphosphine, didecylpropylphosphine, didecylbutylphosphine, didodecylmethylphosphine, didodecylethylphosphine, didodecylpropylphosphine, didodecylbutylphosphine, ditetradecylmethylphosphine, ditetradecylethylphosphine, ditetradecylpropylphosphine, ditetradecylbutylphosphine, dihexadecylmethylphosphine, dihexadecylethylphosphine, dihexadecylpropylphosphine, dihexadecylbutylphosphine, trimethanolphosphine, triethanolphosphine, tripropanolphosphine, tributanolphosphine, trihexanolphosphine, diethylmethanolphosphine, dipropylmethanolphosphine, diisopropylmethanolphosphine, dibutylmethanolphosphine, diisobutylmethanolphosphine, di-t-butylmethanolphosphine, di(2-ethylhexyl)methanolphosphine, dimethylethanolphosphine, diethylethanolphosphine, dipropylethanolphosphine, diisopropylethanolphosphine, dibutylethanolphosphine, diisobutylethanolphosphine, di-t-butylethanolphosphine, di-t-butylphenylphosphine, di(2-ethylhexyl)ethanolphosphine, dimethylpropanolphosphine, diethylpropanolphosphine, dipropylpropanolphosphine, diisopropylpropanolphosphine, dibutylpropanolphosphine, diisobutylpropanolphosphine, di-t-butylpropanolphosphine, di(2-ethylhexyl)propanolphosphine, methyldimethanolphosphine, ethyldimethanolphosphine, propyldimethanolphosphine, isopropyldimethanolphosphine, butyldimethanolphosphine, isobutyldimethanolphosphine, (2-ethylhexyl)dimethanolphosphine, methyldiethanolphosphine, ethyldiethanolphosphine, propyldiethanolphosphine, isopropyldiethanolphosphine, butyldiethanolphosphine, isobutyldiethanolphosphine, t-butyldiethanolphosphine, (2-ethylhexyl)diethanolphosphine, isopropylphenylphosphine, methoxydiphenylphosphine, ethoxydiphenylphosphine, triphenylphosphine, diphenylmethylphosphine, diphenylethylphosphine, diphenylcyclohexylphosphine, diphenylpropylphosphine, diphenylbutylphosphine, diphenyl-t-butylphosphine, diphenylpentylphosphine, diphenylhexylphosphine, diphenyloctylphosphine, diphenylbenzylphosphine, phenoxydiphenylphosphine, diphenyl-1-pyrenylphosphine, phenyldimethylphosphine, trimethylphosphine, tri-n-octylphosphine, tri-o-tolylphosphine, tri-m-tolylphosphine and tris-2,6-dimethoxyphenylphosphine.

Examples of the (B3) phosphine compound other than those of the general formula (X) include phenyl-2-pyridylphosphine, triphenylphosphine oxide, 1,4-bis(diphenylphosphino)ethane, 1,4-bis(diphenylphosphino)propane and 1,4-bis(diphenylphosphino)butane.

As the thermoplastic resin for use in the present invention, for example, at least one thermoplastic resin selected from crystalline resins such as "polyester-based resins such as polyethylene terephthalate (PET), polybutylene terephthalate (PBT), polytrimethylene terephthalate (PTT), polyethylene naphthalate (PEN) and liquid crystal polyester; polyolefin-based resins such as polyethylene (PE), polypropylene (PP), polybutylene, acid-modified polyethylene (m-PE), acid-modified polypropylene (m-PP) and acid-modified polybutylene; polyoxymethylene (POM), polyamide (PA), polyarylene sulfide resins such as polyphenylene sulfide (PPS); polyketone (PK), polyether ketone (PEK), polyether ether ketone (PEEK), polyether ketone (PEKK) and polyether nitrile (PEN); fluorine-based resins such as polytetrafluoroethylene; and liquid crystal polymers (LCP)", amorphous resins such as "styrene-based resins such as polystyrene (PS), acrylonitrile-styrene (AS) and acrylonitrile-butadiene-styrene (ABS), polycarbonate (PC), polymethyl methacrylate (PMMA), polyvinyl chloride (PVC), unmodified or modified polyphenylene ether (PPE), polyimide (PI), polyamide imide (PAI), polyether imide (PEI), polysulfone (PSU), polyether sulfone and polyarylate (PAR); phenol-based resins, phenoxy resins, and various kinds of thermoplastic elastomers such as polystyrene-based elastomers, polyolefin-based elastomers, polyurethane-based elastomers, polyester-based elastomers, polyamide-based elastomers, polybutadiene-based elastomers, polyisoprene-based elastomers, fluorine-based resin and acrylonitrile-based elastomers, and copolymers and modified products thereof is preferably used. Particularly, it is preferred that the thermoplastic resin is at least one thermoplastic resin selected from the group consisting of a polyarylene sulfide resin, a polyether ether ketone resin, a polyphenylene ether resin, a polyoxymethylene resin, a polyamide resin, a polyester-based resin, a polycarbonate resin, a styrene-based resin and a polyolefin-based resin because they strongly interact with the compound (A1) and/or (A2), so that a strong interface can be formed. As the thermoplastic resin, a thermoplastic resin composition containing two or more of those thermoplastic resins may be used within the bounds of not impairing the object of the present invention.

In the present invention, a remaining epoxy group, which is not involved in covalent bonding with carbon fiber, in the compound (A1), and a hydroxyl group, an amide group, an imide group, a urethane group, a urea group, a sulfonyl group or a sulfo group in the compound (A2) may form an interaction such as a covalent bond and a hydrogen bond with functional groups such as an ether group, an ester group, a sulfide group and an amide group on the main chain, an acid anhydride group and a cyano group on the side chain and a hydroxyl group, a carboxyl group and an amino group at the terminal in the thermoplastic resin to improve interfacial adhesion.

The interaction with the component (A) when the above-mentioned preferred thermoplastic resin is used will be described below.

In the case of the polyarylene sulfide resin, it is thought that a strong interface can be formed by a covalent bond between a thiol group or a carboxyl group at the terminal and an epoxy group contained in the compound (A1) and a hydrogen bond between a sulfide group on the main chain and an epoxy group contained in the compound (A1) or a hydroxyl group, an amide group, an imide group, a urethane group, a urea group, a sulfonyl group or a sulfo group contained in the compound (A2).

In the case of the polyether ether ketone resin, the polyphenylene ether resin or the polyoxymethylene resin, it is thought that a strong interface can be formed by a covalent bond between a hydroxyl group at the terminal and an epoxy group contained in the compound (A1) and a hydrogen bond between an ether group on the main chain and an epoxy group contained in the compound (A1) or a hydroxyl group, an amide group, an imide group, a urethane group, a urea group, a sulfonyl group or a sulfo group contained in the compound (A2).

In the case of the polyamide resin, it is thought that a strong interface can be formed by a covalent bond between a carboxyl group or an amino group at the terminal and an epoxy group contained in the compound (A1) and a hydrogen bond between an amide group on the main chain and an epoxy group contained in the compound (A1) or a hydroxyl group, an amide group, an imide group, a urethane group, a urea group, a sulfonyl group or a sulfo group contained in the compound (A2).

In the case of the polyester-based resin and the polycarbonate resin, it is thought that a strong interface can be formed by a covalent bond between a carboxyl group or a hydroxyl group at the terminal and an epoxy group contained in the compound (A1) and a hydrogen bond between an ester group on the main chain and an epoxy group contained in the compound (A1) or a hydroxyl group, an amide group, an imide group, a urethane group, a urea group, a sulfonyl group or a sulfo group contained in the compound (A2).

In the case of the styrene-based resin such as an ABS resin, it is thought that a strong interface can be formed by a hydrogen bond between a cyano group on the side chain and an epoxy group contained in the compound (A1) or a hydroxyl group, an amide group, an imide group, a urethane group, a urea group, a sulfonyl group or a sulfo group contained in the compound (A2).

In the case of the polyolefin-based resin, particularly the acid-modified polyolefin-based resin, it is thought that a strong interface can be formed by a covalent bond between an acid anhydride group or a carboxyl group on the side chain and an epoxy group contained in the compound (A1) and a hydrogen bond between the aforementioned group on the side chain and a hydroxyl group, an amide group, an imide group, a urethane group, a urea group, a sulfonyl group or a sulfo group contained in the compound (A2).

The thermoplastic resin for use in the present invention is preferably a polyarylene sulfide resin or a polyether ether ketone resin from the viewpoint of heat resistance. The thermoplastic resin is preferably a polyphenylene ether resin from the viewpoint of dimensional stability. The thermoplastic resin is preferably a polyoxymethylene resin from the viewpoint of friction/abrasion properties. The thermoplastic resin is preferably a polyamide resin from the viewpoint of strength. The thermoplastic resin is preferably an amorphous resin such as a polycarbonate or styrene-based resin from the viewpoint of surface appearance. The thermoplastic resin is preferably a polyolefin-based resin from the viewpoint of lightness.

In the present invention, carbon fiber has a surface oxygen concentration (O/C) that is preferably in a range of 0.05 to 0.5, more preferably in a range of 0.06 to 0.3, further preferably in a range of 0.07 to 0.2, the surface oxygen concentration (O/C) being a ratio of the number of atoms between oxygen (O) and carbon (C) of the surface of the fiber as measured by X-ray photoelectron spectroscopy. When the surface oxygen concentration (O/C) is 0.05 or more, oxygen-containing functional groups of the surface of carbon fiber can be secured to achieve strong adhesion with the thermoplastic resin. When the surface oxygen concentration (O/C) is 0.5 or less, a reduction in strength of carbon fiber itself due to oxidation can be suppressed.

The surface oxygen concentration of carbon fiber is determined in accordance with the following process by X-ray photoelectron spectroscopy. First, carbon fiber freed of a sizing agent etc. deposited on the surface of carbon fiber using a solvent is cut into 20 mm, and the carbon fiber is spread and arranged on a copper sample support, and the inside of a sample chamber is then held at $1 \times 10^{-8}$ Torr using AlK$\alpha_{1,2}$ as an X ray source. The kinetic energy value (K.E.) of the primary peak of $C_{1S}$ is adjusted to 1202 eV as a correction value of a peak associated with charge during measurement. A $C_{1S}$ peak area is determined by drawing linear baseline in a range of 1191 to 1205 eV as K.E. A $O_{1S}$ peak area is determined by drawing linear baseline in a range of 947 to 959 eV as K.E.

Here, the surface oxygen concentration is calculated as a ratio of the number of atoms from a ratio of the $O_{1S}$ peak area to the $C_{1S}$ peak area using a sensitivity correction value specific to an apparatus. ESCA-1600 manufactured by ULVAC-PHI, Inc. was used as an X-ray photoelectron spectroscopy apparatus, and the sensitivity correction value specific to the apparatus was 2.33.

Next, a preferred aspect for producing the carbon fiber-reinforced thermoplastic resin composition of the present invention will be described.

Examples of the method for producing the carbon fiber-reinforced thermoplastic resin composition of the present invention include a method in which carbon fiber, a thermoplastic resin, the component (A) and the component (B) are melt-kneaded at the same time, a method in which carbon fiber and the component (B) are melt-kneaded with a melt-kneaded product of a thermoplastic resin and the component (A), a method in which carbon fiber and the component (A) are melt-kneaded with a melt-kneaded product of a thermoplastic resin and the component (B), a method in which carbon fiber is melt-kneaded with a melt-kneaded product of a thermoplastic resin and the component (A) and component (B), a method in which sizing agent-applied carbon fiber obtained by depositing a sizing agent containing the component (A) is melt-kneaded with the component (B) and a thermoplastic resin, a method in which sizing agent-applied carbon fiber obtained by depositing a sizing agent containing the component (B) is melt-kneaded with the component (A) and a thermoplastic resin, and a method in which sizing agent-applied carbon fiber obtained by depositing a sizing agent containing the component (A) and the component (B) is melt-kneaded with a thermoplastic resin. Any of these methods may be used.

The method of melt-kneading is not particularly limited, and a publicly known heating and melt-mixing apparatus may be used. Specifically, a single screw extruder, a twin screw extruder, a twin screw extruder with the single screw extruder combined with the twin screw extruder, and a kneader/ruder etc. may be used. Particularly, from the viewpoint of a mixing force, use of a twin screw extruder is preferred, and use of a twin screw extruder having two or more kneading zones is more preferred.

Carbon fiber or sizing agent-applied carbon fiber may be introduced into the heating and melt-mixing apparatus in the form of either a continuous fiber or discontinuous fiber obtained by cutting fiber to a specific length. When carbon fiber is introduced directly into the heating and melt-mixing apparatus in the form of a continuous fiber (direct robing), a molded product excellent in dynamic characteristics can be obtained because breakage of carbon fiber can be suppressed to secure the fiber length in the molded product. Further, productivity is improved because a step of cutting carbon fiber can be omitted.

In the present invention, a carbon fiber-reinforced thermoplastic resin composition including 1 to 80% by mass of sizing agent-applied carbon fiber formed by depositing 0.1 to 10 parts by mass, based on 100 parts by mass of carbon fiber, of a sizing agent containing the component (A) and the component (B), and 20 to 99% by mass of a thermoplastic resin is preferred. When a sizing agent containing the component (A) and the component (B) is applied to carbon fiber, followed by mixing a thermoplastic resin to form a carbon fiber-reinforced thermoplastic resin composition, the sizing agent containing the component (A) and the component (B) is localized on the periphery of carbon fiber, and therefore efficiency of reaction of an oxygen-containing functional group of the surface of carbon fiber with an epoxy group contained in the component (A) is enhanced, so that a high effect can be obtained even with a small amount of the component (A) and the component (B). The deposition amount of the sizing agent is more preferably in a range of 0.2 to 3 parts by mass. When the deposition amount of the sizing agent is 0.1 parts by mass or more, sizing agent-applied carbon fiber can resist friction with a passing metal guide etc. when passing through a process, so that occurrence of fuzz is suppressed, leading to excellent quality. When the deposition amount of the sizing agent is 10 parts by mass or less, a carbon fiber bundle is impregnated with a thermoplastic resin without being hindered by a sizing agent film on the periphery of the carbon fiber bundle, so that generation of voids is suppressed in the obtained composite material. As a result, the composite material has both excellent quality and excellent dynamic characteristics.

In the present invention, a carbon fiber-reinforced thermoplastic resin composition obtained by melt-kneading 1 to 80% by mass of sizing agent-applied carbon fiber obtained by depositing 0.1 to 10 parts by mass, based on 100 parts by mass of carbon fiber, of a sizing agent containing the component (A) and the component (B), and 20 to 99% by mass of a thermoplastic resin is preferred. By melt-kneading sizing agent-applied carbon fiber and the thermoplastic resin, carbon fiber can be uniformly dispersed, so that a molded product excellent in dynamic characteristics can be obtained.

The sizing agent may contain one or more component other than the component (A) and the component (B). For example, nonionic surfactants such as polyalkylene oxides such as polyethylene oxide and polypropylene oxide, compounds with a polyalkylene oxide such as polyethylene oxide or polypropylene oxide added to a higher alcohol, a polyhydric alcohol, an alkyl phenol and a styrenated phenol etc., and block copolymers of ethylene oxide and propylene oxide are preferably used. A polyester resin and an unsaturated polyester compound etc. may be appropriately added within the bounds of not affecting the effect of the present invention.

In the present invention, the sizing agent can be diluted with a solvent and used. Examples of the solvent include water, methanol, ethanol, isopropanol, acetone, methyl ethyl ketone, dimethylformamide and dimethylacetamide and among them, water is preferably used because it is easy to handle and is advantageous in terms of safety.

In the present invention, it is preferred that the thickness of a sizing agent layer applied to carbon fiber and dried is in a range of 2 to 20 nm, and the ratio of the maximum value to the minimum value of the thickness is preferably no more than 2. With the sizing layer having a uniform thickness, a significant interfacial adhesion improvement effect is stably obtained, and moreover excellent high-order processability is stably achieved.

In the present invention, examples of carbon fiber include polyacrylonitrile (PAN)-based carbon fiber, rayon-based carbon fiber and pitch-based carbon fiber. Among them, a PAN-based carbon fiber, which is excellent in balance between the strength and the elastic modulus, is preferably used.

Next, a method for producing a PAN-based carbon fiber will be described.

As a spinning method for obtaining a precursor fiber of carbon fiber, spinning methods such as wet spinning, dry spinning and dry-wet spinning may be used. Among them, a wet or dry-wet spinning method is preferably used because a high-strength carbon fiber is easily obtained. As a spinning dope, a solution or suspension of a homopolymer or copolymer of polyacrylonitrile may be used.

The spinning dope is spun by passage through a mouthpiece, solidified, rinsed and drawn to form a precursor fiber, and the obtained precursor fiber is subjected to a flame resisting treatment and a carbonization treatment, and further a graphitization treatment as necessary, thereby obtaining carbon fiber. As conditions for the carbonization treatment and graphitization treatment, the maximum heat treatment temperature is preferably 1100° C. or higher, more preferably 1400 to 3000° C.

In the present invention, carbon fiber having a fine size is preferably used because carbon fiber having a high strength and elastic modulus is obtained. Specifically, the single fiber diameter of carbon fiber is preferably 7.5 μm or less. The lower limit of the single fiber diameter is not particularly specified, but when the single fiber diameter is 4.5 μm or less, single fiber breakage may easily occur in the process, leading to deterioration of productivity.

The obtained carbon fiber is usually subjected to an oxidation treatment to introduce an oxygen-containing functional group therein for improving interfacial adhesion. As the oxidation treatment, gas phase oxidation, liquid phase oxidation and liquid phase electrolytic oxidation are used, but liquid phase electrolytic oxidation is preferably used because productivity is high and uniform treatment can be performed.

In the present invention, examples of the electrolytic solution that is used in liquid phase electrolytic oxidation include acidic electrolytic solutions and alkaline electrolytic solutions.

Examples of the acidic electrolytic solution include inorganic acids such as sulfuric acid, nitric acid, hydrochloric acid, phosphoric acid, boric acid and carbonic acid, organic acids such as acetic acid, butyric acid, oxalic acid, acrylic acid and maleic acid, and salts of ammonium sulfate and ammonium hydrogen sulfate etc. Among them, sulfuric acid and nitric acid, which show strong acidity, are preferably used.

Specific examples of the alkaline electrolytic solution include aqueous solutions of hydroxides such as sodium hydroxide, potassium hydroxide, magnesium hydroxide, calcium hydroxide and barium hydroxide, aqueous solutions of carbonates such as sodium carbonate, potassium carbonate, magnesium carbonate, calcium carbonate, barium carbonate and ammonium carbonate, aqueous solutions of hydrogen carbonates such as sodium hydrogen carbonate, potassium hydrogen carbonate, magnesium hydrogen carbonate, calcium hydrogen carbonate, barium hydrogen carbonate and ammonium hydrogen carbonate, and aqueous solutions of ammonia, tetraalkylammonium hydroxide and hydrazine. Among them, aqueous solutions of ammonium carbonate and ammonium hydrogen carbonate, or an aqueous solution of tetraalkylammonium hydroxide, which shows strong alkalinity, are preferably used because no alkali metal is contained.

In the present invention, preferably carbon fiber is subjected to an electrolytic treatment with an alkaline electrolytic solution, or subjected to an electrolytic treatment in an acidic aqueous solution and subsequently washed with an alkaline aqueous solution, followed by applying sizing agent to carbon fiber because formation of a covalent bond between the epoxy compound (A) and an oxygen-containing functional group of the surface of carbon fiber is accelerated to further improve interfacial adhesion. It is thought that since when the electrolytic treatment is performed, an excessively oxidized part of the surface of carbon fiber may exist as a fragile layer at the interface, and become a source of collapse when carbon fiber is formed into a composite material, the excessively oxidized part is dissolved and removed with an alkaline aqueous solution, and resultantly formation of a covalent bond is accelerated. When a residue of the acidic electrolytic solution exists on the surface of carbon fiber, a proton in the residue may be caught by the component (B), leading to a reduction in effect of drawing out a hydrogen ion of an oxygen-containing functional group of the surface of carbon fiber by the component (B), i.e. a role which should be intrinsically performed. Therefore, it is preferred to neutralize and wash the acidic electrolytic solution with an alkaline aqueous solution subsequent to performing the electrolytic treatment in an acidic aqueous solution. From the reason described above, further improvement of adhesion can be achieved by combination of carbon fiber subjected to a specific treatment and a sizing agent.

The concentration of the electrolytic solution for use in the present invention is preferably in a range of 0.01 to 5 mol/L, more preferably in a range of 0.1 to 1 mol/L. It is advantageous in terms of an operation cost that the concentration of the electrolytic solution is 0.01 mol/L or more because the electrolytic treatment voltage is reduced. On the other hand, it is advantageous in terms of safety that the concentration of the electrolytic solution is 5 mol/L or less.

The temperature of the electrolytic solution for use in the present invention is preferably in a range of 10 to 100° C., more preferably in a range of 10 to 40° C. It is advantageous in terms of an operation cost that the temperature of the electrolytic solution is 10° C. or higher because efficiency of the electrolytic treatment is improved. On the other hand, it is advantageous in terms of safety that the temperature of the electrolytic solution is 100° C. or lower.

In the present invention, preferably the amount of electricity in liquid phase electrolytic oxidation is optimized in accordance with a carbonization degree of carbon fiber. When carbon fiber having a high elastic modulus is treated, a larger amount of electricity is required.

In the present invention, the current density in liquid phase electrolytic oxidation is preferably in a range of 1.5 to 1000 $A/m^2$, more preferably in a range of 3 to 500 $A/m^2$ of the surface area of carbon fiber in an electrolytic treatment solution. It is advantageous in terms of an operation cost that the current density is 1.5 $A/m^2$ or more because efficiency of the electrolytic treatment is improved. On the other hand, it is advantageous in terms of safety that the current density is 1000 $A/m^2$ or less.

In the present invention, preferably carbon fiber is washed with an alkaline aqueous solution after oxidation treatment because formation of a covalent bond between the epoxy compound (A) and an oxygen-containing functional group of the surface of carbon fiber is accelerated to further improve interfacial adhesion. Particularly, it is preferred that carbon fiber is subjected to a liquid phase electrolytic treatment with an acidic electrolytic solution, and subsequently washed with an alkaline aqueous solution.

In the present invention, the pH of the alkaline aqueous solution to be used for washing is preferably in a range of 7 to 14, more preferably in a range of 10 to 14. Specific examples of the alkaline aqueous solution include aqueous solutions of hydroxides such as sodium hydroxide, potassium hydroxide, magnesium hydroxide, calcium hydroxide and barium hydroxide, aqueous solutions of carbonates such as sodium carbonate, potassium carbonate, magnesium carbonate, calcium carbonate, barium carbonate and ammonium carbonate, aqueous solutions of hydrogen carbonates such as sodium hydrogen carbonate, potassium hydrogen carbonate, magnesium hydrogen carbonate, calcium hydrogen carbonate, barium hydrogen carbonate and ammonium hydrogen carbonate, and aqueous solutions of ammonia, tetraalkylammonium hydroxide and hydrazine. Among them, aqueous solutions of ammonium carbonate and ammonium hydrogen carbonate, or an aqueous solution of tetraalkylammonium hydroxide, which shows strong alkalinity, are preferably used because no alkali metal is contained.

In the present invention, for example, a dipping method and a spraying method may be used as a method for washing carbon fiber. Among them, it is preferred to use a dipping method because washing is easy, and moreover it is a preferred aspect to use a dipping method while carbon fiber is ultrasonically vibrated.

In the present invention, preferably carbon fiber is rinsed and dried after it is subjected to an electrolytic treatment or washed with an alkaline aqueous solution. In this case, since a functional group existing on the outermost surface of carbon fiber is easily lost due to thermal decomposition when the drying temperature is excessively high, it is desirable to dry carbon fiber at a temperature which is as low as possible, and specifically carbon fiber is dried preferably at 250° C. or lower, further preferably at 210° C. or lower.

Examples of means for adding (applying) a sizing agent to carbon fiber include a method in which carbon fiber is immersed in a sizing solution via a roller, a method in which carbon fiber is brought into contact with a sizing solution-deposited roller, and a method in which a sizing solution is atomized and sprayed to carbon fiber. Means for adding a sizing agent may be either a batch system or a continuous system, but a continuous system is preferably used because it is high in productivity and is capable of reducing variations. At this time, preferably the concentration of a sizing solution, the temperature and the thread tension etc. are controlled so that the sizing agent is uniformly deposited while the deposition amount of a sizing agent effective component with respect to carbon fiber falls within a proper range. Further, it is a preferred aspect to ultrasonically vibrate carbon fiber when the sizing agent is added.

In the present invention, for accelerating formation of a covalent bond between an epoxy compound of the sizing agent and an oxygen-containing functional group of the surface of carbon fiber after applying the sizing agent to carbon fiber, a heat treatment is performed preferably at a temperature of 160 to 260° C. for 30 to 600 seconds, more preferably at a temperature of 170 to 250° C. for 30 to 500 seconds, further preferably at a temperature of 180 to 240° C. for 30 to 300 seconds.

The heat treatment can also be performed by microwave irradiation and/or infrared irradiation. When carbon fiber is heating-treated by microwave irradiation and/or infrared irradiation, carbon fiber, i.e. an object to be heated, can be heated to a desired temperature in a short time because microwaves penetrate into carbon fiber and are absorbed. By microwave irradiation and/or infrared irradiation, the inside of carbon fiber can be speedily heated, and therefore a temperature difference between the inside and the outside of a carbon fiber bundle can be decreased, so that adhesion unevenness of the sizing agent can be reduced.

In the present invention, the strand strength of the obtained carbon fiber bundle is preferably 3.5 GPa or more, more preferably 4 GPa or more, further preferably 5 GPa or more. In the present invention, the strand elastic modulus of the obtained carbon fiber bundle is preferably 220 GPa or more, more preferably 240 GPa or more, further preferably 280 GPa or more.

In the present invention, the strand tensile strength and the elastic modulus of the carbon fiber bundle can be determined in accordance with the following process based on the resin-impregnated strand test method in JIS-R-7608 (2004). As a resin formulation, "CELLOXIDE (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass) is used, and as curing conditions, conditions of normal pressure, 130° C. and 30 minutes are used. 10 strands of carbon fiber bundle are measured, and an average value thereof is determined for each of the strand tensile strength and the strand elastic modulus.

The carbon fiber-reinforced thermoplastic resin composition of the present invention may contain components other than those described above and may contain fillers, additives and the like depending on an application etc. within the bounds of not hindering dynamic characteristics. Examples of the filler and additive include inorganic fillers, flame retardants, conductivity imparting agents, nucleating agents, ultraviolet absorbers, antioxidants, vibration damping agents, antibacterial agents, insect repellents, deodorants, coloration inhibitors, heat stabilizers, mold release agents, antistatic agents, plasticizers, lubricants, colorants, pigments, foaming agents and coupling agents.

As additives, particularly, a flame retardant is preferably added for applications where flame retardancy is required, and a conductivity imparting agent is preferably added for applications where conductivity is required. As the flame retardant, for example, flame retardants such as halogen compounds, antimony compounds, phosphorus compounds, nitrogen compounds, silicone compounds, fluorine compounds, phenol compounds and metal hydroxides may be used. Among them, phosphorus compounds such as ammonium polyphosphate, polyphosphazene, phosphate, phosphonate, phosphinate, phosphine oxide and red phosphorus may be preferably used.

As the conductivity imparting agent, for example, carbon black, amorphous carbon powders, natural graphite powders, artificial graphite powders, expanded graphite powders, pitch microbeads, vapor growth carbon fiber and carbon nanotubes may be employed.

The carbon fiber-reinforced thermoplastic resin composition of the present invention may be used in the form of molding materials such as a pellet, a stanpable sheet and a prepreg. The most preferred molding material is a pellet. The pellet generally refers to one obtained in the following manner: a thermoplastic resin pellet and continuous carbon fiber or discontinuous carbon fiber (chopped carbon fiber) obtained by cutting carbon fiber to a specific length are melt-kneaded in an extruder, extruded and pelletized.

Examples of the method for molding the molding material include injection molding (injection compression molding, gas-assisted injection molding and insert molding etc.), blow molding, rotational molding, extrusion molding, press molding, transfer molding and filament winding molding. Among them, injection molding is preferably used from the viewpoint of productivity. Molded articles can be obtained using the above-described molding methods.

Examples of the application of molded articles formed by molding the carbon fiber-reinforced thermoplastic resin of the present invention include housings and internal members such as trays and chassis and cases thereof for electric and electronic components such as personal computers, displays, OA devices, mobile phones, personal digital assistants, facsimile machines, compact discs, portable MDs, portable radio cassettes, PDAs (personal digital assistants such as electronic notebooks), video cameras, digital still cameras, optical devices, audios, air conditioners, lighting devices, entertainment articles, toy articles and other home electric appliances, building material applications such as mechanical components and panels, automobile and two-wheeled vehicle related components, members and outside plates such as motor components, alternator terminals, alternator connectors, IC regulators, potentiometer bases for light dyers, suspension components, various kinds of valves such as exhaust gas valves, fuel-related components, various kinds of exhaust system or intake system pipes, air intake nozzle snorkels, intake manifolds, various kinds of arms, various kinds of frames, various kinds of hinges, various kinds of bearings, fuel pumps, gasoline tanks, CNG tanks, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad abrasion sensors, thermostat bases for air conditioners, warm air flow control valves, brush holders for radiator motors, water pump impellers, turbine vanes, wiper motor related components, distributors, starter switches, starter relays, wire harnesses for transmissions, window washer nozzles, air conditioner panel switch boards, coils for fuel related electromagnetic valves, connectors for fuses, battery trays, AT brackets, head lamp supports, pedal housings, handles, door beams, protectors, chassis, frames, arm rests, horn terminals, step motor rotors, lamp sockets, lamp reflectors, lamp housings, brake pistons, noise shields, radiator supports, spare tire covers, seat shells, solenoid bobbins, engine oil filters, ignition system cases, under covers, scuff plates, pillar trims, propeller shafts, wheels, fenders, fascias, bumpers, bumper beams, bonnets, aero parts, platforms, cowl louvers, roofs, instrument panels, spoilers and various kinds of modules, aircraft related components, members and outside plates such as landing gear pods, winglets, spoilers, edges, ladders, elevators, failing and ribs, and blades of windmills. Particularly, the carbon fiber-reinforced thermoplastic resin is preferably used for aircraft members, blades of windmills, automobile outside plates, and housings and trays and chassis for electronic devices.

The present invention also provides a molding material including the components (A) and (B), carbon fiber and thermoplastic resin, the molding material being any of the following molding materials (P), (Q) and (R):

molding material (P): a pillar-shaped molding material (P) in which carbon fiber is arranged almost in parallel in the axial center direction and the length of carbon fiber is substantially equal to the length of the molding material;

molding material (Q): molding material (Q) in which carbon fiber is in the form of a single fiber and substantially two-dimensionally oriented; and molding material (R): molding material (R) in which carbon fiber is in the form of a bundle and substantially two-dimensionally oriented.

First, the molding material (P) will be described.

The molding material (P) according to the present invention includes the sizing agent-applied carbon fiber and thermoplastic resin described above. As shown in FIG. 1, a molding material 1 of the present invention has a cylindrical shape, where a plurality of pieces of carbon fiber 2 are arranged almost in parallel in the direction of the axis of the cylinder, and the periphery of carbon fiber is covered with a thermoplastic resin 3. That is, carbon fiber 2 forms a core structure, and the thermoplastic resin 3 forms a sheath structure to cover the core structure formed by carbon fiber 2. The shape of the molding material 1 of the present invention is not limited to a cylindrical shape, and may be a prismatic shape, an oval-cylindrical shape or the like as long as carbon fiber 2 and the thermoplastic resin 3 form a core-sheath structure. In this specification, the term "arranged almost in parallel" means a state in which the axis line of the major axis of carbon fiber and the axis line of the major axis of the molding material 1 are directed in the same direction, and the angle of deviation between the axis lines is preferably 20° or less, more preferably 10° or less, further preferably 5° or less.

The molding material 1 of the present invention is preferably a long fiber pellet in which the length of carbon fiber and the length L of the molding material are substantially equal to each other. In this specification, the term "substantially equal length" means that in the pellet-shaped molding material 1, there is no situation in which carbon fiber 2 is cut at some midpoint in the pellet, or carbon fiber 2 is significantly shorter than the total length of the molding material 1 is substantially included. Particularly, the amount of carbon fiber shorter than the length L of the molding material 1 does not have to be limited, but when the content of carbon fiber having a length equal to or smaller than 50% of the length L of the molding material 1 is 30% by mass or less, it is considered that the carbon fiber bundle significantly shorter than the total length of the molding material 1 are not substantially included. Further, the content of carbon fiber having a length equal to or smaller than 50% of the total length of the molding material 1 is preferably 20% by mass or less. The total length of the molding material 1 is the length L in the orientation direction of carbon fiber in the molding material 1. When carbon fiber 2 has a length comparable to that of the molding material 1, the length of carbon fiber in the molded article can be increased, and therefore excellent dynamic characteristics can be obtained.

Preferably the molding material (P) of the present invention is cut to a length of 1 to 50 mm, and used. By preparing the molding material so as to have the aforementioned length, fluidity and handling characteristics during molding can be sufficiently enhanced. The molding material of the present invention can also be used in a continuous form or with a long length depending on a molding method. For example, as a thermoplastic yarn prepreg, the molding material can be wound around a mandrel while being heated to obtain a roll-shaped molding article etc.

As the thermoplastic resin 3 to be used for the molding material (P) of the present invention, for example, at least one thermoplastic resin selected from crystalline resins such as "polyester-based resins such as polyethylene terephthalate (PET), polybutylene terephthalate (PBT), polytrimethylene terephthalate (PTT), polyethylene naphthalate (PEN) and liquid crystal polyester; polyolefin-based resins such as polyethylene (PE), polypropylene (PP), polybutylene, acid-modified polyethylene (m-PE), acid-modified polypropylene (m-PP) and acid-modified polybutylene; polyoxymethylene (POM), polyamide (PA), polyarylene sulfide resins such as polyphenylene sulfide (PPS); polyketone (PK), polyether ketone (PEK), polyether ether ketone (PEEK), polyether ketone ketone (PEKK) and polyether nitrile (PEN); fluorine-based resins such as polytetrafluoroethylene; and liquid crystal polymers (LCP)", amorphous resins such as "styrene-based resins such as polystyrene (PS), acrylonitrile-styrene (AS) and acrylonitrile-butadiene-styrene (ABS), polycarbonate (PC), polymethyl methacrylate (PMMA), polyvinyl chloride (PVC), unmodified or modified polyphenylene ether (PPE), polyimide (PI), polyamide imide (PAI), polyether imide (PEI), polysulfone (PSU), polyether sulfone and polyarylate (PAR); phenol-based resins, phenoxy resins, and various kinds of thermoplastic elastomers such as polystyrene-based elastomers, polyolefin-based elastomers, polyurethane-based elastomers, polyester-based elastomers, polyamide-based elastomers, polybutadiene-based elastomers, polyisoprene-based elastomers, fluorine-based resin and acrylonitrile-based elastomers, and copolymers and modified products thereof is preferably used. As the thermoplastic resin, a thermoplastic resin composition containing two or more of those thermoplastic resins may be used within the bounds of not impairing the object of the present invention.

Figure 2:
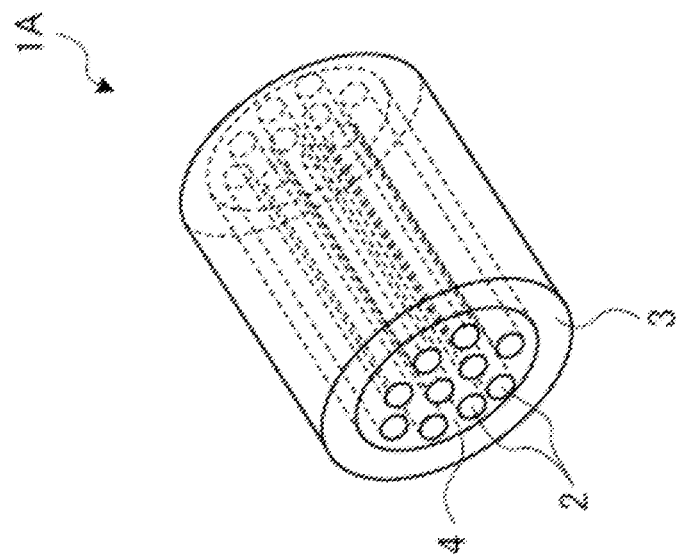
FIG. 2 is a perspective view showing another example of a molding material (P) according to an embodiment of the present invention.

As the molding material (P) of the present invention, one having an impregnation aid provided between carbon fiber 2 and the thermoplastic resin 3 can be suitably used. FIG. 2 is a perspective view of a molding material 1A according to the present invention. The molding material 1A has a configuration in which a plurality of pieces of carbon fiber 2 are arranged almost in parallel in the direction of the axis of the cylinder, the periphery of carbon fiber 2 is covered with an impregnation aid 4, and the periphery of the impregnation aid 4 is covered with the thermoplastic resin 3. For improving the dynamic characteristics of a molding article obtained by molding the molding material, generally it is preferred to use a high-molecular-weight thermoplastic resin, but a high-molecular-weight thermoplastic resin has the problem that its melt viscosity is high melt, so that a carbon fiber bundle is hardly impregnated with the resin. For improving the impregnation property of the thermoplastic resin into the carbon fiber bundle, it is preferred to use a low-molecular-weight thermoplastic resin having a low melt viscosity, but a molded article using a low-molecular-weight thermoplastic resin is significantly reduced in dynamic characteristics.

Thus, by impregnating a bundle of carbon fiber 2 with a relatively low-molecular-weight resin (prepolymer) as the impregnation aid 4, followed by using the relatively high-molecular-weight thermoplastic resin 3 as a matrix resin, the molding material (P) having excellent dynamic characteristics can be produced with high productivity.

A preferred form of the molding material (P) using an impregnation aid will be described below.

When a polyarylene sulfide resin is used as the thermoplastic resin, it is preferred to use, as an impregnation aid, i.e. the component (D), a polyarylene sulfide [d] (hereinafter, referred to as a PAS) having a mass average molecular weight of 10000 or more and a dispersion degree of 2.5 or less in terms of a mass average molecular weight/number average molecular weight, and it is preferred to use the PAS as an impregnation aid in an amount of 0.1 to 100 parts by mass based on 100 parts by mass of carbon fiber.

The molecular weight of the PAS as an impregnation aid is 10000 or more, preferably 15000 or more, more preferably 18000 or more in terms of a mass average molecular weight. When the mass average molecular weight is less than 10000, low-molecular-weight components may cause a thermal decomposition reaction during molding processing at a higher temperature (e.g. 360° C.) to produce a decomposed gas, resulting in contamination of the environment around molding equipment. The upper limit of the mass average molecular weight is not particularly limited, but as an example, the preferred range of the mass average molecular weight may be 1000000 or less, more preferably 500000 or less, further preferably 200000 or less, and when the mass average molecular weight falls within this range, a high impregnation property and high molding processability can be achieved.

The spread of the molecular weight distribution of the PAS, i.e. the dispersion degree in terms of a ratio of the mass average molecular weight to the number average molecular weight (mass average molecular weight/number average molecular weight) is 2.5 or less, preferably 2.3 or less, more preferably 2.1 or less, further preferably 2.0 or less. As the dispersion degree becomes larger, the amount of low-molecular-weight components contained in the PAS tends to increase, so that the environment around molding equipment may be contaminated similarly to the case described above. The mass average molecular weight and number average molecular weight can be determined using, for example, SEC (size exclusion chromatography) including a differential refractive index detector.

The content of the PAS is preferably 0.1 to 100 parts by mass, more preferably 10 to 70 parts by mass, further preferably 15 to 30 parts by mass, based on 100 parts by mass of carbon fiber. When the content of the PAS is 0.1 to 100 parts by mass based on 100 parts by mass of carbon fiber, a molded article having high dynamic characteristics can be produced with high productivity.

When a polyamide resin is used as the thermoplastic resin, it is preferred to use a [e] phenol-based polymer as an impregnation aid, i.e. the component (D), and it is preferred to use the [e] phenol-based polymer in an amount of 0.1 to 100 parts by mass based on 100 parts by mass of carbon fiber.

Examples of the phenol-based polymer to be used as an impregnation aid include phenol-based polymers obtained by a condensation reaction of phenol or a substituent derivative of phenol (precursor a) with a hydrocarbon having two double bonds (precursor b).

As the precursor a, one having 1 to 3 substituents selected from an alkyl group, a halogen atom and a hydroxyl group on a benzene ring of phenol is preferably used. Specific examples include cresol, xylenol, ethylphenol, butylphenol, t-butylphenol, nonylphenol, 3,4,5-trimethylphenol, chlorophenol, bromophenol, chlorocresol, hydroquinone, resorcinol and orcinol, and they may be used alone or in combination of two or more thereof. Particularly, phenol and cresol are preferably used.

Examples of the precursor b include aliphatic hydrocarbons such as butadiene, isoprene, pentadiene and hexadiene, and cycloaliphatic hydrocarbons such as cyclohexadiene, vinylcyclohexene, cyclopentadiene, cyclooctadiene, 2,5-norbornadiene, tetrahydroindene, dicyclopentadiene, monocyclic monoterpene (diterpene, limonene, terpinolene, terpinene, phellandrene), bicyclic sesquiterpene (cadinene, selinene, caryophyllene), and they may be used alone or in combination of two or more thereof. Particularly, monocyclic monoterpene and dicyclopentadiene are preferably used.

The content of the phenol-based polymer is preferably 0.1 to 100 parts by mass, more preferably 10 to 70 parts by mass, further preferably 15 to 30 parts by mass, based on 100 parts by mass of carbon fiber. When the content of the phenol-based polymer is 0.1 to 100 parts by mass based on 100 parts by mass of carbon fiber, a molded article having high dynamic characteristics can be produced with high productivity.

When a polyolefin-based resin is used as the thermoplastic resin, it is preferred to use a [f] terpene-based resin as an impregnation aid, i.e. the component (D), and it is preferred to use the [f] terpene-based polymer in an amount of 0.1 to 100 parts by mass based on 100 parts by mass of carbon fiber.

Examples of the terpene-based resin to be used as an impregnation aid include resins formed of a polymer obtained by polymerizing a terpene monomer alone or copolymerizing a terpene monomer and an aromatic monomer etc. in the presence of a Friedel-Crafts catalyst in an organic solvent.

The terpene-based resin is a thermoplastic polymer having a melt viscosity lower than that of the polyolefin-based resin, so that in a step of molding to a final shape in injection molding, press molding or the like, the viscosity of the resin composition can be decreased to improve moldability. At this time, moldability can be effectively improved because the terpene-based resin has good compatibility with the polyolefin-based resin.

Examples of the terpene monomer include monocyclic monoterpenes such as α-pinene, β-pinene, dipenetene, d-limonene, myrcene, alloocimene, ocimene, α-phellandrene, α-terpinene, γ-terpinene, terpinolene, 1,8-cineole, 1,4-cineole, α-terpineol, β-terpineol, γ-terpineol, sabinene, paramenthadienes and carenes. Examples of the aromatic monomer include styrene and α-methylstyrene.

Among them, α-pinene, β-pinene, dipenetene and d-limonene have good compatibility with the polyolefin-based resin, and are therefore preferred, and homopolymers of these compounds are more preferred. Hydrogenated terpene-based resins obtained by subjecting the terpene-based resin to a hydrogenation treatment have better compatibility with the polyolefin-based resin, and are therefore preferred.

The glass transition temperature of the terpene-based resin is preferably 30 to 100° C. This is because when the glass transition temperature is in the above-described range, handling characteristics of the resin composition of the present invention are improved. When the glass transition temperature is 30° C. or lower, the material may not be quantitatively introduced because the terpene-based resin becomes semi-solid or liquid during molding processing. When the glass transition temperature is 100° C. or higher, moldability may not be improved because the terpene-based resin is quickly solidified during molding processing.

The number average molecular weight of the terpene-based resin is preferably 500 to 5000. When the number average molecular weight is 500 or less, mechanical characteristics of the molded article may be impaired because the mechanical strength of the terpene-based resin is low. When the number average molecular weight is 5000 or more, moldability may not be improved because the viscosity of the terpene-based resin increases. When molding processing is performed using the molding material of the present invention, the number average molecular weight of the impregnation aid is lowered to ensure that the impregnation aid most easily flows and moves through the inside of a mixture of carbon fiber, the impregnation aid and the polyolefin-based resin.

Further, the terpene-based resin should be compatible with the polyolefin-based resin for effectively improving moldability of the polyolefin-based resin composition. Here, the SP value of the polyolefin-based resin depends on a type, but this value is usually about 8 to 9, and therefore the SP value of the terpene-based resin should be 6.5 to 9.5. The SP value of the terpene-based resin is more preferably 7.5 to 9. When the SP value falls out of a range of 6.5 to 9.5, the terpene-based resin tends to be hardly compatible with the polyolefin-based resin, so that moldability is hard to be improved.

Here, the SP value is a solubility parameter, and it is empirically known that the solubility increases as the SP values of the two components become closer to each other. Several methods for determination of a SP value are known, but the same determination method may be used in comparison. Specifically, use of the Fedors method is desirable (see "Foundation/Application and Calculation of SP Value", 31 Mar. 2005, first edition, publisher: Akitoshi Taniguchi, published by JOHOKIKO CO., LTD., pages 66 to 67).

The content of the terpene-based resin is preferably 0.1 to 100 parts by mass, more preferably 10 to 70 parts by mass, further preferably 15 to 30 parts by mass, based on 100 parts by mass of carbon fiber. When the content of the terpene-based resin is 0.1 to 100 parts by mass based on 100 parts by mass of carbon fiber, a molded article having high dynamic characteristics can be produced with high productivity.

Further, when the polyolefin-based resin is used as the thermoplastic resin, it is preferred to use, as an impregnation aid, i.e. the component (D), a mixture of [g] a first propylene-based resin and [h] a second propylene-based resin having an acyl group on the side chain, and it is preferred that the content of the mixture of the [g] first propylene-based resin and the [h] second propylene-based resin having an acyl group on the side chain is 0.1 to 100 parts by mass based on the 100 parts by mass of carbon fiber.

Examples of the [g] first propylene-based resin to be used as an impregnation aid include homopolymers of propylene and copolymers of propylene and at least one α-olefin, conjugated diene, nonconjugated diene and so on.

Examples of the monomer repeating unit that forms the α-olefin include α-olefins with a carbon number of 2 to 12 except propylene, such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1 decene, 1-undecene and 1-dodecene, and examples of the monomer repeating unit that forms conjugated diene and nonconjugated diene include butadiene, ethylidene norbornane, dicyclopentadiene and 1,5-hexadiene. One or more of these other monomer repeating units may be selected.

Examples of the backbone structure of the [g] first propylene-based resin may include homopolymers of propylene, and random or block copolymers of propylene and one or more of the aforementioned other monomers or copolymers of propylene and other thermoplastic monomers. Examples of those that are preferred include polypropylene, ethylene-propylene copolymers, propylene-1-butene copolymers and ethylene-propylene-1-butene copolymers.

Particularly, the [g] first propylene-based resin has preferably 50 mol % or more of constituent units derived from propylene for enhancing affinity with the polyolefin-based resin. Further, for reducing crystallinity of the [g] first propylene-based resin to enhance affinity with the [h] second propylene-based resin, so that the strength of a molded article obtained is increased, the [g] first propylene-based resin has preferably 50 to 99 mol %, more preferably 55 to 98 mol %, further preferably 60 to 97 mol % of constituent units derived from propylene.

Identification of the monomer repeating unit in the propylene-based resin can be performed using a usual method for analysis of a polymer compound, such as IR, NMR, mass spectrometry and elementary analysis.

The raw material of the [h] second propylene-based resin can be obtained by graft-polymerizing a copolymer of one or two or more of propylene and α-olefins, which is represented by polypropylene, an ethylene-propylene copolymer, a propylene-1-butene-copolymer and an ethylene-propylene-1-butene copolymer, with a monomer having an acyl group which is neutralized or which is not neutralized and/or a monomer having a carboxylic acid ester which is saponified or which is not saponified. The monomer repeating unit and the backbone structure of the copolymer of one or two or more of propylene and α-olefins may be selected in the same concept as in the case of the [g] first propylene-based resin.

Here, examples of the monomer having an acyl group which is neutralized or which is not neutralized and/or a monomer having a carboxylic acid ester which is saponified or which is not saponified include ethylene-based unsaturated carboxylic acids, anhydrides thereof, esters thereof, and compounds having an unsaturated vinyl group other than olefins.

Examples of the ethylene-based unsaturated carboxylic acid include (meth)acrylic acid, maleic acid, fumaric acid, tetrahydrophthalic acid, itaconic acid, citraconic acid, crotonic acid and isocrotonic acid, and examples of the anhydride thereof may include Nadic Acid (registered trademark) (endo cis-bicyclo[2.2.1]hepto-5-ene-2,3-dicarboxylic acid), maleic anhydride and citraconic anhydride.

For enhancing the interaction with carbon fiber, the content of the carboxylic acid salt bonded to a polymer chain of the [h] second propylene-based resin is preferably total 0.05 to 5 mmol equivalent per 1 g of the [h] second propylene-based resin in terms of an acyl group represented by —C(=O)—O—. The content of the carboxylic acid salt is more preferably 0.1 to 4 mmol equivalent, further preferably 0.3 to 3 mmol equivalent. Examples of the method for analyzing a content of a carboxylic acid salt as described above include a method in which a metal species forming a salt is quantitatively detected by ICP emission spectrometry and a method in which the quantity of carbonyl carbon of a carboxylic acid salt is determined using IR, NMR and elementary analysis.

In the molding material (P) of the present invention, when the molding material of the present invention is injection-molded by impregnating a carbon fiber bundle with a mixture of the [g] first propylene-based resin and the [h] second propylene-based resin, the mixture of the [g] first propylene-based resin and the [h] second propylene-based resin, which is melt-kneaded in a cylinder of an injection molding machine, diffuses into the polyolefin-based resin to help the carbon fiber bundle diffuse into the polyolefin-based resin and simultaneously help the carbon fiber bundle to be replaced and impregnated with the polyolefin-based resin. In achieving this role, when the rank of the [g] first propylene-based resin, the [h] second propylene-based resin and the polyolefin-based resin for the mass average molecular weight is polyolefin-based resin>[g] first propylene-based resin>[h] second propylene-based resin, the components of the [g] first propylene-based resin and the [h] second propylene-based resin can easily diffuse into the polyolefin-based resin.

From the viewpoint of exhibiting the above-mentioned impregnation property/dispersion property and the viewpoint of enhancing the interaction with the [g] first propylene-based resin by forming an entanglement of molecular chains with the [g] first propylene-based resin, the mass average molecular weight Mw of the [h] second propylene-based resin is preferably 1000 to 50000. The mass average molecular weight Mw is more preferably 2000 to 40000, further preferably 5000 to 30000. The mass average molecular weight is measured using gel permeation chromatography (GPC).

Preferably the [g] first propylene-based resin has 30 to 100% by mass of a propylene-based resin (g-1) having a mass average molecular weight Mw of 30000 or more and less than 150000 and 0 to 70% by mass of a propylene-based resin (g-2) having a mass average molecular weight Mw of 150000 to 500000 (inclusive) from the viewpoint of exhibiting the above-mentioned impregnation property/dispersion property and the viewpoint of affinity with the polyolefin-based resin. When the mass average molecular weight Mw of the propylene-based resin (g-2) is excessively large, it may be difficult to exhibit an impregnation property/dispersion property, and preferably the propylene-based resin (g-2) has a mass average molecular weight in the above-mentioned range.

The content of the mixture of the [g] first propylene-based resin and the [h] second propylene-based resin having an acyl group on the side chain is preferably 0.1 to 100 parts by mass, more preferably 10 to 70 parts by mass, further preferably 15 to 30 parts by mass, based on 100 parts by mass of carbon fiber. When the content of the mixture of the [g] first propylene-based resin and the [h] second propylene-based resin having an acyl group on the side chain is 0.1 to 100 parts based on 100 parts by mass of carbon fiber, a molded article having high dynamic characteristics can be produced with high productivity.

The interaction with the component (A) when the above-mentioned preferred thermoplastic resin is used will be described below.

In the case of the polyarylene sulfide resin, it is thought that a strong interface can be formed by a covalent bond between a thiol group or a carboxyl group at the terminal and an epoxy group contained in the compound (A1) and a hydrogen bond between a sulfide group on the main chain and an epoxy group contained in the compound (A1) or a hydroxyl group, an amide group, an imide group, a urethane group, a urea group, a sulfonyl group or a sulfo group contained in the compound (A2).

In the case of the polyether ether ketone resin, the polyphenylene ether resin or the polyoxymethylene resin, it is thought that a strong interface can be formed by a covalent bond between a hydroxyl group at the terminal and an epoxy group contained in the compound (A1) and a hydrogen bond between an ether group on the main chain and an epoxy group contained in the compound (A1) or a hydroxyl group, an amide group, an imide group, a urethane group, a urea group, a sulfonyl group or a sulfo group contained in the compound (A2).

In the case of the polyamide resin, it is thought that a strong interface can be formed by a covalent bond between a carboxyl group or an amino group at the terminal and an epoxy group contained in the compound (A1) and a hydrogen bond between an amide group on the main chain and an epoxy group contained in the compound (A1) or a hydroxyl group, an amide group, an imide group, a urethane group, a urea group, a sulfonyl group or a sulfo group contained in the compound (A2).

In the case of the polyester-based resin, it is thought that a strong interface can be formed by a covalent bond between a carboxyl group or a hydroxyl group at the terminal and an epoxy group contained in the compound (A1) and a hydrogen bond between an ester group on the main chain and an epoxy group contained in the compound (A1) or a hydroxyl group, an amide group, an imide group, a urethane group, a urea group, a sulfonyl group or a sulfo group contained in the compound (A2).

In the case of the styrene-based resin such as an ABS resin, it is thought that a strong interface can be formed by a hydrogen bond between a cyano group on the side chain and an epoxy group contained in the compound (A1) or a hydroxyl group, an amide group, an imide group, a urethane group, a urea group, a sulfonyl group or a sulfo group contained in the compound (A2).

In the case of the polyolefin-based resin, particularly the acid-modified polyolefin-based resin, it is thought that a strong interface can be formed by a covalent bond between an acid anhydride group or a carboxyl group on the side chain and an epoxy group contained in the compound (A1) and a hydrogen bond between the aforementioned group on the side chain and a hydroxyl group, an amide group, an imide group, a urethane group, a urea group, a sulfonyl group or a sulfo group contained in the compound (A2).

The thermoplastic resin for use in the present invention is preferably a polyarylene sulfide resin or a polyether ether ketone resin from the viewpoint of heat resistance. The thermoplastic resin is preferably a polyphenylene ether resin from the viewpoint of dimensional stability. The thermoplastic resin is preferably a polyoxymethylene resin from the viewpoint of friction/abrasion properties. The thermoplastic resin is preferably a polyamide resin from the viewpoint of strength. The thermoplastic resin is preferably an amorphous resin such as a polycarbonate or styrene-based resin from the viewpoint of surface appearance. The thermoplastic resin is preferably a polyolefin-based resin from the viewpoint of lightness.

Next, a preferred aspect for producing the molding material (P) of the present invention will be described.

Examples of the method for producing the molding material of the present invention include a draw-out molding method (pultrusion method) in which sizing agent-applied carbon fiber is impregnated with a thermoplastic resin while the carbon fiber is drawn. In the draw-out molding method, a resin additive is added to a thermoplastic resin as necessary, the thermoplastic resin is supplied in a molten state from an extruder to a cross head die while the continuous carbon fiber is caused to pass through the cross head die to be drawn, so that the continuous carbon fiber is impregnated with the thermoplastic resin, and the continuous carbon fiber impregnated with the molten resin is heated, cooled and then cut perpendicularly to the draw-out direction to obtain a molding material 1. The molding material 1 has carbon fiber arranged in parallel with the same length in the length direction. Draw-out molding is essentially a method of impregnating a continuous carbon fiber bundle with a thermoplastic resin while drawing the carbon fiber bundle, and in addition to a method in which a thermoplastic resin is supplied from an extruder etc. to a cross head while a carbon fiber bundle is caused to pass through the inside of the cross head, thereby impregnating the carbon fiber bundle with the thermoplastic resin, the following methods may be used: a method in which a carbon fiber bundle is caused to pass through the inside of an impregnation bath containing an emulsion, a suspension or a solution of a thermoplastic resin, thereby impregnating the carbon fiber bundle with the thermoplastic resin; and a method in which a powder of thermoplastic resin is sprayed to a carbon fiber bundle, or a carbon fiber bundle is caused to pass through the inside of a tank containing a powder of thermoplastic resin, so that the powder of thermoplastic resin is deposited on carbon fiber, followed by melting the thermoplastic resin to impregnate the carbon fiber bundle with the thermoplastic resin. The cross head method is especially preferred. The resin impregnation operation in these draw-out molding methods is generally performed in one stage, but may be performed in two or more stages, or may be performed with different impregnation methods.

A molding material having an impregnation aid, i.e. the component (D) is produced by impregnating sizing agent-applied carbon fiber with the component (D), and then coating carbon fiber impregnated with the component (D) with a thermoplastic resin by the draw-out molding method.

Next, the molding material (Q) and the method for production thereof will be described.

In the molding material (Q), a sizing agent containing the components (A) and (B) is described as a binder.

In the molding material (Q) according to the present invention, the shape of the thermoplastic resin of the molding material (Q) is preferably any one selected from the group consisting of a particle shape, a fiber shape and a film shape.

The shape of the molding material (Q) is preferably any one selected from the group consisting of a web shape, a nonwoven fabric shape and a felt shape.

The molding material (Q) is produced through the following first step, second step and third step:
first step: processing carbon fiber into a sheet-shaped fabric in any one shape selected from the group consisting of a web shape, a nonwoven fabric shape, a felt shape and a mat shape;
second step: adding 0.1 to 10 parts by mass of a binder containing the component (A) and the component (B) based on 100 parts by mass of the fabric obtained in the first step; and
third step: adding 1 to 80% by mass of the fabric, to which the binder is added in the second step, and 20 to 99% by mass of a thermoplastic resin, and performing heating and melting to form a composite.

In the first step, carbon fiber is processed into a sheet-shaped fabric in any one shape selected from the group consisting of a web shape, a nonwoven fabric shape, a felt shape and a mat shape. A fabric of carbon fiber having a web shape or the like can be produced by dispersing a carbon fiber bundle. The carbon fiber bundle may be either one including continuous carbon fiber or one formed including discontinuous carbon fiber as long as carbon fiber is the carbon fiber described above, but for achieving a better dispersion state, a discontinuous carbon fiber is preferred, and a chopped carbon fiber is more preferred.

Carbon fiber can be dispersed by a wet method or a dry method. The wet method is a method in which a carbon fiber bundle is dispersed in water to be formed into a sheet, and the dry method is a method in which a carbon fiber bundle is dispersed in air.

In the case of the wet method, a slurry obtained by dispersing a carbon fiber bundle in water can be formed into a sheet to obtain a carbon fiber fabric.

For the water in which a carbon fiber bundle is dispersed (dispersion liquid), water such as distilled water and purified water may be used in addition to normal tap-water. Water can be mixed with a surfactant as necessary. The surfactant is classified into various surfactants of cationic, anionic, nonionic and amphoteric types, and among them, nonionic surfactants are preferably used, and particularly polyoxyethylene lauryl ether is more preferably used. When the surfactant is mixed with water, the concentration of the surfactant is normally 0.0001% by mass to 0.1% by mass (inclusive), preferably 0.0005% by mass to 0.05% by mass (inclusive).

The added amount of the carbon fiber bundle with respect to water (dispersion liquid) can be adjusted to normally 0.1 g to 10 g (inclusive), preferably 0.3 g to 5 g (inclusive) as an amount based on 1 L of water (dispersion liquid). When the added amount of the carbon fiber bundle is in the aforementioned range, the carbon fiber bundle is efficiently dispersed in water (dispersion liquid), so that a uniformly dispersed slurry can be obtained in a short time. When the carbon fiber bundle is dispersed in water (dispersion liquid), stirring is performed as necessary.

The slurry refers to a suspension in which solid particles are dispersed, and an aqueous slurry is preferred in the present invention. The solid concentration in the slurry (mass content of carbon fiber in the slurry) is preferably 0.01% by mass to 1% by mass (inclusive), more preferably 0.03% by mass to 0.5% by mass (inclusive). When the solid concentration is in the above-mentioned range, sheet formation can be efficiently performed.

Sheet formation from a slurry can be performed by suctioning water from the slurry. Sheet formation from a slurry can be performed in accordance with so called a paper making method. For explaining by showing an example, sheet formation can be performed by feeding a slurry into a tank which has a paper making surface on the bottom and allows water to be suctioned from the bottom, and suctioning water. Examples of the tank include No. 2553-I (trade name) manufactured by Kumagai Riki Kogyo Co., Ltd., a tank which includes on the bottom a mesh conveyor having a paper making surface with a width of 200 mm. In this manner, a carbon fiber sheet is obtained.

In the case of the dry method, a carbon fiber sheet can be obtained by dispersing a carbon fiber bundle in a gas phase. That is, a carbon fiber sheet can be obtained by dispersing a carbon fiber bundle in a gas phase, and depositing the dispersed carbon fiber bundle.

Dispersion of a carbon fiber bundle in a gas phase is classified into the following three types: a method in which a carbon fiber bundle is opened in a noncontact manner, and the opened carbon fiber bundle is deposited (noncontact method), a method in which a carbon fiber bundle is opened by applying an air stream to the carbon fiber bundle, and the opened carbon fiber bundle is deposited (method using an air stream), and a method in which dispersion of a carbon fiber bundle is performed by opening the carbon fiber bundle in a contact manner and depositing the opened carbon fiber bundle (contact method).

The noncontact method is a method in which a carbon fiber bundle is opened while the carbon fiber bundle is kept from coming into contact with a solid and a fiber opening device. For example, a method in which a gas such as air or an inert gas is sprayed to a reinforced fiber bundle, particularly a method in which air that is advantageous in terms of a cost is pressurized and sprayed is preferably used.

In the method using an air stream, conditions for application of the air stream to the carbon fiber bundle are not particularly limited. As an example, pressurized air (air stream to apply a pressure of normally 0.1 MPa to 10 MPa (inclusive), preferably 0.5 MPa to 5 MPa (inclusive)) is applied until the carbon fiber bundle is opened. In the method using an air stream, the device that can be used is not particularly limited, and a container, which is provided with an air tube, allows air to be suctioned and can store the carbon fiber bundle, can be shown as an example. By using such a container, opening and deposition of the carbon fiber bundle can be performed in one container.

The contact method is a method in which a carbon fiber bundle is opened while the carbon fiber bundle is physically in contact with a solid and a fiber opening device. Examples of the contact method include carding, needle punch and roller opening, and among them, carding and needle punch are preferred, and carding is more preferred. Conditions for carrying out the contact method are not particularly limited, and conditions for a carbon fiber bundle to be opened can be appropriately determined The basis weight of the sheet-shaped carbon fiber fabric produced as described above is preferably 10 to 500 g/m$^2$, more preferably 50 to 300 g/m$^2$. When the basis weight is less than 10 g/m$^2$, defects of handling characteristics, such as breakage of a base material, may occur, and when the basis weight is more than 500 g/m$^2$, it may take a long time for drying the base material in the wet method, and the sheet may be thick in the dry method, so that handling in subsequent processes may become difficult.

In the second step: 0.1 to 10 parts by mass of a binder containing the component (A) and the component (B) are added based on 100 parts by mass of the carbon fiber sheet, i.e. the fabric obtained in the first step. The binder containing the component (A) and the component (B) is important for enhancing handling characteristics of carbon fiber in the steps and for interfacial adhesion between carbon fiber and the thermoplastic resin. When the amount of the binder is less than 0.1 parts by mass, it becomes difficult to take up carbon fiber, so that production efficiency of the molding material is deteriorated. When the amount of the binder is more than 10 parts by mass, interfacial adhesion between carbon fiber and the thermoplastic resin is deteriorated.

Preferably addition of the binder to the carbon fiber sheet is performed using an aqueous solution, emulsion or suspension containing the binder. The aqueous solution means a solution with the component (A) and the component (B) almost completely dissolved in water. The emulsion means a state in which a liquid containing the component (A) and the component B) is dispersed in a liquid as a dispersion medium while forming fine particles. The suspension means a state in which the component (A) and the component (B) are suspended in water. The rank of the magnitude of the component particle diameter in the liquid is aqueous solution<emulsion<suspension. The method for adding a binder to a carbon fiber sheet is not particularly limited, and examples thereof may include a method in which a carbon fiber sheet is immersed in an aqueous solution, emulsion or suspension of a binder, and a method in which a carbon fiber sheet is showered with an aqueous solution, emulsion or suspension of a binder. Preferably an excessive aqueous solution, emulsion or suspension is removed by, for example, a method of suction and removal or a method of absorption into an absorbent material such as an absorbent paper after the binder is added.

Preferably the carbon fiber sheet is heated after addition of the binder in the second step. In this way, water contained in the carbon fiber sheet after the binder is added thereto is removed to reduce a time required for the third step, so that a molding material can be obtained in a short time. The heating temperature can be appropriately set, and is preferably 100° C. to 300° C. (inclusive), more preferably 120° C. to 250° C. (inclusive).

It is preferred to take up carbon fiber for producing a carbon fiber sheet provided with a binder in a large amount in a short time. At this time, it is preferred to take up carbon fiber with the tensile strength kept at 1 N/cm or more so that creases and slack do not occur in the carbon fiber sheet. The tensile strength is more preferably 3 N/cm or more, further preferably 5 N/cm or more. The tensile strength that can be applied to the carbon fiber sheet can be controlled by adjusting the type and added amount of the binder, and when the added amount is increased, the tensile strength can be enhanced. When the tensile strength to be applied is less than 1 N/cm, the carbon fiber sheet is easily broken, and therefore the tensile strength is preferably 1 N/cm or more from the viewpoint of handling characteristics of the carbon fiber sheet. The upper limit of the tensile strength is not particularly limited, but with a tensile strength of 100 N/cm, handling characteristics of the carbon fiber sheet can be sufficiently satisfied.

In the third step: the carbon fiber sheet provided with a binder containing the component (A) and the component (B), which is obtained in the second step, is impregnated with a thermoplastic resin to form the carbon fiber sheet and the thermoplastic resin into a composite, thereby obtaining a molding material. Here, as the thermoplastic resin, for example, at least one thermoplastic resin selected from crystalline resins such as "polyester-based resins such as polyethylene terephthalate (PET), polybutylene terephthalate (PBT), polytrimethylene terephthalate (PTT), polyethylene naphthalate (PEN) and liquid crystal polyester; polyolefin-based resins such as polyethylene (PE), polypropylene (PP), polybutylene, acid-modified polyethylene (m-PE), acid-modified polypropylene (m-PP) and acid-modified polybutylene; polyoxymethylene (POM), polyamide (PA), polyarylene sulfide resins such as polyphenylene sulfide (PPS); polyketone (PK), polyether ketone (PEK), polyether ether ketone (PEEK), polyether ketone ketone (PEKK) and polyether nitrile (PEN); fluorine-based resins such as polytetrafluoroethylene; and liquid crystal polymers (LCP)", amorphous resins such as "styrene-based resins such as polystyrene (PS), acrylonitrile-styrene (AS) and acrylonitrile-butadiene-styrene (ABS), polycarbonate (PC), polymethyl methacrylate (PMMA), polyvinyl chloride (PVC), unmodified or modified polyphenylene ether (PPE), polyimide (PI), polyamide imide (PAI), polyether imide (PEI), polysulfone (PSU), polyether sulfone and polyarylate (PAR); phenol-based resins, phenoxy resins, and various kinds of thermoplastic elastomers such as polystyrene-based elastomers, polyolefin-based elastomers, polyurethane-based elastomers, polyester-based elastomers, polyamide-based elastomers, polybutadiene-based elastomers, polyisoprene-based elastomers, fluorine-based resin and acrylonitrile-based elastomers, and copolymers and modified products thereof is preferably used. As the thermoplastic resin, a thermoplastic resin composition containing two or more of those thermoplastic resins may be used within the bounds of not impairing the object of the present invention.

The interaction with the component (A) when the above-mentioned preferred thermoplastic resin is used will be described below.

In the case of the polyarylene sulfide resin, it is thought that a strong interface can be formed by a covalent bond between a thiol group or a carboxyl group at the terminal and an epoxy group contained in the compound (A1) and a hydrogen bond between a sulfide group on the main chain and an epoxy group contained in the compound (A1) or a hydroxyl group, an amide group, an imide group, a urethane group, a urea group, a sulfonyl group or a sulfo group contained in the compound (A2).

In the case of the polyether ether ketone resin, the polyphenylene ether resin or the polyoxymethylene resin, it is thought that a strong interface can be formed by a covalent bond between a hydroxyl group at the terminal and an epoxy group contained in the compound (A1) and a hydrogen bond between an ether group on the main chain and an epoxy group contained in the compound (A1) or a hydroxyl group, an amide group, an imide group, a urethane group, a urea group, a sulfonyl group or a sulfo group contained in the compound (A2).

In the case of the polyamide resin, it is thought that a strong interface can be formed by a covalent bond between a carboxyl group or an amino group at the terminal and an epoxy group contained in the compound (A1) and a hydrogen bond between an amide group on the main chain and an epoxy group contained in the compound (A1) or a hydroxyl group, an amide group, an imide group, a urethane group, a urea group, a sulfonyl group or a sulfo group contained in the compound (A2).

In the case of the polyester-based resin, it is thought that a strong interface can be formed by a covalent bond between a carboxyl group or a hydroxyl group at the terminal and an epoxy group contained in the compound (A1) and a hydrogen bond between an ester group on the main chain and an epoxy group contained in the compound (A1) or a hydroxyl group, an amide group, an imide group, a urethane group, a urea group, a sulfonyl group or a sulfo group contained in the compound (A2).

In the case of the styrene-based resin such as an ABS resin, it is thought that a strong interface can be formed by a hydrogen bond between a cyano group on the side chain and an epoxy group contained in the compound (A1) or a hydroxyl group, an amide group, an imide group, a urethane group, a urea group, a sulfonyl group or a sulfo group contained in the compound (A2).

In the case of the polyolefin-based resin, particularly the acid-modified polyolefin-based resin, it is thought that a strong interface can be formed by a covalent bond between an acid anhydride group or a carboxyl group on the side chain and an epoxy group contained in the compound (A1) and a hydrogen bond between the aforementioned group on the side chain and a hydroxyl group, an amide group, an imide group, a urethane group, a urea group, a sulfonyl group or a sulfo group contained in the compound (A2).

The thermoplastic resin for use in the present invention is preferably a polyarylene sulfide resin or a polyether ether ketone resin from the viewpoint of heat resistance. The thermoplastic resin is preferably a polyphenylene ether resin from the viewpoint of dimensional stability. The thermoplastic resin is preferably a polyoxymethylene resin from the viewpoint of friction/abrasion properties. The thermoplastic resin is preferably a polyamide resin from the viewpoint of strength. The thermoplastic resin is preferably an amorphous resin such as a polycarbonate or styrene-based resin from the viewpoint of surface appearance. The thermoplastic resin is preferably a polyolefin-based resin from the viewpoint of lightness.

The content of carbon fiber, a binder and a thermoplastic resin with respect to the molding material of the present invention is 1 to 70% by mass for the carbon fiber, 0.1 to 10% by mass for the binder and 20 to 98.9% by mass for the thermoplastic resin. When the content is in the above-mentioned range, a molding material capable of efficiently exhibiting a reinforcement effect of carbon fiber is easily obtained. More preferably, the content of carbon fiber is 10 to 60% by mass, the content of the binder is 0.5 to 10% by mass, and the content of the thermoplastic resin is 30 to 89.5% by mass. Further preferably, the content of carbon fiber is 20 to 60% by mass, the content of the binder is 1 to 8% by mass, and the content of the thermoplastic resin is 32 to 79% by mass.

The thermoplastic resin and the carbon fiber sheet provided with a binder can be formed into a composite by bringing the thermoplastic resin into contact with the carbon fiber sheet. The form of the thermoplastic resin in this case is not particularly limited, but is preferably at least one form selected from, for example, a cloth, a nonwoven fabric and a film. The method for bringing the thermoplastic resin into contact with the carbon fiber sheet is not particularly limited, and a method is shown as an example in which two sheets of cloth, nonwoven fabric or film of the thermoplastic resin are provided, and disposed, respectively, on upper and lower surfaces of the carbon fiber sheet provided with a binder.

The thermoplastic resin and the carbon fiber sheet provided with a binder is formed into a composite preferably by pressurization and/or heating, and more preferably by both pressurization and heating in parallel. The pressure as a condition for pressurization is preferably 0.01 MPa to 10 MPa (inclusive), more preferably 0.05 MPa to 5 MPa (inclusive). The temperature as a condition for heating is preferably a temperature at which a thermoplastic resin to be used can be melted or fluidized, and is preferably 50° C. to 400° C. (inclusive), more preferably 80° C. to 350° C. (inclusive) in terms of a temperature range. Pressurization and/or heating can be performed while the thermoplastic resin is kept in contact with the carbon fiber sheet provided with a binder. For example, two sheets of cloth, nonwoven fabric or film of the thermoplastic resin are provided, disposed, respectively, on upper and lower surfaces of the carbon fiber sheet provided with a binder, and heated and/or heated from both the surfaces (held by a double belt press device etc.).

Alternatively, in the third step, the carbon fiber sheet to which a binder containing the component (A) and the component (B) is added may be impregnated with a thermosetting resin, in place of the thermoplastic resin, to form the carbon fiber sheet and the thermosetting resin into a composite, thereby obtaining a molding material. Here, examples of the thermosetting resin include unsaturated polyester resins, vinyl ester resins, epoxy resins, phenol resins, melamine resins, urea resins, cyanate ester resins and bismaleimide resins. Among them, epoxy resins are preferably used because they are excellent in balance of mechanical characteristics and have the advantage of small hardening shrinkage. Later-described thermoplastic resins or oligomers thereof can be included in the thermosetting resin for the purpose of improving toughness.

In the molding material of the present invention, carbon fiber is in the form of a single fiber and substantially two-dimensionally oriented; and The term "two-dimensionally oriented" means that an average value of two dimensional orientation angles formed by carbon fiber single fiber forming a molding material and the closest other carbon fiber single fiber is 10 to 80°. The two dimensional orientation angle can be measured by observing a molding material with an optical microscope or an electron microscope. In the molding material, two dimensional orientation angles for 400 pieces of carbon fiber are measured and an average value thereof is determined. The term "carbon fiber is "substantially" two-dimensionally oriented" means that in terms of a number of pieces of carbon fiber, normally 70% or more, preferably 95% or more, more preferably all of the 400 pieces of carbon fiber are two-dimensionally oriented.

Next, the molding material (R) will be described.

The molding material (R) according to the present invention includes the sizing agent-applied carbon fiber and thermoplastic resin described above.

The shape of the molding material (R) according to the present invention is preferably a sheet shape. Here, the term "sheet shape" refers to a state in which a film-shaped, a particle-shaped or a fiber-shaped thermoplastic resin is combined with substantially two-dimensionally oriented bundled carbon fiber to form a composite.

The method for producing the molding material (R) according to the present invention will be described. The molding material according to the present invention is produced through the following first step, second step and third step:

first step: obtaining sizing agent-applied carbon fiber by depositing 0.1 to 10 parts by mass, based on 100 parts by mass of carbon fiber, of a sizing agent containing the component (A) and the component (B);

second step: cutting to 1 to 50 mm the sizing agent-applied carbon fiber obtained in the first step; and third step: mixing 1 to 80% by mass of the sizing agent-applied carbon fiber cut in the second step and 20 to 99% by mass of a thermoplastic resin, thereby forming a composite.

In the first step, sizing agent-applied carbon fiber is obtained by depositing 0.1 to 10 parts by mass, based on 100 parts by mass of carbon fiber, of a sizing agent containing the component (A) and the component (B). As a method for adding a sizing agent to carbon fiber, as described above, a method in which carbon fiber is immersed in a sizing solution via a roller, a method in which carbon fiber is brought into contact with a sizing solution-deposited roller, and a method in which a sizing solution is atomized and sprayed to carbon fiber, etc. may be used.

In the second step, the sizing agent-applied carbon fiber obtained in the first step is cut to 1 to 50 mm. The length of carbon fiber is preferably 1 to 50 mm. When the length of carbon fiber is less than 1 mm, it may become difficult to efficiently exhibit the effect of reinforcement by carbon fiber, and when the length of carbon fiber is more than 50 mm, it may become difficult to properly maintain dispersion. Cutting can be performed using a publicly known method by a guillotine cutter, or a rotary cutter such as a roving cutter.

In the third step, the sizing agent-applied carbon fiber cut in the second step and a matrix resin are formed into a composite by mixing the carbon fiber and the resin so that the ratio of sizing agent-applied carbon fiber is 1 to 80% by mass and the ratio of a thermoplastic resin is 20 to 99% by mass. The blending ratio of sizing agent-applied carbon fiber and the thermoplastic resin is preferably 1 to 80% by mass for the sizing agent-applied carbon fiber and 20 to 99% by mass for the thermoplastic resin, more preferably 10 to 70% by mass for the sizing agent-applied carbon fiber and 30 to 90% by mass for the matrix resin, further preferably 20 to 60% by mass for the sizing agent-applied carbon fiber and 40 to 80% by mass for the matrix resin.

As the thermoplastic resin to be used for the molding material (R) of the present invention, for example, at least one thermoplastic resin selected from crystalline resins such as "polyester-based resins such as polyethylene terephthalate (PET), polybutylene terephthalate (PBT), polytrimethylene terephthalate (PTT), polyethylene naphthalate (PEN) and liquid crystal polyester; polyolefin-based resins such as polyethylene (PE), polypropylene (PP), polybutylene, acid-modified polyethylene (m-PE), acid-modified polypropylene (m-PP) and acid-modified polybutylene; polyoxymethylene (POM), polyamide (PA), polyarylene sulfide resins such as polyphenylene sulfide (PPS); polyketone (PK), polyether ketone (PEK), polyether ether ketone (PEEK), polyether ketone ketone (PEKK) and polyether nitrile (PEN); fluorine-based resins such as polytetrafluoroethylene; and liquid crystal polymers (LCP)", amorphous resins such as "styrene-based resins such as polystyrene (PS), acrylonitrile-styrene (AS) and acrylonitrile-butadiene-styrene (ABS), polycarbonate (PC), polymethyl methacrylate (PMMA), polyvinyl chloride (PVC), unmodified or modified polyphenylene ether (PPE), polyimide (PI), polyamide imide (PAI), polyether imide (PEI), polysulfone (PSU), polyether sulfone and polyarylate (PAR); phenol-based resins, phenoxy resins, and various kinds of thermoplastic elastomers such as polystyrene-based elastomers, polyolefin-based elastomers, polyurethane-based elastomers, polyester-based elastomers, polyamide-based elastomers, polybutadiene-based elastomers, polyisoprene-based elastomers, fluorine-based resin and acrylonitrile-based elastomers, and copolymers and modified products thereof is preferably used. As the thermoplastic resin, a thermoplastic resin composition containing two or more of those thermoplastic resins may be used within the bounds of not impairing the object of the present invention.

For securing fluidity during molding, a polymerizable monomer of the thermoplastic resin can be blended. The polymerizable monomer of the thermoplastic resin acts to enhance moldability when the resin is molded into a carbon fiber-reinforced composite material. Since the polymerizable monomer enhances wettability to carbon fiber, a larger amount of carbon fiber can be included in the molding material. The polymerizable monomer can form a thermoplastic polymer during polymerization. Such a polymerizable monomer is, for example, a molecule which has one carbon-carbon double bond capable of radical polymerization in the molecule and has a molecular weight 1000 or less. By using a polymerizable monomer having one carbon-carbon double bond in the molecule, a carbon fiber-reinforced composite material formed by polymerizing and curing a molding material containing the polymerizable monomer is formed of a non-crosslinked polymer and exhibits thermoplasticity.

Specific examples of the polymerizable monomer of the thermoplastic resin to be used include aromatic vinyls such as styrene, vinyl acetate, vinyl chloride, maleic anhydride, maleic acid, fumaric acid, fumaric acid esters, and (meth) acrylic monomers such as methyl methacrylate and methacrylic acid. These monomers may be used alone or in combination of two or more thereof as necessary. The polymerizable monomer of the thermoplastic resin may be in the form of an oligomer of the above-mentioned polymerizable monomer etc. as long as moderate fluidity can be imparted to the molding material. Particularly, (meth)acrylic monomers having good weather resistance after curing are preferred.

The thermoplastic resin is used as a film-shaped sheet etc. with a molten resin uniformly applied onto a mold release film as in the case of a thermosetting resin. When a thermoplastic resin in which a polymerizable monomer is blended is used, it is preferred that the thermoplastic resin has such a viscosity that liquid dripping from the side of a mold release film does not occur. Bundled sizing agent-applied carbon fiber cut in the second step is uniformly dropped or scattered on a sheet to which a thermoplastic resin is applied, and a sheet to which a molten resin is similarly applied is laminated to sandwich carbon fiber, thereby forming a composite.

In the molding material of the present invention produced as described above, carbon fiber is in the form of a bundle and substantially two-dimensionally oriented. The term "two-dimensionally oriented" means that an average value of two dimensional orientation angles formed by carbon fiber bundles forming a molding material and the closest other carbon fiber bundles is 10 to 80°. The two dimensional orientation angle can be measured by observing a molding material with an optical microscope or an electron microscope. In the molding material, two dimensional orientation angles for 400 pieces of carbon fiber are measured and an average value thereof is determined. The term "carbon fiber is "substantially" two-dimensionally oriented" means that in terms of a number of carbon fiber bundles, normally 70% or more, preferably 95% or more, more preferably all of the 400 carbon fiber bundles are two-dimensionally oriented.

The present invention also provides a prepreg including sizing agent-applied carbon fiber formed by applying to carbon fiber a sizing agent containing the components (A) and (B), and a thermoplastic resin.

In this specification, the prepreg containing sizing agent-applied carbon fiber and a thermoplastic resin means a unidirectional prepreg with carbon fiber bundles drawn in one direction, and the form of the thermoplastic resin that forms the prepreg with carbon fiber bundles drawn in one direction is not limited to a film shape, particle shape, a fiber shape etc.

The width of the prepreg of the present invention is preferably 1 to 50 mm.

As the thermoplastic resin to be used for the prepreg of the present invention, for example, at least one thermoplastic resin selected from crystalline resins such as "polyester-based resins such as polyethylene terephthalate (PET), polybutylene terephthalate (PBT), polytrimethylene terephthalate (PTT), polyethylene naphthalate (PEN) and liquid crystal polyester; polyolefin-based resins such as polyethylene (PE), polypropylene (PP), polybutylene, acid-modified polyethylene (m-PE), acid-modified polypropylene (m-PP) and acid-modified polybutylene; polyoxymethylene (POM), polyamide (PA), polyarylene sulfide resins such as polyphenylene sulfide (PPS); polyketone (PK), polyether ketone (PEK), polyether ether ketone (PEEK), polyether ketone ketone (PEKK) and polyether nitrile (PEN); fluorine-based resins such as polytetrafluoroethylene; and liquid crystal polymers (LCP)", amorphous resins such as "styrene-based resins such as polystyrene (PS), acrylonitrile-styrene (AS) and acrylonitrile-butadiene-styrene (ABS), polycarbonate (PC), polymethyl methacrylate (PMMA), polyvinyl chloride (PVC), unmodified or modified polyphenylene ether (PPE), polyimide (PI), polyamide imide (PAI), polyether imide (PEI), polysulfone (PSU), polyether sulfone and polyarylate (PAR); phenol-based resins, phenoxy resins, and various kinds of thermoplastic elastomers such as polystyrene-based elastomers, polyolefin-based elastomers, polyurethane-based elastomers, polyester-based elastomers, polyamide-based elastomers, polybutadiene-based elastomers, polyisoprene-based elastomers, fluorine-based resin and acrylonitrile-based elastomers, and copolymers and modified products thereof is preferably used. As the thermoplastic resin, a thermoplastic resin composition containing two or more of those thermoplastic resins may be used within the bounds of not impairing the object of the present invention.

As a thermoplastic resin to be used for the prepreg of the present invention, the polyarylene sulfide resin can be suitably used as the thermoplastic resin of the present invention, because it is thought that a strong interface can be formed by a covalent bond between a thiol group or a carboxyl group at the terminal and an epoxy group contained in the compound (A1) and a hydrogen bond between a sulfide group on the main chain and an epoxy group contained in the compound (A1) or a hydroxyl group, an amide group, an imide group, a urethane group, a urea group, a sulfonyl group or a sulfo group contained in the compound (A2).

The polyether ether ketone resin, the polyphenyl ether resin or the polyoxymethylene resin can be suitably used as the thermoplastic resin of the present invention because it is thought that a strong interface can be formed by a covalent bond between a hydroxyl group at the terminal and an epoxy group contained in the compound (A1) and a hydrogen bond between an ether group on the main chain and an epoxy group contained in the compound (A1) or a hydroxyl group, an amide group, an imide group, a urethane group, a urea group, a sulfonyl group or a sulfo group contained in the compound (A2).

The polyamide resin can be suitably used as the thermoplastic resin of the present invention because it is thought that a strong interface can be formed by a covalent bond between a carboxyl group or an amino group at the terminal and an epoxy group contained in the compound (A1) and a hydrogen bond between an amide group on the main chain and an epoxy group contained in the compound (A1) or a hydroxyl group, an amide group, an imide group, a urethane group, a urea group, a sulfonyl group or a sulfo group contained in the compound (A2).

The polyester-based resin and the polycarbonate resin can be suitably used as the thermoplastic resin of the present invention because it is thought that a strong interface can be formed by a covalent bond between a carboxyl group or a hydroxyl group at the terminal and an epoxy group contained in the compound (A1) and a hydrogen bond between an ester group on the main chain and an epoxy group contained in the compound (A1) or a hydroxyl group, an amide group, an imide group, a urethane group, a urea group, a sulfonyl group or a sulfo group contained in the compound (A2).

The styrene-based resin such as an ABS resin can be suitably used as the thermoplastic resin of the present invention because it is thought that a strong interface can be formed by a hydrogen bond between a cyano group on the side chain and an epoxy group contained in the compound (A1) or a hydroxyl group, an amide group, an imide group, a urethane group, a urea group, a sulfonyl group or a sulfo group contained in the compound (A2).

The polyolefin-based resin, particularly the acid-modified polyolefin-based resin can be suitably used as the thermoplastic resin of the present invention because it is thought that a strong interface can be formed by a covalent bond between an acid anhydride group or a carboxyl group on the side chain and an epoxy group contained in the compound (A1) and a hydrogen bond between the aforementioned group on the side chain and a hydroxyl group, an amide group, an imide group, a urethane group, a urea group, a sulfonyl group or a sulfo group contained in the compound (A2).

For the thermoplastic resin for use in the present invention, a polyarylene sulfide resin and a polyether ether ketone resin are preferably used from the viewpoint of heat resistance. A polyphenylene ether resin is preferably used from the viewpoint of dimensional stability. A polyoxymethylene resin is preferably used from the viewpoint of friction/abrasion properties. The thermoplastic resin is preferably a polyamide resin from the viewpoint of strength. The thermoplastic resin is preferably an amorphous resin such as a polycarbonate or styrene-based resin from the viewpoint of surface appearance. A polyolefin-based resin is preferably used from the viewpoint of lightness.

As the film-shaped thermoplastic resin, in addition to coating films prepared by applying a molten resin onto a mold release sheet, those obtained by spinning a thermoplastic resin into fiber, cutting the fiber into short fiber, then dispersing the short fiber in a liquid to form a short fiber web with fiber randomly oriented from the dispersion liquid, and forming the short fiber web into a sheet can be used.

The prepreg of the present invention can be produced by heating carbon fiber bundles drawn in one direction while sandwiching the carbon fiber bundles from the both sides by a coating film of a thermoplastic resin and a short fiber web.

As a prepreg containing a particle-shaped thermoplastic resin, carbon fiber can be impregnated with the resin in the following manner: carbon fiber bundles drawn in one direction are caused to pass through a resin slurry with a powder of thermoplastic resin suspended in water, so that the resin slurry is added to the carbon fiber bundles, and water deposited on the carbon fiber bundles is evaporated, followed by heating the carbon fiber bundles to a temperature equal to or higher than a melting point of the particle-shaped thermoplastic resin.

For example, the resin slurry bath may contain in an aqueous solution 4 to 30% by mass of the particle-shaped resin and 0.05 to 0.25% by mass of a surfactant to accelerate mixing of the particle-shaped resin and water.

Examples of the prepreg containing a fiber-shaped thermoplastic resin include those obtained by mixing carbon fiber bundles and fiber of a thermoplastic resin. For mixing of fiber, polymer fiber of a thermoplastic resin which is attached on a bobbin rack etc. is sent to a kodet roll by way of a fiber guide etc., and after the fiber leaves the kodet roll, individual pieces of fiber are caused to pass through a fiber comb by way of an additional fiber guide. On the other hand, carbon fiber bundles are sent to a kodet roll by way of a fiber guide etc., then pass through an additional fiber guide, have the width of carbon fiber tows made uniform by an air fiber opening device, and are mixed with polymer fiber passing through the fiber comb by a fixed rod for mixing, and the mixture is sent to a twist guide by way of the comb for maintaining dimensional stability and a mixed state in a prepreg formed by mixing fiber, and is taken up. Preferably polymer fiber and carbon fiber are uniformly spread over the entire width and the spread widths of the former and the latter are made substantially equal for securing a perfect mixed state of the prepreg.

Further, the prepreg of the present invention can be produced by a pultrusion method. In the pultrusion method, for example, a resin additive is added to a thermoplastic resin as necessary, and the thermoplastic resin is supplied in a molten state from an extruder to an impregnation die. By drawing carbon fiber bundles through the impregnation die, the molten resin supplied to the impregnation die is added to the carbon fiber bundles, the carbon fiber bundles are impregnated with the thermoplastic resin by heating, and the carbon fiber bundles impregnated with the molten resin are cooled while being taken up, and are widened. In this manner, a tape-shaped prepreg can be formed.

The prepreg according to the present invention which is prepared as described above can be formed into a carbon fiber-reinforced composite material by drawing the prepreg in one direction into a desired mold, followed by press-molding the prepreg under heating by a heating type press machine etc. The prepreg can also be formed into a carbon fiber-reinforced composite material by drawing the prepreg in one direction into a desired mold, and then stacking a plurality of sheets of another prepreg while shifting an angle in the fiber axis direction, followed by press-molding the prepreg under heating by a heating type press machine etc.

EXAMPLES

Next, the present invention will be described in detail by way of Examples, but the present invention is not limited to these Examples.

<Strand Tensile Strength and Elastic Modulus of Carbon Fiber Bundle>

The strand tensile strength and the strand elastic modulus of a carbon fiber bundle were determined in accordance with the following process based on the resin-impregnated strand test method in JIS-R-7608 (2004). As a resin formulation, "CELLOXIDE (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass) was used, and as curing conditions, conditions of normal pressure, temperature: 125° C. and time: 30 minutes were used. Ten strands of carbon fiber bundle were measured, and an average value thereof was determined for each of the strand tensile strength and the strand elastic modulus.

<Surface Oxygen Concentration (O/C) of Carbon Fiber>

The surface oxygen concentration (O/C) of carbon fiber was determined in accordance with the following process by X-ray photoelectron spectroscopy. First, carbon fiber freed of contaminants deposited on the surface using a solvent is cut into about 20 mm, and the carbon fiber is spread on a copper sample support. Next, the sample support is set in a sample chamber and the inside of the sample chamber is held at $1\times10^{-8}$ Torr. Subsequently, measurement was performed with a photoelectron escape angle of 90° using $AlK\alpha_{1,2}$ as an X ray source. The kinetic energy value (K.E.) of the primary peak of $C_{1S}$ was adjusted to 1202 eV as a correction value of a peak associated with charge during measurement. A $C_{1S}$ peak area was determined by drawing linear baseline in a range of 1191 to 1205 eV as K.E. A $O_{1S}$ peak area was determined by drawing linear baseline in a range of 947 to 959 eV as K.E. Here, the surface oxygen concentration is calculated as a ratio of the number of atoms from a ratio of the $O_{1S}$ peak area to the $C_{1S}$ peak area using a sensitivity correction value specific to an apparatus. ESCA-1600 manufactured by ULVAC-PHI, Inc. was used as an X-ray photoelectron spectroscopy apparatus, and the sensitivity correction value specific to the apparatus was 2.33.

<Method for Measurement of Sizing Deposition Amount>

About 2 g of a sizing-deposited carbon fiber bundle is weighed (W1) (read to a fourth decimal place), and then left standing for 15 minutes in an electric furnace (volume: 120 cm$^3$) set at a temperature of 450° C. in a nitrogen gas stream of 50 mL/min to thermally decompose a sizing agent completely. Then, the carbon fiber bundle is transferred to a container in a dry nitrogen gas stream of 20 L/min, and cooled for 15 minutes, the carbon fiber bundle is thereafter weighed (W2) (read to a fourth decimal place), and a sizing deposition amount is determined from W1−W2. A value obtained by converting the sizing deposition amount into an amount based on 100 parts by mass of the carbon fiber bundle (round off the third decimal point) was defined as a number of parts by mass of the deposited sizing agent. Measurement was performed twice, and an average value thereof was defined as a number of parts by mass of the sizing agent.

Examples and Comparative Examples for a short fiber pellet will be described below.

<Method for Evaluation of Flexural Properties of Injection-Molded Article>

A flexural strength test piece having a length of 130±1 mm and a width of 25±0.2 mm was cut out from the obtained injection-molded article. In accordance with the test method defined in ASTM D-790 (2004), a supports span was set at 100 mm using a three-point flexural test tool (indenter: 10 mm and supporting point: 10 mm), and a flexural strength was measured at a cross head speed of 5.3 mm/minute. In these Examples, "Instron (registered trademark)" Universal Tester Model 4201 (manufactured by Instron Ltd.) was used as a tester. The number of measurements was n=5, and an average value was defined as a flexural strength.

The materials and components used in Examples and Comparative Examples are as follows.

(A1) Components: A-1 to A-7

A-1: "jER (registered trademark)" 152 (manufactured by Mitsubishi Chemical Corporation)
Glycidyl ether of phenol novolak
Epoxy equivalent: 175 g/mol, number of epoxy groups: 3

A-2: "EPICLON (registered trademark)" N660 (manufactured by DIC Corporation)
Glycidyl ether of cresol novolak
Epoxy equivalent: 206 g/mol, number of epoxy groups: 4.3

A-3: "Araldite (registered trademark)" MY721 (manufactured by Huntsman Advanced Materials Co., Ltd.)
N,N,N',N'-tetraglycidyl-4,4'-diaminodiphenylmethane
Epoxy equivalent: 113 g/mol, number of epoxy groups: 4

A-4: "jER (registered trademark)" 828 (manufactured by Mitsubishi Chemical Corporation)
Diglycidyl ether of bisphenol A
Epoxy equivalent: 189 g/mol, number of epoxy groups: 2

A-5: "jER (registered trademark)" 1001 (manufactured by Mitsubishi Chemical Corporation)
Diglycidyl ether of bisphenol A
Epoxy equivalent: 475 g/mol, number of epoxy groups: 2

A-6: "DENACOL (registered trademark)" EX-810 (manufactured by Nagase ChemteX Corporation).
Diglycidyl ether of ethylene glycol
Epoxy equivalent: 113 g/mol, number of epoxy groups: 2

A-7: "TETRAD-X (manufactured by Mitsubishi Gas Chemical Company, Inc.)
Tetraglycidylmethaxylenediamine
Epoxy equivalent: 100 g/mol, number of epoxy groups: 4

Component Corresponding to Both (A1) Component and (A-2) Component: A-8

A-8: "DENACOL (registered trademark)" EX-611 (manufactured by Nagase ChemteX Corporation).
Sorbitol polyglycidyl ether
Epoxy equivalent: 167 g/mol, number of epoxy groups: 4
Number of hydroxyl groups: 2

(A2) Components: A-9 and A-10

A-9: "DENACOL (registered trademark)" EX-731 (manufactured by Nagase ChemteX Corporation).
N-glycidyl phthalimide
Epoxy equivalent: 216 g/mol, number of epoxy groups: 1
Number of imide groups: 1

A-10: "ADEKA RESIN (registered trademark)" EPU-6 (manufactured by ADEKA CORPORATION)
Urethane-modified epoxy
Epoxy equivalent: 250 g/mol, number of epoxy groups: 1
Number of urethane groups: 1 or more (B1) Components: B-1 to B-7

B-1: "DBU (registered trademark)" (manufactured by San-Apro Ltd.) (corresponding to formula (III))
1,8-diazabicyclo[5,4,0]-7-undecene, molecular weight: 152

B-2: N,N-dimethylbenzylamine (manufactured by Tokyo Chemical Industry Co., Ltd.), molecular weight: 135.21

B-3: 1,8-bis(dimethylamino)naphthalene (manufactured by Aldrich Co., Ltd.)
Another name: proton sponge, molecular weight: 214.31 (corresponding to formula (IV))

B-4: 2,4,6-tris(dimethylaminomethyl)phenol (manufactured by Tokyo Chemical Industry Co., Ltd.)
Another name: DMP-30, molecular weight: 265.39 (corresponding to formula (V))

B-5: "DBN (manufactured by San-Apro Ltd.), molecular weight: 124 (corresponding to formula (III))
1,5-diazabicyclo[4,3,0]-5-nonene B-6: triisopropanolamine (manufactured by Tokyo Chemical Industry Co., Ltd.), molecular weight: 191.27 (corresponding to formula (VI))

B-7: U-CAT SA506 (manufactured by San-Apro Ltd.) (corresponding to formula (III))
DBU-p-toluenesulfonic acid salt, molecular weight: 324.44

(B2) Components: B-8 to B-14

B-8: benzyltrimethylammonium bromide (the carbon number of $R_1$ is 7, the carbon numbers of $R_2$ to $R_4$ are each 1, and the anion site is a bromide anion, manufactured by Tokyo Chemical Industry Co., Ltd.) (corresponding to formula (I))

B-9: tetrabutylammonium bromide (the carbon numbers of $R_1$ to $R_4$ are each 4, and the anion site is a bromide anion, manufactured by Tokyo Chemical Industry Co., Ltd.) (corresponding to formula (I))

B-10: trimethyloctadecylammonium bromide (the carbon number of $R_1$ is 18, the carbon numbers of $R_2$ to $R_4$ are each 1, and the anion site is a bromide anion, manufactured by Tokyo Chemical Industry Co., Ltd.) (corresponding to formula (I))

B-11: (2-methoxyethoxymethyl)triethylammonium chloride (the carbon number of $R_1$ is 4, the carbon numbers of $R_2$ to $R_4$ are each 2, and the anion site is a chloride anion, manufactured by Tokyo Chemical Industry Co., Ltd.) (corresponding to formula (I))

B-12: (2-acetoxyethyl)trimethylammonium chloride (the carbon number of $R_1$ is 4, the carbon numbers of $R_2$ to $R_4$ are each 1, and the anion site is a chloride anion, manufactured by Tokyo Chemical Industry Co., Ltd.) (corresponding to formula (I))

B-13: (2-hydroxyethyl)trimethylammonium bromide (the carbon number of $R_1$ is 2, the carbon numbers of $R_2$ to $R_4$ are each 1, and the anion site is a bromide anion, manufactured by Tokyo Chemical Industry Co., Ltd.) (corresponding to formula (I))

B-14: 1-hexadecylpyridinium chloride (the carbon number of $R_5$ is 16, $R_6$ and $R_7$ are each a hydrogen atom, and the anion site is a bromide anion, manufactured by Tokyo Chemical Industry Co., Ltd.) (corresponding to formula (II))

(B3) Components: B-15 to B-17

B-15: tetrabutylphosphonium bromide (the carbon numbers of $R_{30}$ to $R_{33}$ are each 4, and the anion site is a bromide anion, manufactured by Tokyo Chemical Industry Co., Ltd.), molecular weight: 339 (corresponding to formula (IX))

B-16: tetraphenylphosphonium bromide (the carbon numbers of $R_{30}$ to $R_{33}$ are each 6, and the anion site is a bromide anion, manufactured by Tokyo Chemical Industry Co., Ltd.), molecular weight: 419 (corresponding to formula (IX))

B-17: triphenylphosphine (the carbon numbers of $R_{34}$ to $R_{36}$ are each 6, manufactured by Tokyo Chemical Industry Co., Ltd.), molecular weight: 262 (corresponding to formula (X))

(C) Component: C-1 and C-2

C-1: "DENACOL (registered trademark)" EX-141 (manufactured by Nagase ChemteX Corporation).

Phenylglycidyl ether, epoxy equivalent: 151 g/mol, number of epoxy groups: 1

C-2: hexamethylenediamine (manufactured by Tokyo Chemical Industry Co., Ltd.), molecular weight: 116

Thermoplastic Resin

Polyarylene sulfide (PPS) resin pellet: "Torelina (registered trademark)" M2888 (manufactured by Toray Industries, Inc.)

Polyamide 66 (PA66) resin pellet: "Amilan (registered trademark)" CM3001 (manufactured by Toray Industries, Inc.)

Polycarbonate (PC) resin pellet: "Lexan (registered trademark)" 141R (SABIC) ABS resin pellet (styrene-based resin): "Toyolac (registered trademark)" T-100A (manufactured by Toray Industries, Inc.)

Polypropylene (PP) resin pellet (polyolefin-based resin): mixture of unmodified PP resin pellet and acid-modified PP resin pellet, unmodified PP resin pellet: "Prime Polypro (registered trademark)" J830HV (manufactured by Prime Polymer Co., Ltd.) (50 parts by mass) and acid-modified PP resin pellet: "Admer (registered trademark)" QE800 (manufactured by Mitsui Chemicals, Incorporated) (50 parts by mass).

Example 1

This Example includes the following first to fifth steps.

First Step: Step of Producing Carbon Fiber as a Raw Material.

A copolymer including 99 mol % of acrylonitrile and 1 mol % of itaconic acid was spun, and baked to obtain carbon fiber having a total filament number of 24000, a total fineness of 1000 tex, a specific gravity of 1.8, a strand tensile strength of 6.2 GPa and a strand tensile elastic modulus of 300 GPa. Then, the carbon fiber was subjected to an electrolytic surface treatment at an electricity amount of 100 C per 1 g of carbon fiber using an aqueous ammonium hydrogen carbonate solution with a concentration of 0.1 mol/L as an electrolytic solution. The carbon fiber subjected to an electrolytic surface treatment was subsequently rinsed, dried in heated air at a temperature of 150° C. to obtain carbon fiber as a raw material. The surface oxygen concentration O/C at this time was 0.20. This was designated as carbon fiber A.

Second Step: Step of Depositing a Sizing Agent on Carbon Fiber.

The component (A-4) and the component (B-1) were mixed at a mass ratio of 100:1, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Cutting Sizing Agent-Applied Carbon Fiber.

The sizing agent-applied carbon fiber obtained in the second step was cut to ¼ inch using a cartridge cutter.

Fourth Step: Extrusion Step.

Using Twin Screw Extruder Model TEX-30α (screw diameter: 30 mm, L/D=32) manufactured by The Japan Steel Works, Ltd., a PPS resin pellet was supplied from a main hopper, the sizing agent-applied carbon fiber cut in the previous step was then supplied from a side hopper downstream of the main hopper, and the PPS resin pellet and the sizing agent-applied carbon fiber were sufficiently kneaded at a rotation number of 150 rpm at a barrel temperature of 320° C., and degassed by a downstream vacuum vent. Supply was adjusted using a weight feeder so that the amount of sizing agent-applied carbon fiber was 10 parts by mass while the amount of the PPS resin pellet was 90 parts by mass. The molten resin was discharged from a slot die (diameter: 5 mm), and the obtained strand was cooled, and then cut with a cutter to form a pellet-shaped molding material.

Fifth Step: Injection Molding Step.

The pellet-shaped molding material obtained in the extrusion step was molded at a cylinder temperature of 330° C. and a mold temperature of 80° C. using Injection Molding Machine Model J350EIII manufactured by The Japan Steel Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 1. As a result, it was found that dynamic characteristics were sufficiently high with the flexural strength being 230 MPa.

Examples 2 to 5

First Step: Step of Producing Carbon Fiber as a Raw Material.

Carbon fiber was produced in the same manner as in Example 1.

Second Step: Step of Depositing a Sizing Agent on Carbon Fiber.

Sizing agent-applied carbon fiber was obtained using the same method as that in Example 1, except that the mass ratio of the components (A-4) and (B-1) was changed in a range of 100:3 to 100:20 as shown in Table 1. The deposition amount of the sizing agent was 0.5 parts by mass based on 100 parts by mass of the surface-treated carbon fiber in each case.

Third to Fifth Steps.

Test pieces for evaluation of characteristics were formed using the same method as that in Example 1. Next, the obtained test pieces for evaluation of characteristics were evaluated in accordance with the above-described method for evaluation of an injection-molded article. The results were summarized in Table 1. As a result, it was found that dynamic characteristics were sufficiently high with the flexural strength being 231 to 234 MPa.

Comparative Examples 1 to 5

First Step: Step of Producing Carbon Fiber as a Raw Material.

Carbon fiber was produced in the same manner as in Example 1.

Second Step: Step of Depositing a Sizing Agent on Carbon Fiber.

Sizing agent-applied carbon fiber was obtained using the same method as that in Example 1, except that the mass ratio of the component (A), the component (B) and the component (C) (other components) was changed as shown in Table 1. The deposition amount of the sizing agent was 0.5 parts by mass based on 100 parts by mass of the surface-treated carbon fiber in each case.

Third to Fifth Steps.

Test pieces for evaluation of characteristics were formed using the same method as that in Example 1. Next, the obtained test pieces for evaluation of characteristics were evaluated in accordance with the above-described method for evaluation of an injection-molded article. The results were summarized in Table 1. As a result, it was found that dynamic characteristics were insufficient with the flexural strength being 215 to 218 MPa.

trolytic surface treatment at an electricity amount of 20 C per 1 g of carbon fiber using an aqueous sulfuric acid solution with a concentration of 0.05 mol/L as an electrolytic solution. The surface oxygen concentration O/C at this time was 0.20. This was designated as carbon fiber B.

Second Step: Step of Depositing a Sizing Agent on Carbon Fiber.

The component (A-4) and the component (B-7) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

TABLE 1

|  |  |  | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|---|
| Component (A) | A-4 | jER828 | 100 | 100 | 100 | 100 | 100 | 100 | 100 | 100 |  |  |
| Parts by mass | A-5 | jER1001 |  |  |  |  |  |  |  |  |  |  |
| Component (B) | B-1 | DBU | 1 | 3 | 6 | 15 | 20 |  | 30 |  |  | 3 |
| Parts by mass | B-2 | N,N-dimethyl-benzylamine |  |  |  |  |  |  |  |  |  |  |
| Component (C) | C-1 | EX-141 |  |  |  |  |  |  |  |  | 100 | 100 |
| Parts by mass | C-2 | Hexamethylenediamine |  |  |  |  |  |  |  | 3 |  |  |
| Thermoplastic resin |  |  | PPS | PPS | PPS | PPS | PPS | PPS | PPS | PPS | PPS | PPS |
| Carbon fiber |  |  | A | A | A | A | A | A | A | A | A | A |
| Flexural strength |  | MPa | 230 | 232 | 234 | 231 | 232 | 215 | 218 | 215 | 217 | 218 |

Examples 6 to 15

First Step: Step of Producing Carbon Fiber as a Raw Material.

Carbon fiber was produced in the same manner as in Example 1.

Second Step: Step of Depositing a Sizing Agent on Carbon Fiber.

Sizing agent-applied carbon fiber was obtained using the same method as that in Example 1, except that the mass ratio of the component (A) and the component (B) was changed as shown in Table 1. The deposition amount of the sizing agent was 0.5 parts by mass based on 100 parts by mass of the surface-treated carbon fiber in each case.

Third to Fifth Steps.

Test pieces for evaluation of characteristics were formed using the same method as that in Example 1. Next, the obtained test pieces for evaluation of characteristics were evaluated in accordance with the above-described method for evaluation of an injection-molded article. The results were summarized in Table 2. As a result, it was found that dynamic characteristics were sufficiently high with the flexural strength being 225 to 252 MPa.

Example 16

First Step: Step of Producing Carbon Fiber as a Raw Material.

Carbon fiber was produced in the same manner as in Example 1 except that carbon fiber was subjected to an electrolytic surface treatment at an electricity amount of 20 C per 1 g of carbon fiber using an aqueous sulfuric acid solution with a concentration of 0.05 mol/L as an electrolytic solution.

Third to Fifth Steps.

Test pieces for evaluation of characteristics were formed using the same method as that in Example 1. Next, the obtained test pieces for evaluation of characteristics were evaluated in accordance with the above-described method for evaluation of an injection-molded article. The results were summarized in Table 2. As a result, it was found that dynamic characteristics were sufficiently high with the flexural strength being 220 MPa.

Example 17

First Step: Step of Producing Carbon Fiber as a Raw Material.

Carbon fiber B obtained in Example 16 was immersed in an aqueous tetraethylammonium hydroxide solution (pH=14), and drawn up while being ultrasonically vibrated. The surface oxygen concentration O/C at this time was 0.17. This was designated as carbon fiber C.

Second Step: Step of Depositing a Sizing Agent on Carbon Fiber.

The component (A-4) and the component (B-7) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third to Fifth Steps.

Test pieces for evaluation of characteristics were formed using the same method as that in Example 1. Next, the obtained test pieces for evaluation of characteristics were evaluated in accordance with the above-described method for evaluation of an injection-molded article. The results were summarized in Table 2. As a result, it was found that dynamic characteristics were sufficiently high with the flexural strength being 228 MPa.

Comparative Example 6

First Step: Step of Producing Carbon Fiber as a Raw Material.

Carbon fiber was produced in the same manner as in Example 16.

Second Step: Step of Depositing a Sizing Agent on Carbon Fiber.

Only the component (A-4) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third to Fifth Steps.

Test pieces for evaluation of characteristics were formed using the same method as that in Example 1. Next, the obtained test pieces for evaluation of characteristics were evaluated in accordance with the above-described method for evaluation of an injection-molded article. The results were summarized in Table 2. As a result, it was found that dynamic characteristics were insufficient with the flexural strength being 202 MPa.

Comparative Example 7

First Step: Step of Producing Carbon Fiber as a Raw Material.

Carbon fiber was produced in the same manner as in Example 17.

Second Step: Step of Depositing a Sizing Agent on Carbon Fiber.

Only the component (A-4) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third to Fifth Steps.

Test pieces for evaluation of characteristics were formed using the same method as that in Example 1. Next, the obtained test pieces for evaluation of characteristics were evaluated in accordance with the above-described method for evaluation of an injection-molded article. The results were summarized in Table 2. As a result, it was found that dynamic characteristics were insufficient with the flexural strength being 208 MPa.

TABLE 2

| | | | Example 6 | Example 7 | Example 8 | Example 9 | Example 10 | Example 11 | Example 12 | Example 13 |
|---|---|---|---|---|---|---|---|---|---|---|
| Component (A) Parts by mass | A-1 | jER152 | 100 | | | | | | | |
| | A-2 | N660 | | 100 | | | | | | |
| | A-3 | MY721 | | | 100 | | | | | |
| | A-4 | jER828 | | | | 100 | | | | |
| | A-5 | jER1001 | | | | | 100 | | | |
| | A-6 | EX-810 | | | | | | 100 | | |
| | A-7 | TETRIAD-X | | | | | | | 100 | |
| | A-8 | EX-611 | | | | | | | | 100 |
| | A-9 | EX-731 | | | | | | | | |
| | A-10 | EPU-6 | | | | | | | | |
| Component (B) Parts by mass | B-7 | DBU-p-toluene-sulfonic acid salt | 3 | 3 | 3 | 3 | 3 | 3 | 3 | 3 |
| | B-8 | Benzyltrimethylammonium bromide | | | | | | | | |
| Thermoplastic resin | | | PPS | PPS | PPS | PPS | PPS | PPS | PPS | PPS |
| Carbon fiber | | | A | A | A | A | A | A | A | A |
| Flexural strength | MPa | | 252 | 251 | 248 | 232 | 230 | 226 | 240 | 225 |

| | | | Example 14 | Example 15 | Example 16 | Example 17 | Comparative Example 6 | Comparative Example 7 |
|---|---|---|---|---|---|---|---|---|
| Component (A) Parts by mass | A-1 | jER152 | | | | | | |
| | A-2 | N660 | | | | | | |
| | A-3 | MY721 | | | | | | |
| | A-4 | jER828 | | | 100 | 100 | 100 | 100 |
| | A-5 | jER1001 | | | | | | |
| | A-6 | EX-810 | | | | | | |
| | A-7 | TETRIAD-X | | | | | | |
| | A-8 | EX-611 | | | | | | |
| | A-9 | EX-731 | 100 | | | | | |
| | A-10 | EPU-6 | | 100 | | | | |

TABLE 2-continued

|  |  |  |  |  |  |  |  |  |
|---|---|---|---|---|---|---|---|---|
| Component (B) Parts by mass | B-7 | DBU-p-toluene-sulfonic acid salt | 3 | 3 | 3 | 3 |  |  |
|  | B-8 | Benzyltrimethylammonium bromide |  |  |  |  |  |  |
| Thermoplastic resin |  |  | PPS | PPS | PPS | PPS | PPS | PPS |
| Carbon fiber |  |  | A | A | B | C | B | C |
| Flexural strength |  | MPa | 227 | 230 | 220 | 228 | 202 | 208 |

Examples 18 to 24

First Step: Step of Producing Carbon Fiber as a Raw Material.

Carbon fiber was produced in the same manner as in Example 1.

Second Step: Step of Depositing a Sizing Agent on Carbon Fiber.

Sizing agent-applied carbon fiber was obtained using the same method as that in Example 1, except that the mass ratio of the component (A) and the component (B) was changed as shown in Table 3-1. The deposition amount of the sizing agent was 0.5 parts by mass based on 100 parts by mass of the surface-treated carbon fiber in each case.

Third to Fifth Steps.

Test pieces for evaluation of characteristics were formed using the same method as that in Example 1. Next, the obtained test pieces for evaluation of characteristics were evaluated in accordance with the above-described method for evaluation of an injection-molded article. The results were summarized in Table 3-1. As a result, it was found that dynamic characteristics were sufficiently high with the flexural strength being 228 to 233 MPa.

The surface oxygen concentration O/C at this time was 0.20. This was designated as carbon fiber B.

Second Step: Step of Depositing a Sizing Agent on Carbon Fiber.

The component (A-4) and the component (B-8) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third to Fifth Steps.

Test pieces for evaluation of characteristics were formed using the same method as that in Example 1. Next, the obtained test pieces for evaluation of characteristics were evaluated in accordance with the above-described method for evaluation of an injection-molded article. The results were

TABLE 3-1

|  |  |  | Example 18 | Example 19 | Example 20 | Example 21 | Example 22 | Example 23 | Example 24 | Example 25 | Example 26 |
|---|---|---|---|---|---|---|---|---|---|---|---|
| Component (A) Parts by mass | A-4 | jER828 | 100 | 100 | 100 | 100 | 100 | 100 | 100 | 100 | 100 |
|  | A-5 | jER1001 |  |  |  |  |  |  |  |  |  |
| Component (B) Parts by mass | B-1 | DBU | 3 |  |  |  |  |  |  |  |  |
|  | B-2 | N, N-dimethylbenzylamine |  | 3 |  |  |  |  |  |  |  |
|  | B-3 | Proton sponge |  |  | 3 |  |  |  |  |  |  |
|  | B-4 | DMP-30 |  |  |  | 3 |  |  |  |  |  |
|  | B-5 | DBN |  |  |  |  | 3 |  |  |  |  |
|  | B-6 | Triisopropanolamine |  |  |  |  |  | 3 |  |  |  |
|  | B-7 | DBU-p-toluenesulfonic acid salt |  |  |  |  |  |  |  |  |  |
|  | B-8 | Benzyltrimethylammonium bromide |  |  |  |  |  |  | 3 | 3 | 3 |
| Thermoplastic resin |  |  | PPS | PPS | PPS | PPS | PPS | PPS | PPS | PPS | PPS |
| Carbon fiber |  |  | A | A | A | A | A | A | A | B | C |
| Flexural strength |  | MPa | 233 | 231 | 230 | 229 | 231 | 232 | 228 | 220 | 227 |

Example 25

First Step: Step of Producing Carbon Fiber as a Raw Material.

Carbon fiber was produced in the same manner as in Example 1 except that carbon fiber was subjected to an electrolytic surface treatment at an electricity amount of 20 C per 1 g of carbon fiber using an aqueous sulfuric acid solution with a concentration of 0.05 mol/L as an electrolytic solution.

summarized in Table 3-1. As a result, it was found that dynamic characteristics were sufficiently high with the flexural strength being 220 MPa.

Example 26

First Step: Step of Producing Carbon Fiber as a Raw Material.

Carbon fiber B obtained in Example 25 was immersed in an aqueous tetraethylammonium hydroxide solution (pH=14), and drawn up while being ultrasonically vibrated. The surface oxygen concentration O/C at this time was 0.17. This was designated as carbon fiber C.

Second Step: Step of Depositing a Sizing Agent on Carbon Fiber.

The component (A-4) and the component (B-8) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third to Fifth Steps.

Test pieces for evaluation of characteristics were formed using the same method as that in Example 1. Next, the Second Step: Step of Depositing a Sizing Agent on Carbon Fiber.

Sizing agent-applied carbon fiber was obtained using the same method as that in Example 1, except that the mass ratio of the component (A) and the component (B) was changed as shown in Table 3-2. The deposition amount of the sizing agent was 0.5 parts by mass based on 100 parts by mass of the surface-treated carbon fiber in each case.

Third to Fifth Steps.

Test pieces for evaluation of characteristics were formed using the same method as that in Example 1. Next, the obtained test pieces for evaluation of characteristics were evaluated in accordance with the above-described method for evaluation of an injection-molded article. The results were summarized in Table 3-2. As a result, it was found that dynamic characteristics were sufficiently high with the flexural strength being 222 to 230 MPa.

TABLE 3-2

| | | | Example 27 | Example 28 | Example 29 | Example 30 | Example 31 | Example 32 | Example 33 | Example 34 | Example 35 |
|---|---|---|---|---|---|---|---|---|---|---|---|
| Component (A) Parts by mass | A-4 A-5 | jER828 jER1001 | 100 | 100 | 100 | 100 | 100 | 100 | 100 | 100 | 100 |
| Component (B) Parts by mass | B-9 | Tributyl-ammonium bromide | 3 | | | | | | | | |
| | B-10 | Trimethyloctadecylammonium bromide | | 3 | | | | | | | |
| | B-11 | (2-methoxyethoxymethyl) triethylammoniumt chloride | | | 3 | | | | | | |
| | B-12 | (2-acetoxyethyl) trimethyl-ammonium chloride | | | | 3 | | | | | |
| | B-13 | (2-hydroxyethyl) trimethyl-ammonium bromide | | | | | 3 | | | | |
| | B-14 | 1-hexadecyl-pyridinium chloride | | | | | | 3 | | | |
| | B-15 | Tetrabutyl-phosphonium bromide | | | | | | | 3 | | |
| | B-16 | Tetraphenyl-phosphonium bromide | | | | | | | | 3 | |
| | B-17 | Triphenyl-phosphine | | | | | | | | | 3 |
| Thermoplastic resin | | | PPS | PPS | PPS | PPS | PPS | PPS | PPS | PPS | PPS |
| Carbon fiber | | | A | A | A | A | A | A | A | A | A |
| Flexural strength | | MPa | 230 | 222 | 227 | 229 | 228 | 227 | 230 | 223 | 225 | obtained test pieces for evaluation of characteristics were evaluated in accordance with the above-described method for evaluation of an injection-molded article. The results were summarized in Table 3-1. As a result, it was found that dynamic characteristics were sufficiently high with the flexural strength being 227 MPa.

Examples 27 to 35

First Step: Step of Producing Carbon Fiber as a Raw Material.

Carbon fiber was produced in the same manner as in Example 1.

Example 36

This Example includes the following first to fifth steps.

First Step: Step of Producing Carbon Fiber as a Raw Material.

Carbon fiber was produced in the same manner as in Example 1.

Second Step: Step of Depositing a Sizing Agent on Carbon Fiber.

The component (A-8) and the component (B-1) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Cutting Sizing Agent-Applied Carbon Fiber.

The sizing agent-applied carbon fiber obtained in the second step was cut to ¼ inch using a cartridge cutter.

Fourth Step: Extrusion Step.

Using Twin Screw Extruder Model TEX-30α (screw diameter: 30 mm, L/D=32) manufactured by The Japan Steel Works, Ltd., a PA66 resin pellet was supplied from a main hopper, the sizing agent-applied carbon fiber cut in the previous step was then supplied from a side hopper downstream of the main hopper, and the PA66 resin pellet and the sizing agent-applied carbon fiber were sufficiently kneaded at a rotation number of 150 rpm at a barrel temperature of 280° C., and degassed by a downstream vacuum vent. Supply was adjusted using a weight feeder so that the amount of sizing agent-applied carbon fiber was 30 parts by mass while the amount of the PA66 resin pellet was 70 parts by mass. The molten resin was discharged from a slot die (diameter: 5 mm), and the obtained strand was cooled, and then cut with a cutter to form a pellet-shaped molding material.

Fifth Step: Injection Molding Step.

The pellet-shaped molding material obtained in the extrusion step was molded at a cylinder temperature of 300° C. and a mold temperature of 70° C. using Injection Molding Machine Model J350EIII manufactured by The Japan Steel Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 4. As a result, it was found that dynamic characteristics were sufficiently high with the flexural strength being 342 MPa.

Examples 37 to 41

First Step: Step of Producing Carbon Fiber as a Raw Material.

Carbon fiber was produced in the same manner as in Example 1.

Second Step: Step of Depositing a Sizing Agent on Carbon Fiber.

Sizing agent-applied carbon fiber was obtained using the same method as that in Example 36, except that the mass ratio of the component (A) and the component (B) was changed as shown in Table 4. The deposition amount of the sizing agent was 0.5 parts by mass based on 100 parts by mass of the surface-treated carbon fiber in each case.

Third to Fifth Steps.

Test pieces for evaluation of characteristics were formed using the same method as that in Example 36. Next, the obtained test pieces for evaluation of characteristics were evaluated in accordance with the above-described method for evaluation of an injection-molded article. The results were summarized in Table 4. As a result, it was found that dynamic characteristics were sufficiently high with the flexural strength being 329 to 340 MPa.

Comparative Example 8

First Step: Step of Producing Carbon Fiber as a Raw Material.

Carbon fiber was produced in the same manner as in Example 1.

Second Step: Step of Depositing a Sizing Agent on Carbon Fiber.

Only the component (A-8) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third to Fifth Steps.

Test pieces for evaluation of characteristics were formed using the same method as that in Example 36. Next, the obtained test pieces for evaluation of characteristics were evaluated in accordance with the above-described method for evaluation of an injection-molded article. The results were summarized in Table 4. As a result, it was found that dynamic characteristics were insufficient with the flexural strength being 320 MPa.

TABLE 4

|  |  |  | Example 36 | Example 37 | Example 38 | Example 39 | Example 40 | Example 41 | Comparative Example 8 |
|---|---|---|---|---|---|---|---|---|---|
| Component (A) Parts by mass | A-8 | EX-611 | 100 | 100 | 100 | 100 | 100 | 100 | 100 |
|  | A-9 | EX-731 |  |  |  |  |  |  |  |
| Component (B) Parts by mass | B-1 | DBU | 3 |  |  |  |  |  |  |
|  | B-4 | DMP-30 |  | 3 |  |  |  |  |  |
|  | B-8 | Benzyltrimethyl-ammonium bromide |  |  | 3 |  |  |  |  |
|  | B-14 | 1-hexadecyl-pyridinium chloride |  |  |  |  | 3 |  |  |
|  | B-15 | Tetrabutyl-phosphonium bromide |  |  |  |  |  | 3 |  |

TABLE 4-continued

|  |  | Example 36 | Example 37 | Example 38 | Example 39 | Example 40 | Example 41 | Comparative Example 8 |
|---|---|---|---|---|---|---|---|---|
| B-17 | Triphenyl-phosphine |  |  |  |  |  | 3 |  |
| Thermoplastic resin |  | PA66 | PA66 | PA66 | PA66 | PA66 | PA66 | PA66 |
| Carbon fiber |  | A | A | A | A | A | A | A |
| Flexural strength | MPa | 342 | 340 | 339 | 335 | 340 | 329 | 320 |

Example 42

This Example includes the following first to fifth steps.

First Step: Step of Producing Carbon Fiber as a Raw Material.

Carbon fiber was produced in the same manner as in Example 1.

Second Step: Step of Depositing a Sizing Agent on Carbon Fiber.

The component (A-10) and the component (B-6) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Cutting Sizing Agent-Applied Carbon Fiber.

The sizing agent-applied carbon fiber obtained in the second step was cut to ¼ inch using a cartridge cutter.

Fourth Step: Extrusion Step.

Using Twin Screw Extruder Model TEX-30α (screw diameter: 30 mm, L/D=32) manufactured by The Japan Steel Works, Ltd., a PC resin pellet was supplied from a main hopper, the sizing agent-applied carbon fiber cut in the previous step was then supplied from a side hopper downstream of the main hopper, and the PC resin pellet and the sizing agent-applied carbon fiber were sufficiently kneaded at a rotation number of 150 rpm at a barrel temperature of 300° C., and degassed by a downstream vacuum vent. Supply was adjusted using a weight feeder so that the amount of sizing agent-applied carbon fiber was 8 parts by mass while the amount of the PC resin pellet was 92 parts by mass. The molten resin was discharged from a slot die (diameter: 5 mm), and the obtained strand was cooled, and then cut with a cutter to form a pellet-shaped molding material.

Fifth Step: Injection Molding Step.

The pellet-shaped molding material obtained in the extrusion step was molded at a cylinder temperature of 320° C. and a mold temperature of 70° C. using Injection Molding Machine Model J350EIII manufactured by The Japan Steel Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 5. As a result, it was found that dynamic characteristics were sufficiently high with the flexural strength being 162 MPa.

Examples 43 to 47

First Step: Step of Producing Carbon Fiber as a Raw Material.

Carbon fiber was produced in the same manner as in Example 1.

Second Step: Step of Depositing a Sizing Agent on Carbon Fiber.

Sizing agent-applied carbon fiber was obtained using the same method as that in Example 42, except that the mass ratio of the component (A) and the component (B) was changed as shown in Table 5. The deposition amount of the sizing agent was 0.5 parts by mass based on 100 parts by mass of the surface-treated carbon fiber in each case.

Third to Fifth Steps.

Test pieces for evaluation of characteristics were formed using the same method as that in Example 42. Next, the obtained test pieces for evaluation of characteristics were evaluated in accordance with the above-described method for evaluation of an injection-molded article. The results were summarized in Table 5. As a result, it was found that dynamic characteristics were sufficiently high with the flexural strength being 153 to 160 MPa.

Comparative Example 9

First Step: Step of Producing Carbon Fiber as a Raw Material.

Carbon fiber was produced in the same manner as in Example 1.

Second Step: Step of Depositing a Sizing Agent on Carbon Fiber.

Only the component (A-10) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third to Fifth Steps.

Test pieces for evaluation of characteristics were formed using the same method as that in Example 42. Next, the obtained test pieces for evaluation of characteristics were evaluated in accordance with the above-described method for evaluation of an injection-molded article. The results were summarized in Table 5. As a result, it was found that dynamic characteristics were insufficient with the flexural strength being 145 MPa.

TABLE 5

|  |  |  | Example 42 | Example 43 | Example 44 | Example 45 | Example 46 | Example 47 | Comparative Example 9 |
|---|---|---|---|---|---|---|---|---|---|
| Component (A) | A-9 | EX-731 | | | | | | | |
| Parts by mass | A-10 | EPU-6 | 100 | 100 | 100 | 100 | 100 | 100 | 100 |
| Component (B) | B-6 | Triisopropanolamine | 3 | | | | | | |
| Parts by mass | B-7 | DBU-p-toluenesulfonic acid salt | | 3 | | | | | |
|  | B-8 | Benzyltrimethylammonium bromide | | | 3 | | | | |
|  | B-14 | 1-hexadecylpyridinium chloride | | | | 3 | | | |
|  | B-15 | Tetrabutylphosphonium bromide | | | | | 3 | | |
|  | B-17 | Triphenylphosphine | | | | | | 3 | |
| Thermoplastic resin | | | PC | PC | PC | PC | PC | PC | PC |
| Carbon fiber | | | A | A | A | A | A | A | A |
| Flexural strength | | MPa | 162 | 160 | 159 | 160 | 155 | 153 | 145 |

Example 48

This Example includes the following first to fifth steps.

First Step: Step of Producing Carbon Fiber as a Raw Material.

Carbon fiber was produced in the same manner as in Example 1.

Second Step: Step of Depositing a Sizing Agent on Carbon Fiber.

The component (A-1) and the component (B-1) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Cutting Sizing Agent-Applied Carbon Fiber.

The sizing agent-applied carbon fiber obtained in the second step was cut to ¼ inch using a cartridge cutter.

Fourth Step: Extrusion Step.

Using Twin Screw Extruder Model TEX-30α (screw diameter: 30 mm, L/D=32) manufactured by The Japan Steel Works, Ltd., a ABS resin pellet was supplied from a main hopper, the sizing agent-applied carbon fiber cut in the previous step was then supplied from a side hopper downstream of the main hopper, and the ABS resin pellet and the sizing agent-applied carbon fiber were sufficiently kneaded at a rotation number of 150 rpm at a barrel temperature of 250° C., and degassed by a downstream vacuum vent. Supply was adjusted using a weight feeder so that the amount of sizing agent-applied carbon fiber was 8 parts by mass while the amount of the ABS resin pellet was 92 parts by mass. The molten resin was discharged from a slot die (diameter: 5 mm), and the obtained strand was cooled, and then cut with a cutter to form a pellet-shaped molding material.

Fifth Step: Injection Molding Step.

The pellet-shaped molding material obtained in the extrusion step was molded at a cylinder temperature of 260° C. and a mold temperature of 60° C. using Injection Molding Machine Model J350EIII manufactured by The Japan Steel Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 6. As a result, it was found that dynamic characteristics were sufficiently high with the flexural strength being 115 MPa.

Examples 49 to 53

First Step: Step of Producing Carbon Fiber as a Raw Material.

Carbon fiber was produced in the same manner as in Example 1.

Second Step: Step of Depositing a Sizing Agent on Carbon Fiber.

Sizing agent-applied carbon fiber was obtained using the same method as that in Example 48, except that the mass ratio of the component (A) and the component (B) was changed as shown in Table 5. The deposition amount of the sizing agent was 0.5 parts by mass based on 100 parts by mass of the surface-treated carbon fiber in each case.

Third to Fifth Steps.

Test pieces for evaluation of characteristics were formed using the same method as that in Example 48. Next, the obtained test pieces for evaluation of characteristics were evaluated in accordance with the above-described method for evaluation of an injection-molded article. The results were summarized in Table 6. As a result, it was found that dynamic characteristics were sufficiently high with the flexural strength being 109 to 117 MPa.

Comparative Example 10

First Step: Step of Producing Carbon Fiber as a Raw Material.

Carbon fiber was produced in the same manner as in Example 1.

Second Step: Step of Depositing a Sizing Agent on Carbon Fiber.

Only the component (A-1) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third to Fifth Steps.

Test pieces for evaluation of characteristics were formed using the same method as that in Example 48. Next, the obtained test pieces for evaluation of characteristics were evaluated in accordance with the above-described method for evaluation of an injection-molded article. The results were summarized in Table 6. As a result, it was found that dynamic characteristics were insufficient with the flexural strength being 101 MPa.

Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were

TABLE 6

| | | | Example 48 | Example 49 | Example 50 | Example 51 | Example 52 | Example 53 | Comparative Example 10 |
|---|---|---|---|---|---|---|---|---|---|
| Component (A) | A-1 | jER152 | 100 | 100 | 100 | 100 | 100 | 100 | 100 |
| Parts by mass | A-2 | N660 | | | | | | | |
| Component (B) | B-1 | DBU | 3 | | | | | | |
| Parts by mass | B-3 | Proton sponge | | 3 | | | | | |
| | B-8 | Benzyltrimethylammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |
| Thermoplastic resin | | | ABS | ABS | ABS | ABS | ABS | ABS | ABS |
| Carbon fiber | | | A | A | A | A | A | A | A |
| Flexural strength | | MPa | 115 | 117 | 112 | 113 | 110 | 109 | 101 |

Example 54

This Example includes the following first to fifth steps.

First Step: Step of Producing Carbon Fiber as a Raw Material.

Carbon fiber was produced in the same manner as in Example 1.

Second Step: Step of Depositing a Sizing Agent on Carbon Fiber.

The component (A-8) and the component (B-6) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Cutting Sizing Agent-Applied Carbon Fiber.

The sizing agent-applied carbon fiber obtained in the second step was cut to ¼ inch using a cartridge cutter.

Fourth Step: Extrusion Step.

Using Twin Screw Extruder Model TEX-30α (screw diameter: 30 mm, L/D=32) manufactured by The Japan Steel Works, Ltd., a PP resin pellet was supplied from a main hopper, the sizing agent-applied carbon fiber cut in the previous step was then supplied from a side hopper downstream of the main hopper, and the PP resin pellet and the sizing agent-applied carbon fiber were sufficiently kneaded at a rotation number of 150 rpm at a barrel temperature of 230° C., and degassed by a downstream vacuum vent. Supply was adjusted using a weight feeder so that the amount of sizing agent-applied carbon fiber was 20 parts by mass while the amount of the PP resin pellet was 80 parts by mass. The molten resin was discharged from a slot die (diameter: 5 mm), and the obtained strand was cooled, and then cut with a cutter to form a pellet-shaped molding material.

Fifth Step: Injection Molding Step.

The pellet-shaped molding material obtained in the extrusion step was molded at a cylinder temperature of 240° C. and a mold temperature of 60° C. using Injection Molding Machine Model J350EIII manufactured by The Japan Steel evaluated in accordance with the above-described method for evaluation of an injection-molded article. The results were summarized in Table 7. As a result, it was found that dynamic characteristics were sufficiently high with the flexural strength being 115 MPa.

Examples 55 to 59

First Step: Step of Producing Carbon Fiber as a Raw Material.

Carbon fiber was produced in the same manner as in Example 1.

Second Step: Step of Depositing a Sizing Agent on Carbon Fiber.

Sizing agent-applied carbon fiber was obtained using the same method as that in Example 54, except that the mass ratio of the component (A) and the component (B) was changed as shown in Table 7. The deposition amount of the sizing agent was 0.5 parts by mass based on 100 parts by mass of the surface-treated carbon fiber in each case.

Third to Fifth Steps.

Test pieces for evaluation of characteristics were formed using the same method as that in Example 54. Next, the obtained test pieces for evaluation of characteristics were evaluated in accordance with the above-described method for evaluation of an injection-molded article. The results were summarized in Table 7. As a result, it was found that dynamic characteristics were sufficiently high with the flexural strength being 102 to 112 MPa.

Comparative Example 11

First Step: Step of Producing Carbon Fiber As a Raw Material.

Carbon fiber was produced in the same manner as in Example 1.

Second Step: Step of Depositing A Sizing Agent on Carbon Fiber.

Only the component (A-8) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third to Fifth Steps.

Test pieces for evaluation of characteristics were formed using the same method as that in Example 54. Next, the obtained test pieces for evaluation of characteristics were evaluated in accordance with the above-described method for evaluation of an injection-molded article. The results were summarized in Table 7. As a result, it was found that dynamic characteristics were insufficient with the flexural strength being 95 MPa.

then rapidly cooled to near room temperature to obtain a slurry (E). The slurry (E) was diluted with 376 kg of NMP to obtain a slurry (F).

The slurry (F) (14.3 kg) heated to 80° C. was filtered with a sieve (80 mesh, aperture: 0.175 mm) to obtain 10 kg of a coarse PPS resin and a slurry (G). The slurry (G) was added in a rotary evaporator, purged with nitrogen, then treated under reduced pressure at 100 to 160° C. for 1.5 hours, and then treated in a vacuum drier at 160° C. for 1 hour. The amount of NMP in the obtained solid was 3% by mass.

To this solid was added 12 kg (1.2 times the amount of the slurry (G)) of ion-exchanged water, and the mixture was then

TABLE 7

|  |  |  | Example 54 | Example 55 | Example 56 | Example 57 | Example 58 | Example 59 | Comparative Example 11 |
|---|---|---|---|---|---|---|---|---|---|
| Component (A) | A-8 | EX-611 | 100 | 100 | 100 | 100 | 100 | 100 | 100 |
| Parts by mass | A-9 | EX-731 |  |  |  |  |  |  |  |
| Component (B) | B-6 | Triisopropanolamine | 3 |  |  |  |  |  |  |
| Parts by mass | B-7 | DBU-p-toluenesulfonic acid salt |  | 3 |  |  |  |  |  |
|  | B-8 | Benzyltrimethylammonium bromide |  |  | 3 |  |  |  |  |
|  | B-14 | 1-hexadecylpyridinium chloride |  |  |  | 3 |  |  |  |
|  | B-15 | Tetrabutylphosphonium bromide |  |  |  |  | 3 |  |  |
|  | B-17 | Triphenylphosphine |  |  |  |  |  | 3 |  |
| Thermoplastic resin |  |  | PP | PP | PP | PP | PP | PP | PP |
| Carbon fiber |  |  | A | A | A | A | A | A | A |
| Flexural strength |  | MPa | 115 | 112 | 110 | 109 | 110 | 102 | 95 |

Examples and Comparative Examples for a long fiber pellet (molding material (P)) will be described below.

<Method for Evaluation of Flexural Properties of Injection-Molded Article>

A flexural strength test piece having a length of 130±1 mm and a width of 25±0.2 mm was cut out from the obtained injection-molded article. In accordance with the test method defined in ASTM D-790 (2004), a supports span was set at 100 mm using a three-point flexural test tool (indenter: 10 mm and supporting point: 10 mm), and a flexural strength was measured at a cross head speed of 5.3 mm/minute. In these Examples, "Instron (registered trademark)" Universal Tester Model 4201 (manufactured by Instron Ltd.) was used as a tester. The number of measurements was n=5, and an average value was defined as a flexural strength.

Reference Example 1

<Preparation of Polyphenylene Sulfide Prepolymer>

Into a 1000 L autoclave with a stirrer were added 118 kg (1000 mol) of 47.5% sodium hydrosulfide, 42.3 kg (1014 mol) of 96% sodium hydroxide, 163 kg (1646 mol) of N-methyl-2-pyrrolidone (hereinafter abbreviated as NMP in some cases), 24.6 kg (300 mol) of sodium acetate and 150 kg of ion-exchanged water, and the mixture was gradually heated to 240° C. for 3 hours while nitrogen was passed at normal pressure, and 211 kg of water and 4 kg of NMP were distilled out via a rectifying tower, followed by cooling the reaction vessel to 160° C. Here, 0.02 mol of hydrogen sulfide per 1 mol of a sulfur component added during this liquid removal operation scattered to outside the system.

Next, 147 kg (1004 mol) of p-dichlorobenzene and 129 kg (1300 mol) of NMP were added, and the reaction vessel was sealed under a nitrogen gas. The mixture was heated to 270° C. at a rate of 0.6° C./min with stirring at 240 rpm, and held at this temperature for 140 minutes. The mixture was cooled to 250° C. at a rate of 1.3° C./min while 18 kg (1000 mol) of water was injected under pressure for 15 minutes. Thereafter, the mixture was cooled to 220° C. at a rate of 0.4° C./min, and stirred at 70° C. for 30 minutes to be re-slurried. The slurry was subjected to suction filtration with a glass filter having an aperture of 10 to 16 μm. To the obtained white cake was added 12 kg of ion-exchanged water, the mixture was stirred at 70° C. for 30 minutes to be re-slurried, and the slurry was similarly subjected to suction filtration, and then dried in vacuum at 70° C. for 5 hours to obtain 100 g of a polyphenylene sulfide oligomer. The above-described operation was repeated until the amount of the polyphenylene sulfide prepolymer reached a predetermined amount.

The obtained polyphenylene sulfide oligomer (4 g) was taken and subjected to Soxhlet extraction with 120 g of chloroform for 3 hours. To a solid obtained by distilling away chloroform from the obtained extract liquid was added 20 g of chloroform again, and the solid was dissolved at room temperature to obtain a mixed liquid in the form of a slurry. The mixed liquid was slowly added dropwise to 250 g of methanol, precipitates were subjected to suction filtration with a glass filter having an aperture of 10 to 16 μm, and the obtained white cake was dried in vacuum at 70° C. for 3 hours to obtain a white powder.

The mass average molecular weight of this white powder was 900. From an absorption spectrum in infrared spectroscopic analysis of this white powder, it was found that the white powder was polyphenylene sulfide (PPS). As a result of analyzing the thermal characteristic of this white powder using a differential scanning calorimeter (temperature rise rate of 40° C./min), it was found that a broad heat absorption was shown at 200 to 260° C. and the peak temperature was 215° C.

From mass spectrometry of components divided by high-performance liquid chromatography and molecular weight information by MALDI-TOF-MS, it was found that this white powder was a mixture of cyclic polyphenylene sulfide with a repeating unit number of 4 to 11 and linear polyphenylene sulfide with a repeating unit number of 2 to 11, and the mass ratio of cyclic polyphenylene sulfide and linear polyphenylene sulfide was 9:1.

Reference Example 2

<Preparation of Mixture PP of Propylene-Based Resin>

Propylene-butene-ethylene copolymer (g-1) (constituent unit derived from propylene (hereinafter, also referred to as "C3")=66 mol %, Mw=90000) (91 parts by mass) as a first propylene-based resin (g), a maleic anhydride-modified propylene-ethylene copolymer (C3=98 mol %, Mw=25000, acid content=0.81 mmol equivalent) (9 parts by mass) as a raw material of a second propylene-based resin (h) and potassium oleate (3 parts by mass) as a surfactant were mixed. This mixture was supplied at a rate of 3000 g/hour from a hopper of a twin screw extruder (manufactured by Ikegai Corp., PCM-30, L/D=40), a 20% aqueous potassium hydroxide solution was continuously supplied at a rate of 90 g/hour from a supply port provided in a vent section of the extruder, and the mixture was continuously extruded at a heating temperature of 210° C. The extruded resin mixer was cooled to 110° C. with a static mixer with a jacket installed at a port of the extruder, and further introduced into hot water at 80° C. to obtain an emulsion. The obtained emulsion had a solid concentration of 45%.

The maleic anhydride-modified propylene-ethylene copolymer (C3=98 mol %, Mw=25000, acid content=0.81 mmol equivalent) was obtained by mixing 96 parts by mass of a propylene-ethylene copolymer, 4 parts by mass of maleic anhydride and 0.4 parts by mass of PERHEXA 25B (manufactured by NOF CORPORATION) as a polymerization initiator, and modifying the mixture at 160° C. for 2 hours.

The materials and components used in Examples and Comparative Examples are as follows.

(A1) Components: A-1 to A-7
A-1: "jER (registered trademark)" 152 (manufactured by Mitsubishi Chemical Corporation)
  Glycidyl ether of phenol novolak
  Epoxy equivalent: 175 g/mol, number of epoxy groups: 3
A-2: "EPICLON (registered trademark)" N660 (manufactured by DIC Corporation)
  Glycidyl ether of cresol novolak
  Epoxy equivalent: 206 g/mol, number of epoxy groups: 3
A-3: "Araldite (registered trademark)" MY721 (manufactured by Huntsman Advanced Materials Co., Ltd.)
  N,N,N',N'-tetraglycidyl-4,4'-diaminodiphenylmethane
  Epoxy equivalent: 113 g/mol, number of epoxy groups: 4
A-4: "jER (registered trademark)" 828 (manufactured by Mitsubishi Chemical Corporation)
  Diglycidyl ether of bisphenol A
  Epoxy equivalent: 189 g/mol, number of epoxy groups: 2
A-5: "jER (registered trademark)" 1001 (manufactured by Mitsubishi Chemical Corporation)
  Diglycidyl ether of bisphenol A
  Epoxy equivalent: 475 g/mol, number of epoxy groups: 2
A-6: "DENACOL (registered trademark)" EX-810 (manufactured by Nagase ChemteX Corporation).
  Diglycidyl ether of ethylene glycol
  Epoxy equivalent: 113 g/mol, number of epoxy groups: 2
A-7: "TETRAD-X (manufactured by Mitsubishi Gas Chemical Company, Inc.)
  Tetraglycidylmethaxylenediamine
  Epoxy equivalent: 100 g/mol, number of epoxy groups: 4
Component Corresponding to Both (A1) Component and (A-2) Component: A-8
A-8: "DENACOL (registered trademark)" EX-611 (manufactured by Nagase ChemteX Corporation).
  Sorbitol polyglycidyl ether
  Epoxy equivalent: 167 g/mol, number of epoxy groups: 4
  Number of hydroxyl groups: 2

(A2) Components: A-9 and A-10
A-9: "DENACOL (registered trademark)" EX-731 (manufactured by Nagase ChemteX Corporation).
  N-glycidyl phthalimide
  Epoxy equivalent: 216 g/mol, number of epoxy groups: 1
  Number of imide groups: 1
A-10: "ADEKA RESIN (registered trademark)" EPU-6 (manufactured by ADEKA CORPORATION)
  Urethane-modified epoxy
  Epoxy equivalent: 250 g/mol, number of epoxy groups: 1 or more
  Number of urethane groups: 1 or more (B1) Components: B-1 to B-7
B-1: "DBU (registered trademark)" (manufactured by San-Apro Ltd.)
  1,8-diazabicyclo[5,4,0]-7-undecene, molecular weight: 152, corresponding to formula (III)
B-2: N,N-dimethylbenzylamine (manufactured by Tokyo Chemical Industry Co., Ltd.), molecular weight: 135.21
B-3: 1,8-bis(dimethylamino)naphthalene (manufactured by Aldrich Co., Ltd.)
  Another name: proton sponge, molecular weight: 214.31, corresponding to formula (IV)
B-4: 2,4,6-tris(dimethylaminomethyl)phenol (manufactured by Tokyo Chemical Industry Co., Ltd.)
  Another name: DMP-30, molecular weight: 265.39, corresponding to formula (V)
B-5: "DBN (manufactured by San-Apro Ltd.), molecular weight: 124, corresponding to formula (III)
  1,5-diazabicyclo[4,3,0]-5-nonene
B-6: triisopropanolamine (manufactured by Tokyo Chemical Industry Co., Ltd.), molecular weight: 191.27, corresponding to formula (VI)
B-7: U-CAT SA506 (manufactured by San-Apro Ltd.), corresponding to formula (III)
  DBU-p-toluenesulfonic acid salt, molecular weight: 324.44

(B2) Components: B-8 to B-14
B-8: benzyltrimethylammonium bromide (the carbon number of $R_1$ is 7, the carbon numbers of $R_2$ to $R_4$ are each 1, and the anion site is a bromide anion, manufactured by Tokyo Chemical Industry Co., Ltd., corresponding to formula (I))
B-9: tetrabutylammonium bromide (the carbon numbers of $R_1$ to $R_4$ are each 4, and the anion site is a bromide anion, manufactured by Tokyo Chemical Industry Co., Ltd., corresponding to formula (I))
B-10: trimethyloctadecylammonium bromide (the carbon number of $R_1$ is 18, the carbon numbers of $R_2$ to $R_4$ are each 1, and the anion site is a bromide anion, manufactured by Tokyo Chemical Industry Co., Ltd., corresponding to formula (I))
B-11: (2-methoxyethoxymethyl)triethylammonium chloride (the carbon number of $R_1$ is 4, the carbon numbers of $R_2$ to $R_4$ are each 2, and the anion site is a chloride anion, manufactured by Tokyo Chemical Industry Co., Ltd., corresponding to formula (I))
B-12: (2-acetoxyethyl)trimethylammonium chloride (the carbon number of $R_1$ is 4, the carbon numbers of $R_2$ to $R_4$ are each 1, and the anion site is a chloride anion, manufactured by Tokyo Chemical Industry Co., Ltd., corresponding to formula (I))
B-13: (2-hydroxyethyl)trimethylammonium bromide (the carbon number of $R_1$ is 2, the carbon numbers of $R_2$ to $R_4$ are each 1, and the anion site is a bromide anion, manufactured by Tokyo Chemical Industry Co., Ltd., corresponding to formula (I))

B-14: 1-hexadecylpyridinium chloride (the carbon number of $R_5$ is 16, $R_6$ and $R_7$ are each a hydrogen atom, and the anion site is a chloride anion, manufactured by Tokyo Chemical Industry Co., Ltd., corresponding to formula (II))

(B3) Components: B-15 to B-17

B-15: tetrabutylphosphonium bromide (the carbon numbers of $R_{30}$ to $R_{33}$ are each 4, and the anion site is a bromide anion, manufactured by Tokyo Chemical Industry Co., Ltd., corresponding to formula (IX)), molecular weight: 339

B-16: tetraphenylphosphonium bromide (the carbon numbers of $R_{30}$ to $R_{33}$ are each 6, and the anion site is a bromide anion, manufactured by Tokyo Chemical Industry Co., Ltd., corresponding to formula (IX)), molecular weight: 419

B-17: triphenylphosphine (the carbon numbers of $R_{34}$ to $R_{36}$ are each 6, manufactured by Tokyo Chemical Industry Co., Ltd., corresponding to formula (X)), molecular weight: 262

(C) Component: C-1 and C-2

C-1: "DENACOL (registered trademark)" EX-141 (manufactured by Nagase ChemteX Corporation).

Phenylglycidyl ether, epoxy equivalent: 151 g/mol, number of epoxy groups: 1

C-2: hexamethylenediamine (manufactured by Tokyo Chemical Industry Co., Ltd.), molecular weight: 116

(D) Components: D-1 to D-4

D-1: polyphenylene sulfide prepolymer prepared in Reference Example 1

D-2: terpene phenol polymer (adduct of monocyclic monoterpene phenol and phenol, YP902 manufactured by Yasuhara Chemical Co., LTD)

D-3: terpene resin (resin formed of a polymer polymerized using α-pinene and β-pinene as principal components, YS Resin PX1250 manufactured by Yasuhara Chemical Co., LTD)

D-4: Mixture of propylene-based resin prepared in Reference Example 4

Thermoplastic Resin

Polyarylene sulfide (PPS) resin pellet: "Torelina (registered trademark)" A900 (manufactured by Toray Industries, Inc.)

Polyamide 6 (PA6) resin pellet: "Amilan (registered trademark)" CM1001 (manufactured by Toray Industries, Inc.)

Polypropylene (PP) resin pellet (polyolefin-based resin): mixture of unmodified PP resin pellet and acid-modified PP resin pellet, unmodified PP resin pellet: "Prime Polypro (registered trademark)" J830HV (manufactured by Prime Polymer Co., Ltd.) (50 parts by mass) and acid-modified PP resin pellet: "Admer (registered trademark)" QE800 (manufactured by Mitsui Chemicals, Incorporated) (50 parts by mass)

Polycarbonate (PC) resin pellet: "Lexan (registered trademark)" 141R (SABIC)

ABS resin pellet (styrene-based resin): "Toyolac (registered trademark)" T-100A (manufactured by Toray Industries, Inc.)

Example 60

This Example includes the following first to fourth steps.

First Step: Step of Producing Carbon Fiber as a Raw Material.

A copolymer including 99 mol % of acrylonitrile and 1 mol % of itaconic acid was spun, and baked to obtain carbon fiber having a total filament number of 24000, a total fineness of 1000 tex, a specific gravity of 1.8, a strand tensile strength of 6.2 GPa and a strand tensile elastic modulus of 300 GPa. Then, the carbon fiber was subjected to an electrolytic surface treatment at an electricity amount of 100 C per 1 g of carbon fiber using an aqueous ammonium hydrogen carbonate solution with a concentration of 0.1 mol/L as an electrolytic solution. The carbon fiber subjected to an electrolytic surface treatment was subsequently rinsed, dried in heated air at a temperature of 150° C. to obtain carbon fiber as a raw material. The surface oxygen concentration O/C at this time was 0.20. This was designated as carbon fiber A.

Second Step: Step of Depositing a Sizing Agent on Carbon Fiber.

The component (A-4) and the component (B-1) were mixed at a mass ratio of 100:1, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Long Fiber Pellet.

A corrugated cross head die, through which a continuous sizing agent-applied carbon fiber could pass, was mounted at the end part of a single screw extruder. Then, a PPS resin pellet was supplied in a molten state from the extruder to the cross head die while the continuous sizing agent-applied carbon fiber was caused to pass through the cross head die at a rate of 5 m/minute to be drawn, so that the continuous sizing agent-applied carbon fiber was impregnated with the PPS resin, and the melt-impregnated product was heated, cooled and then cut to 7 mm perpendicularly to the draw-out direction to obtain a long fiber pellet (form A) in which carbon fiber was arranged almost parallel to the axial center direction and the length of carbon fiber was substantially equal to the length of the molding material. In the extruder, carbon fiber and the resin pellet were sufficiently kneaded at a barrel temperature of 320° C. and a rotation number of 150 rpm, and degassed by a downstream vacuum vent. Supply of the PPS resin pellet was adjusted so that the amount of the PPS resin was 80 parts by mass while the amount of sizing agent-applied carbon fiber was 20 parts by mass.

Fourth Step: Injection Molding Step.

The long fiber pellet obtained in the previous step was molded at a cylinder temperature of 330° C. and a mold temperature of 100° C. using Injection Molding Machine Model J350EIII manufactured by The Japan Steel Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 8. As a result, it was found that dynamic characteristics were sufficiently high with the flexural strength being 280 MPa.

Examples 61 to 64

First Step: Step of Producing Carbon Fiber as a Raw Material.

Carbon fiber was produced in the same manner as in Example 60.

Second Step: Step of Depositing a Sizing Agent on Carbon Fiber.

Sizing agent-applied carbon fiber was obtained using the same method as that in Example 60, except that the mass ratio of the components (A-4) and (B-1) was changed in a range of 100:3 to 100:20 as shown in Table 8. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 8. As a result, it was found that dynamic characteristics were sufficiently high with the flexural strength being 279 to 285 MPa.

Comparative Examples 12 to 16

First Step: Step of Producing Carbon Fiber as a Raw Material.

Carbon fiber was produced in the same manner as in Example 60.

Second Step: Step of Depositing a Sizing Agent on Carbon Fiber.

Sizing agent-applied carbon fiber was obtained using the same method as that in Example 1, except that the mass ratio of the component (A), the component (B) and the component (C) (other components) was changed as shown in Table 8. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 8. As a result, it was found that dynamic characteristics were insufficient with the flexural strength being 250 to 268 MPa.

Second Step: Step of Depositing a Sizing Agent on Carbon Fiber.

Sizing agent-applied carbon fiber was obtained using the same method as that in Example 60, except that the mass ratio of the component (A) and the component (B) was changed as shown in Table 9. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 9. As a result, it was found that dynamic characteristics were sufficiently high with the flexural strength being 272 to 303 MPa.

Example 75

First Step: Step of Producing Carbon Fiber as a Raw Material.

Carbon fiber was produced in the same manner as in Example 60 except that carbon fiber was subjected to an electrolytic surface treatment at an electricity amount of 20 C per 1 g of carbon fiber using an aqueous sulfuric acid solution with a concentration of 0.05 mol/L as an electrolytic solution. The surface oxygen concentration O/C at this time was 0.20. This was designated as carbon fiber B.

Second Step: Step of Depositing a Sizing Agent on Carbon Fiber.

The component (A-4) and the component (B-7) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

TABLE 8

|  |  |  | Example 60 | Example 61 | Example 62 | Example 63 | Example 64 | Comparative Example 12 | Comparative Example 13 | Comparative Example 14 | Comparative Example 15 | Comparative Example 16 |
|---|---|---|---|---|---|---|---|---|---|---|---|---|
| Component (A) Parts by mass | A 4 | jER828 | 100 | 100 | 100 | 100 | 100 | 100 | 100 | 100 | | |
|  | A 5 | jER1001 | | | | | | | | | | |
| Component (B) Parts by mass | B 1 | DBU | 1 | 3 | 6 | 15 | 20 | | 30 | | | 3 |
|  | B 2 | N,N dimethylbenzylamine | | | | | | | | | | |
| Component (C) Parts by mass | C 1 | EX 141 | | | | | | | | | 100 | 100 |
|  | C 2 | Hexamethylenediamine | | | | | | | | | | |
| Thermoplastic resin | | | PPS | PPS | PPS | PPS | PPS | PPS | PPS | PPS | PPS | PPS |
| Carbon fiber | | | A | A | A | A | A | A | A | A | A | A |
| Content of sizing agent applied carbon fiber (%) | | | 20 | 20 | 20 | 20 | 20 | 20 | 20 | 20 | 20 | 20 |
| Long fiber pellet. | | | Form A | Form A | Form A | Form A | Form A | Form A | Form A | Form A | Form A | Form A |
| Flexural strength | | MPa | 280 | 282 | 285 | 280 | 279 | 265 | 266 | 250 | 262 | 268 |

Examples 65 to 74

First Step: Step of Producing Carbon Fiber as a Raw Material.

Carbon fiber was produced in the same manner as in Example 60.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 9. As a result, it was found that dynamic characteristics were sufficiently high with the flexural strength being 271 MPa.

Example 76

First Step: Step of Producing Carbon Fiber as a Raw Material.

Carbon fiber B obtained in Example 75 was immersed in an aqueous tetraethylammonium hydroxide solution (pH=14), and drawn up while being ultrasonically vibrated. The surface oxygen concentration O/C at this time was 0.17. This was designated as carbon fiber C.

Second Step: Step of Depositing a Sizing Agent on Carbon Fiber.

The component (A-4) and the component (B-7) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 9. As a result, it was found that dynamic characteristics were sufficiently high with the flexural strength being 279 MPa.

Comparative Example 17

First Step: Step of Producing Carbon Fiber as a Raw Material.

Carbon fiber was produced in the same manner as in Example 16.

Second Step: Step of Depositing a Sizing Agent on Carbon Fiber.

Only the component (A-4) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 9. As a result, it was found that dynamic characteristics were insufficient with the flexural strength being 251 MPa.

Comparative Example 18

First Step: Step of Producing Carbon Fiber as a Raw Material.

Carbon fiber was produced in the same manner as in Example 76.

Second Step: Step of Depositing a Sizing Agent on Carbon Fiber.

Only the component (A-4) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 9. As a result, it was found that dynamic characteristics were insufficient with the flexural strength being 255 MPa.

TABLE 9

| | | | Example 65 | Example 66 | Example 67 | Example 68 | Example 69 | Example 70 | Example 71 | Example 72 |
|---|---|---|---|---|---|---|---|---|---|---|
| Component (A) Parts by mass | A 1 | jER152 | 100 | | | | | | | |
| | A 2 | N660 | | 100 | | | | | | |
| | A 3 | MY725 | | | 100 | | | | | |
| | A 4 | jER828 | | | | 100 | | | | |
| | A 5 | jER1001 | | | | | 100 | | | |
| | A 6 | Ex 810 | | | | | | 100 | | |
| | A 7 | TETRAD-X | | | | | | | 100 | |
| | A 8 | EX 611 | | | | | | | | 100 |
| | A 9 | EX 731 | | | | | | | | |
| | A 10 | EPU 6 | | | | | | | | |
| Component (B) Part by mass | B 6 | Triisopropanolamine | | | | | | | | |
| | B 7 | DBU-p-toluenesulfonic acid salt | 3 | 3 | 3 | 3 | 3 | 3 | 3 | 3 |
| Thermoplastic resin | | | PPS | PPS | PPS | PPS | PPS | PPS | PPS | PPS |
| Carbon fiber | | | A | A | A | A | A | A | A | A |
| Content of sizing agent applied carbon fiber (wt %) | | | 20 | 20 | 20 | 20 | 20 | 20 | 20 | 20 |
| Long fiber pellet. | | | Form A | Form A | Form A | Form A | Form A | Form A | Form A | Form A |
| Flexural strength | MPa | | 302 | 303 | 295 | 288 | 280 | 272 | 290 | 275 |

TABLE 9-continued

|  |  |  | Example 73 | Example 74 | Example 75 | Example 76 | Comparative Example 17 | Comparative Example 18 |
|---|---|---|---|---|---|---|---|---|
| Component (A) Parts by mass | A 1 | jER152 |  |  |  |  |  |  |
|  | A 2 | N660 |  |  |  |  |  |  |
|  | A 3 | MY725 |  |  |  |  |  |  |
|  | A 4 | jER828 |  |  | 100 | 100 | 100 | 100 |
|  | A 5 | jER1001 |  |  |  |  |  |  |
|  | A 6 | Ex 810 |  |  |  |  |  |  |
|  | A 7 | TETRAD-X |  |  |  |  |  |  |
|  | A 8 | EX 611 |  |  |  |  |  |  |
|  | A 9 | EX 731 | 100 |  |  |  |  |  |
|  | A 10 | EPU 6 |  | 100 |  |  |  |  |
| Component (B) Part by mass | B 6 | Triisopropanolamine |  |  |  |  |  |  |
|  | B 7 | DBU-p-toluenesulfonic acid salt | 3 | 3 | 3 | 3 |  |  |
| Thermoplastic resin |  |  | PPS | PPS | PPS | PPS | PPS | PPS |
| Carbon fiber |  |  | A | A | B | C | B | C |
| Content of sizing agent applied carbon fiber (wt %) |  |  | 20 | 20 | 20 | 20 | 20 | 20 |
| Long fiber pellet. |  |  | Form A | Form A | Form A | Form A | Form A | Form A |
| Flexural strength |  | MPa | 273 | 280 | 271 | 279 | 251 | 255 |

Examples 77 to 83

First Step: Step of Producing Carbon Fiber as a Raw Material.

Carbon fiber was produced in the same manner as in Example 60.

Second Step: Step of Depositing a Sizing Agent on Carbon Fiber.

Sizing agent-applied carbon fiber was obtained using the same method as that in Example 60, except that the component (A) and the component (B) were changed as shown in Table 10-1. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 10-1. As a result, it was found that dynamic characteristics were sufficiently high with the flexural strength being 286 to 300 MPa.

Example 84

First Step: Step of Producing Carbon Fiber as a Raw Material.

Carbon fiber was produced in the same manner as in Example 1 except that carbon fiber was subjected to an electrolytic surface treatment at an electricity amount of 20 C per 1 g of carbon fiber using an aqueous sulfuric acid solution with a concentration of 0.05 mol/L as an electrolytic solution. The surface oxygen concentration O/C at this time was 0.20. This was designated as carbon fiber B.

Second Step: Step of Depositing a Sizing Agent on Carbon Fiber.

The component (A-1) and the component (B-8) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 10-1. As a result, it was found that dynamic characteristics were sufficiently high with the flexural strength being 285 MPa.

Example 85

First Step: Step of Producing Carbon Fiber as a Raw Material.

Carbon fiber B obtained in Example 84 was immersed in an aqueous tetraethylammonium hydroxide solution (pH=14), and drawn up while being ultrasonically vibrated. The surface oxygen concentration O/C at this time was 0.17. This was designated as carbon fiber C.

Second Step: Step of Depositing a Sizing Agent on Carbon Fiber.

The component (A-1) and the component (B-8) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 10-1. As a result, it was found that dynamic characteristics were sufficiently high with the flexural strength being 292 MPa.

TABLE 10-1

|  |  |  | Example 77 | Example 78 | Example 79 | Example 80 | Example 81 | Example 82 | Example 83 | Example 84 | Example 85 |
|---|---|---|---|---|---|---|---|---|---|---|---|
| Component (A) Parts by mass | A-1 | jER152 | 100 | 100 | 100 | 100 | 100 | 100 | 100 | 100 | 100 |
|  | A-2 | N660 |  |  |  |  |  |  |  |  |  |
| Component (B) Parts by mass | B-1 | DBU | 3 |  |  |  |  |  |  |  |  |
|  | B-2 | N,N-dimethylbenzylamine |  | 3 |  |  |  |  |  |  |  |
|  | B-3 | Proton sponge |  |  | 3 |  |  |  |  |  |  |
|  | B-4 | DMP-30 |  |  |  | 3 |  |  |  |  |  |
|  | B-5 | DBN |  |  |  |  | 3 |  |  |  |  |
|  | B-6 | Triisopropanolamine |  |  |  |  |  | 3 |  |  |  |
|  | B-8 | Benzyltrimethylammonium bromide |  |  |  |  |  |  | 3 | 3 | 3 |
| Thermoplastic resin |  |  | PPS | PPS | PPS | PPS | PPS | PPS | PPS | PPS | PPS |
| Carbon fiber |  |  | A | A | A | A | A | A | A | B | C |
| Content of sizing agent-applied carbon fiber (wt %) |  |  | 20 | 20 | 20 | 20 | 20 | 20 | 20 | 20 | 20 |
| Long fiber pellet. |  |  | Form A | Form A | Form A | Form A | Form A | Form A | Form A | Form A | Form A |
| Flexural strength |  | MPa | 286 | 288 | 295 | 292 | 300 | 300 | 290 | 285 | 292 |

Examples 86 to 94

First Step: Step of Producing Carbon Fiber as a Raw Material.

Carbon fiber was produced in the same manner as in Example 60.

Second Step: Step of Depositing a Sizing Agent on Carbon Fiber.

Sizing agent-applied carbon fiber was obtained using the same method as that in Example 60, except that the component (A) and the component (B) were changed as shown in Table 10-2. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 10-2. As a result, it was found that dynamic characteristics were sufficiently high with the flexural strength being 280 to 296 MPa.

Comparative Example 19

First Step: Step of Producing Carbon Fiber as a Raw Material.

Carbon fiber was produced in the same manner as in Example 60.

Second Step: Step of Depositing a Sizing Agent on Carbon Fiber.

Only the component (A-1) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 60. Next, the obtained test pieces for evaluation of characteristics were evaluated in accordance with the above-described method for evaluation of an injection-molded article. The results were summarized in Table 10-2. As a result, it was found that dynamic characteristics were insufficient with the flexural strength being 270 MPa.

TABLE 10-2

|  |  |  | Example 86 | Example 87 | Example 88 | Example 89 | Example 90 | Example 91 | Example 92 | Example 93 | Example 94 | Comparative Example 19 |
|---|---|---|---|---|---|---|---|---|---|---|---|---|
| Component (A) Parts by mass | A-1 | jER152 | 100 | 100 | 100 | 100 | 100 | 100 | 100 | 100 | 100 | 100 |
|  | A-2 | N660 |  |  |  |  |  |  |  |  |  |  |
| Component (B) Parts by mass | B-9 | Tributylammonium bromide | 3 |  |  |  |  |  |  |  |  |  |
|  | B-10 | Trimethyloctadecylammonium bromide |  | 3 |  |  |  |  |  |  |  |  |
|  | B-11 | (2 methoxyethoxymethyl)-triethylammonium chloride |  |  | 3 |  |  |  |  |  |  |  |
|  | B-12 | (2-acetoxyethyl)-trimethylammonium chloride |  |  |  | 3 |  |  |  |  |  |  |
|  | B-13 | (2-hydroxyethyl)-trimethylammonium bromide |  |  |  |  | 3 |  |  |  |  |  |
|  | B-14 | 1-hexadecylpyridinium chloride |  |  |  |  |  | 3 |  |  |  |  |
|  | B-15 | Tetrabutylphosphonium bromide |  |  |  |  |  |  | 3 |  |  |  |

TABLE 10-2-continued

|  |  | Example 86 | Example 87 | Example 88 | Example 89 | Example 90 | Example 91 | Example 92 | Example 93 | Example 94 | Comparative Example 19 |
|---|---|---|---|---|---|---|---|---|---|---|---|
| B-16 | Tetraphenylphosphonium bromide |  |  |  |  |  |  |  | 3 |  |  |
| B-17 | Triphenylphosphine |  |  |  |  |  |  |  |  | 3 |  |
| Thermoplastic resin |  | PPS | PPS | PPS | PPS | PPS | PPS | PPS | PPS | PPS | PPS |
| Carbon fiber |  | A | A | A | A | A | A | A | A | A | A |
| Content of sizing agent-applied carbon fiber (%) |  | 20 | 20 | 20 | 20 | 20 | 20 | 20 | 20 | 20 | 20 |
| Long fiber pellet. |  | Form A | Form A | Form A | Form A | Form A | Form A | Form A | Form A | Form A | Form A |
| Flexural strength | MPa | 296 | 285 | 294 | 280 | 282 | 288 | 295 | 286 | 292 | 270 |

Example 95

This Example includes the following first to fourth steps.

First Step: Step Of Producing Carbon Fiber As A Raw Material.

Carbon fiber was produced in the same manner as in Example 60.

Second Step: Step of Depositing a Sizing Agent on Carbon Fiber.

The component (A-4) and the component (B-3) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Long Fiber Pellet.

The component (D-1) prepared in Reference Example 1 is melted in a melting bath at 240° C., and supplied to a kiss coater by a gear pump. The component (D-1) was applied from the kiss coater onto a roll heated to 230° C., thereby forming a film.

Sizing agent-applied carbon fiber was caused to pass over the roll while being in contact with the roll, so that the component (D-1) was deposited in a fixed amount per unit length of sizing agent-applied carbon fiber.

The sizing agent-applied carbon fiber, on which the component (D-1) was deposited, was supplied into a furnace heated to 350° C., and caused to pass through gaps between ten rolls (ϕ50 mm) arranged alternately in a vertical direction on one straight line, which freely rotated on a bearing, and caused to pass over ten roll bars (ϕ200 mm) placed in a zigzag manner in the furnace, so that the sizing agent-applied carbon fiber was sufficiently impregnated with the component (D-1) while the component (D-1) was converted into PAS, i.e. a high-polymerization-degree polymer. Next, the carbon fiber strand drawn out from the inside of the furnace was sprayed with air to be cooled, and then wound by a drum winder.

Ten strands having a length of 10 mm were cut from the wound carbon fiber strand, and for separating carbon fiber and polyarylene sulfide from each other, extraction was performed by refluxing 1-chloronaphthalene at 210° C. for 6 hours using a Soxhlet extractor. Extracted polyarylene sulfide was subjected to measurement of a molecular weight. The obtained PPS had a mass average molecular weight (Mw) of 26800, a number average molecular weight (Mn) of 14100 and a dispersion degree (Mw/Mn) of 1.90. Next, a mass loss rate Δ Wr of extracted polyarylene sulfide was measured and found to be 0.09%. The deposition amount of the component (D-1) was 20 parts by mass based on 100 parts by mass of carbon fiber.

Subsequently, the PPS resin was melted in a single screw extruder at 360° C., and extruded into a cross head die mounted at the end of the extruder, and simultaneously the sizing agent-applied carbon fiber impregnated with the component (D-1) was continuously supplied into the cross head die (rate: 30 m/min), whereby the sizing agent-applied carbon fiber impregnated with the component (D-1) was covered with the molten PPS resin. Then, the sizing agent-applied carbon fiber was cooled, and then cut to 7 mm perpendicularly to the draw-out direction to obtain a long fiber pellet (form B) of core-sheath structure in which carbon fiber was arranged almost in parallel in the axial center direction and the length of carbon fiber was substantially equal to the length of the molding material. Supply of the PPS resin pellet was adjusted so that the amount of sizing agent-applied carbon fiber was 20 parts by mass based on the total amount.

Fourth Step: Injection Molding Step.

The long fiber pellet obtained in the previous step was molded at a cylinder temperature of 330° C. and a mold temperature of 100° C. using Injection Molding Machine Model J350EIII manufactured by The Japan Steel Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 11. As a result, it was found that dynamic characteristics were sufficiently high with the flexural strength being 285 MPa.

Examples 96 to 101

First Step: Step of Producing Carbon Fiber as a Raw Material.

Carbon fiber was produced in the same manner as in Example 60.

Second Step: Step of Depositing a Sizing Agent on Carbon Fiber.

Sizing agent-applied carbon fiber was obtained using the same method as that in Example, except that the component (A) and the component (B) were changed as shown in Table 11. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 95. Next, the obtained test pieces for evaluation of characteristics were evaluated in accordance with the above-described method for evaluation of an injection-molded article. The results were summarized in Table 11. As a result, it was found that dynamic characteristics were sufficiently high with the flexural strength being 284 to 290 MPa.

Comparative Example 20

First Step: Step of Producing Carbon Fiber as a Raw Material.

Carbon fiber was produced in the same manner as in Example 60.

Second Step: Step of Depositing a Sizing Agent on Carbon Fiber.

Only the component (A-4) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 95. Next, the obtained test pieces for evaluation of characteristics were evaluated in accordance with the above-described method for evaluation of an injection-molded article. The results were summarized in Table 11. As a result, it was found that dynamic characteristics were insufficient with the flexural strength being 266 MPa.

Example 102

This Example includes the following first to fourth steps.

First Step: Step of Producing Carbon Fiber as a Raw Material.

Carbon fiber was produced in the same manner as in Example 60.

Second Step: Step of Depositing a Sizing Agent on Carbon Fiber.

The component (A-8) and the component (B-1) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Long Fiber Pellet.

The component (D-2) is melted in a melting bath at 190° C., and supplied to a kiss coater by a gear pump. The component (C-2) was applied from the kiss coater onto a roll heated to 180° C., thereby forming a film.

Sizing agent-applied carbon fiber was caused to pass over the roll while being in contact with the roll, so that the component (D-2) was deposited in a fixed amount per unit length of sizing agent-applied carbon fiber.

The sizing agent-applied carbon fiber, on which the component (D-2) was deposited, was supplied into a furnace heated to 180° C., and caused to pass through gaps between ten rolls ($\phi$50 mm) arranged alternately in a vertical direction on one straight line, which freely rotated on a bearing, and caused to pass over ten roll bars ($\phi$200 mm) placed in a zigzag manner in the furnace, so that the sizing agent-applied carbon fiber was sufficiently impregnated with the component (D-2). The deposition amount of the component (D-2) was 20 parts by mass based on 100 parts by mass of carbon fiber.

Subsequently, the PA6 resin was melted in a single screw extruder at 300° C., and extruded into a cross head die mounted at the end of the extruder, and simultaneously the sizing agent-applied carbon fiber impregnated with the component (D-2) was continuously supplied into the cross head die (rate: 30 m/min), whereby the sizing agent-applied carbon

TABLE 11

| | | | Example 95 | Example 96 | Example 97 | Example 98 | Example 99 | Example 100 | Example 101 | Comparative Example 20 |
|---|---|---|---|---|---|---|---|---|---|---|
| Component (A) Parts by mass | A-4 | jER828 | 100 | 100 | 100 | 100 | 100 | 100 | 100 | 100 |
| | A-5 | jER1001 | | | | | | | | |
| Component (B) Parts by mass | B-3 | Proton sponge | 3 | | | | | | | |
| | B-4 | DMP-30 | | 3 | | | | | | |
| | B-6 | Triisopropanolamine | | | 3 | | | | | |
| | B-7 | DBU-p-toluenesulfonic acid salt | | | | 3 | | | | |
| | B-14 | 1-hexadecylpyridinium chloride | | | | | 3 | | | |
| | B-15 | Tetrabutylphosphonium bromide | | | | | | 3 | | |
| | B-17 | Triphenylphosphine | | | | | | | 3 | |
| Component (D) | | | D-1 | D-1 | D-1 | D-1 | D-1 | D-1 | D-1 | D-1 |
| Thermoplastic resin | | | PPS | PPS | PPS | PPS | PPS | PPS | PPS | PPS |
| Carbon fiber | | | A | A | A | A | A | A | A | A |
| Content of sizing agent-applied carbon fiber (wt %) | | | 20 | 20 | 20 | 20 | 20 | 20 | 20 | 20 |
| Long fiber pellet. | | | Form B | Form B | Form B | Form B | Form B | Form B | Form B | Form B |
| Flexural strength | | MPa | 285 | 290 | 288 | 290 | 288 | 285 | 284 | 266 | fiber impregnated with the component (D-2) was covered with the molten PA6 resin. Then, the sizing agent-applied carbon fiber was cooled, and then cut to 7 mm perpendicularly to the draw-out direction to obtain a long fiber pellet (form B) of core-sheath structure in which carbon fiber was arranged almost in parallel in the axial center direction and the length of carbon fiber was substantially equal to the length of the molding material. Supply of the PA6 resin pellet was adjusted so that the amount of sizing agent-applied carbon fiber was 30 parts by mass based on the total amount.

Fourth Step: Injection Molding Step.

The long fiber pellet obtained in the previous step was molded at a cylinder temperature of 300° C. and a mold temperature of 70° C. using Injection Molding Machine Model J350EIII manufactured by The Japan Steel Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 12. As a result, it was found that dynamic characteristics were sufficiently high with the flexural strength being 381 MPa.

Examples 103 to 107

First Step: Step of Producing Carbon Fiber as a Raw Material.

Carbon fiber was produced in the same manner as in Example 60.

Second Step: Step of Depositing a Sizing Agent on Carbon Fiber.

Sizing agent-applied carbon fiber was obtained using the same method as that in Example 102, except that the component (A) and the component (B) were changed as shown in Table 12. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 102. Next, the obtained test pieces for evaluation of characteristics were evaluated in accordance with the above-described method for evaluation of an injection-molded article. The results were summarized in Table 12. As a result, it was found that dynamic characteristics were sufficiently high with the flexural strength being 372 to 379 MPa.

Comparative Example 21

First Step: Step of Producing Carbon Fiber as a Raw Material.

Carbon fiber was produced in the same manner as in Example 60.

Second Step: Step of Depositing a Sizing Agent on Carbon Fiber.

Only the component (A-8) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 102. Next, the obtained test pieces for evaluation of characteristics were evaluated in accordance with the above-described method for evaluation of an injection-molded article. The results were summarized in Table 12. As a result, it was found that dynamic characteristics were insufficient with the flexural strength being 362 MPa.

TABLE 12

| | | | Example 102 | Example 103 | Example 104 | Example 105 | Example 106 | Example 107 | Comparative Example 21 |
|---|---|---|---|---|---|---|---|---|---|
| Component (A) Parts by mass | A-8 | EX-611 | 100 | 100 | 100 | 100 | 100 | 100 | 100 |
| | A-9 | EX-731 | | | | | | | |
| Component (B) Parts by mass | B-1 | DBU | 3 | | | | | | |
| | B-4 | DMP-30 | | 3 | | | | | |
| | B-8 | Benzyltrimethylammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |
| Component (D) | | | D-2 | D-2 | D-2 | D-2 | D-2 | D-2 | D-2 |
| Thermoplastic resin | | | PA6 | PA6 | PA6 | PA6 | PA6 | PA6 | PA6 |
| Carbon fiber | | | A | A | A | A | A | A | A |
| Content of sizing agent-applied carbon fiber (wt %) | | | 30 | 30 | 30 | 30 | 30 | 30 | 30 |
| Long fiber pellet. | | | Form B | Form B | Form B | Form B | Form B | Form B | Form B |
| Flexural strength | | MPa | 381 | 379 | 372 | 375 | 373 | 372 | 362 |

Example 108

This Example includes the following first to fifth steps.

First Step: Step of Producing Carbon Fiber as a Raw Material.

Carbon fiber was produced in the same manner as in Example 60.

Second Step: Step of Depositing a Sizing Agent on Carbon Fiber.

The component (A-8) and the component (B-6) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Long Fiber Pellet.

The component (D-3) is melted in a melting bath at 190° C., and supplied to a kiss coater by a gear pump. The component (D-3) was applied from the kiss coater onto a roll heated to 180° C., thereby forming a film.

Sizing agent-applied carbon fiber was caused to pass over the roll while being in contact with the roll, so that the component (D-3) was deposited in a fixed amount per unit length of sizing agent-applied carbon fiber.

The sizing agent-applied carbon fiber, on which the component (D-3) was deposited, was supplied into a furnace heated to 180° C., and caused to pass through gaps between ten rolls (φ50 mm) arranged alternately in a vertical direction on one straight line, which freely rotated on a bearing, and caused to pass over ten roll bars (φ200 mm) placed in a zigzag manner in the furnace, so that the sizing agent-applied carbon fiber was sufficiently impregnated with the component (D-3). The deposition amount of the component (D-3) was 20 parts by mass based on 100 parts by mass of carbon fiber.

Subsequently, the PP resin was melted in a single screw extruder at 240° C., and extruded into a cross head die mounted at the end of the extruder, and simultaneously the sizing agent-applied carbon fiber impregnated with the component (D-3) was continuously supplied into the cross head die (rate: 30 m/min), whereby the sizing agent-applied carbon fiber impregnated with the component (D-3) was covered with the molten PP resin. Then, the sizing agent-applied carbon fiber was cooled, and then cut to 7 mm perpendicularly to the draw-out direction to obtain a long fiber pellet (form B) of core-sheath structure in which carbon fiber was arranged almost in parallel in the axial center direction and the length of carbon fiber was substantially equal to the length of the molding material. Supply of the PP resin pellet was adjusted so that the amount of sizing agent-applied carbon fiber was 20 parts by mass based on the total amount.

Fourth Step: Injection Molding Step.

The long fiber pellet obtained in the previous step was molded at a cylinder temperature of 240° C. and a mold temperature of 60° C. using Injection Molding Machine Model J350EIII manufactured by The Japan Steel Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 13-1. As a result, it was found that dynamic characteristics were sufficiently high with the flexural strength being 155 MPa.

Examples 109 to 113

First Step: Step of Producing Carbon Fiber as a Raw Material.

Carbon fiber was produced in the same manner as in Example 60.

Second Step: Step of Depositing a Sizing Agent on Carbon Fiber. Sizing agent-applied carbon fiber was obtained using the same method as that in Example 108, except that the component (A) and the component (B) were changed as shown in Table 13-1. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 108. Next, the obtained test pieces for evaluation of characteristics were evaluated in accordance with the above-described method for evaluation of an injection-molded article. The results were summarized in Table 13-1. As a result, it was found that dynamic characteristics were sufficiently high with the flexural strength being 145 to 159 MPa.

Comparative Example 22

First Step: Step of Producing Carbon Fiber as a Raw Material.

Carbon fiber was produced in the same manner as in Example 60.

Second Step: Step of Depositing a Sizing Agent on Carbon Fiber.

Only the component (A-8) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 108. Next, the obtained test pieces for evaluation of characteristics were evaluated in accordance with the above-described method for evaluation of an injection-molded article. The results were summarized in Table 13-1. As a result, it was found that dynamic characteristics were insufficient with the flexural strength being 135 MPa.

TABLE 13-1

| | | | Example 108 | Example 109 | Example 110 | Example 111 | Example 112 | Example 113 | Comparative Example 22 |
|---|---|---|---|---|---|---|---|---|---|
| Component (A) Parts by mass | A-8 | EX-611 | 100 | 100 | 100 | 100 | 100 | 100 | 100 |
| | A-9 | EX-731 | | | | | | | |
| Component (B) Parts by mass | B-6 | Triisopropanolamine | 3 | | | | | | |
| | B-7 | DBU-p-toluenesulfonic acid salt | | 3 | | | | | |
| | B-8 | Benzyltrimethylammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |

TABLE 13-1-continued

|  | Example 108 | Example 109 | Example 110 | Example 111 | Example 112 | Example 113 | Comparative Example 22 |
|---|---|---|---|---|---|---|---|
| Component (D) | D-3 | D-3 | D-3 | D-3 | D-3 | D-3 | D-3 |
| Thermoplastic resin | PP | PP | PP | PP | PP | PP | PP |
| Carbon fiber | A | A | A | A | A | A | A |
| Content of sizing agent-applied carbon fiber (wt %) | 20 | 20 | 20 | 20 | 20 | 20 | 20 |
| Long fiber pellet. | Form B | Form B | Form B | Form B | Form B | Form B | Form B |
| Flexural strength    MPa | 155 | 159 | 153 | 150 | 151 | 145 | 135 |

Example 114

This Example includes the following first to fifth steps.

First Step: Step of Producing Carbon Fiber as a Raw Material.

Carbon fiber was produced in the same manner as in Example 60.

Second Step: Step of Depositing a Sizing Agent on Carbon Fiber.

The component (A-8) and the component (B-6) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Long Fiber Pellet.

An emulsion of the component (D-4) was adjusted to have a solid concentration of 27% by mass, deposited by a roller impregnation method, and then dried at 210° C. for 2 minutes to remove water, thereby obtaining a composite of sizing agent-applied carbon fiber and first and second propylene-based resins. The deposition amount of the component (D-4) was 20 parts by mass based on 100 parts by mass of carbon fiber.

Subsequently, the PP resin was melted in a single screw extruder at 300° C., and extruded into a cross head die mounted at the end of the extruder, and simultaneously the sizing agent-applied carbon fiber with the component (D-4) deposited thereon was continuously supplied into the cross head die (rate: 30 m/min), whereby the sizing agent-applied carbon fiber with the component (D-4) deposited thereon was covered with the molten PP resin. Then, the sizing agent-applied carbon fiber was cooled, and then cut to 7 mm perpendicularly to the draw-out direction to obtain a long fiber pellet (form B) of core-sheath structure in which carbon fiber was arranged almost in parallel in the axial center direction and the length of carbon fiber was substantially equal to the length of the molding material. Supply of the PP resin pellet was adjusted so that the amount of sizing agent-applied carbon fiber was 20 parts by mass based on the total amount.

Fourth Step: Injection Molding Step.

The long fiber pellet obtained in the previous step was molded at a cylinder temperature of 240° C. and a mold temperature of 60° C. using Injection Molding Machine Model J350EIII manufactured by The Japan Steel Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 13-2. As a result, it was found that dynamic characteristics were sufficiently high with the flexural strength being 158 MPa.

Examples 115 to 119

First Step: Step of Producing Carbon Fiber as a Raw Material.

Carbon fiber was produced in the same manner as in Example 60.

Second Step: Step of Depositing a Sizing Agent on Carbon Fiber.

Sizing agent-applied carbon fiber was obtained using the same method as that in Example 114, except that the component (A) and the component (B) were changed as shown in Table 13-2. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 114. Next, the obtained test pieces for evaluation of characteristics were evaluated in accordance with the above-described method for evaluation of an injection-molded article. The results were summarized in Table 13-2. As a result, it was found that dynamic characteristics were sufficiently high with the flexural strength being 145 to 162 MPa.

Comparative Example 23

First Step: Step of Producing Carbon Fiber as a Raw Material.

Carbon fiber was produced in the same manner as in Example 60.

Second Step: Step of Depositing a Sizing Agent on Carbon Fiber.

Only the component (A-8) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 114. Next, the obtained test pieces for evaluation of characteristics were evaluated in accordance with the above-described method for evaluation of an injection-molded article. The results were summarized in Table 13-2. As a result, it was found that dynamic characteristics were insufficient with the flexural strength being 135 MPa.

Model J350EIII manufactured by The Japan Steel Works, Ltd., thereby forming test pieces for evaluation of characteristics. The obtained test pieces were left standing for 24 hours

TABLE 13-2

| | | | Example 114 | Example 115 | Example 116 | Example 117 | Example 118 | Example 119 | Comparative Example 23 |
|---|---|---|---|---|---|---|---|---|---|
| Component (A) | A-8 | EX-611 | 100 | 100 | 100 | 100 | 100 | 100 | 100 |
| Parts by mass | A-9 | EX-731 | | | | | | | |
| Component (B) | B-6 | Triisopropanolamine | 3 | | | | | | |
| Parts by mass | B-7 | DBU-p-toluenesulfonic acid salt | | 3 | | | | | |
| | B-8 | Benzyltrimethylammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |
| Component (D) | | | D-4 | D-4 | D-4 | D-4 | D-4 | D-4 | D-4 |
| Thermoplastic resin | | | PP | PP | PP | PP | PP | PP | PP |
| Carbon fiber | | | A | A | A | A | A | A | A |
| Content of sizing agent-applied carbon fiber (wt %) | | | 20 | 20 | 20 | 20 | 20 | 20 | 20 |
| Long fiber pellet. | | | Form B | Form B | Form B | Form B | Form B | Form B | Form B |
| Flexural strength | MPa | | 158 | 162 | 155 | 150 | 152 | 145 | 135 |

Example 120

This Example includes the following first to fourth steps.

First Step: Step of Producing Carbon Fiber as a Raw Material.

Carbon fiber was produced in the same manner as in Example 60.

Second Step: Step of Depositing a Sizing Agent on Carbon Fiber.

The component (A-10) and the component (B-6) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Long Fiber Pellet.

A corrugated cross head die, through which a continuous sizing agent-applied carbon fiber could pass, was mounted at the end part of a single screw extruder. Then, a PC resin pellet was supplied in a molten state from the extruder to the cross head die while the continuous sizing agent-applied carbon fiber was caused to pass through the cross head die at a rate of 5 m/minute to be drawn, so that the continuous sizing agent-applied carbon fiber was impregnated with the PC resin, and the melt-impregnated product was heated, cooled and then cut to 7 mm perpendicularly to the draw-out direction to obtain a long fiber pellet (form A) in which carbon fiber was arranged almost parallel to the axial center direction and the length of carbon fiber was substantially equal to the length of the molding material. In the extruder, carbon fiber and the resin pellet were sufficiently kneaded at a barrel temperature of 300° C. and a rotation number of 150 rpm, and degassed by a downstream vacuum vent. Supply of the PC resin pellet was adjusted so that the amount of the PC resin was 80 parts by mass while the amount of sizing agent-applied carbon fiber was 20 parts by mass.

Fourth Step: Injection Molding Step.

The long fiber pellet obtained in the previous step was molded at a cylinder temperature of 320° C. and a mold temperature of 70° C. using Injection Molding Machine Model J350EIII manufactured by The Japan Steel Works, Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 14. As a result, it was found that dynamic characteristics were sufficiently high with the flexural strength being 210 MPa.

Examples 121 to 125

First Step: Step of Producing Carbon Fiber as a Raw Material.

Carbon fiber was produced in the same manner as in Example 60.

Second Step: Step of Depositing a Sizing Agent on Carbon Fiber.

Sizing agent-applied carbon fiber was obtained using the same method as that in Example 120, except that the component (A) and the component (B) were changed as shown in Table 14. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 120. Next, the obtained test pieces for evaluation of characteristics were evaluated in accordance with the above-described method for evaluation of an injection-molded article. The results were summarized in Table 14. As a result, it was found that dynamic characteristics were sufficiently high with the flexural strength being 200 to 209 MPa.

Comparative Example 24

First Step: Step of Producing Carbon Fiber as a Raw Material.

Carbon fiber was produced in the same manner as in Example 60.

Second Step: Step of Depositing a Sizing Agent on Carbon Fiber.

Only the component (A-10) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 120. Next, the obtained test pieces for evaluation of characteristics were evaluated in accordance with the above-described method for evaluation of an injection-molded article. The results were summarized in Table 14. As a result, it was found that dynamic characteristics were insufficient with the flexural strength being 190 MPa.

tion to obtain a long fiber pellet (form A) in which carbon fiber was arranged almost parallel to the axial center direction and the length of carbon fiber was substantially equal to the length of the molding material. In the extruder, carbon fiber and the resin pellet were sufficiently kneaded at a barrel temperature of 250° C. and a rotation number of 150 rpm, and degassed by a downstream vacuum vent. Supply of the ABS resin pellet was adjusted so that the amount of the PC resin was 80 parts by mass while the amount of sizing agent-applied carbon fiber was 20 parts by mass.

Fourth Step: Injection Molding Step.

The long fiber pellet obtained in the previous step was molded at a cylinder temperature of 260° C. and a mold temperature of 60° C. using Injection Molding Machine Model J350EIII manufactured by The Japan Steel Works,

TABLE 14

|  |  |  | Example 120 | Example 121 | Example 122 | Example 123 | Example 124 | Example 125 | Comparative Example 24 |
|---|---|---|---|---|---|---|---|---|---|
| Component (A) | A-9 | EX-731 |  |  |  |  |  |  |  |
| Parts by mass | A-10 | EPU-6 | 100 | 100 | 100 | 100 | 100 | 100 | 100 |
| Component (B) | B-6 | Triisopropanolamine | 3 |  |  |  |  |  |  |
| Parts by mass | B-7 | DBU-p-toluenesulfonic acid salt |  | 3 |  |  |  |  |  |
|  | B-8 | Benzyltrimethylammonium bromide |  |  | 3 |  |  |  |  |
|  | B-14 | 1-hexadecylpyridinium chloride |  |  |  | 3 |  |  |  |
|  | B-15 | Tetrabutylphosphonium bromide |  |  |  |  | 3 |  |  |
|  | B-17 | Triphenylphosphine |  |  |  |  |  | 3 |  |
| Thermoplastic resin |  |  | PC | PC | PC | PC | PC | PC | PC |
| Carbon fiber |  |  | A | A | A | A | A | A | A |
| Content of sizing agent-applied carbon fiber (wt %) |  |  | 20 | 20 | 20 | 20 | 20 | 20 | 20 |
| Long fiber pellet. |  |  | Form A | Form A | Form A | Form A | Form A | Form A | Form A |
| Flexural strength | MPa |  | 210 | 205 | 200 | 207 | 209 | 200 | 190 |

Example 126

This Example includes the following first to fourth steps.

First Step: Step of Producing Carbon Fiber as a Raw Material.

Carbon fiber was produced in the same manner as in Example 60.

Second Step: Step of Depositing a Sizing Agent on Carbon Fiber.

The component (A-1) and the component (B-1) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Long Fiber Pellet.

A corrugated cross head die, through which a continuous sizing agent-applied carbon fiber could pass, was mounted at the end part of a single screw extruder. Then, an ABS resin pellet was supplied in a molten state from the extruder to the cross head die while the continuous sizing agent-applied carbon fiber was caused to pass through the cross head die at a rate of 5 m/minute to be drawn, so that the continuous sizing agent-applied carbon fiber was impregnated with the ABS resin, and the melt-impregnated material was heated, cooled and then cut to 7 mm perpendicularly to the draw-out direc- Ltd., thereby forming test pieces for evaluation of characteristics. The obtained test pieces were left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of an injection-molded article. The results were summarized in Table 15. As a result, it was found that dynamic characteristics were sufficiently high with the flexural strength being 180 MPa.

Examples 127 to 131

First Step: Step of Producing Carbon Fiber as a Raw Material.

Carbon fiber was produced in the same manner as in Example 60.

Second Step: Step of Depositing a Sizing Agent Oo Carbon Fiber.

Sizing agent-applied carbon fiber was obtained using the same method as that in Example 126, except that the component (A) and the component (B) were changed as shown in Table 15. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 126. Next, the obtained test pieces for evaluation of characteristics were evaluated in accordance with the above-described method for evaluation of an injection-molded article. The results were summarized in Table 15. As a result, it was found that dynamic characteristics were sufficiently high with the flexural strength being 165 to 180 MPa.

Comparative Example 25

First Step: Step of Producing Carbon Fiber as a Raw Material.

Carbon fiber was produced in the same manner as in Example 60.

Second Step: Step of Depositing a Sizing Agent on Carbon Fiber.

Only the component (A-1) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 126. Next, the obtained test pieces for evaluation of characteristics were evaluated in accordance with the above-described method for evaluation of an injection-molded article. The results were summarized in Table 15. As a result, it was found that dynamic characteristics were insufficient with the flexural strength being 155 MPa.

Examples and Comparative Examples for a two-dimensional orientation material of carbon single fiber (molding material (Q)) will be described below.

<Method for Evaluation of Flexural Properties of Molded Article>

A flexural strength test piece having a length of 130±1 mm and a width of 25±0.2 mm was cut out from the obtained article. In accordance with the test method defined in ASTM D-790 (2004), a supports span was set at 100 mm using a three-point flexural test tool (indenter: 10 mm and supporting point: 10 mm), and a flexural strength was measured at a cross head speed of 5.3 mm/minute. In these Examples, "Instron (registered trademark)" Universal Tester Model 4201 (manufactured by Instron Ltd.) was used as a tester. The number of measurements was n=5, and an average value was defined as a flexural strength.

The materials and components used in Examples and Comparative Examples are as follows.

(A1) Components: A-1 to A-7

A-1: "jER (registered trademark)" 152 (manufactured by Mitsubishi Chemical Corporation)
Glycidyl ether of phenol novolak
Epoxy equivalent: 175 g/mol, number of epoxy groups: 3

A-2: "EPICLON (registered trademark)" N660 (manufactured by DIC Corporation)
Glycidyl ether of cresol novolak
Epoxy equivalent: 206 g/mol, number of epoxy groups: 3

A-3: "Araldite (registered trademark)" MY721 (manufactured by Huntsman Advanced Materials Co., Ltd.)
N,N,N',N'-tetraglycidyl-4,4'-diaminodiphenylmethane
Epoxy equivalent: 113 g/mol, number of epoxy groups: 4

A-4: "jER (registered trademark)" 828 (manufactured by Mitsubishi Chemical Corporation)
Diglycidyl ether of bisphenol A
Epoxy equivalent: 189 g/mol, number of epoxy groups: 2

A-5: "jER (registered trademark)" 1001 (manufactured by Mitsubishi Chemical Corporation)
Diglycidyl ether of bisphenol A
Epoxy equivalent: 475 g/mol, number of epoxy groups: 2

A-6: "DENACOL (registered trademark)" EX-810 (manufactured by Nagase ChemteX Corporation).
Diglycidyl ether of ethylene glycol
Epoxy equivalent: 113 g/mol, number of epoxy groups: 2

A-7: "TETRAD-X (manufactured by Mitsubishi Gas Chemical Company, Inc.)
Tetraglycidylmethaxylenediamine
Epoxy equivalent: 100 g/mol, number of epoxy groups: 4

Component Corresponding to Both (A1) Component and (A-2) Component: A-8

A-8: "DENACOL (registered trademark)" EX-611 (manufactured by Nagase ChemteX Corporation).
Sorbitol polyglycidyl ether
Epoxy equivalent: 167 g/mol, number of epoxy groups: 4
Number of hydroxyl groups: 2

(A2) Components: A-9 and A-10

A-9: "DENACOL (registered trademark)" EX-731 (manufactured by Nagase ChemteX Corporation).

TABLE 15

| | | | Example 126 | Example 127 | Example 128 | Example 129 | Example 130 | Example 131 | Comparative Example 25 |
|---|---|---|---|---|---|---|---|---|---|
| Component (A) Parts by mass | A-1 | jER152 | 100 | 100 | 100 | 100 | 100 | 100 | 100 |
| | A-2 | N660 | | | | | | | |
| Component (B) Parts by mass | B-1 | DBU | 3 | | | | | | |
| | B-3 | Proton sponge | | 3 | | | | | |
| | B-8 | Benzyltrimethylammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |
| Thermoplastic resin | | | ABS | ABS | ABS | ABS | ABS | ABS | ABS |
| Carbon fiber | | | A | A | A | A | A | A | A |
| Content of sizing agent-applied carbon fiber (wt %) | | | 20 | 20 | 20 | 20 | 20 | 20 | 20 |
| Long fiber pellet. | | | Form A | Form A | Form A | Form A | Form A | Form A | Form A |
| Flexural strength | MPa | | 180 | 175 | 174 | 173 | 180 | 165 | 155 |

N-glycidyl phthalimide
Epoxy equivalent: 216 g/mol, number of epoxy groups: 1
Number of imide groups: 1

A-10: "ADEKA RESIN (registered trademark)" EPU-6 (manufactured by ADEKA CORPORATION)
Urethane-modified epoxy
Epoxy equivalent: 250 g/mol, number of epoxy groups: 1
Number of urethane groups: 1 or more (B1) Components: B-1 to B-7

B-1: "DBU (registered trademark)" (manufactured by San-Apro Ltd.), corresponding to formula (III)
1,8-diazabicyclo[5,4,0]-7-undecene, molecular weight: 152

B-2: N,N-dimethylbenzylamine (manufactured by Tokyo Chemical Industry Co., Ltd.), molecular weight: 135.21

B-3: 1,8-bis(dimethylamino)naphthalene (manufactured by Aldrich Co., Ltd.)
Another name: proton sponge, molecular weight: 214.31, corresponding to formula (IV)

B-4: 2,4,6-tris(dimethylaminomethyl)phenol (manufactured by Tokyo Chemical Industry Co., Ltd.)
Another name: DMP-30, molecular weight: 265.39, corresponding to formula (V)

B-5: "DBN (manufactured by San-Apro Ltd.), molecular weight: 124, corresponding to formula (III)
1,5-diazabicyclo[4,3,0]-5-nonene B-6: triisopropanolamine (manufactured by Tokyo Chemical Industry Co., Ltd.), molecular weight: 191.27, corresponding to formula (VI)

B-7: U-CAT SA506 (manufactured by San-Apro Ltd.), corresponding to formula (III)
DBU-p-toluenesulfonic acid salt, molecular weight: 324.44

(B2) Components: B-8 to B-14

B-8: benzyltrimethylammonium bromide (the carbon number of $R_1$ is 7, the carbon numbers of $R_2$ to $R_4$ are each 1, and the anion site is a bromide anion, manufactured by Tokyo Chemical Industry Co., Ltd., corresponding to formula (I))

B-9: tetrabutylammonium bromide (the carbon numbers of $R_1$ to $R_4$ are each 4, and the anion site is a bromide anion, manufactured by Tokyo Chemical Industry Co., Ltd., corresponding to formula (I))

B-10: trimethyloctadecylammonium bromide (the carbon number of $R_1$ is 18, the carbon numbers of $R_2$ to $R_4$ are each 1, and the anion site is a bromide anion, manufactured by Tokyo Chemical Industry Co., Ltd., corresponding to formula (I))

B-11: (2-methoxyethoxymethyl)triethylammonium chloride (the carbon number of $R_1$ is 4, the carbon numbers of $R_2$ to $R_4$ are each 2, and the anion site is a chloride anion, manufactured by Tokyo Chemical Industry Co., Ltd., corresponding to formula (I))

B-12: (2-acetoxyethyl)trimethylammonium chloride (the carbon number of $R_1$ is 4, the carbon numbers of $R_2$ to $R_4$ are each 1, and the anion site is a chloride anion, manufactured by Tokyo Chemical Industry Co., Ltd., corresponding to formula (I))

B-13: (2-hydroxyethyl)trimethylammonium bromide (the carbon number of $R_1$ is 2, the carbon numbers of $R_2$ to $R_4$ are each 1, and the anion site is a bromide anion, manufactured by Tokyo Chemical Industry Co., Ltd., corresponding to formula (I))

B-14: 1-hexadecylpyridinium chloride (the carbon number of $R_5$ is 16, $R_6$ and $R_7$ are each a hydrogen atom, and the anion site is a chloride anion, manufactured by Tokyo Chemical Industry Co., Ltd., corresponding to formula (II))

(B3) Components: B-15 to B-17

B-15: tetrabutylphosphonium bromide (the carbon numbers of $R_{30}$ to $R_{33}$ are each 4, and the anion site is a bromide anion, manufactured by Tokyo Chemical Industry Co., Ltd., corresponding to formula (IX)), molecular weight: 339

B-16: tetraphenylphosphonium bromide (the carbon numbers of $R_{30}$ to $R_{33}$ are each 6, and the anion site is a bromide anion, manufactured by Tokyo Chemical Industry Co., Ltd., corresponding to formula (IX)), molecular weight: 419

B-17: triphenylphosphine (the carbon numbers of $R_{34}$ to $R_{36}$ are each 6, manufactured by Tokyo Chemical Industry Co., Ltd., corresponding to formula (X)), molecular weight: 262

(C) Component: C-1 and C-2

C-1: "DENACOL (registered trademark)" EX-141 (manufactured by Nagase ChemteX Corporation).
Phenylglycidyl ether, epoxy equivalent: 151 g/mol, number of epoxy groups: 1

C-2: hexamethylenediamine (manufactured by Tokyo Chemical Industry Co., Ltd.), molecular weight: 116

Thermoplastic Resin

Polyarylene sulfide (PPS) resin film: obtained by processing "Torelina (registered trademark)" M2888 (manufactured by Toray Industries, Inc.) into a film (basis weight: 100 g/m$^2$)

Polyamide 6 (PA6) resin film: obtained by processing "Amilan (registered trademark)" CM1001 (manufactured by Toray Industries, Inc.) into a film (basis weight: 100 g/m$^2$)

Polycarbonate (PC) resin film: obtained by processing "Lexan (registered trademark)" 141R (SABIC) into a film (basis weight: 100 g/m$^2$)

ABS resin film (styrene-based resin): obtained by "Toyolac (registered trademark)" T-100A (manufactured by Toray Industries, Inc.) into a film (basis weight: 100 g/m$^2$)

Polypropylene (PP) resin film (polyolefin-based resin): obtained by mixing an unmodified PP resin pellet and an acid-modified PP resin pellet and processing the mixture into a film (basis weight: 100 g/m$^2$), unmodified PP resin pellet: "Prime Polypro (registered trademark)" J830HV (manufactured by Prime Polymer Co., Ltd.) (50 parts by mass) and acid-modified PP resin pellet: "Admer (registered trademark)" QE800 (manufactured by Mitsui Chemicals, Incorporated) (50 parts by mass)

Example 132

This Example includes the following first to fourth steps.
First Step: Step f Producing Carbon Fiber as a Raw Material.

A copolymer including 99 mol % of acrylonitrile and 1 mol % of itaconic acid was spun, and baked to obtain carbon fiber having a total filament number of 24000, a total fineness of 1000 tex, a specific gravity of 1.8, a strand tensile strength of 6.2 GPa and a strand tensile elastic modulus of 300 GPa. Then, the carbon fiber was subjected to an electrolytic surface treatment at an electricity amount of 100 C per 1 g of carbon fiber using an aqueous ammonium hydrogen carbonate solution with a concentration of 0.1 mol/L as an electrolytic solution. The carbon fiber subjected to an electrolytic surface treatment was subsequently rinsed, dried in heated air at a temperature of 150° C. to obtain carbon fiber as a raw material. Thereafter, the obtained carbon fiber was cut to 6 mm using a cartridge cutter. The surface oxygen concentration O/C at this time was 0.20. This was designated as carbon fiber A.

Second Step: Step of Producing a Paper-Making Web.

A cylindrical container having a diameter of 500 mm was charged with a dispersion liquid at a concentration of 0.1% by mass, which included water and a surfactant (manufactured by Nacalai Tesque, Inc., Polyoxyethylene Lauryl Ether (trade name)), and the carbon fiber cut in the previous step was added therein so that the mass content of fiber was 0.02%. The mixture was stirred for 5 minutes, and then subjected to a dehydration treatment to obtain a paper-making web. The basis weight at this time was 67 g/m$^2$.

Third Step: Step of Adding a Binder to a Paper-Making Web.

The component (A-4) and the component (B-1) were mixed at a mass ratio of 100:1, and the mixture was further mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step: Step of Forming a Paper-Making Web and a Thermoplastic Resin into a Composite.

A PPS resin film (resin basis weight: 100 g/m$^2$) was held over the paper-making web obtained in the previous steps from upper and lower directions, and this was heated and pressurized at 330° C. and 3.5 MPa and then cooled and pressurized at 60° C. and 3.5 MPa by a heat press apparatus to obtain a molding material with a paper-making web and a PPS resin formed into a composite. Further, the molding material was stacked, heated and pressurized, and cooled and pressurized so that a molded article had a thickness of 3 mm. The carbon fiber content of the obtained molded article was 25% by mass. The molded article was left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of a molded article. The results were summarized in Table 16. As a result, it was found that dynamic characteristics were sufficiently high with the flexural strength being 441 MPa.

Examples 133 to 136

First and Second Steps:
Carbon fiber and a paper-making web were produced in the same manner as in Example 132.

Third Step: Step of Adding a Binder to a Paper-Making Web.

A paper-making web provided with a binder was obtained using the same method as that in Example 132, except that the mass ratio of the components (A-4) and (B-1) was changed in a range of 100:3 to 100:20 as shown in Table 16. The deposition amount of the binder was 0.5 parts by mass based on 100 parts by mass of the surface-treated carbon fiber in each case.

Fourth Step: Step of Forming a Paper-Making Web and a Thermoplastic Resin into a Composite.

Test pieces for evaluation of characteristics were formed using the same method as that in Example 132. Next, the obtained test pieces for evaluation of characteristics were evaluated in accordance with the above-described method for evaluation of a molded article. The results were summarized in Table 16. As a result, it was found that dynamic characteristics were sufficiently high with the flexural strength being 441 to 445 MPa.

Comparative Examples 26 to 30

First and Second Steps:
Carbon fiber and a paper-making web were produced in the same manner as in Example 132.

Third Step: Step of Adding a Binder to a Paper-Making Web.

A paper-making web provided with a binder was obtained using the same method as that in Example 1, except that the mass ratio of the component (A), the component (B) and the component (C) (other components) was changed as shown in Table 16. The deposition amount of the binder was 0.5 parts by mass based on 100 parts by mass of the surface-treated carbon fiber in each case.

Fourth Step:
Test pieces for evaluation of characteristics were formed using the same method as that in Example 132. Next, the obtained test pieces for evaluation of characteristics were evaluated in accordance with the above-described method for evaluation of a molded article. The results were summarized in Table 16. As a result, it was found that dynamic characteristics were insufficient with the flexural strength being 419 to 425 MPa.

TABLE 16

| | | | Example 132 | Example 133 | Example 134 | Example 135 | Example 136 | Comparative Example 26 | Comparative Example 27 | Comparative Example 28 | Comparative Example 29 | Comparative Example 30 |
|---|---|---|---|---|---|---|---|---|---|---|---|---|
| Component (A) Parts by mass | A 4 | jER828 | 100 | 100 | 100 | 100 | 100 | 100 | 100 | 100 | | |
| | A 5 | jER1001 | | | | | | | | | 100 | 100 |
| Component (B) Parts by mass | B 1 | DBU | 1 | 3 | 6 | 15 | 20 | | 30 | | | 3 |
| | B 2 | N,N dimethylbenzylamine | | | | | | | | | | |
| Component (C) Parts by mass | C 1 | EX 141 | | | | | | | | | 100 | 100 |
| | C 2 | Hexamethylenediamine | | | | | | | | 3 | | |
| Thermoplastic resin | | | PPS | PPS | PPS | PPS | PPS | PPS | PPS | PPS | PPS | PPS |
| Carbon fiber | | | A | A | A | A | A | A | A | A | A | A |
| Form of molding material | | | Web shape | Web shape | Web shape | Web shape | Web shape | Web shape | Web shape | Web shape | Web shape | Web shape |
| Flexural strength | MPa | | 441 | 442 | 445 | 444 | 441 | 420 | 425 | 422 | 421 | 419 |

Examples 137 to 146

First and Second Steps:
Carbon fiber and a paper-making web were produced in the same manner as in Example 132.

Third Step: Step of Adding a Binder to a Paper-Making Web.
A paper-making web provided with a binder was obtained using the same method as that in Example 132, except that the mass ratio of the component (A) and the component (B) was changed as shown in Table 17. The deposition amount of the binder was 0.5 parts by mass based on 100 parts by mass of the surface-treated carbon fiber in each case.

Fourth Step:
Test pieces for evaluation of characteristics were formed using the same method as that in Example 132. Next, the obtained test pieces for evaluation of characteristics were evaluated in accordance with the above-described method for evaluation of a molded article. The results were summarized in Table 17. As a result, it was found that dynamic characteristics were sufficiently high with the flexural strength being 433 to 451 MPa.

Example 147

First Step: Step of Producing Carbon Fiber as a Raw Material.
Carbon fiber was produced in the same manner as in Example 132 except that carbon fiber was subjected to an electrolytic surface treatment at an electricity amount of 20 C per 1 g of carbon fiber using an aqueous sulfuric acid solution with a concentration of 0.05 mol/L as an electrolytic solution. The surface oxygen concentration O/C at this time was 0.20. This was designated as carbon fiber B.

Second Step: Step of Producing a Paper-Making Web.
A paper-making web was produced in the same manner as in Example 132.

Third Step: Step oOf Adding a Binder to a Paper-Making Web.
The component (A-4) and the component (B-7) were mixed at a mass ratio of 100:3, and the mixture was further mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step:
Test pieces for evaluation of characteristics were formed using the same method as that in Example 132. Next, the obtained test pieces for evaluation of characteristics were evaluated in accordance with the above-described method for evaluation of a molded article. The results were summarized in Table 17. As a result, it was found that dynamic characteristics were sufficiently high with the flexural strength being 434 MPa.

Example 148

First Step: Step of Producing Carbon Fiber as a Raw Material.
Carbon fiber B obtained in Example 147 was immersed in an aqueous tetraethylammonium hydroxide solution (pH=14), and drawn up while being ultrasonically vibrated. The surface oxygen concentration O/C at this time was 0.17. This was designated as carbon fiber C.

Second Step: Step of Producing a Paper-Making Web.
A paper-making web was produced in the same manner as in Example 132.

Third Step: Step of Adding a Binder to a Paper-Making Web.
The component (A-4) and the component (B-7) were mixed at a mass ratio of 100:3, and the mixture was further mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step:
Test pieces for evaluation of characteristics were formed using the same method as that in Example 132. Next, the obtained test pieces for evaluation of characteristics were evaluated in accordance with the above-described method for evaluation of a molded article. The results were summarized in Table 17. As a result, it was found that dynamic characteristics were sufficiently high with the flexural strength being 440 MPa.

Comparative Example 31

First Step: Step of Producing Carbon Fiber as a Raw Material.
Carbon fiber was produced in the same manner as in Example 147.

Second Step: Step of Producing a Paper-Making Web.
A paper-making web was produced in the same manner as in Example 132.

Third Step: Step of Adding a Binder to a Paper-Making Web.
Only the component (A-4) was mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step:
Test pieces for evaluation of characteristics were formed using the same method as that in Example 132. Next, the obtained test pieces for evaluation of characteristics were evaluated in accordance with the above-described method for evaluation of a molded article. The results were summarized in Table 17. As a result, it was found that dynamic characteristics were insufficient with the flexural strength being 415 MPa.

Comparative Example 32

First Step: Step of Producing Carbon Fiber as a Raw Material.
Carbon fiber was produced in the same manner as in Example 148.

Second Step: Step of Producing a Paper-Making Web.
A paper-making web was produced in the same manner as in Example 132.

Third Step: Step of Adding a Binder to a Paper-Making Web.

Only the component (A-4) was mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step:

Test pieces for evaluation of characteristics were formed using the same method as that in Example 132. Next, the obtained test pieces for evaluation of characteristics were evaluated in accordance with the above-described method for evaluation of a molded article. The results were summarized in Table 17. As a result, it was found that dynamic characteristics were insufficient with the flexural strength being 418 MPa.

Third Step: Step of Adding a Binder to a Paper-Making Web.

A paper-making web provided with a binder was obtained using the same method as that in Example 132, except that the component (A) and the component (B) were changed as shown in Table 18-1. The deposition amount of the binder was 0.5 parts by mass based on 100 parts by mass of the surface-treated carbon fiber in each case.

Fourth Step:

Test pieces for evaluation of characteristics were formed using the same method as that in Example 132. Next, the obtained test pieces for evaluation of characteristics were evaluated in accordance with the above-described method for evaluation of a molded article. The results were summarized in Table 18-1. As a result, it was found that dynamic characteristics were sufficiently high with the flexural strength being 444 to 452 MPa.

TABLE 17

|  |  |  | Example 137 | Example 138 | Example 139 | Example 140 | Example 141 | Example 142 | Example 143 | Example 144 |
|---|---|---|---|---|---|---|---|---|---|---|
| Component (A) Parts by mass | A-1 | jER152 | 100 | | | | | | | |
| | A-2 | N660 | | 100 | | | | | | |
| | A-3 | MY721 | | | 100 | | | | | |
| | A-4 | jER828 | | | | 100 | | | | |
| | A-5 | jER1001 | | | | | 100 | | | |
| | A-6 | EX-810 | | | | | | 100 | | |
| | A-7 | TETRAD-X | | | | | | | 100 | |
| | A-8 | EX-611 | | | | | | | | 100 |
| | A-9 | EX-731 | | | | | | | | |
| | A-10 | EPU-6 | | | | | | | | |
| Component (B) Parts by mass | B-6 | Triisopropanolamine | | | | | | | | |
| | B-7 | DBU-p-toluenesulfonic acid salt | 3 | 3 | 3 | 3 | 3 | 3 | 3 | 3 |
| Thermoplastic resin | | | PPS | PPS | PPS | PPS | PPS | PPS | PPS | PPS |
| Carbon fiber | | | A | A | A | A | A | A | A | A |
| Form of molding material | | | Web shape | Web shape | Web shape | Web shape | Web shape | Web shape | Web shape | Web shape |
| Flexural strength | MPa | | 451 | 449 | 448 | 441 | 435 | 434 | 447 | 435 |

|  |  |  | Example 145 | Example 146 | Example 147 | Example 148 | Comparative Example 31 | Comparative Example 32 |
|---|---|---|---|---|---|---|---|---|
| Component (A) Parts by mass | A-1 | jER152 | | | | | | |
| | A-2 | N660 | | | | | | |
| | A-3 | MY721 | | | | | | |
| | A-4 | jER828 | | | 100 | 100 | 100 | 100 |
| | A-5 | jER1001 | | | | | | |
| | A-6 | EX-810 | | | | | | |
| | A-7 | TETRAD-X | | | | | | |
| | A-8 | EX-611 | | | | | | |
| | A-9 | EX-731 | 100 | | | | | |
| | A-10 | EPU-6 | | 100 | | | | |
| Component (B) Parts by mass | B-6 | Triisopropanolamine | | | | | | |
| | B-7 | DBU-p-toluenesulfonic acid salt | 3 | 3 | 3 | 3 | | |
| Thermoplastic resin | | | PPS | PPS | PPS | PPS | PPS | PPS |
| Carbon fiber | | | A | A | B | C | B | C |
| Form of molding material | | | Web shape | Web shape | Web shape | Web shape | Web shape | Web shape |
| Flexural strength | MPa | | 437 | 433 | 434 | 440 | 415 | 418 |

Examples 149 to 155

First Step: Step of Producing Carbon Fiber as a Raw Material.

Carbon fiber was produced in the same manner as in Example 132.

Second Step: Step of Producing a Paper-Making Web.

A paper-making web was produced in the same manner as in Example 132.

Example 156

First Step: Step of Producing Carbon Fiber as a Raw Material.

Carbon fiber was produced in the same manner as in Example 132 except that carbon fiber was subjected to an electrolytic surface treatment at an electricity amount of 20 C per 1 g of carbon fiber using an aqueous sulfuric acid solution with a concentration of 0.05 mol/L as an electrolytic solution.

The surface oxygen concentration O/C at this time was 0.20. This was designated as carbon fiber B.

Second Step: Step of Producing a Paper-Making Web.

A paper-making web was produced in the same manner as in Example 132.

Third Step: Step of Adding a Binder to a Paper-Making Web.

The component (A-1) and the component (B-8) were mixed at a mass ratio of 100:3, and the mixture was further mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step:

Test pieces for evaluation of characteristics were formed using the same method as that in Example 132. Next, the obtained test pieces for evaluation of characteristics were evaluated in accordance with the above-described method for evaluation of a molded article. The results were summarized in Table 18-1. As a result, it was found that dynamic characteristics were sufficiently high with the flexural strength being 442 MPa.

TABLE 18-1

|  |  |  | Example 149 | Example 150 | Example 151 | Example 152 | Example 153 | Example 154 | Example 155 | Example 156 | Example 157 |
|---|---|---|---|---|---|---|---|---|---|---|---|
| Component (A) Parts by mass | A-1 | jER152 | 100 | 100 | 100 | 100 | 100 | 100 | 100 | 100 | 100 |
|  | A-2 | N660 |  |  |  |  |  |  |  |  |  |
| Component (B) Parts by mass | B-1 | DBU | 3 |  |  |  |  |  |  |  |  |
|  | B-2 | N,N-dimethyl-benzylamine |  | 3 |  |  |  |  |  |  |  |
|  | B-3 | Proton sponge |  |  | 3 |  |  |  |  |  |  |
|  | B-4 | DMP-30 |  |  |  | 3 |  |  |  |  |  |
|  | B-5 | DBN |  |  |  |  | 3 |  |  |  |  |
|  | B-6 | Triisopropano-lamine |  |  |  |  |  | 3 |  |  |  |
|  | B-8 | Benzyltrimethyl-ammonium bromide |  |  |  |  |  |  | 3 | 3 | 3 |
| Thermoplastic resin |  |  | PPS | PPS | PPS | PPS | PPS | PPS | PPS | PPS | PPS |
| Carbon fiber |  |  | A | A | A | A | A | A | A | B | C |
| Form of molding material |  |  | Web shape | Web shape | Web shape | Web shape | Web shape | Web shape | Web shape | Web shape | Web shape |
| Flexural strength |  | MPa | 450 | 444 | 447 | 445 | 449 | 452 | 444 | 435 | 442 |

Fourth Step:

Test pieces for evaluation of characteristics were formed using the same method as that in Example 132. Next, the obtained test pieces for evaluation of characteristics were evaluated in accordance with the above-described method for evaluation of a molded article. The results were summarized in Table 18-1. As a result, it was found that dynamic characteristics were sufficiently high with the flexural strength being 435 MPa.

Example 157

First Step: Step of Producing Carbon Fiber as a Raw Material.

Carbon fiber B obtained in Example 156 was immersed in an aqueous tetraethylammonium hydroxide solution (pH=14), and drawn up while being ultrasonically vibrated. The surface oxygen concentration O/C at this time was 0.17.

This was designated as carbon fiber C.

Second Step: Step of Producing a Paper-Making Web.

A paper-making web was produced in the same manner as in Example 132.

Third Step: Step of Adding a Binder to a Paper-Making Web.

The component (A-1) and the component (B-8) were mixed at a mass ratio of 100:3, and the mixture was further mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step:

Test pieces for evaluation of characteristics were formed using the same method as that in Example 132. Next, the obtained test pieces for evaluation of characteristics were evaluated in accordance with the above-described method for evaluation of a molded article. The results were summarized in Table 18-1. As a result, it was found that dynamic characteristics were sufficiently high with the flexural strength being 442 MPa.

Examples 158 to 166

First Step: Step of Producing Carbon Fiber as a Raw Material.

Carbon fiber was produced in the same manner as in Example 132.

Second Step: Step of Producing a Paper-Making Web.

A paper-making web was produced in the same manner as in Example 132.

Third Step: Step of Adding a Binder to a Paper-Making Web.

A paper-making web provided with a binder was obtained using the same method as that in Example 132, except that the mass ratio of the component (A) and the component (B) was changed as shown in Table 18-2. The deposition amount of the binder was 0.5 parts by mass based on 100 parts by mass of the surface-treated carbon fiber in each case.

Fourth Step:

Test pieces for evaluation of characteristics were formed using the same method as that in Example 132. Next, the obtained test pieces for evaluation of characteristics were evaluated in accordance with the above-described method for evaluation of a molded article. The results were summarized in Table 18-2. As a result, it was found that dynamic characteristics were sufficiently high with the flexural strength being 433 to 448 MPa.

Comparative Example 33

First Step: Step of Producing Carbon Fiber as a Raw Material.

Carbon fiber was produced in the same manner as in Example 132.

Second Step: Step of Depositing a Binder on Carbon Fiber.

Only the component (A-1) was mixed with acetone to obtain an acetone solution of about 1% by mass with a binder uniformly dissolved therein. The acetone solution of a binder was used to apply the binder to the surface-treated carbon fiber using an immersion method, a heat treatment was then performed at a temperature of 210° C. for 180 seconds to obtain binder-applied carbon fiber. The deposition amount of the binder was adjusted to be 0.5 parts by mass based on 100 parts by mass of the surface-treated carbon fiber.

Third and Fourth Steps:

Test pieces for evaluation of characteristics were formed using the same method as that in Example 132. Next, the obtained test pieces for evaluation of characteristics were evaluated in accordance with the above-described method for evaluation of a molded article. The results were summarized in Table 18-2. As a result, it was found that dynamic characteristics were insufficient with the flexural strength being 425 MPa.

Second Step: Step of Producing a Paper-Making Web.

A cylindrical container having a diameter of 500 mm was charged with a dispersion liquid at a concentration of 0.1% by mass, which included water and a surfactant (manufactured by Nacalai Tesque, Inc., Polyoxyethylene Lauryl Ether (trade name)), and the carbon fiber cut in the previous step was added therein so that the mass content of fiber was 0.02% by mass. The mixture was stirred for 5 minutes, and then subjected to a dehydration treatment to obtain a paper-making web. The basis weight at this time was 82 g/m².

Third Step: Step of Adding a Binder to a Paper-Making Web.

The component (A-8) and the component (B-1) were mixed at a mass ratio of 100:3, and the mixture was further mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

TABLE 18-2

|  |  |  | Example 158 | Example 159 | Example 160 | Example 161 | Example 162 |
|---|---|---|---|---|---|---|---|
| Component (A) | A-1 | jER152 | 100 | 100 | 100 | 100 | 100 |
| Parts by mass | A-2 | N660 |  |  |  |  |  |
| Component (B) | B-9 | Tributylammonium bromide | 3 |  |  |  |  |
| Parts by mass | B-10 | Trimethyloctadecylammonium bromide |  | 3 |  |  |  |
|  | B-11 | (2-methoxyethoxymethyl)triethylammonium chloride |  |  | 3 |  |  |
|  | B-12 | (2-acetoxyethyl)trimethylammonium chloride |  |  |  | 3 |  |
|  | B-13 | (2-hydroxyethyl)trimethylammonium bromide |  |  |  |  | 3 |
|  | B-14 | 1-hexadecylpyridinium chloride |  |  |  |  |  |
|  | B-15 | Tetrabutylphosphonium bromide |  |  |  |  |  |
|  | B-16 | Tetraphenylphosphonium bromide |  |  |  |  |  |
|  | B-17 | Triphenylphosphine |  |  |  |  |  |
| Thermoplastic resin |  |  | PPS | PPS | PPS | PPS | PPS |
| Carbon fiber |  |  | A | A | A | A | A |
| Form of molding material |  |  | Web shape | Web shape | Web shape | Web shape | Web shape |
| Flexural strength | MPa |  | 447 | 439 | 445 | 435 | 433 |
|  |  |  | Example 163 | Example 164 | Example 165 | Example 166 | Comparative Example 33 |
| Component (A) | A-1 | jER152 | 100 | 100 | 100 | 100 | 100 |
| Parts by mass | A-2 | N660 |  |  |  |  |  |
| Component (B) | B-9 | Tributylammonium bromide |  |  |  |  |  |
| Parts by mass | B-10 | Trimethyloctadecylammonium bromide |  |  |  |  |  |
|  | B-11 | (2-methoxyethoxymethyl)triethylammonium chloride |  |  |  |  |  |
|  | B-12 | (2-acetoxyethyl)trimethylammonium chloride |  |  |  |  |  |
|  | B-13 | (2-hydroxyethyl)trimethylammonium bromide |  |  |  |  |  |
|  | B-14 | 1-hexadecylpyridinium chloride | 3 |  |  |  |  |
|  | B-15 | Tetrabutylphosphonium bromide |  | 3 |  |  |  |
|  | B-16 | Tetraphenylphosphonium bromide |  |  | 3 |  |  |
|  | B-17 | Triphenylphosphine |  |  |  | 3 |  |
| Thermoplastic resin |  |  | PPS | PPS | PPS | PPS | PPS |
| Carbon fiber |  |  | A | A | A | A | A |
| Form of molding material |  |  | Web shape | Web shape | Web shape | Web shape | Web shape |
| Flexural strength | MPa |  | 447 | 448 | 440 | 438 | 425 |

Example 167

This Example includes the following first to fourth steps.

First Step: Step of Producing Carbon Fiber as a Raw Material.

Carbon fiber was produced in the same manner as in Example 132.

Fourth Step: Step of Forming a Paper-Making Web and a Thermoplastic Resin into a Composite.

A PA6 resin film (resin basis weight: 100 g/m²) was held over the paper-making web obtained in the previous steps from upper and lower directions, and this was heated and pressurized at 300° C. and 3.5 MPa and then cooled and pressurized at 60° C. and 3.5 MPa by a heat press apparatus to obtain a molding material with a paper-making web and a PA6 resin formed into a composite. Further, the molding material was stacked, heated and pressurized, and cooled and pressurized so that a molded article had a thickness of 3 mm. The carbon fiber content of the obtained molded article was 29% by mass. The molded article was left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of a molded article. The results were summarized in Table 19. As a result, it was found that dynamic characteristics were sufficiently high with the flexural strength being 465 MPa.

Examples 168 to 172

First Step: Step of Producing Carbon Fiber as a Raw Material.

Carbon fiber was produced in the same manner as in Example 132.

Second Step: Step of Producing a Paper-Making Web.

A paper-making web was produced in the same manner as in Example 167.

Third Step: Step of Adding a Binder to a Paper-Making Web.

Only the component (A-8) was mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step:

Test pieces for evaluation of characteristics were formed using the same method as that in Example 167. Next, the obtained test pieces for evaluation of characteristics were evaluated in accordance with the above-described method for evaluation of a molded article. The results were summarized in Table 19. As a result, it was found that dynamic characteristics were insufficient with the flexural strength being 440 MPa.

TABLE 19

| | | | Example 167 | Example 168 | Example 169 | Example 170 | Example 171 | Example 172 | Comparative Example 34 |
|---|---|---|---|---|---|---|---|---|---|
| Component (A) | A-7 | TETRAD-X | | | | | | | |
| Parts by mass | A-8 | EX-611 | 100 | 100 | 100 | 100 | 100 | 100 | 100 |
| Component (B) | B-1 | DBU | | 3 | | | | | |
| Parts by mass | B-4 | DMP-30 | | | 3 | | | | |
| | B-8 | Benzyltrimethyl-ammonium bromide | | | | 3 | | | |
| | B-14 | 1-hexadecylpyridinium chloride | | | | | 3 | | |
| | B-15 | Tetrabutylphosphonium bromide | | | | | | 3 | |
| | B-17 | Triphenylphosphine | | | | | | | 3 |
| Thermoplastic resin | | | PA6 | PA6 | PA6 | PA6 | PA6 | PA6 | PA6 |
| Carbon fiber | | | A | A | A | A | A | A | A |
| Form of molding material | | | Web shape | Web shape | Web shape | Web shape | Web shape | Web shape | Web shape |
| Flexural strength | | MPa | 465 | 460 | 461 | 460 | 455 | 450 | 440 |

Second Step: Step of Producing a Paper-Making Web.

A paper-making web was produced in the same manner as in Example 167.

Third Step: Step of Adding a Binder to a Paper-Making Web.

A paper-making web provided with a binder was obtained using the same method as that in Example 167, except that the component (A) and the component (B) were changed as shown in Table 19. The deposition amount of the binder was 0.5 parts by mass based on 100 parts by mass of the surface-treated carbon fiber in each case.

Fourth Step:

Test pieces for evaluation of characteristics were formed using the same method as that in Example 167. Next, the obtained test pieces for evaluation of characteristics were evaluated in accordance with the above-described method for evaluation of a molded article. The results were summarized in Table 19. As a result, it was found that dynamic characteristics were sufficiently high with the flexural strength being 450 to 461 MPa.

Comparative Example 34

First Step: Step Of Producing Carbon Fiber As A Raw Material.

Carbon fiber was produced in the same manner as in Example 132.

Example 173

This Example includes the following first to fourth steps.

First Step: Step of Producing Carbon Fiber as a Raw Material.

Carbon fiber was produced in the same manner as in Example 132.

Second Step: Step of Producing a Paper-Making Web.

A cylindrical container having a diameter of 500 mm was charged with a dispersion liquid at a concentration of 0.1% by mass, which included water and a surfactant (manufactured by Nacalai Tesque Inc., Polyoxyethylene Lauryl Ether (trade name)), and the carbon fiber cut in the previous step was added therein so that the mass content of fiber was 0.02% by mass. The mixture was stirred for 5 minutes, and then subjected to a dehydration treatment to obtain a paper-making web. The basis weight at this time was 78 g/m$^2$.

Third Step: Step of Adding a Binder to a Paper-Making Web.

The component (A-10) and the component (B-6) were mixed at a mass ratio of 100:3, and the mixture was further mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step: Step of Forming A Paper-Making Web and a Thermoplastic Resin into a Composite.

A PC resin film (resin basis weight: 100 g/m²) was held over the paper-making web obtained in the previous steps from upper and lower directions, and this was heated and pressurized at 320° C. and 3.5 MPa and then cooled and pressurized at 60° C. and 3.5 MPa by a heat press apparatus to obtain a molding material with a paper-making web and a PC resin formed into a composite. Further, the molding material was stacked, heated and pressurized, and cooled and pressurized so that a molded article had a thickness of 3 mm. The carbon fiber content of the obtained molded article was 28% by mass. The molded article was left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of a molded article. The results were summarized in Table 20. As a result, it was found that dynamic characteristics were sufficiently high with the flexural strength being 417 MPa.

Examples 174 to 178

First Step: Step of Producing Carbon Fiber as a Raw Material.

Carbon fiber was produced in the same manner as in Example 132.

Second Step: Step of Producing a Paper-Making Web.

A paper-making web was produced in the same manner as in Example 173.

Third Step: Step of Adding a Binder to a Paper-Making Web.

A paper-making web provided with a binder was obtained using the same method as that in Example 173, except that the component (A) and the component (B) were changed as shown in Table 20. The deposition amount of the binder was 0.5 parts by mass based on 100 parts by mass of the surface-treated carbon fiber in each case.

Fourth Step:

Test pieces for evaluation of characteristics were formed using the same method as that in Example 173. Next, the obtained test pieces for evaluation of characteristics were evaluated in accordance with the above-described method for evaluation of a molded article. The results were summarized in Table 20. As a result, it was found that dynamic characteristics were sufficiently high with the flexural strength being 400 to 414 MPa.

Comparative Example 35

First Step: Step of Producing Carbon Fiber as a Raw Material.

Carbon fiber was produced in the same manner as in Example 132.

Second Step: Step of Producing a Paper-Making Web.

A paper-making web was produced in the same manner as in Example 173.

Third Step: Step of Adding a Binder to a Paper-Making Web.

Only the component (A-10) was mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step:

Test pieces for evaluation of characteristics were formed using the same method as that in Example 173. Next, the obtained test pieces for evaluation of characteristics were evaluated in accordance with the above-described method for evaluation of a molded article. The results were summarized in Table 20. As a result, it was found that dynamic characteristics were insufficient with the flexural strength being 390 MPa.

TABLE 20

| | | | Example 173 | Example 174 | Example 175 | Example 176 | Example 177 | Example 178 | Comparative Example 35 |
|---|---|---|---|---|---|---|---|---|---|
| Component (A) Parts by mass | A-9 | EX-731 | | | | | | | |
| | A-10 | EPU-6 | 100 | 100 | 100 | 100 | 100 | 100 | 100 |
| Component (B) Parts by mass | B-6 | Triisopropanolamine | 3 | | | | | | |
| | B-7 | DBU-p-toluenesulfonic acid salt | | 3 | | | | | |
| | B-8 | Benzyltrimethyl-ammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |
| Thermoplastic resin | | | PC | PC | PC | PC | PC | PC | PC |
| Carbon fiber | | | A | A | A | A | A | A | A |
| Form of molding material | | | Web shape | Web shape | Web shape | Web shape | Web shape | Web shape | Web shape |
| Flexural strength | MPa | | 417 | 409 | 414 | 405 | 401 | 400 | 390 |

Example 179

This Example includes the following first to fourth steps.

First Step: Step of Producing Carbon Fiber as a Raw Material.

Carbon fiber was produced in the same manner as in Example 132.

Second Step: Step of Producing a Paper-Making Web.

A cylindrical container having a diameter of 500 mm was charged with a dispersion liquid at a concentration of 0.1% by mass, which included water and a surfactant (manufactured by Nacalai Tesque, Inc., Polyoxyethylene Lauryl Ether (trade name)), and the carbon fiber cut in the previous step was added therein so that the mass content of fiber was 0.02% by mass. The mixture was stirred for 5 minutes, and then subjected to a dehydration treatment to obtain a paper-making web. The basis weight at this time was 86 g/m².

Third Step: Step of Adding a Binder to a Paper-Making Web.

The component (A-1) and the component (B-1) were mixed at a mass ratio of 100:3, and the mixture was further mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step: Step of Forming a Paper-Making Web and a Thermoplastic Resin into a Composite.

An ABS resin film (resin basis weight: 100 g/m²) was held over the paper-making web obtained in the previous steps from upper and lower directions, and this was heated and pressurized at 260° C. and 3.5 MPa and then cooled and pressurized at 60° C. and 3.5 MPa by a heat press apparatus to obtain a molding material with a paper-making web and an ABS resin formed into a composite. Further, the molding material was stacked, heated and pressurized, and cooled and pressurized so that a molded article had a thickness of 3 mm. The carbon fiber content of the obtained molded article was 30% by mass. The molded article was left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of a molded article. The results were summarized in Table 21. As a result, it was found that dynamic characteristics were sufficiently high with the flexural strength being 352 MPa.

Examples 180 to 184

First Step: Step of Producing Carbon Fiber as a Raw Material.

Carbon fiber was produced in the same manner as in Example 132.

Second Step: Step of Producing a Paper-Making Web.

A paper-making web was produced in the same manner as in Example 179.

Third Step: Step of Adding a Binder to a Paper-Making Web.

A paper-making web provided with a binder was obtained using the same method as that in Example 179, except that the component (A) and the component (B) were changed as shown in Table 21. The deposition amount of the binder was 0.5 parts by mass based on 100 parts by mass of the surface-treated carbon fiber in each case.

Fourth Step:

Test pieces for evaluation of characteristics were formed using the same method as that in Example 179. Next, the obtained test pieces for evaluation of characteristics were evaluated in accordance with the above-described method for evaluation of a molded article. The results were summarized in Table 21. As a result, it was found that dynamic characteristics were sufficiently high with the flexural strength being 338 to 351 MPa.

Comparative Example 36

First Step: Step of Producing Carbon Fiber as a Raw Material.

Carbon fiber was produced in the same manner as in Example 132.

Second Step: Step of Producing a Paper-Making Web.

A paper-making web was produced in the same manner as in Example 179.

Third Step: Step of Adding a Binder to a Paper-Making Web.

Only the component (A-1) was mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step:

Test pieces for evaluation of characteristics were formed using the same method as that in Example 179. Next, the obtained test pieces for evaluation of characteristics were evaluated in accordance with the above-described method for evaluation of a molded article. The results were summarized in Table 21. As a result, it was found that dynamic characteristics were insufficient with the flexural strength being 320 MPa.

TABLE 21

| | | | Example 179 | Example 180 | Example 181 | Example 182 | Example 183 | Example 184 | Comparative Example 36 |
|---|---|---|---|---|---|---|---|---|---|
| Component (A) | A-1 | jER152 | 100 | 100 | 100 | 100 | 100 | 100 | 100 |
| Parts by mass | A-2 | N660 | | | | | | | |
| Component (B) | B-1 | DBU | 3 | | | | | | |
| Parts by mass | B-3 | Proton sponge | | 3 | | | | | |
| | B-8 | Benzyltrimethyl-ammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |
| Thermoplastic resin | | | ABS | ABS | ABS | ABS | ABS | ABS | ABS |
| Carbon fiber | | | A | A | A | A | A | A | A |
| Form of molding material | | | Web shape | Web shape | Web shape | Web shape | Web shape | Web shape | Web shape |
| Flexural strength | MPa | | 352 | 351 | 348 | 345 | 341 | 338 | 320 |

Example 185

This Example includes the following first to fourth steps.

First Step: Step of Producing Carbon Fiber as a Raw Material.

Carbon fiber was produced in the same manner as in Example 132.

Second Step: Step of Producing a Paper-Making Web.

A cylindrical container having a diameter of 500 mm was charged with a dispersion liquid at a concentration of 0.1% by mass, which included water and a surfactant (manufactured by Nacalai Tesque, Inc., Polyoxyethylene Lauryl Ether (trade name)), and the carbon fiber cut in the previous step was added therein so that the mass content of fiber was 0.02% by mass. The mixture was stirred for 5 minutes, and then subjected to a dehydration treatment to obtain a paper-making web. The basis weight at this time was 103 g/m².

Third Step: Step of Adding a Binder to a Paper-Making Web.

The component (A-8) and the component (B-6) were mixed at a mass ratio of 100:3, and the mixture was further mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step: Step of Forming a Paper-Making Web and a Thermoplastic Resin into a Composite.

A PP resin film (resin basis weight: 100 g/m²) was held over the paper-making web obtained in the previous steps from upper and lower directions, and this was heated and pressurized at 240° C. and 3.5 MPa and then cooled and pressurized at 60° C. and 3.5 MPa by a heat press apparatus to obtain a molding material with a paper-making web and a PP resin formed into a composite. Further, the molding material was stacked, heated and pressurized, and cooled and pressurized so that a molded article had a thickness of 3 mm. The carbon fiber content of the obtained molded article was 34% by mass. The molded article was left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of a molded article. The results were summarized in Table 22. As a result, it was found that dynamic characteristics were sufficiently high with the flexural strength being 320 MPa.

Examples 186 to 190

First Step: Step of Producing Carbon Fiber as a Raw Material.

Carbon fiber was produced in the same manner as in Example 132.

Second Step: Step of Producing a Paper-Making Web.

A paper-making web was produced in the same manner as in Example 185.

Third Step: Step of Adding a Binder to a Paper-Making Web.

A paper-making web provided with a binder was obtained using the same method as that in Example 185, except that the component (A) and the component (B) were changed as shown in Table 22. The deposition amount of the binder was 0.5 parts by mass based on 100 parts by mass of the surface-treated carbon fiber in each case.

Fourth Step:

Test pieces for evaluation of characteristics were formed using the same method as that in Example 185. Next, the obtained test pieces for evaluation of characteristics were evaluated in accordance with the above-described method for evaluation of a molded article. The results were summarized in Table 22. As a result, it was found that dynamic characteristics were sufficiently high with the flexural strength being 309 to 315 MPa.

Comparative Example 37

First Step: Step of Producing Carbon Fiber as a Raw Material.

Carbon fiber was produced in the same manner as in Example 132.

Second Step: Step of Producing a Paper-Making Web.

A paper-making web was produced in the same manner as in Example 185.

Third Step: Step of Adding a Binder to a Paper-Making Web.

Only the component (A-8) was mixed with acetone to obtain an acetone solution of about 1% by mass with a binder uniformly dissolved therein. Then, the acetone solution was sprayed over the paper-making web obtained in the previous step. Thereafter, an excess acetone solution was suctioned, and then a heat treatment was performed at 210° C. for 180 seconds. The deposition amount of the binder was 0.5 parts by mass based on 100 parts by mass of carbon fiber.

Fourth Step:

Test pieces for evaluation of characteristics were formed using the same method as that in Example 185. Next, the obtained test pieces for evaluation of characteristics were evaluated in accordance with the above-described method for evaluation of a molded article. The results were summarized in Table 22. As a result, it was found that dynamic characteristics were insufficient with the flexural strength being 295 MPa.

TABLE 22

| | | | Example 185 | Example 186 | Example 187 | Example 188 | Example 189 | Example 190 | Comparative Example 37 |
|---|---|---|---|---|---|---|---|---|---|
| Component (A) | A-7 | TETRAD-X | | | | | | | |
| Parts by mass | A-8 | EX-611 | 100 | 100 | 100 | 100 | 100 | 100 | 100 |
| Component (B) | B-6 | Triisopropanolamine | 3 | | | | | | |
| Parts by mass | B-7 | DBU-p-toluenesulfonic acid salt | | 3 | | | | | |
| | B-8 | Benzyltrimethylammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |

TABLE 22-continued

|  | Example 185 | Example 186 | Example 187 | Example 188 | Example 189 | Example 190 | Comparative Example 37 |
|---|---|---|---|---|---|---|---|
| Thermoplastic resin | PP | PP | PP | PP | PP | PP | PP |
| Carbon fiber | A | A | A | A | A | A | A |
| Form of molding material | Web shape | Web shape | Web shape | Web shape | Web shape | Web shape | Web shape |
| Flexural strength    MPa | 320 | 315 | 312 | 310 | 312 | 309 | 295 |

Examples and Comparative Examples for a two-dimensional orientation material of bundled carbon fiber (molding material (R)) will be described below.

<Method for Evaluation of Flexural Properties of Molded Article>

A flexural strength test piece having a length of 130±1 mm and a width of 25±0.2 mm was cut out from the obtained article. In accordance with the test method defined in ASTM D-790 (2004), a supports span was set at 100 mm using a three-point flexural test tool (indenter: 10 mm and supporting point: 10 mm), and a flexural strength was measured at a cross head speed of 5.3 mm/minute. In these Examples, "Instron (registered trademark)" Universal Tester Model 4201 (manufactured by Instron Ltd.) was used as a tester. The number of measurements was n=5, and an average value was defined as a flexural strength.

The materials and components used in Examples and Comparative Examples are as follows.

(A1) Components: A-1 to A-7

A-1: "jER (registered trademark)" 152 (manufactured by Mitsubishi Chemical Corporation)
Glycidyl ether of phenol novolak
Epoxy equivalent: 175 g/mol, number of epoxy groups: 3

A-2: "EPICLON (registered trademark)" N660 (manufactured by DIC Corporation)
Glycidyl ether of cresol novolak
Epoxy equivalent: 206 g/mol, number of epoxy groups: 3

A-3: "Araldite (registered trademark)" MY721 (manufactured by Huntsman Advanced Materials Co., Ltd.)
N,N,N',N'-tetraglycidyl-4,4'-diaminodiphenylmethane
Epoxy equivalent: 113 g/mol, number of epoxy groups: 4

A-4: "jER (registered trademark)" 828 (manufactured by Mitsubishi Chemical Corporation)
Diglycidyl ether of bisphenol A
Epoxy equivalent: 189 g/mol, number of epoxy groups: 2

A-5: "jER (registered trademark)" 1001 (manufactured by Mitsubishi Chemical Corporation)
Diglycidyl ether of bisphenol A
Epoxy equivalent: 475 g/mol, number of epoxy groups: 2

A-6: "DENACOL (registered trademark)" EX-810 (manufactured by Nagase ChemteX Corporation).
Diglycidyl ether of ethylene glycol
Epoxy equivalent: 113 g/mol, number of epoxy groups: 2

A-7: "TETRAD-X (manufactured by Mitsubishi Gas Chemical Company, Inc.)
Tetraglycidylmethaxylenediamine
Epoxy equivalent: 100 g/mol, number of epoxy groups: 4

Component Corresponding to Both (A1) Component and (A-2) Component: A-8

A-8: "DENACOL (registered trademark)" EX-611 (manufactured by Nagase ChemteX Corporation).
Sorbitol polyglycidyl ether
Epoxy equivalent: 167 g/mol, number of epoxy groups: 4
Number of hydroxyl groups: 2

(A2) Components: A-9 and A-10

A-9: "DENACOL (registered trademark)" EX-731 (manufactured by Nagase ChemteX Corporation).
N-glycidyl phthalimide
Epoxy equivalent: 216 g/mol, number of epoxy groups: 1
Number of imide groups: 1

A-10: "ADEKA RESIN (registered trademark)" EPU-6 (manufactured by ADEKA CORPORATION)
Urethane-modified epoxy
Epoxy equivalent: 250 g/mol, number of epoxy groups: 1
Number of urethane groups: 1 or more (B1) Components: B-1 to B-7

B-1: "DBU (registered trademark)" (manufactured by San-Apro Ltd.), corresponding to formula (III)
1,8-diazabicyclo[5,4,0]-7-undecene, molecular weight: 152

B-2: N,N-dimethylbenzylamine (manufactured by Tokyo Chemical Industry Co., Ltd.), molecular weight: 135.21

B-3: 1,8-bis(dimethylamino)naphthalene (manufactured by Aldrich Co., Ltd.)
Another name: proton sponge, molecular weight: 214.31, corresponding to formula (IV)

B-4: 2,4,6-tris(dimethylaminomethyl)phenol (manufactured by Tokyo Chemical Industry Co., Ltd.)
Another name: DMP-30, molecular weight: 265.39, corresponding to formula (V)

B-5: "DBN (manufactured by San-Apro Ltd.), molecular weight: 124, corresponding to formula (III)
1,5-diazabicyclo[4,3,0]-5-nonene B-6: triisopropanolamine (manufactured by Tokyo Chemical Industry Co., Ltd.), molecular weight: 191.27, corresponding to formula (VI)

B-7: U-CAT SA506 (manufactured by San-Apro Ltd.), corresponding to formula (III)
DBU-p-toluenesulfonic acid salt, molecular weight: 324.44

(B2) Components: B-8 to B-14

B-8: benzyltrimethylammonium bromide (the carbon number of $R_1$ is 7, the carbon numbers of $R_2$ to $R_4$ are each 1, and the anion site is a bromide anion, manufactured by Tokyo Chemical Industry Co., Ltd., corresponding to formula (I))

B-9: tetrabutylammonium bromide (the carbon numbers of $R_1$ to $R_4$ are each 4, and the anion site is a bromide anion, manufactured by Tokyo Chemical Industry Co., Ltd., corresponding to formula (I))

B-10: trimethyloctadecylammonium bromide (the carbon number of $R_1$ is 18, the carbon numbers of $R_2$ to $R_4$ are each 1, and the anion site is a bromide anion, manufactured by Tokyo Chemical Industry Co., Ltd., corresponding to formula (I))

B-11: (2-methoxyethoxymethyl)triethylammonium chloride (the carbon number of $R_1$ is 4, the carbon numbers of $R_2$ to $R_4$ are each 2, and the anion site is a chloride anion, manufactured by Tokyo Chemical Industry Co., Ltd., corresponding to formula (I))

B-12: (2-acetoxyethyl)trimethylammonium chloride (the carbon number of $R_1$ is 4, the carbon numbers of $R_2$ to $R_4$ are each 1, and the anion site is a chloride anion, manufactured by Tokyo Chemical Industry Co., Ltd., corresponding to formula (I))

B-13: (2-hydroxyethyl)trimethylammonium bromide (the carbon number of $R_1$ is 2, the carbon numbers of $R_2$ to $R_4$ are each 1, and the anion site is a bromide anion, manufactured by Tokyo Chemical Industry Co., Ltd.)

B-14: 1-hexadecylpyridinium chloride (the carbon number of $R_5$ is 16, $R_6$ and $R_7$ are each a hydrogen atom, and the anion site is a chloride anion, manufactured by Tokyo Chemical Industry Co., Ltd., corresponding to formula (II))

(B3) Components: B-15 to B-17

B-15: tetrabutylphosphonium bromide (the carbon numbers of $R_{30}$ to $R_{33}$ are each 4, and the anion site is a bromide anion, manufactured by Tokyo Chemical Industry Co., Ltd., corresponding to formula (IX)), molecular weight: 339

B-16: tetraphenylphosphonium bromide (the carbon numbers of $R_{30}$ to $R_{33}$ are each 6, and the anion site is a bromide anion, manufactured by Tokyo Chemical Industry Co., Ltd., corresponding to formula (IX)), molecular weight: 419

B-17: triphenylphosphine (the carbon numbers of $R_{34}$ to $R_{36}$ are each 6, manufactured by Tokyo Chemical Industry Co., Ltd., corresponding to formula (X)), molecular weight: 262

(C) Component (Other Components): C-1 and C-2

C-1: "DENACOL (registered trademark)" EX-141 (manufactured by Nagase ChemteX Corporation).

Phenylglycidyl ether, epoxy equivalent: 151 g/mol, number of epoxy groups: 1

C-2: hexamethylenediamine (manufactured by Tokyo Chemical Industry Co., Ltd.), molecular weight: 116

Thermoplastic Resin

Polyarylene sulfide (PPS) resin film: obtained by processing "Torelina (registered trademark)" M2888 (manufactured by Toray Industries, Inc.) into a film (basis weight: 100 g/m$^2$)

Example 191

This Example includes the following first to fourth steps.

First Step: Step of Producing Carbon Fiber as a Raw Material.

A copolymer including 99 mol % of acrylonitrile and 1 mol % of itaconic acid was spun, and baked to obtain carbon fiber having a total filament number of 24000, a total fineness of 1000 tex, a specific gravity of 1.8, a strand tensile strength of 6.2 GPa and a strand tensile elastic modulus of 300 GPa. Then, the carbon fiber was subjected to an electrolytic surface treatment at an electricity amount of 100 C per 1 g of carbon fiber using an aqueous ammonium hydrogen carbonate solution with a concentration of 0.1 mol/L as an electrolytic solution. The carbon fiber subjected to an electrolytic surface treatment was subsequently rinsed, dried in heated air at a temperature of 150° C. to obtain carbon fiber as a raw material. The surface oxygen concentration O/C at this time was 0.20. This was designated as carbon fiber A.

Second Step: Step of Depositing a Sizing Agent on Carbon Fiber.

The component (A-1) and the component (B-1) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Cutting Sizing Agent-Applied Carbon Fiber.

The sizing agent-applied carbon fiber obtained in the second step was cut to 6 mm using a cartridge cutter.

Fourth Step: Step of Forming a Composite With a Thermoplastic Resin.

The sizing agent-applied carbon fiber (basis weight: 86 g/m$^2$) cut in the previous step was randomly placed on a PPS resin film, another PPS resin film was held over the carbon fiber, and this was heated and pressurized at 330° C. and 5.0 MPa and then cooled and pressurized at 60° C. and 5.0 MPa by a heat press apparatus to obtain cut sizing agent-applied carbon fiber and a PPS resin formed into a composite. Further, the molding material was stacked, heated and pressurized, and cooled and pressurized so that a molded article had a thickness of 3 mm. The carbon fiber content of the obtained molded article was 30% by weight. The molded article was left standing for 24 hours in a constant-temperature and constant-humidity chamber adjusted to 50% RH at a temperature of 23° C., and then subjected to a characteristic evaluation test. Next, the obtained test pieces for evaluation of characteristics were evaluated in accordance with the above-described method for evaluation of a molded article. The results were summarized in Table 23. As a result, it was found that dynamic characteristics were sufficiently high with the flexural strength being 285 MPa.

Examples 192 to 196

First Step: Step of Producing Carbon Fiber as a Raw Material.

Carbon fiber was produced in the same manner as in Example 191.

Second Step: Step of Depositing a Sizing Agent on Carbon Fiber.

Sizing agent-applied carbon fiber was obtained using the same method as that in Example 191, except that the mass ratio of the component (A) and the component (B) was changed as shown in Table 23. The deposition amount of the sizing agent was 0.5 parts by mass based on 100 parts by mass of the surface-treated carbon fiber in each case.

Third and Fourth Steps:

Test pieces for evaluation of characteristics were formed using the same method as that in Example 191. Next, the obtained test pieces for evaluation of characteristics were evaluated in accordance with the above-described method for evaluation of a molded article. The results were summarized in Table 23. As a result, it was found that dynamic characteristics were sufficiently high with the flexural strength being 265 to 280 MPa.

Comparative Example 38

First Step: Step oProducing Carbon Fiber as a Raw Material.

Carbon fiber was produced in the same manner as in Example 191.

Second Step: Step of Depositing a Sizing Agent on Carbon Fiber.

Only the component (A-1) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps:

Test pieces for evaluation of characteristics were formed using the same method as that in Example 191. Next, the obtained test pieces for evaluation of characteristics were evaluated in accordance with the above-described method for evaluation of a molded article. The results were summarized in Table 23. As a result, it was found that dynamic characteristics were insufficient with the flexural strength being 251 MPa.

A-5: "jER (registered trademark)" 1001 (manufactured by Mitsubishi Chemical Corporation)
  Diglycidyl ether of bisphenol A
  Epoxy equivalent: 475 g/mol, number of epoxy groups: 2
A-6: "DENACOL (registered trademark)" EX-810 (manufactured by Nagase ChemteX Corporation).
  Diglycidyl ether of ethylene glycol
  Epoxy equivalent: 113 g/mol, number of epoxy groups: 2
A-7: "TETRAD-X (manufactured by Mitsubishi Gas Chemical Company, Inc.)
  Tetraglycidylmethaxylenediamine
  Epoxy equivalent: 100 g/mol, number of epoxy groups: 4
  Component Corresponding to Both (A1) Component and (A-2) Component: A-8
A-8: "DENACOL (registered trademark)" EX-611 (manufactured by Nagase ChemteX Corporation).

TABLE 23

|  |  |  | Example 191 | Example 192 | Example 193 | Example 194 | Example 195 | Example 196 | Comparative Example 38 |
|---|---|---|---|---|---|---|---|---|---|
| Component (A) Parts by mass | A-1 | jER152 | 100 | 100 | 100 | 100 | 100 | 100 | 100 |
|  | A-2 | N660 |  |  |  |  |  |  |  |
| Component (B) Parts by mass | B-1 | DBU | 3 |  |  |  |  |  |  |
|  | B-4 | DMP-30 |  | 3 |  |  |  |  |  |
|  | B-8 | Benzyltrimethylammonium bromide |  |  | 3 |  |  |  |  |
|  | B-14 | 1-hexadecylpyridinium chloride |  |  |  | 3 |  |  |  |
|  | B-15 | Tetrabutylphosphonium bromide |  |  |  |  | 3 |  |  |
|  | B-17 | Triphenylphosphine |  |  |  |  |  | 3 |  |
| Matrix resin |  |  | PPS | PPS | PPS | PPS | PPS | PPS | PPS |
| Carbon fiber |  |  | A | A | A | A | A | A | A |
| Flexural strength |  | MPa | 285 | 280 | 277 | 270 | 275 | 265 | 251 |

Examples and Comparative Examples for a prepreg will be described below.

<Method for Evaluation of 90° Flexural Properties of Unidirectional Molded Article>

A flexural strength test piece having a length of 130±1 mm and a width of 25±0.2 mm was cut out from the obtained unidirectional article in a direction perpendicular to a direction of carbon fiber. In accordance with the test method defined in ASTM D-790 (2004), a supports span was set at 100 mm using a three-point flexural test tool (indenter: 10 mm and supporting point: 10 mm), and a flexural strength was measured at a cross head speed of 5.3 mm/minute. In these Examples, "Instron (registered trademark)" Universal Tester Model 4201 (manufactured by Instron Ltd.) was used as a tester. The number of measurements was n=5, and an average value was defined as a flexural strength.

The materials and components used in Examples and Comparative Examples are as follows.

(A1) Components: A-1 to A-7
A-1: "jER (registered trademark)" 152 (manufactured by Mitsubishi Chemical Corporation)
  Glycidyl ether of phenol novolak
  Epoxy equivalent: 175 g/mol, number of epoxy groups: 3
A-2: "EPICLON (registered trademark)" N660 (manufactured by DIC Corporation)
  Glycidyl ether of cresol novolak
  Epoxy equivalent: 206 g/mol, number of epoxy groups: 3
A-3: "Araldite (registered trademark)" MY721 (manufactured by Huntsman Advanced Materials Co., Ltd.)
  N,N,N',N'-tetraglycidyl-4,4'-diaminodiphenylmethane
  Epoxy equivalent: 113 g/mol, number of epoxy groups: 4
A-4: "jER (registered trademark)" 828 (manufactured by Mitsubishi Chemical Corporation)
  Diglycidyl ether of bisphenol A
  Epoxy equivalent: 189 g/mol, number of epoxy groups: 2

Sorbitol polyglycidyl ether
  Epoxy equivalent: 167 g/mol, number of epoxy groups: 4
  Number of hydroxyl groups: 2
(A2) Components: A-9 and A-10
A-9: "DENACOL (registered trademark)" EX-731 (manufactured by Nagase ChemteX Corporation).
  N-glycidyl phthalimide
  Epoxy equivalent: 216 g/mol, number of epoxy groups: 1
  Number of imide groups: 1
A-10: "ADEKA RESIN (registered trademark)" EPU-6 (manufactured by ADEKA CORPORATION)
  Urethane-modified epoxy
  Epoxy equivalent: 250 g/mol, number of epoxy groups: 1
  Number of urethane groups: 1 or more
(B1) Components: B-1 to B-7
B-1: "DBU (registered trademark)" (manufactured by San-Apro Ltd.), corresponding to formula (III)
  1,8-diazabicyclo[5,4,0]-7-undecene, molecular weight: 152
B-2: N,N-dimethylbenzylamine (manufactured by Tokyo Chemical Industry Co., Ltd.), molecular weight: 135.21
B-3: 1,8-bis(dimethylamino)naphthalene (manufactured by Aldrich Co., Ltd.), corresponding to formula (IV)
  Another name: proton sponge, molecular weight: 214.31
B-4: 2,4,6-tris(dimethylaminomethyl)phenol (manufactured by Tokyo Chemical Industry Co., Ltd.), corresponding to formula (V)
  Another name: DMP-30, molecular weight: 265.39
B-5: "DBN (manufactured by San-Apro Ltd.), molecular weight: 124, corresponding to formula (III)
  1,5-diazabicyclo[4,3,0]-5-nonene
B-6: triisopropanolamine (manufactured by Tokyo Chemical Industry Co., Ltd.), molecular weight: 191.27, corresponding to formula (VI)

B-7: U-CAT SA506 (manufactured by San-Apro Ltd.), corresponding to formula (III)
DBU-p-toluenesulfonic acid salt, molecular weight: 324.44

(B2) Components: B-8 to B-14

B-8: benzyltrimethylammonium bromide (the carbon number of $R_1$ is 7, the carbon numbers of $R_2$ to $R_4$ are each 1, and the anion site is a bromide anion, manufactured by Tokyo Chemical Industry Co., Ltd.), corresponding to formula (I)

B-9: tetrabutylammonium bromide (the carbon numbers of $R_1$ to $R_4$ are each 4, and the anion site is a bromide anion, manufactured by Tokyo Chemical Industry Co., Ltd.), corresponding to formula (I)

B-10: trimethyloctadecylammonium bromide (the carbon number of $R_1$ is 18, the carbon numbers of $R_2$ to $R_4$ are each 1, and the anion site is a bromide anion, manufactured by Tokyo Chemical Industry Co., Ltd.), corresponding to formula (I)

B-11: (2-methoxyethoxymethyl)triethylammonium chloride (the carbon number of $R_1$ is 4, the carbon numbers of $R_2$ to $R_4$ are each 2, and the anion site is a chloride anion, manufactured by Tokyo Chemical Industry Co., Ltd.), corresponding to formula (I)

B-12: (2-acetoxyethyl)trimethylammonium chloride (the carbon number of $R_1$ is 4, the carbon numbers of $R_2$ to $R_4$ are each 1, and the anion site is a chloride anion, manufactured by Tokyo Chemical Industry Co., Ltd.), corresponding to formula (I)

B-13: (2-hydroxyethyl)trimethylammonium bromide (the carbon number of $R_1$ is 2, the carbon numbers of $R_2$ to $R_4$ are each 1, and the anion site is a bromide anion, manufactured by Tokyo Chemical Industry Co., Ltd.), corresponding to formula (I)

B-14: 1-hexadecylpyridinium chloride (the carbon number of $R_5$ is 16, $R_6$ and $R_7$ are each a hydrogen atom, and the anion site is a chloride anion, manufactured by Tokyo Chemical Industry Co., Ltd.), corresponding to formula (II)

(B3) Components: B-15 to B-17

B-15: tetrabutylphosphonium bromide (the carbon numbers of $R_{30}$ to $R_{33}$ are each 4, and the anion site is a bromide anion, manufactured by Tokyo Chemical Industry Co., Ltd.), molecular weight: 339, corresponding to formula (IX)

B-16: tetraphenylphosphonium bromide (the carbon numbers of $R_{30}$ to $R_{33}$ are each 6, and the anion site is a bromide anion, manufactured by Tokyo Chemical Industry Co., Ltd.), molecular weight: 419, corresponding to formula (IX)

B-17: triphenylphosphine (the carbon numbers of $R_{34}$ to $R_{36}$ are each 6, manufactured by Tokyo Chemical Industry Co., Ltd.), molecular weight: 262, corresponding to formula (X)

(C) Component (Other Components): C-1 and C-2

C-1: "DENACOL (registered trademark)" EX-141 (manufactured by Nagase ChemteX Corporation).
Phenylglycidyl ether, epoxy equivalent: 151 g/mol, number of epoxy groups: 1

C-2: hexamethylenediamine (manufactured by Tokyo Chemical Industry Co., Ltd.), molecular weight: 116

Thermoplastic Resin

Polyarylene sulfide (PPS) resin pellet: "Torelina (registered trademark)" A900 (manufactured by Toray Industries, Inc.)

Polyamide 6 (PA6) resin pellet: "Amilan (registered trademark)" CM1001 (manufactured by Toray Industries, Inc.)

Polypropylene (PP) resin pellet (polyolefin-based resin): mixture of unmodified PP resin pellet and acid-modified PP resin pellet at a weight ratio of 1:1

Unmodified PP resin pellet: "Prime Polypro (registered trademark)" J830HV (manufactured by Prime Polymer Co., Ltd.)

Unmodified PP resin pellet: "Admer (registered trademark)" QE800 (manufactured by Mitsui Chemicals, Incorporated)

Polycarbonate (PC) resin pellet: "Lexan (registered trademark)" 141R (SABIC)

ABS resin pellet (styrene-based resin): "Toyolac (registered trademark)" T-100A (manufactured by Toray Industries, Inc.)

Example 197

This Example includes the following first to fourth steps.

First Step: Step of Producing Carbon Fiber as a Raw Material.

A copolymer including 99 mol % of acrylonitrile and 1 mol % of itaconic acid was spun, and baked to obtain carbon fiber having a total filament number of 24000, a total fineness of 1000 tex, a specific gravity of 1.8, a strand tensile strength of 6.2 GPa and a strand tensile elastic modulus of 300 GPa. Then, the carbon fiber was subjected to an electrolytic surface treatment at an electricity amount of 100 C per 1 g of carbon fiber using an aqueous ammonium hydrogen carbonate solution with a concentration of 0.1 mol/L as an electrolytic solution. The carbon fiber subjected to an electrolytic surface treatment was subsequently rinsed, dried in heated air at a temperature of 150° C. to obtain carbon fiber as a raw material. The surface oxygen concentration O/C at this time was 0.20. This was designated as carbon fiber A.

Second Step: Step of Depositing a Sizing Agent on Carbon Fiber.

The component (A-4) and the component (B-1) were mixed at a mass ratio of 100:1, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Tape-Shaped Prepreg.

A corrugated cross head die, through which a continuous sizing agent-applied carbon fiber could pass, was mounted at the end part of a single screw extruder. Then, a PPS resin pellet was supplied in a molten state from the extruder to the cross head die while the continuous sizing agent-applied carbon fiber was caused to pass through the cross head die at a rate of 5 m/minute to be drawn, so that the continuous sizing agent-applied carbon fiber was impregnated with the PPS resin, and the melt-impregnated product was heated, cooled and then wound to prepare a tape-shaped prepreg. In the extruder, carbon fiber and the resin pellet were sufficiently kneaded at a barrel temperature of 320° C. and a rotation number of 150 rpm, and degassed by a downstream vacuum vent. Supply of the PPS resin pellet was adjusted so that the amount of the PPS resin was 34 parts by mass while the amount of sizing agent-applied carbon fiber was 66 parts by mass.

Fourth Step: Step of Stacking and Press-Molding Prepregs.

The tape-shaped prepreg obtained in the previous step was drawn in one direction into a mold of 30 cm×30 cm, press-molded under the condition of 330° C.×10 minutes by a heating press molding machine to obtain a flat plate-shape molded article of 30 cm×30 cm×3 mm. Next, the obtained test pieces for evaluation of characteristics were evaluated in accordance with the above-described method for evaluation of a molded article. The results were summarized in Table 24. As a result, it was found that dynamic characteristics were sufficiently high with the flexural strength being 73 MPa.

Examples 198 to 201

First Step: Step of Producing Carbon Fiber as a Raw Material.

Carbon fiber was produced in the same manner as in Example 197.

Comparative Examples 39 to 43

First Step: Step of Producing Carbon Fiber as a Raw Material.

Carbon fiber was produced in the same manner as in Example 197.

Second Step: Step of Depositing a Sizing Agent on Carbon Fiber.

Sizing agent-applied carbon fiber was obtained using the same method as that in Example 197, except that the mass ratio of the component (A), the component (B) and the component (C) (other components) was changed as shown in Table 24. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 24. As a result, it was found that dynamic characteristics were insufficient with the flexural strength being 55 to 60 MPa.

TABLE 24

| | | | Example 197 | Example 198 | Example 199 | Example 200 | Example 201 | Comparative Example 39 |
|---|---|---|---|---|---|---|---|---|
| Component (A) | A 4 | jER828 | 100 | 100 | 100 | 100 | 100 | 100 |
| Parts by mass | A 5 | jER1001 | | | | | | |
| Component (B) | B 1 | DBU | 1 | 3 | 6 | 15 | 20 | |
| Parts by mass | B 2 | N,N dimethylbenzylamine | | | | | | |
| Component (C) | C 1 | EX 141 | | | | | | |
| Parts by mass | C 2 | Hexamethylenediamine | | | | | | |
| Thermoplastic resin | | | PPS | PPS | PPS | PPS | PPS | PPS |
| Carbon fiber | | | A | A | A | A | A | A |
| 90° Flexural strength | | MPa | 73 | 76 | 75 | 77 | 70 | 58 |

| | | | Comparative Example 40 | Comparative Example 41 | Comparative Example 42 | Comparative Example 43 |
|---|---|---|---|---|---|---|
| Component (A) | A 4 | jER828 | 100 | 100 | | |
| Parts by mass | A 5 | jER1001 | | | | |
| Component (B) | B 1 | DBU | 30 | | | 3 |
| Parts by mass | B 2 | N,N dimethylbenzylamine | | | | |
| Component (C) | C 1 | EX 141 | | | 100 | 100 |
| Parts by mass | C 2 | Hexamethylenediamine | | 3 | | |
| Thermoplastic resin | | | PPS | PPS | PPS | PPS |
| Carbon fiber | | | A | A | A | A |
| 90° Flexural strength | | MPa | 55 | 56 | 58 | 60 |

Second Step: Step of Depositing a Sizing Agent on Carbon Fiber.

Sizing agent-applied carbon fiber was obtained using the same method as that in Example 197, except that the mass ratio of the components (A-4) and (B-1) was changed in a range of 100:3 to 100:20 as shown in Table 24. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 24. As a result, it was found that dynamic characteristics were sufficiently high with the flexural strength being 70 to 77 MPa.

Examples 202 to 211

First Step: Step of Producing Carbon Fiber as a Raw Material.

Carbon fiber was produced in the same manner as in Example 197.

Second Step: Step of Depositing a Sizing Agent on Carbon Fiber.

Sizing agent-applied carbon fiber was obtained using the same method as that in Example 197, except that the mass ratio of the component (A) and the component (B) was changed as shown in Table 25. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 25. As a result, it was found that dynamic characteristics were sufficiently high with the flexural strength being 70 to 85 MPa.

Example 212

First Step: Step of Producing Carbon Fiber as a Raw Material.

Carbon fiber was produced in the same manner as in Example 197 except that carbon fiber was subjected to an electrolytic surface treatment at an electricity amount of 20 C per 1 g of carbon fiber using an aqueous sulfuric acid solution with a concentration of 0.05 mol/L as an electrolytic solution. The surface oxygen concentration O/C at this time was 0.20. This was designated as carbon fiber B.

Second Step: Step of Depositing a Sizing Agent on Carbon Fiber.

The component (A-4) and the component (B-7) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 25. As a result, it was found that dynamic characteristics were sufficiently high with the flexural strength being 70 MPa.

Example 213

First Step: Step of Producing Carbon Fiber as a Raw Material.

Carbon fiber B obtained in Example 212 was immersed in an aqueous tetraethylammonium hydroxide solution (pH=14), and drawn up while being ultrasonically vibrated. The surface oxygen concentration O/C at this time was 0.17. This was designated as carbon fiber C.

Second Step: Step of Depositing a Sizing Agent on Carbon Fiber.

The component (A-4) and the component (B-7) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 25. As a result, it was found that dynamic characteristics were sufficiently high with the flexural strength being 77 MPa.

Comparative Example 44

First Step: Step of Producing Carbon Fiber as a Raw Material.

Carbon fiber was produced in the same manner as in Example 212.

Second Step: Step of Depositing a Sizing Agent on Carbon Fiber.

Only the component (A-4) was mixed with acetone to obtain an acetone solution of about 1% by mass with a sizing agent uniformly dissolved therein. The acetone solution of a sizing agent was used to apply the sizing agent to the surface-treated carbon fiber B using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 25. As a result, it was found that dynamic characteristics were insufficient with the flexural strength being 50 MPa.

Comparative Example 45

First Step: Step of Producing Carbon Fiber as a Raw Material.

Carbon fiber was produced in the same manner as in Example 213.

Second Step: Step of Depositing a Sizing Agent on Carbon Fiber.

Only the component (A-4) was mixed with acetone to obtain an acetone solution of about 1% by mass with a sizing agent uniformly dissolved therein. The acetone solution of a sizing agent was used to apply the sizing agent to the surface-treated carbon fiber C using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 25. As a result, it was found that dynamic characteristics were insufficient with the flexural strength being 53 MPa.

TABLE 25

| | | | Example 202 | Example 203 | Example 204 | Example 205 | Example 206 | Example 207 | Example 208 | Example 209 |
|---|---|---|---|---|---|---|---|---|---|---|
| Component (A) Parts by mass | A-1 | jER152 | 100 | | | | | | | |
| | A-2 | N660 | | 100 | | | | | | |
| | A-3 | MY721 | | | 100 | | | | | |
| | A-4 | jER828 | | | | 100 | | | | |
| | A-5 | jER1001 | | | | | 100 | | | |
| | A-6 | EX-810 | | | | | | 100 | | |
| | A-7 | TETRAD-X | | | | | | | 100 | |
| | A-8 | EX-611 | | | | | | | | 100 |
| | A-9 | EX-731 | | | | | | | | |
| | A-10 | EPU-6 | | | | | | | | |
| Component (B) Parts by mass | B-6 | Triisopropanolamine | | | | | | | | |
| | B-7 | DBU-p-toluenesulfonic acid salt | 3 | 3 | 3 | 3 | 3 | 3 | 3 | 3 |
| Thermoplastic resin | | | PPS | PPS | PPS | PPS | PPS | PPS | PPS | PPS |
| Carbon fiber | | | A | A | A | A | A | A | A | A |
| 90° Flexural strength | MPa | | 85 | 82 | 81 | 77 | 74 | 70 | 80 | 71 |

| | | | Example 210 | Example 211 | Example 212 | Example 213 | Comparative Example 44 | Comparative Example 45 |
|---|---|---|---|---|---|---|---|---|
| Component (A) Parts by mass | A-1 | jER152 | | | | | | |
| | A-2 | N660 | | | | | | |
| | A-3 | MY721 | | | | | | |
| | A-4 | jER828 | | | 100 | 100 | 100 | 100 |
| | A-5 | jER1001 | | | | | | |
| | A-6 | EX-810 | | | | | | |
| | A-7 | TETRAD-X | | | | | | |
| | A-8 | EX-611 | | | | | | |
| | A-9 | EX-731 | 100 | | | | | |
| | A-10 | EPU-6 | | 100 | | | | |
| Component (B) Parts by mass | B-6 | Triisopropanolamine | | | | | | |
| | B-7 | DBU-p-toluenesulfonic acid salt | 3 | 3 | 3 | 3 | | |
| Thermoplastic resin | | | PPS | PPS | PPS | PPS | PPS | PPS |
| Carbon fiber | | | A | A | B | C | B | C |
| 90° Flexural strength | MPa | | 72 | 70 | 70 | 77 | 50 | 53 |

Examples 214 to 220

First Step: Step of Producing Carbon Fiber as a Raw Material.

Carbon fiber was produced in the same manner as in Example 197.

Second Step: Step of Depositing a Sizing Agent on Carbon Fiber.

Sizing agent-applied carbon fiber was obtained using the same method as that in Example 197, except that the component (A) and the component (B) were changed as shown in Table 26-1. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 26-1. As a result, it was found that dynamic characteristics were sufficiently high with the flexural strength being 80 to 86 MPa.

Example 221

First Step: Step of Producing Carbon Fiber as a Raw Material.

Carbon fiber was produced in the same manner as in Example 197 except that carbon fiber was subjected to an electrolytic surface treatment at an electricity amount of 20 C per 1 g of carbon fiber using an aqueous sulfuric acid solution with a concentration of 0.05 mol/L as an electrolytic solution. The surface oxygen concentration O/C at this time was 0.20. This was designated as carbon fiber B.

Second Step: Step of Depositing a Sizing Agent on Carbon Fiber.

The component (A-1) and the component (B-8) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 26-1. As a result, it was found that dynamic characteristics were sufficiently high with the flexural strength being 72 MPa.

Example 222

First Step: Step of Producing Carbon Fiber as a Raw Material.

Carbon fiber B obtained in Example 221 was immersed in an aqueous tetraethylammonium hydroxide solution (pH=14), and drawn up while being ultrasonically vibrated. The surface oxygen concentration O/C at this time was 0.17. This was designated as carbon fiber C.

Second Step: Step of Depositing a Sizing Agent on Carbon Fiber.

The component (A-1) and the component (B-8) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 26-1. As a result, it was found that dynamic characteristics were sufficiently high with the flexural strength being 77 MPa.

parts by mass based on 100 parts by mass of the surface-treated carbon fiber in each case.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 26-2. As a result, it was found that dynamic characteristics were sufficiently high with the flexural strength being 73 to 82 MPa.

Comparative Example 46

First Step: Step of Producing Carbon Fiber as a Raw Material.

Carbon fiber was produced in the same manner as in Example 197.

Second Step: Step of Depositing a Sizing Agent on Carbon Fiber.

Only the component (A-1) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treat-

TABLE 26-1

| | | | Example 214 | Example 215 | Example 216 | Example 217 | Example 218 |
|---|---|---|---|---|---|---|---|
| Component (A) | A-1 | jER152 | 100 | 100 | 100 | 100 | 100 |
| Parts by mass | A-2 | N660 | | | | | |
| Component (B) | B-1 | DBU | 3 | | | | |
| Parts by mass | B-2 | N,N-dimethylbenzylamine | | 3 | | | |
| | B-3 | Proton sponge | | | 3 | | |
| | B-4 | DMP-30 | | | | 3 | |
| | B-5 | DBN | | | | | 3 |
| | B-6 | Triisopropanolamine | | | | | |
| | B-8 | Benzyltrimethylammonium bromide | | | | | |
| Thermoplastic resin | | | PPS | PPS | PPS | PPS | PPS |
| Carbon fiber | | | A | A | A | A | A |
| 90° Flexural strength | | MPa | 86 | 80 | 81 | 80 | 83 |

| | | | Example 219 | Example 220 | Example 221 | Example 222 |
|---|---|---|---|---|---|---|
| Component (A) | A-1 | jER152 | 100 | 100 | 100 | 100 |
| Parts by mass | A-2 | N660 | | | | |
| Component (B) | B-1 | DBU | | | | |
| Parts by mass | B-2 | N,N-dimethylbenzylamine | | | | |
| | B-3 | Proton sponge | | | | |
| | B-4 | DMP-30 | | | | |
| | B-5 | DBN | | | | |
| | B-6 | Triisopropanolamine | 3 | | | |
| | B-8 | Benzyltrimethylammonium bromide | | 3 | 3 | 3 |
| Thermoplastic resin | | | PPS | PPS | PPS | PPS |
| Carbon fiber | | | A | A | B | C |
| 90° Flexural strength | | MPa | 85 | 80 | 72 | 77 |

Examples 223 to 231

First Step: Step of Producing Carbon Fiber as a Raw Material.

Carbon fiber was produced in the same manner as in Example 197.

Second Step: Step of Depositing a Sizing Agent on Carbon Fiber.

Sizing agent-applied carbon fiber was obtained using the same method as that in Example 197, except that the component (A) and the component (B) were changed as shown in Table 26-2. The deposition amount of the sizing agent was 0.5 ment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 197. Next, the obtained test pieces for evaluation of characteristics were evaluated in accordance with the above-described method for evaluation of a molded article. The results were summarized in Table 26-2. As a result, it was found that dynamic characteristics were insufficient with the flexural strength being 62 MPa.

amount of the PA6 resin was 30 parts by mass while the amount of sizing agent-applied carbon fiber was 70 parts by mass.

TABLE 26-2

| | | | Example 223 | Example 224 | Example 225 | Example 226 | Example 227 | Example 228 | Example 229 | Example 230 | Example 231 | Comparative Example 46 |
|---|---|---|---|---|---|---|---|---|---|---|---|---|
| Component (A) Parts by mass | A-1 | jER152 | 100 | 100 | 100 | 100 | 100 | 100 | 100 | 100 | 100 | 100 |
| | A-2 | N660 | | | | | | | | | | |
| Component (B) Parts by mass | B-9 | Tributylammonium bromide | 3 | | | | | | | | | |
| | B-10 | Trimethyloctadecylammonium bromide | | 3 | | | | | | | | |
| | B-11 | (2 methoxyethoxymethyl)-triethylammonium chloride | | | 3 | | | | | | | |
| | B-12 | (2-acetoxyethyl)trimethyl-ammonium chloride | | | | 3 | | | | | | |
| | B-13 | (2-hydroxyethyl)trimethyl-ammonium bromide | | | | | 3 | | | | | |
| | B-14 | 1-hexadecylpyridinium chloride | | | | | | 3 | | | | |
| | B-15 | Tetrabutylphosphonium bromide | | | | | | | 3 | | | |
| | B-16 | Tetraphenylphosphonium bromide | | | | | | | | 3 | | |
| | B-17 | Triphenylphosphine | | | | | | | | | 3 | |
| Thermoplastic resin | | | PPS | PPS | PPS | PPS | PPS | PPS | PPS | PPS | PPS | PPS |
| Carbon fiber | | | A | A | A | A | A | A | A | A | A | A |
| 90° Flexural strength | | MPa | 80 | 75 | 82 | 76 | 77 | 80 | 75 | 74 | 73 | 62 |

Example 232

This Example includes the following first to fourth steps.

First Step: Step of Producing Carbon Fiber as a Raw Material.

Carbon fiber was produced in the same manner as in Example 197.

Second Step: Step of Depositing a Sizing Agent on Carbon Fiber.

The component (A-8) and the component (B-1) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Tape-Shaped Prepreg.

A corrugated cross head die, through which a continuous sizing agent-applied carbon fiber could pass, was mounted at the end part of a single screw extruder. Then, a PA6 resin pellet was supplied in a molten state from the extruder to the cross head die while the continuous sizing agent-applied carbon fiber was caused to pass through the cross head die at a rate of 5 m/minute to be drawn, so that the continuous sizing agent-applied carbon fiber was impregnated with the PA6 resin, and the melt-impregnated product was heated, cooled and then wound to prepare a tape-shaped prepreg. In the extruder, carbon fiber and the resin pellet were sufficiently kneaded at a barrel temperature of 300° C. and a rotation number of 150 rpm, and degassed by a downstream vacuum vent. Supply of the PA6 resin pellet was adjusted so that the Fourth Step: Step of Stacking and Press-Molding Prepregs.

The tape-shaped prepreg obtained in the previous step was drawn in one direction into a mold of 30 cm×30 cm, press-molded under the condition of 300° C.×10 minutes by a heating press molding machine to obtain a flat plate-shape molded article of 30 cm×30 cm×3 mm. Next, the obtained test pieces for evaluation of characteristics were evaluated in accordance with the above-described method for evaluation of a molded article. The results were summarized in Table 27. As a result, it was found that dynamic characteristics were sufficiently high with the flexural strength being 65 MPa.

Examples 233 to 237

First Step: Step of Producing Carbon Fiber as a Raw Material.

Carbon fiber was produced in the same manner as in Example 197.

Second Step: Step of Depositing a Sizing Agent on Carbon Fiber.

Sizing agent-applied carbon fiber was obtained using the same method as that in Example 232, except that the component (A) and the component (B) were changed as shown in Table 27. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 232. Next, the obtained test pieces for evaluation of characteristics were evaluated in accordance with the above-described method for evaluation of a molded article. The results were summarized in Table 27. As a result, it was found that dynamic characteristics were sufficiently high with the flexural strength being 55 to 63 MPa.

Comparative Example 47

First Step: Step of Producing Carbon Fiber as a Raw Material.

Carbon fiber was produced in the same manner as in Example 197.

Second Step: Step of Depositing a Sizing Agent on Carbon Fiber.

Only the component (A-8) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 232. Next, the obtained test pieces for evaluation of characteristics were evaluated in accordance with the above-described method for evaluation of a molded article. The results were summarized in Table 27. As a result, it was found that dynamic characteristics were insufficient with the flexural strength being 49 MPa.

was supplied in a molten state from the extruder to the cross head die while the continuous sizing agent-applied carbon fiber was caused to pass through the cross head die at a rate of 5 m/minute to be drawn, so that the continuous sizing agent-applied carbon fiber was impregnated with the PP resin, and the melt-impregnated product was heated, cooled and then wound to prepare a tape-shaped prepreg. In the extruder, carbon fiber and the resin pellet were sufficiently kneaded at a barrel temperature of 240° C. and a rotation number of 150 rpm, and degassed by a downstream vacuum vent. Supply of the PP resin pellet was adjusted so that the amount of the PP resin was 25 parts by mass while the amount of sizing agent-applied carbon fiber was 75 parts by mass.

Fourth Step: Step of Stacking and Press-Molding Prepregs.

The tape-shaped prepreg obtained in the previous step was drawn in one direction into a mold of 30 cm×30 cm, press-molded under the condition of 240° C.×10 minutes by a heating press molding machine to obtain a flat plate-shape molded article of 30 cm×30 cm×3 mm. Next, the obtained test pieces for evaluation of characteristics were evaluated in accordance with the above-described method for evaluation of a molded article. The results were summarized in Table 28. As a result, it was found that dynamic characteristics were sufficiently high with the flexural strength being 35 MPa.

TABLE 27

| | | | Example 232 | Example 233 | Example 234 | Example 235 | Example 236 | Example 237 | Comparative Example 47 |
|---|---|---|---|---|---|---|---|---|---|
| Component (A) | A-1 | jER152 | | | | | | | |
| Parts by mass | A-8 | EX-611 | 100 | 100 | 100 | 100 | 100 | 100 | 100 |
| Component (B) | B-1 | DBU | 3 | | | | | | |
| Parts by mass | B-4 | DMP-30 | | 3 | | | | | |
| | B-8 | Benzyltrimethylammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |
| Thermoplastic resin | | | PA6 | PA6 | PA6 | PA6 | PA6 | PA6 | PA6 |
| Carbon fiber | | | A | A | A | A | A | A | A |
| 90° Flexural strength | | MPa | 65 | 63 | 63 | 60 | 59 | 55 | 49 |

Example 238

This Example includes the following first to fourth steps.

First Step: Step of Producing Carbon Fiber as a Raw Material.

Carbon fiber was produced in the same manner as in Example 197.

Second Step: Step of Depositing a Sizing Agent on Carbon Fiber.

The component (A-8) and the component (B-6) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Tape-Shaped Prepreg.

A corrugated cross head die, through which a continuous sizing agent-applied carbon fiber could pass, was mounted at the end part of a single screw extruder. Then, a PP resin pellet

Examples 239 to 243

First Step: Step of Producing Carbon Fiber as a Raw Material.

Carbon fiber was produced in the same manner as in Example 197.

Second Step: Step of Depositing a Sizing Agent on Carbon Fiber.

Sizing agent-applied carbon fiber was obtained using the same method as that in Example 238, except that the component (A) and the component (B) were changed as shown in Table 28. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 238. Next, the obtained test pieces for evaluation of characteristics were evaluated in accordance with the above-described method for evaluation of a molded article. The results were summarized in Table 28. As a result, it was found that dynamic characteristics were sufficiently high with the flexural strength being 30 to 33 MPa.

Comparative Example 48

First Step: Step of Producing Carbon Fiber as a Raw Material.

Carbon fiber was produced in the same manner as in Example 197.

Second Step: Step of Depositing a Sizing Agent on Carbon Fiber.

Only the component (A-8) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 238. Next, the obtained test pieces for evaluation of characteristics were evaluated in accordance with the above-described method for evaluation of a molded article. The results were summarized in Table 28. As a result, it was found that dynamic characteristics were insufficient with the flexural strength being 20 MPa.

was supplied in a molten state from the extruder to the cross head die while the continuous sizing agent-applied carbon fiber was caused to pass through the cross head die at a rate of 5 m/minute to be drawn, so that the continuous sizing agent-applied carbon fiber was impregnated with the PC resin, and the melt-impregnated product was heated, cooled and then wound to prepare a tape-shaped prepreg. In the extruder, carbon fiber and the resin pellet were sufficiently kneaded at a barrel temperature of 300° C. and a rotation number of 150 rpm, and degassed by a downstream vacuum vent. Supply of the PC resin pellet was adjusted so that the amount of the PC resin was 31 parts by mass while the amount of sizing agent-applied carbon fiber was 69 parts by mass.

Fourth Step: Step of Stacking and Press-Molding Prepregs.

The tape-shaped prepreg obtained in the previous step was drawn in one direction into a mold of 30 cm×30 cm, press-molded under the condition of 320° C.×10 minutes by a heating press molding machine to obtain a flat plate-shape molded article of 30 cm×30 cm×3 mm. Next, the obtained test pieces for evaluation of characteristics were evaluated in accordance with the above-described method for evaluation of a molded article. The results were summarized in Table 29. As a result, it was found that dynamic characteristics were sufficiently high with the flexural strength being 58 MPa.

TABLE 28

|  |  |  | Example 238 | Example 239 | Example 240 | Example 241 | Example 242 | Example 243 | Comparative Example 48 |
|---|---|---|---|---|---|---|---|---|---|
| Component (A) Parts by mass | A-8 | EX-611 | 100 | 100 | 100 | 100 | 100 | 100 | 100 |
|  | A-9 | EX-731 |  |  |  |  |  |  |  |
| Component (B) Parts by mass | B-6 | Triisopropanolamine | 3 |  |  |  |  |  |  |
|  | B-7 | DBU-p-toluenesulfonic acid salt |  | 3 |  |  |  |  |  |
|  | B-8 | Benzyltrimethylammonium bromide |  |  | 3 |  |  |  |  |
|  | B-14 | 1-hexadecylpyridinium chloride |  |  |  | 3 |  |  |  |
|  | B-15 | Tetrabutylphosphonium bromide |  |  |  |  | 3 |  |  |
|  | B-17 | Triphenylphosphine |  |  |  |  |  | 3 |  |
| Thermoplastic resin |  |  | PP | PP | PP | PP | PP | PP | PP |
| Carbon fiber |  |  | A | A | A | A | A | A | A |
| 90° Flexural strength |  | MPa | 35 | 32 | 30 | 33 | 32 | 30 | 20 |

Example 244

This Example includes the following first to fourth steps.

First Step: Step of Producing Carbon Fiber as a Raw Material.

Carbon fiber was produced in the same manner as in Example 197.

Second Step: Step of Depositing a Sizing Agent on Carbon Fiber.

The component (A-10) and the component (B-6) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Tape-Shaped Prepreg.

A corrugated cross head die, through which a continuous sizing agent-applied carbon fiber could pass, was mounted at the end part of a single screw extruder. Then, a PC resin pellet

Examples 245 to 249

First Step: Step of Producing Carbon Fiber as a Raw Material.

Carbon fiber was produced in the same manner as in Example 197.

Second Step: Step of Depositing a Sizing Agent on Carbon Fiber.

Sizing agent-applied carbon fiber was obtained using the same method as that in Example 244, except that the component (A) and the component (B) were changed as shown in Table 29. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 244. Next, the obtained test pieces for evaluation of characteristics were evaluated in accordance with the above-described method for evaluation of a molded article. The results were summarized in Table 29. As a result, it was found that dynamic characteristics were sufficiently high with the flexural strength being 50 to 59 MPa.

Comparative Example 49

First Step: Step f Producing Carbon Fiber as a Raw Material.

Carbon fiber was produced in the same manner as in Example 197.

Second Step: Step of Depositing a Sizing Agent on Carbon Fiber.

Only the component (A-10) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 244. Next, the obtained test pieces for evaluation of characteristics were evaluated in accordance with the above-described method for evaluation of a molded article. The results were summarized in Table 29. As a result, it was found that dynamic characteristics were insufficient with the flexural strength being 42 MPa.

pellet was supplied in a molten state from the extruder to the cross head die while the continuous sizing agent-applied carbon fiber was caused to pass through the cross head die at a rate of 5 m/minute to be drawn, so that the continuous sizing agent-applied carbon fiber was impregnated with the ABS resin, and the melt-impregnated product was heated, cooled and then wound to prepare a tape-shaped prepreg. In the extruder, carbon fiber and the resin pellet were sufficiently kneaded at a barrel temperature of 250° C. and a rotation number of 150 rpm, and degassed by a downstream vacuum vent. Supply of the ABS resin pellet was adjusted so that the amount of the ABS resin was 28 parts by mass while the amount of sizing agent-applied carbon fiber was 72 parts by mass.

Fourth Step: Step of Stacking and Press-Molding Prepregs.

The tape-shaped prepreg obtained in the previous step was drawn in one direction into a mold of 30 cm×30 cm, press-molded under the condition of 260° C.×10 minutes by a heating press molding machine to obtain a flat plate-shape molded article of 30 cm×30 cm×3 mm. Next, the obtained test pieces for evaluation of characteristics were evaluated in accordance with the above-described method for evaluation of a molded article. The results were summarized in Table 30. As a result, it was found that dynamic characteristics were sufficiently high with the flexural strength being 48 MPa.

TABLE 29

| | | | Example 244 | Example 245 | Example 246 | Example 247 | Example 248 | Example 249 | Comparative Example 49 |
|---|---|---|---|---|---|---|---|---|---|
| Component (A) | A-9 | EX-731 | | | | | | | |
| Parts by mass | A-10 | EPU-6 | 100 | 100 | 100 | 100 | 100 | 100 | 100 |
| Component (B) | B-6 | Triisopropanolamine | 3 | | | | | | |
| Parts by mass | B-7 | DBU-p-toluenesulfonic acid salt | | 3 | | | | | |
| | B-8 | Benzyltrimethylammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |
| Thermoplastic resin | | | PC | PC | PC | PC | PC | PC | PC |
| Carbon fiber | | | A | A | A | A | A | A | A |
| 90° Flexural strength | | MPa | 58 | 59 | 55 | 55 | 54 | 50 | 42 |

Example 250

This Example includes the following first to fourth steps.

First Step: Step of Producing Carbon Fiber as a Raw Material.

Carbon fiber was produced in the same manner as in Example 197.

Second Step: Step of Depositing a Sizing Agent on Carbon Fiber.

The component (A-1) and the component (B-1) were mixed at a mass ratio of 100:3, and the mixture was further mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third Step: Step of Producing a Tape-Shaped Prepreg.

A corrugated cross head die, through which a continuous sizing agent-applied carbon fiber could pass, was mounted at the end part of a single screw extruder. Then, an ABS resin

Examples 251 to 255

First Step: Step of Producing Carbon Fiber as a Raw Material.

Carbon fiber was produced in the same manner as in Example 197.

Second Step: Step of Depositing a Sizing Agent on Carbon Fiber.

Sizing agent-applied carbon fiber was obtained using the same method as that in Example 250, except that the component (A) and the component (B) were changed as shown in Table 30. The deposition amount of the sizing agent was 0.5 parts by mass based on 100 parts by mass of the surface-treated carbon fiber in each case.

Third and Fourth Steps.

Test pieces for evaluation of characteristics were formed using the same method as that in Example 250. Next, the obtained test pieces for evaluation of characteristics were evaluated in accordance with the above-described method for evaluation of a molded article. The results were summarized in Table 30. As a result, it was found that dynamic characteristics were sufficiently high with the flexural strength being 42 to 49 MPa.

Comparative Example 50

First Step: Step of Producing Carbon Fiber as a Raw Material.

Carbon fiber was produced in the same manner as in Example 197.

Second Step: Step of Depositing a Sizing Agent on Carbon Fiber.

Only the component (A-1) was mixed with acetone to obtain an acetone solution of about 1% by mass with a sizing agent uniformly dissolved therein. The acetone solution of a sizing agent was used to apply the sizing agent to the surface-treated carbon fiber using an immersion method, a heat treatment was then performed at a temperature of 210° C. for 180 seconds to obtain sizing agent-applied carbon fiber. The deposition amount of the sizing agent was adjusted to be 0.5 parts by mass based on 100 parts by mass of the surface-treated carbon fiber.

Third and Fourth Steps.

Test pieces for evaluation of characteristics were formed using the same method as that in Example 250. Next, the obtained test pieces for evaluation of characteristics were evaluated in accordance with the above-described method for evaluation of a molded article. The results were summarized in Table 30. As a result, it was found that dynamic characteristics were insufficient with the flexural strength being 30 MPa.

TABLE 30

| | | | Example 250 | Example 251 | Example 252 | Example 253 | Example 254 | Example 255 | Comparative Example 50 |
|---|---|---|---|---|---|---|---|---|---|
| Component (A) Parts by mass | A-1 | jER152 | 100 | 100 | 100 | 100 | 100 | 100 | 100 |
| | A-2 | N660 | | | | | | | |
| Component (B) Parts by mass | B-1 | DBU | 3 | | | | | | |
| | B-3 | Proton sponge | | 3 | | | | | |
| | B-8 | Benzyltrimethylammonium bromide | | | 3 | | | | |
| | B-14 | 1-hexadecylpyridinium chloride | | | | 3 | | | |
| | B-15 | Tetrabutylphosphonium bromide | | | | | 3 | | |
| | B-17 | Triphenylphosphine | | | | | | 3 | |
| Thermoplastic resin | | | ABS | ABS | ABS | ABS | ABS | ABS | ABS |
| Carbon fiber | | | A | A | A | A | A | A | A |
| 90° Flexural strength | | MPa | 48 | 49 | 48 | 45 | 44 | 42 | 30 |

DESCRIPTION OF REFERENCE SIGNS

1: Molding material
1A: Molding material
2: Carbon fiber
3: Thermoplastic resin
4: Impregnation aid
L: Length of molding material

The invention claimed is:

1. A carbon fiber-reinforced thermoplastic resin composition comprising sizing agent-applied carbon fiber formed by depositing of a sizing agent containing the following components (A) and (B), carbon fiber and a thermoplastic resin;
   component (A): (A1) a bifunctional or higher functional epoxy compound and/or (A2) an epoxy compound which has a monofunctional or higher epoxy group and has one or more types of functional groups selected from a hydroxyl group, an amide group, an imide group, a urethane group, a urea group, a sulfonyl group and a sulfo group; and
   component (B): 0.1 to 25 parts by mass, based on 100 parts by mass of the component (A), of at least one reaction accelerator selected from the group consisting of the following compounds [a] and [b]:
   [a] a tertiary amine compound and/or tertiary amine salt having a molecular weight of 100 g/mol or more (B1); and
   [b] a quaternary ammonium salt (B2) having a cation site represented by the following general formula (I) or (II):

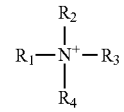

Formula (I)

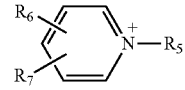

Formula (II)

wherein $R_1$ and $R_2$ represent a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group, and $R_3$ and $R_4$ represent a hydrocarbon group with a carbon number of 2 to 22, a group containing a hydrocarbon with a carbon number of 2 to 22 and an ether structure, a group containing a hydrocarbon with a carbon number of 2 to 22 and an ester structure or a group containing a hydrocarbon with a carbon number of 2 to 22 and a hydroxyl group; and in the general formula (II), $R_5$ represents a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group, and $R_6$ and $R_7$ each represent hydrogen, a hydrocarbon group with a carbon number of 1 to 8, a group containing a hydrocarbon with a carbon number of 1 to 8 and an ether structure or a group containing a hydrocarbon with a carbon number of 1 to 8 and an ester structure;
wherein the [a] tertiary amine compound and/or tertiary amine salt having a molecular weight of 100 g/mol or more (B1) is
a compound represented by the following general formula (III):

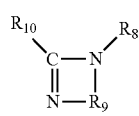

Formula (III)

wherein $R_8$ represents a hydrocarbon group with a carbon number of 1 to 22, a group containing a hydrocarbon with a carbon number of 1 to 22 and an ether structure or a group containing a hydrocarbon with a carbon number of 1 to 22 and an ester structure or a group containing a hydrocarbon with a carbon number of 1 to 22 and a hydroxyl group; $R_9$ is an alkylene group with a carbon number of 3 to 22, and may contain an unsaturated group; and $R_{10}$ represents hydrogen, a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group; or $R_8$ and $R_{10}$ are bonded to each other to form an alkylene group with a carbon number of 2 to 11, a compound represented by the following general formula (IV):

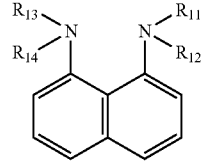

Formula (IV)

wherein $R_{11}$ to $R_{14}$ each represents a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group, a compound represented by the following general formula (V):

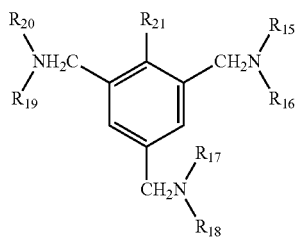

Formula (V)

wherein $R_{15}$ to $R_{20}$ each represents a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group; and $R_{21}$ represents a hydrocarbon group with a carbon number of 1 to 22, a group containing a hydrocarbon with a carbon number of 1 to 22 and an ether structure, a group containing a hydrocarbon with a carbon number of 1 to 22 and an ester structure, a group containing a hydrocarbon with a carbon number of 1 to 22 and a hydroxyl group, or a hydroxyl group, or a compound represented by the following general formula (VI), the compound having at least one branched structure and containing at least one hydroxyl group:

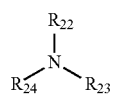

Formula (VI)

wherein $R_{22}$ to $R_{24}$ each represents a hydrocarbon group with a carbon number of 1 to 22, a group containing a hydrocarbon with a carbon number of 1 to 22 and an ether structure, a group containing a hydrocarbon with a carbon number of 1 to 22 and an ester structure or a group containing a hydrocarbon with a carbon number of 1 to 22 and a hydroxyl group, and any of $R_{22}$ to $R_{24}$ contains a branched structure represented by the general formula (VII) or (VIII);

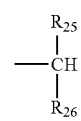

Formula (VII)

wherein $R_{25}$ and $R_{26}$ each represents a hydrocarbon group with a carbon number of 1 to 22, a group containing a hydrocarbon with a carbon number of 1 to 22 and an ether structure, a group containing a hydrocarbon with a carbon number of 1 to 22 and an ester structure, a group containing a hydrocarbon with a carbon number of 1 to 22 and a hydroxyl group, or a hydroxyl group; and

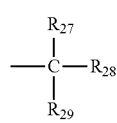

Formula (VIII)

wherein $R_{27}$ to $R_{29}$ each represents a hydrocarbon group with a carbon number of 1 to 22, a group containing a hydrocarbon with a carbon number of 1 to 22 and an ether structure, a group containing a hydrocarbon with a carbon number of 1 to 22 and an ester structure, a group containing a hydrocarbon with a carbon number of 1 to 22 and a hydroxyl group, or a hydroxyl group;

wherein the component (B) is contained in an amount of 0.001 to 0.3 parts by mass based on 100 parts by mass of carbon fiber.

2. The carbon fiber-reinforced thermoplastic resin composition according to claim 1, wherein the compound represented by the general formula (III) is 1,5-diazabicyclo[4,3,0]-5-nonene or a salt thereof, or 1,8-diazabicyclo[5,4,0]-7-undecene or a salt thereof.

3. The carbon fiber-reinforced thermoplastic resin composition according to claim 1, wherein the compound represented by the general formula (VI) has at least two branched structures.

4. The carbon fiber-reinforced thermoplastic resin composition according to claim 1, wherein the compound represented by the general formula (VI) is triisopropanolamine or a salt thereof.

5. The carbon fiber-reinforced thermoplastic resin composition according to claim 1, wherein an anion site of the [b] quaternary ammonium salt having a cation site (B2) is a halogen ion.

6. The carbon fiber-reinforced thermoplastic resin composition according to claim 1, wherein the component (A) satisfies at least one of the following requirements ($\alpha$) to ($\gamma$):
  ($\alpha$) the epoxy equivalent is less than 360 g/mol;
  ($\beta$) it is a trifunctional or higher epoxy compound; and
  ($\gamma$) an aromatic ring is included in the molecule.

7. The carbon fiber-reinforced thermoplastic resin composition according to claim 1, wherein the (A1) component is a phenol novolak epoxy resin, a cresol novolak epoxy resin or tetraglycidyldiaminodiphenylmethane.

8. The carbon fiber-reinforced thermoplastic resin composition according to claim 1, wherein the thermoplastic resin is at least one thermoplastic resin selected from the group consisting of a polyarylene sulfide resin, a polyether ether ketone resin, a polyphenylene ether resin, a polyoxymethylene resin, a polyamide resin, a polyester-based resin, a polycarbonate resin, a styrene-based resin and a polyolefin-based resin.

9. The carbon fiber-reinforced thermoplastic resin composition according to claim 1, wherein the surface oxygen concentration O/C of carbon fiber is 0.05 to 0.5 as measured by X-ray photoelectron spectroscopy.

10. The carbon fiber-reinforced thermoplastic resin composition according to claim 1, wherein the carbon fiber-reinforced thermoplastic resin composition comprises 1 to 80% by mass of sizing agent-applied carbon fiber formed by depositing 0.1 to 10 parts by mass, based on 100 parts by mass of carbon fiber, of a sizing agent containing the component (A) and the component (B), and 20 to 99% by mass of a thermoplastic resin.

11. The carbon fiber-reinforced thermoplastic resin composition according to claim 1, wherein the carbon fiber-reinforced thermoplastic resin composition is obtained by melt-kneading 1 to 80% by mass of sizing agent-applied carbon fiber obtained by depositing 0.1 to 10 parts by mass, based on 100 parts by mass of carbon fiber, of a sizing agent containing the component (A) and the component (B), and 20 to 99% by mass of a thermoplastic resin.

12. The carbon fiber-reinforced thermoplastic resin composition according to claim 1, wherein carbon fiber is subjected to liquid phase electrolytic oxidation in an alkaline electrolytic solution, or subjected to liquid phase electrolytic oxidation in an acidic electrolytic solution, and subsequently washed with an alkaline aqueous solution.

13. A carbon fiber-reinforced thermoplastic resin molded article formed by molding the carbon fiber-reinforced thermoplastic resin composition according to claim 1.

14. A molding material comprising at least the components (A) and (B), carbon fiber and thermoplastic resin according to claim 1, the molding material being any of the following molding materials (P), (Q) and (R):
  molding material (P): a pillar-shaped molding material (P) in which carbon fiber is arranged almost in parallel in the axial center direction and the length of carbon fiber is substantially equal to the length of the molding material;
  molding material (Q): molding material (Q) in which carbon fiber is in the form of a single fiber and substantially two-dimensionally oriented; and
  molding material (R): molding material (R) in which carbon fiber is in the form of a bundle and substantially two-dimensionally oriented.

15. The molding material according to claim 14, wherein the configuration of the molding material (P) satisfies at least one of the requirements ($\delta$) to ($\zeta$):
  ($\delta$) it has a core-sheath structure comprising as a core structure a structure B having carbon fiber as a principal component and comprising as a sheath structure a structure A having a thermoplastic resin as a principal component, with the structure A covering the periphery of the structure B;
  ($\epsilon$) the pillar-shaped molding material has a length of 1 to 50 mm; and
  ($\zeta$) it is a long fiber pellet.

16. The molding material according to claim 14, wherein the thermoplastic resin of the molding material (P) and a component (D) additionally contained in the molding material (P) satisfy any one of the requirements ($\eta$) to ($\kappa$):
  ($\eta$) the thermoplastic resin is a polyarylene sulfide resin and as the component (D), a polyarylene sulfide having a mass average molecular weight of 10000 or more and a dispersion degree of 2.5 or less in terms of a mass average molecular weight/number average molecular weight [d] is contained in an amount of 0.1 to 100 parts by mass based on 100 parts by mass of carbon fiber;
  ($\theta$) the thermoplastic resin is a polyamide resin and, as the component (D), a phenol-based polymer [e] is contained in an amount of 0.1 to 100 parts by mass based on 100 parts by mass of carbon fiber;
  ($\upsilon$) the thermoplastic resin is a polyolefin-based resin and, as the component (D), a terpene-based resin [f] is contained in an amount of 0.1 to 100 parts by mass based on 100 parts by mass of carbon fiber; and
  ($\kappa$) the thermoplastic resin is a polyolefin-based resin and as the component (D), a mixture of a first propylene-based resin [g] and a second propylene-based resin [h] having an acyl group on side chain is contained in an amount of 0.1 to 100 parts by mass based on 100 parts by mass of carbon fiber.

17. The molding material according to claim 16, wherein carbon fiber is impregnated with a part or the whole of the component (D) of the molding material (P).

18. The molding material according to claim 14, the shape of the thermoplastic resin of the molding material (Q) is any one selected from the group consisting of a particle shape, a fiber shape and a film shape.

19. The molding material according to claim 14, wherein the shape of the molding material (Q) is any one selected from the group consisting of a web shape, a nonwoven fabric shape and a felt shape.

20. A method for producing the molding material (Q) according to claim 14, the method comprising at least the following first step, second step and third step:
  first step: processing carbon fiber into a sheet-shaped fabric in any one shape selected from the group consisting of a web shape, a nonwoven fabric shape, a felt shape and a mat shape;
  second step: adding 0.1 to 10 parts by mass of a binder containing the component (A) and the component (B) based on 100 parts by mass of the fabric obtained in the first step; and third step: adding 1 to 80% by mass of the fabric, to which the binder is added in the second step, and 20 to 99% by mass of a thermoplastic resin, and performing heating and melting to form a composite.

21. The molding material according to claim 14, wherein the shape of the molding material (R) is a sheet shape.

22. A method for producing the molding material (R) according to claim 14, the method comprising the following first step, second step and third step:

first step: obtaining sizing agent-applied carbon fiber by depositing 0.1 to 10 parts by mass, based on 100 parts by mass of carbon fiber, of a sizing agent containing the component (A) and the component (B);

second step: cutting to 1 to 50 mm the sizing agent-applied carbon fiber obtained in the first step; and third step: mixing 1 to 80% by mass of the sizing agent-applied carbon fiber cut in the second step and 20 to 99% by mass of a matrix resin, thereby forming a composite.

23. A carbon fiber-reinforced composite material formed by molding the molding material according to claim 14.

24. A prepreg comprising sizing agent-applied carbon fiber formed by applying to carbon fiber a sizing agent containing at least the components (A) and (B) according to claim 1, and a thermoplastic resin.

25. The prepreg according to claim 24, wherein the width of the prepreg is 1 to 50 mm.

26. A carbon fiber-reinforced composite material formed by molding the prepreg according to claim 24.

* * * * *